US012240249B2

(12) United States Patent
Nakano et al.

(10) Patent No.: US 12,240,249 B2
(45) **Date of Patent: *Mar. 4, 2025**

(54) BOARD, LIQUID ACCOMMODATION CONTAINER, AND PRINTING SYSTEM

(71) Applicant: SEIKO EPSON CORPORATION, Tokyo (JP)

(72) Inventors: Shuichi Nakano, Shiojiri (JP); Yasuhiko Kosugi, Matsumoto (JP); Jun Sato, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/908,045

(22) Filed: Oct. 7, 2024

(65) Prior Publication Data

US 2025/0033367 A1 Jan. 30, 2025

Related U.S. Application Data

(63) Continuation of application No. 18/527,895, filed on Dec. 4, 2023, which is a continuation of application (Continued)

(30) Foreign Application Priority Data

Dec. 28, 2021 (JP) ................................ 2021-214129
Dec. 28, 2021 (JP) ................................ 2021-214139

(51) Int. Cl.
*B41J 2/175* (2006.01)

(52) U.S. Cl.
CPC ....... *B41J 2/17546* (2013.01); *B41J 2/17513* (2013.01); *B41J 2/17523* (2013.01); *B41J 2/17543* (2013.01)

(58) Field of Classification Search
CPC .... B41J 2/175; B41J 2/17503; B41J 2/17506; B41J 2/17509; B41J 2/17513;
(Continued)

(56) References Cited

U.S. PATENT DOCUMENTS 6,000,773 A 12/1999 Murray et al.
6,039,428 A 3/2000 Juve
(Continued)

FOREIGN PATENT DOCUMENTS

JP H10-337879 A 12/1998
JP 2000-269988 A 9/2000
(Continued)

OTHER PUBLICATIONS

U.S. Appl. No. 17/717,753, filed Apr. 11, 2022 in the name of Shuichi Nakano et al.
(Continued)

*Primary Examiner* — Anh T Vo
(74) *Attorney, Agent, or Firm* — Oliff PLC

(57) ABSTRACT

In a board that includes a plurality of contact portions that are arranged to contact corresponding apparatus-side terminals when the board is mounted in a printing apparatus, some contact portions are disposed in a first region, and the remaining contact portions are disposed in a second region. The some contact portions include a first contact portion, a second contact portion, a third contact portion, and a fourth contact portion. The remaining contact portions include a fifth contact portion. The some contact portions are arranged in a first pattern in the first region and the remaining contact portions are arranged in a second pattern in the second region, and the first pattern is asymmetrical to the second pattern with respect to a first virtual line.

26 Claims, 61 Drawing Sheets

Related U.S. Application Data

No. 17/988,307, filed on Nov. 16, 2022, now Pat. No. 11,872,822, which is a continuation of application No. 17/717,857, filed on Apr. 11, 2022, now Pat. No. 11,535,038.

(58) Field of Classification Search
CPC .... B41J 2/1752; B41J 2/17523; B41J 2/1753; B41J 2/17526; B41J 2/17546
See application file for complete search history.

(56) References Cited

U.S. PATENT DOCUMENTS

| | | | |
|---|---|---|---|
| 6,164,743 A | 12/2000 | Hmelar et al. | |
| 6,502,917 B1 | 1/2003 | Shinada et al. | |
| 6,648,445 B2 | 11/2003 | Ishizawa et al. | |
| 7,264,334 B2 | 9/2007 | Shinada et al. | |
| 7,967,415 B2 | 6/2011 | Asauchi et al. | |
| 8,033,629 B2 | 10/2011 | Asauchi | |
| 8,764,172 B2 * | 7/2014 | Asauchi | G03G 15/0863 347/86 |
| 11,535,038 B1 | 12/2022 | Nakano et al. | |
| 11,872,822 B2 | 1/2024 | Nakano et al. | |
| 2005/0237355 A1 | 10/2005 | Fukano et al. | |
| 2007/0149044 A1 | 6/2007 | Asauchi | |
| 2009/0085939 A1 * | 4/2009 | Asauchi | B41J 2/17546 347/6 |
| 2009/0262161 A1 | 10/2009 | Nishihara | |
| 2010/0091070 A1 | 4/2010 | Kimura | |
| 2010/0257305 A1 | 10/2010 | Asauchi | |
| 2010/0289847 A1 | 11/2010 | Ishizawa et al. | |
| 2011/0205589 A1 | 8/2011 | Sato | |
| 2011/0208991 A1 | 8/2011 | Sato | |
| 2012/0056954 A1 | 3/2012 | Asauchi et al. | |
| 2012/0074031 A1 | 3/2012 | Sato | |
| 2012/0272018 A1 | 10/2012 | Sato | |
| 2013/0050308 A1 | 2/2013 | Asauchi | |
| 2015/0237145 A1 | 8/2015 | Koseki et al. | |
| 2016/0140077 A1 | 5/2016 | Yoshida | |

FOREIGN PATENT DOCUMENTS

| | | |
|---|---|---|
| JP | 2005-190324 A | 7/2005 |
| JP | 2007-196664 A | 8/2007 |
| JP | 2010-060978 A | 3/2010 |
| JP | 2010-111116 A | 5/2010 |
| JP | 2010-221484 A | 10/2010 |
| JP | 2011-170740 A | 9/2011 |
| JP | 2011-189730 A | 9/2011 |
| JP | 2012-069033 A | 4/2012 |
| JP | 2014-056577 A | 3/2014 |
| JP | 2015-154260 A | 8/2015 |
| JP | 2016-095629 A | 5/2016 |
| WO | 99/059823 A1 | 11/1999 |
| WO | 2012/029311 A1 | 3/2012 |

OTHER PUBLICATIONS

Jul. 12, 2022 Notice of Allowance issued in U.S. Appl. No. 17/717,753.
Aug. 10, 2022 Notice of Allowance issued in U.S. Appl. No. 17/717,753.
May 24, 2023 Notice Of Allowance issued in U.S. Appl. No. 17/980,222.
Jul. 12, 2024 Notice of Allowance received in U.S. Appl. No. 18/237,161.
Nov. 1, 2024 Notice of Allowance issued in U.S. Appl. No. 18/527,895.

* cited by examiner

FIG. 12

| | FIRST TIMING t1 | SECOND TIMING t2 | THIRD TIMING t3 | COUPLING STATE | DETERMINATION RESULT |
|---|---|---|---|---|---|
| EXPECTED VALUE | L (FIRST EXPECTED VALUE) | H (SECOND EXPECTED VALUE) | L (THIRD EXPECTED VALUE) | — | — |
| DETECTED VALUE | L | H | L | MOUNTING-COMPLETED STATE | CONTAINER PROVIDED |
| | L | L | L | NON-MOUNTING-COMPLETED STATE | NO CONTAINER |
| | H | L | H | STATE OF SHORT CIRCUIT BETWEEN DATA TERMINAL AND CLOCK TERMINAL | SHORT CIRCUIT OCCURRING |
| | H | H | H | STATE OF SHORT CIRCUIT BETWEEN DATA TERMINAL AND POWER SOURCE TERMINAL OR STATE OF SHORT CIRCUIT BETWEEN DATA TERMINAL AND RESET TERMINAL | SHORT CIRCUIT OCCURRING |

| | t1 | t2 | t3 | COUPLING STATE | DETERMINATION |
|---|---|---|---|---|---|
| EXPECTED VALUE | L | H | L | MOUNTING-COMPLETED STATE | CONTAINER PROVIDED |
| DETECTED VALUE | L | H | L | | |

| | t1 | t2 | t3 | COUPLING STATE | DETERMINATION |
|---|---|---|---|---|---|
| EXPECTED VALUE | L | H | L | STATE OF SHORT CIRCUIT BETWEEN DATA TERMINAL AND CLOCK TERMINAL | SHORT CIRCUIT OCCURRING |
| DETECTED VALUE | H | L | H | | |

| | t1 | t2 | t3 | COUPLING STATE | DETERMINATION |
|---|---|---|---|---|---|
| EXPECTED VALUE | L | H | L | STATE OF SHORT CIRCUIT BETWEEN DATA TERMINAL AND RESET TERMINAL | SHORT CIRCUIT OCCURRING |
| DETECTED VALUE | H | H | H | | |

| | t1 | t2 | t3 | COUPLING STATE | DETERMINATION |
|---|---|---|---|---|---|
| EXPECTED VALUE | L | H | L | STATE OF SHORT CIRCUIT BETWEEN DATA TERMINAL AND RESET TERMINAL | SHORT CIRCUIT OCCURRING |
| DETECTED VALUE | H | H | H | | |

FIG. 20C

| | TIMING | | | COUPLING STATE | DETERMINATION | No. |
|---|---|---|---|---|---|---|
| | t1 | t2 | t3 | | | |
| EXPECTED VALUE | L | H | L | — | | |
| DETECTED VALUE | H | L | H | STATE OF SHORT CIRCUIT BETWEEN DATA TERMINAL AND CLOCK TERMINAL OCCURS AT t<t1 | SHORT CIRCUIT OCCURRING | 1 |
| | L | L | H | STATE OF SHORT CIRCUIT BETWEEN DATA TERMINAL AND CLOCK TERMINAL OCCURS AT t1<t<t2 | SHORT CIRCUIT OCCURRING | 2 |
| | L | H | H | STATE OF SHORT CIRCUIT BETWEEN DATA TERMINAL AND CLOCK TERMINAL OCCURS AT t2<t<t3 | SHORT CIRCUIT OCCURRING | 3 |
| | H | H | L | STATE OF SHORT CIRCUIT BETWEEN DATA TERMINAL AND CLOCK TERMINAL IS ELIMINATED AT t1<t<t2 | SHORT CIRCUIT OCCURRING | 4 |
| | H | L | L | STATE OF SHORT CIRCUIT BETWEEN DATA TERMINAL AND CLOCK TERMINAL IS ELIMINATED AT t2<t<t3 | SHORT CIRCUIT OCCURRING | 5 |
| | H | H | H | STATE OF SHORT CIRCUIT BETWEEN DATA TERMINAL AND POWER SOURCE TERMINAL OR BETWEEN DATA TERMINAL OR RESET TERMINAL OCCURS AT t<t1 | SHORT CIRCUIT OCCURRING | 6 |
| | L | H | H | STATE OF SHORT CIRCUIT BETWEEN DATA TERMINAL AND POWER SOURCE TERMINAL OR BETWEEN DATA TERMINAL OR RESET TERMINAL OCCURS AT t1<t<t2 | SHORT CIRCUIT OCCURRING | 7 |
| | L | H | H | STATE OF SHORT CIRCUIT BETWEEN DATA TERMINAL AND POWER SOURCE TERMINAL OR BETWEEN DATA TERMINAL OR RESET TERMINAL OCCURS AT t2<t<t3 | SHORT CIRCUIT OCCURRING | 8 |
| | H | H | L | STATE OF SHORT CIRCUIT BETWEEN DATA TERMINAL AND POWER SOURCE TERMINAL OR BETWEEN DATA TERMINAL OR RESET TERMINAL IS ELIMINATED AT t1<t<t2 | SHORT CIRCUIT OCCURRING | 9 |
| | H | H | L | STATE OF SHORT CIRCUIT BETWEEN DATA TERMINAL AND POWER SOURCE TERMINAL OR BETWEEN DATA TERMINAL OR RESET TERMINAL IS ELIMINATED AT t2<t<t3 | SHORT CIRCUIT OCCURRING | 10 |

FIG. 21A

| No. | (a) | (b) | (c) | (d) | (e) |
|---|---|---|---|---|---|
| 1 | cpc | cpd | cpvd | cpr | cpvs |
| 2 | cpr | cpd | cpvd | cpc | cpvs |
| 3 | cpc | cpd | cpr | cpvd | cpvs |
| 4 | cpvd | cpd | cpr | cpc | cpvs |
| 5 | cpr | cpd | cpc | cpvd | cpvs |
| 6 | cpvd | cpd | cpc | cpr | cpvs |
| 7 | cpd | cpvd | cpc | cpr | cpvs |
| 8 | cpd | cpvd | cpr | cpc | cpvs |
| 9 | cpd | cpc | cpvd | cpr | cpvs |
| 10 | cpd | cpr | cpvd | cpc | cpvs |
| 11 | cpd | cpc | cpr | cpvd | cpvs |
| 12 | cpd | cpr | cpc | cpvd | cpvs |
| 13 | cpc | cpvd | cpd | cpr | cpvs |
| 14 | cpr | cpvd | cpd | cpc | cpvs |
| 15 | cpvd | cpr | cpd | cpc | cpvs |
| 16 | cpc | cpr | cpd | cpvd | cpvs |
| 17 | cpvd | cpc | cpd | cpr | cpvs |
| 18 | cpr | cpc | cpd | cpvd | cpvs |
| 19 | cpvd | cpc | cpr | cpd | cpvs |
| 20 | cpvd | cpr | cpc | cpd | cpvs |
| 21 | cpc | cpvd | cpr | cpd | cpvs |
| 22 | cpr | cpvd | cpc | cpd | cpvs |
| 23 | cpc | cpr | cpvd | cpd | cpvs |
| 24 | cpr | cpc | cpvd | cpd | cpvs |

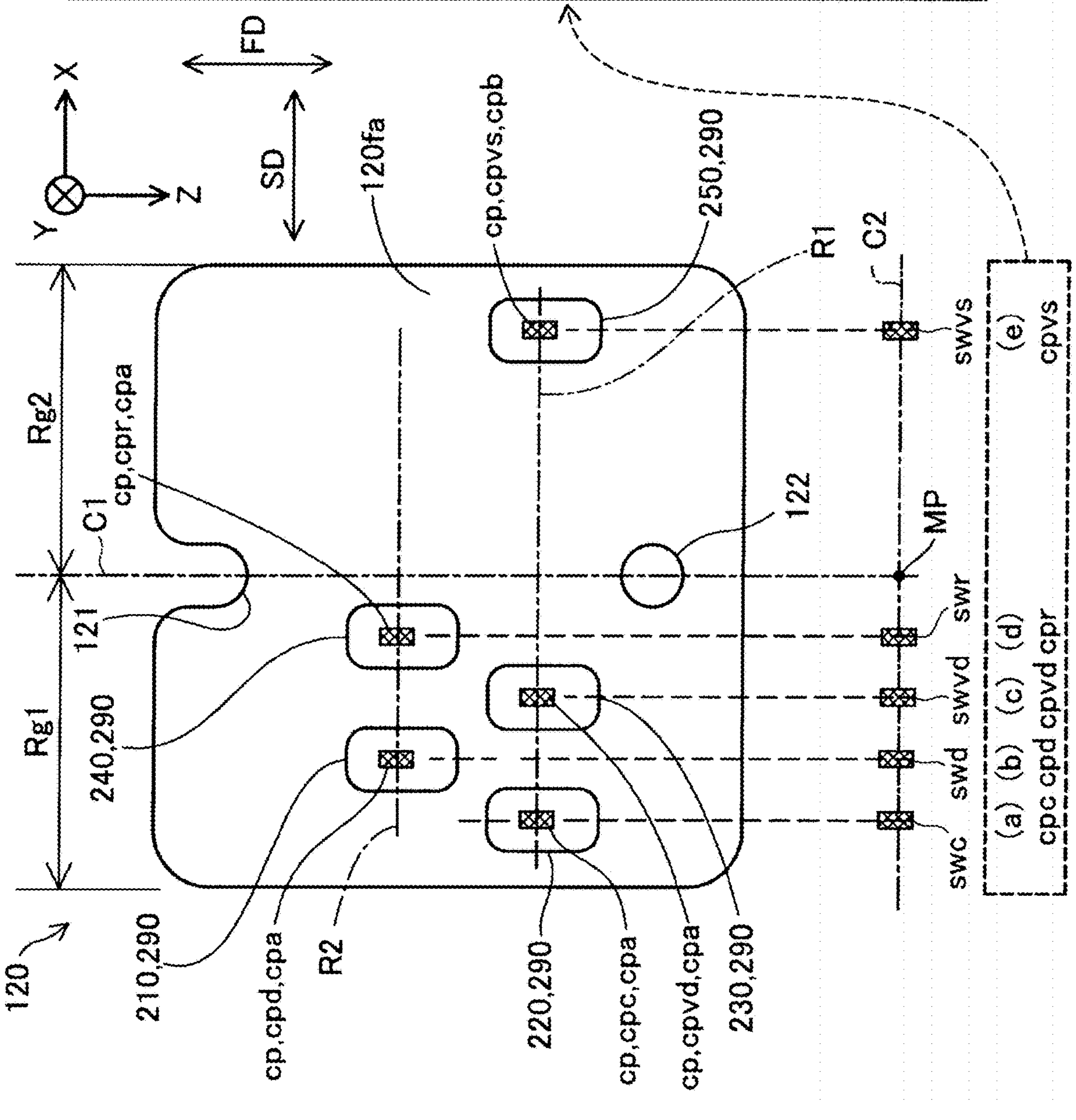

BOARD, LIQUID ACCOMMODATION CONTAINER, AND PRINTING SYSTEM

CROSS-REFERENCE TO RELATED APPLICATION(S)

This application is a Continuation of application Ser. No. 18/527,895, filed on Dec. 4, 2023, which in turn is a Continuation of application Ser. No. 17/988,307 filed Nov. 16, 2022, which in turn is a Continuation of application Ser. No. 17/717,857 filed Apr. 11, 2022, and claims priority from Japanese Application Serial Number 2021-214129, filed Dec. 28, 2021 and Japanese Application Serial Number 2021-214139, filed Dec. 28, 2021. The disclosures of these prior-filed applications are hereby incorporated by reference herein in their entireties.

BACKGROUND

1. Technical Field

The present disclosure relates to a board, a liquid accommodation container, a printing system, and a use of the board or the liquid accommodation container.

2. Related Art

In the related art, there is known a technique for detecting mounting of an ink cartridge detachably mounted in a printing apparatus by using a mounting detection terminal of a terminal group (International Publication No. 2012-029311). The terminal group includes five memory terminals and four mounting detection terminals including a terminal to which a high voltage higher than a power source voltage is applied. The mounting detection terminals are arranged at the four corners of the terminal group so as to surround the memory terminals. In International Publication No. 2012-029311, when it is detected that the mounting detection terminal is electrically coupled to an apparatus-side terminal, the printing apparatus determines that the ink cartridge is mounted in the printing apparatus.

Further, there is known a technique for detecting the mounting of an ink cartridge detachably mounted in a printing apparatus by using a memory terminal (JP-A-2011-170740). A storage device such as a memory provided in the ink cartridge outputs a response signal for notifying that the storage device is coupled to a host device such as a printing apparatus, to a host terminal via any of a reset terminal, a clock terminal, and a data terminal. The host device uses the response signal from the storage device to determine whether or not the storage device is coupled to the host device, without using a terminal dedicated for coupling detection.

However, International Publication No. 2012-029311 and JP-A-2011-170740 do not mention short-circuit detection between the memory terminals. In International Publication No. 2012-029311, when a short circuit occurs between the memory terminals, even though it is determined that the ink cartridge is mounted in the printing apparatus, there is a possibility that the printing apparatus does not operate normally, or reading/writing on the memory of the ink cartridge is not performed normally. In JP-A-2011-170740, when a short circuit occurs between the memory terminals, there is a possibility that it is not possible for the memory to output an original signal to the printing apparatus, and it is not possible for the printing apparatus to determine that the memory is appropriately coupled to the printing apparatus.

SUMMARY

An advantage of some aspects of the disclosure is to suppress a possibility of an occurrence of a short circuit between terminals in a liquid accommodation container such as an ink cartridge. Another advantage of some aspects of the disclosure is to detect a short circuit when the short circuit occurs between at least some terminals.

According to a first aspect of the present disclosure, there is provided a board that is configured to be mounted in a printing apparatus that includes a printing head and an accommodation section in which a liquid accommodation container can be mounted, and where the accommodation section includes (i) a liquid introduction portion that introduces a liquid to the printing head, and (ii) a plurality of apparatus-side terminals. The board includes a base member, a device provided at the base member, and a plurality of terminals that are each provided at the base member, are each electrically coupled to the device, and each include a contact portion. The plurality of terminals includes a data terminal with a data contact portion that is arranged to contact a corresponding apparatus-side data terminal among the plurality of apparatus-side terminals when the board is mounted in the printing apparatus, a clock terminal with a clock contact portion that is arranged to contact a corresponding apparatus-side clock terminal among the plurality of apparatus-side terminals when the board is mounted in the printing apparatus, a reset terminal with a reset contact portion that is arranged to contact a corresponding apparatus-side reset terminal among the plurality of apparatus-side terminals when the board is mounted in the printing apparatus, a power-source terminal with a power-source contact portion that is arranged to contact a corresponding apparatus-side power-source terminal among the plurality of apparatus-side terminals when the board is mounted in the printing apparatus, and a ground terminal with a ground contact portion that is arranged to contact a corresponding apparatus-side ground terminal among the plurality of apparatus-side terminals when the board is mounted in the printing apparatus. The data terminal is configured such that it can be used to detect whether or not the data terminal has a short circuit with at least one of the clock terminal, the reset terminal, and the power-source terminal. And, in a plan view, when (i) two orthogonal straight lines are set as a first virtual line and a second virtual line, and (ii) a position of each contact portion on the base member is projected in a direction perpendicular to the second virtual line onto the second virtual line as a projection position, including projection positions of the data contact portion, the clock contact portion, the reset contact portion, the power-source contact portion, and the ground contact portion, (a) the projection positions of all contact portions on the base member are different from each other, and the first virtual line passes through a middle between two projection positions that are farthest from each other among the projection positions of all of the contact portions, (b) the first virtual line defines a first region of the base member on one side of the first virtual line and a second region of the base member on the other side of the first virtual line, and some contact portions are arranged in the first region including at least the data contact portion, the clock contact portion, the reset contact portion, and the power-source contact portion, and remaining contact portions are arranged in the second region including at least the ground contact portion, and (c) the some contact portions are arranged in a first pattern in the first region and the remaining contact portions are arranged in a second pattern in the second region, and the first pattern and the second pattern are asymmetrical to each other with respect to the first virtual line.

BRIEF DESCRIPTION OF THE DRAWINGS

FIG. 12 is a diagram illustrating an outline of the coupling state determination processing executed by a main control unit.

FIG. 20C is a diagram illustrating another specific example of the coupling state determination processing.

FIG. 21A is a diagram illustrating a board as Embodiment 1.

DESCRIPTION OF EXEMPLARY EMBODIMENTS

A. First Embodiment

A1. Hardware Configuration

Figure 1:
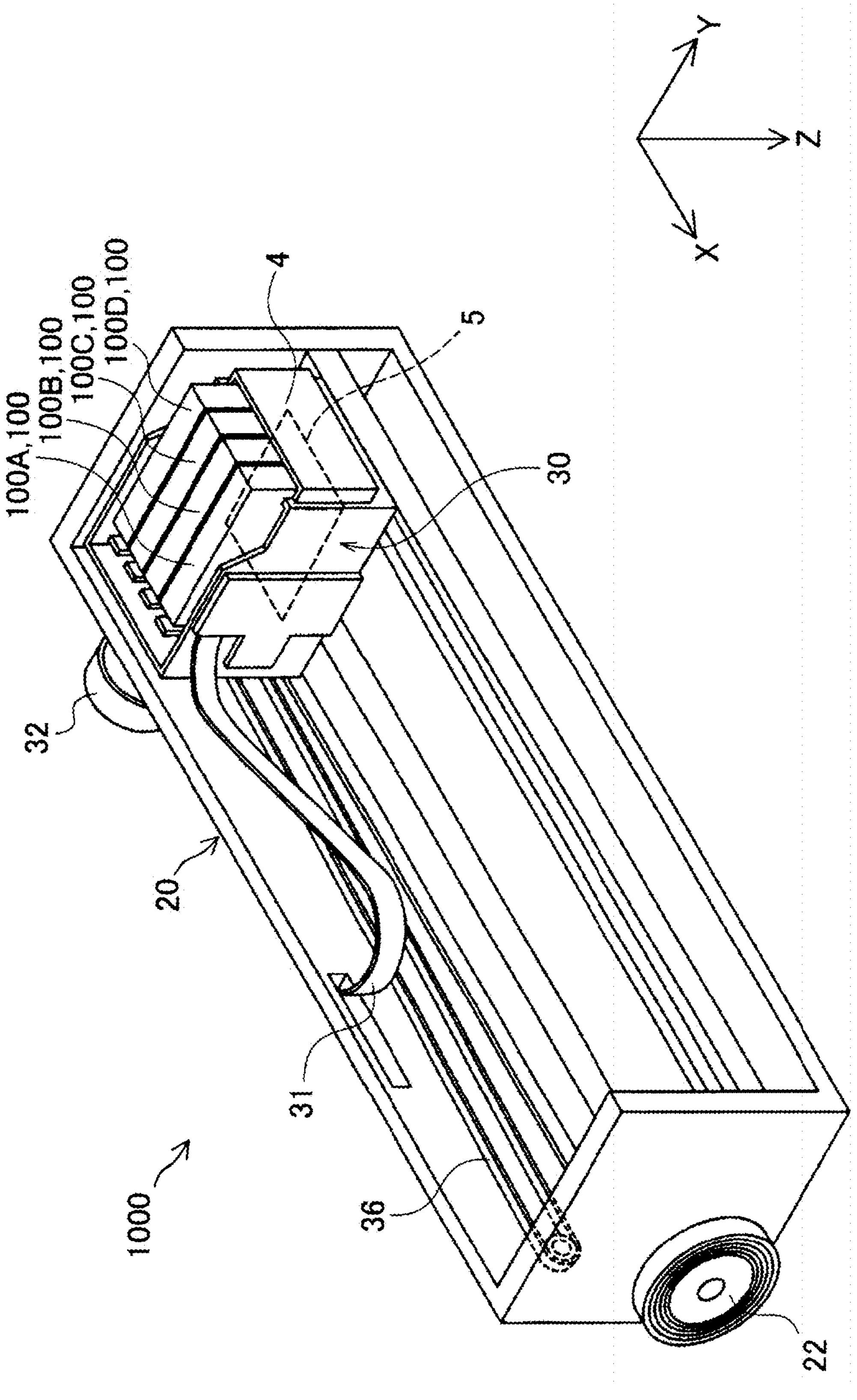
FIG. 1 is a perspective view illustrating a hardware configuration of a printing system.
Figure 2:
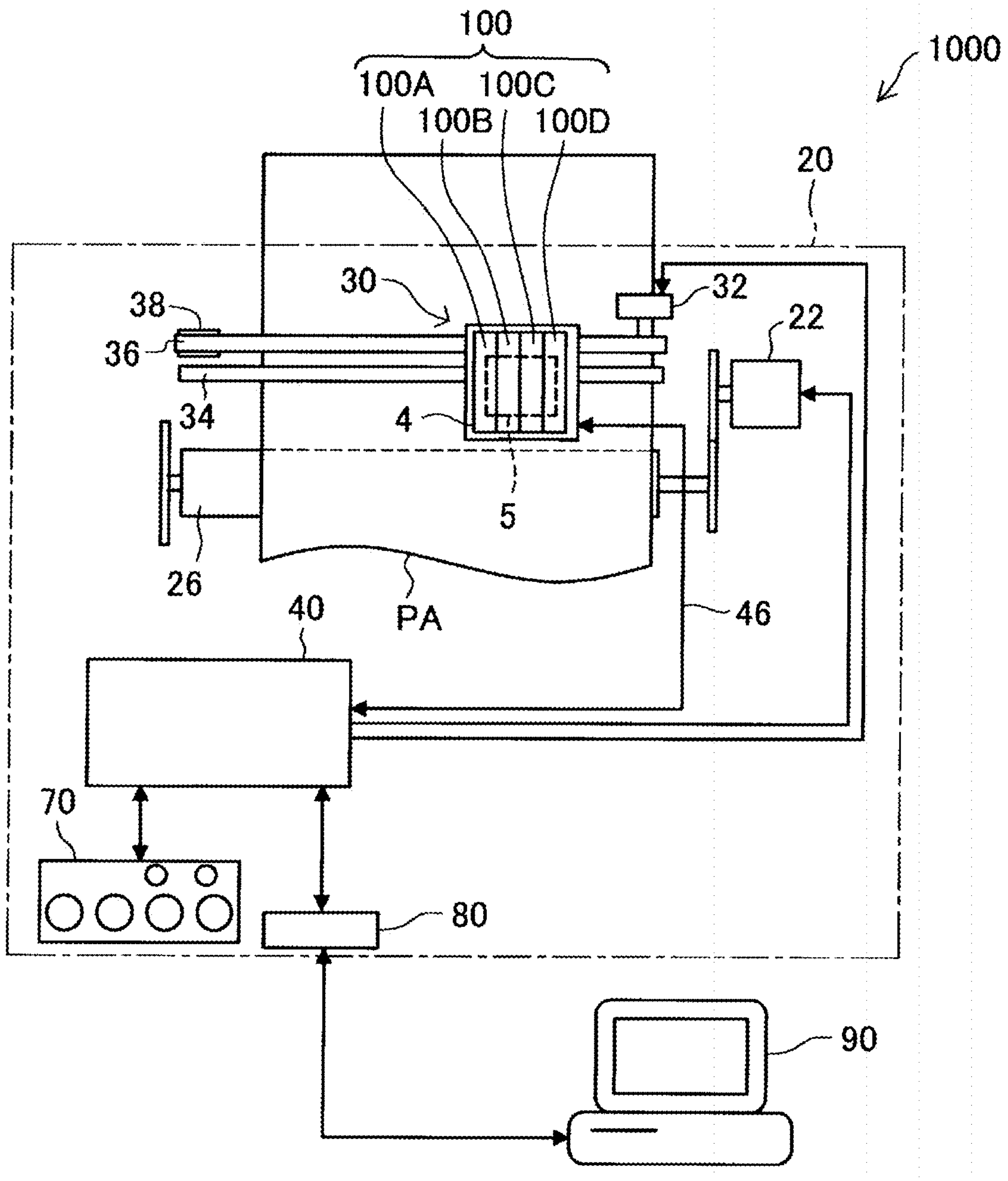
FIG. 2 is a schematic diagram illustrating a configuration of the printing system.

The outline of a printing system 1000 will be described with reference to FIGS. 1 and 2. FIG. 1 is a perspective view illustrating a hardware configuration of the printing system 1000. FIG. 2 is a schematic diagram illustrating a configuration of the printing system 1000. In FIG. 1, an X-axis, a Y-axis, and a Z-axis that are perpendicular to each other are indicated. Directions in which arrows of the X-axis, the Y-axis, and the Z-axis are directed indicate positive directions along the X-axis, the Y-axis, and the Z-axis, respectively. The positive directions along the X-axis, the Y-axis, and the Z-axis are a +X direction, a +Y direction, and a +Z direction, respectively. Directions opposite to the directions in which the arrows of the X-axis, the Y-axis, and the Z-axis are directed indicate negative directions along the X-axis, the Y-axis, and the Z-axis, respectively. The negative directions along the X-axis, the Y-axis, and the Z-axis are a −X direction, a −Y direction, and a −Z direction, respectively. When positiveness and negativeness in the directions along the X-axis, the Y-axis, and the Z-axis do not matter, the directions may be referred to as an X-direction, a Y-direction, and a Z-direction, respectively. The same applies to the drawings and description made below. The X-axis, the Y-axis, and the Z-axis drawn in the other drawings correspond to the X-axis, the Y-axis, and the Z-axis in FIG. 1, respectively. In FIG. 1, in the normal use posture of the printing system 1000, the front direction of the printing system 1000 is set as the +Y direction, the +Z direction is the gravity direction, and the −Z direction is the antigravity direction.

The printing system 1000 includes a printing apparatus 20 and a plurality of liquid accommodation containers 100. Specifically, the printing apparatus 20 is an ink jet printer, and the liquid accommodation container 100 is an ink cartridge. The printing apparatus 20 includes a head drive mechanism, a main scanning feeding mechanism, and a sub-scanning feeding mechanism.

The head drive mechanism includes a carriage 30. The carriage 30 includes an accommodation section 4 and a printing head 5. The accommodation section 4 is configured to detachably mount four liquid accommodation containers 100. In the present disclosure, the sentence that "the liquid accommodation container 100 is mounted in the printing apparatus 20" means that the liquid accommodation container 100 is physically attached to the printing apparatus 20 and a contact portion cp of a terminal 290 on the container-side, described later, is electrically coupled to an apparatus-side terminal 490, also described later. Each of the four liquid accommodation containers 100 is accommodated at a predetermined position of the accommodation section 4. In the present embodiment, the four liquid accommodation containers 100 accommodate liquids of colors different from each other. The liquid can be an ink, and is referred to as an ink below. When the four liquid accommodation containers 100 are distinguished from each other, the four liquid accommodation containers are referred to as liquid accommodation containers 100A to 100D. The carriage 30 is configured to be movable to a replacement position at which replacement of the liquid accommodation container 100 is possible and a standby position at which the replacement of the liquid accommodation container 100 is not possible.

The printing head 5 is provided on the surface of the carriage 30 that faces in the +Z direction. A plurality of nozzles for discharging ink droplets are provided on the surface of the printing head 5, which faces the +Z direction. Each nozzle is coupled to any of the liquid accommodation containers 100A to 100D mounted on the accommodation section 4 via a flow path in the carriage 30. The accommodation section 4 is provided with a liquid introduction portion 6, described later, and a coupling mechanism 400, also described later. The liquid introduction portion 6 is configured to be detachable from a liquid supply port (described later) 104*op* of the liquid accommodation container 100. At the liquid introduction portion 6, an ink is supplied from the liquid accommodation container 100, and the ink is introduced into the printing head 5 via the flow path in the carriage 30. The coupling mechanism 400 includes a plurality of apparatus-side terminals 490, described later.

The main scanning feeding mechanism includes a drive belt 36, a carriage motor 32, a sliding shaft 34, and a pulley 38. The drive belt 36 is an endless belt and is stretched between the carriage motor 32 and the pulley 38. The carriage 30 is fixed to the drive belt 36. The sliding shaft 34 is provided in parallel with the shaft of a paper feeding roller 26, described later, and holds the carriage 30 slidably. As the carriage motor 32 rotates, the carriage 30 fixed to the drive belt 36 moves in the +X direction and the −X direction along the sliding shaft 34.

The sub-scanning feeding mechanism includes a paper feeding motor 22 and the paper feeding roller 26. As the paper feeding motor 22 rotates, the paper feeding roller 26 transports a print medium PA in the Y-direction.

The printing apparatus 20 further includes a main control unit 40. The main control unit 40 is coupled to the carriage 30 by a cable 31. A bus 46 is formed in the cable 31, and the main control unit 40 is electrically coupled to a sub-control board 500 (described later) of the carriage 30 via the bus 46.

The main control unit 40 controls each of the above mechanisms to realize printing processing. For example, the main control unit 40 receives a print job of a user from a computer 90 via a connector 80, and performs printing based on the content of the received print job. A print medium PA is transported in the +Y direction by the paper feeding roller 26, and the printing head 5 provided on the carriage 30 is moved in the +X direction and the −X direction by the drive belt 36. In this manner, an ink is charged from the printing head 5 in the +Z direction. The discharged ink lands at a certain place on the print medium PA, and an image is formed. In the present disclosure, an "image" includes characters and symbols, among other things. In the present disclosure, the +X direction and the −X direction in which the carriage 30 moves are collectively referred to as a "main scanning direction". The −Y direction and +Y direction in which the print medium PA is fed are collectively referred to as a "sub-scanning direction".

The printing apparatus 20 further includes an operation portion 70. The user makes various settings of the printing apparatus 20 or checks the status of the printing apparatus 20, by using the operation portion 70.

As described above, the printing apparatus 20 includes the printing head 5, the liquid introduction portion 6 for introducing a liquid into the printing head 5, the accommodation section 4 that is provided with the liquid introduction portion 6 and accommodates the liquid accommodation container 100, and the plurality of apparatus-side terminals 490. The printing head 5 is provided in the printing apparatus 20. The printing head 5 is not provided in the liquid accommodation container 100. A form in which the printing head 5 is provided in the liquid accommodation container 100 differs from the present disclosure in the technical field.

Figure 3:
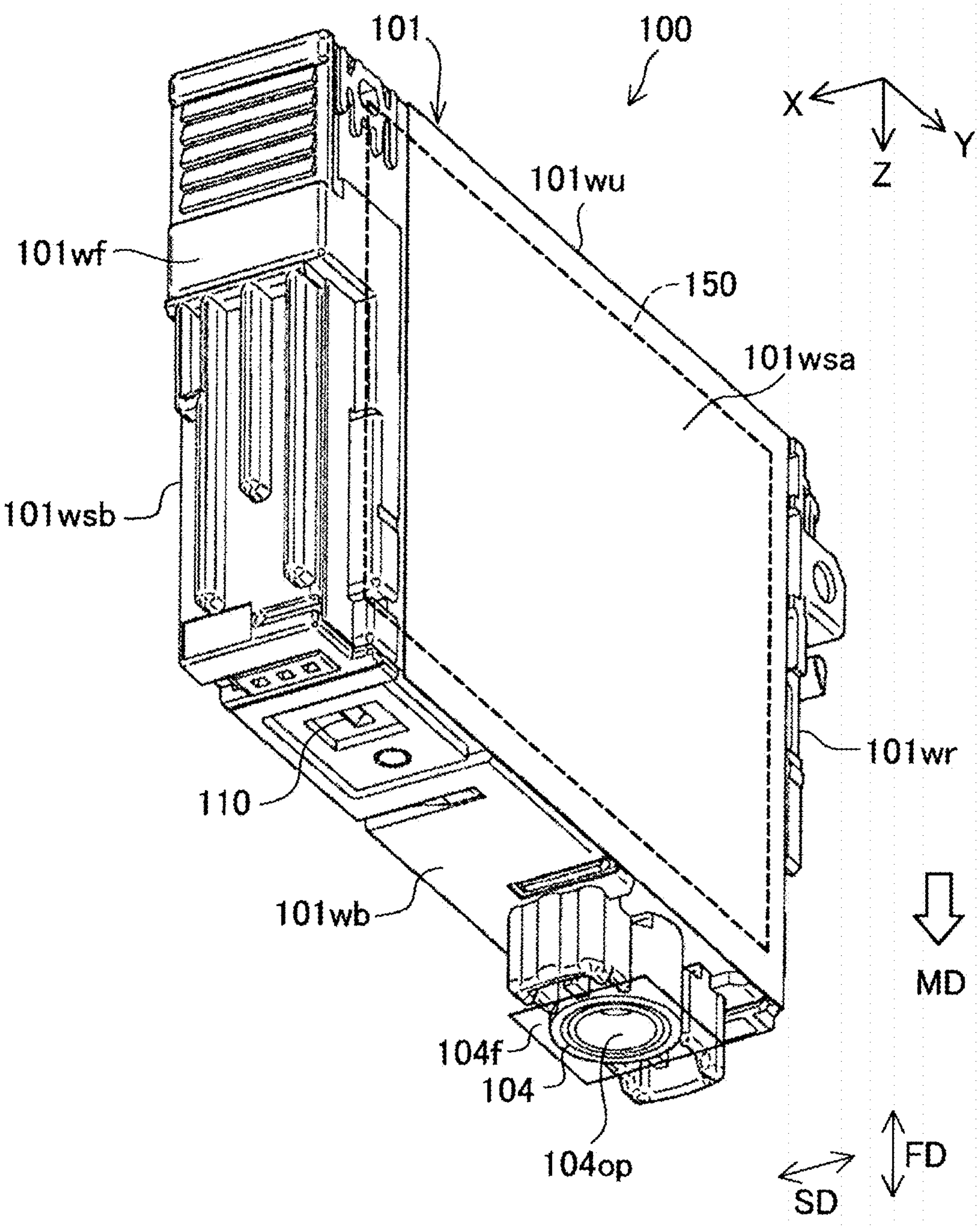
FIG. 3 is a first perspective view illustrating a configuration of a liquid accommodation container.
Figure 4:
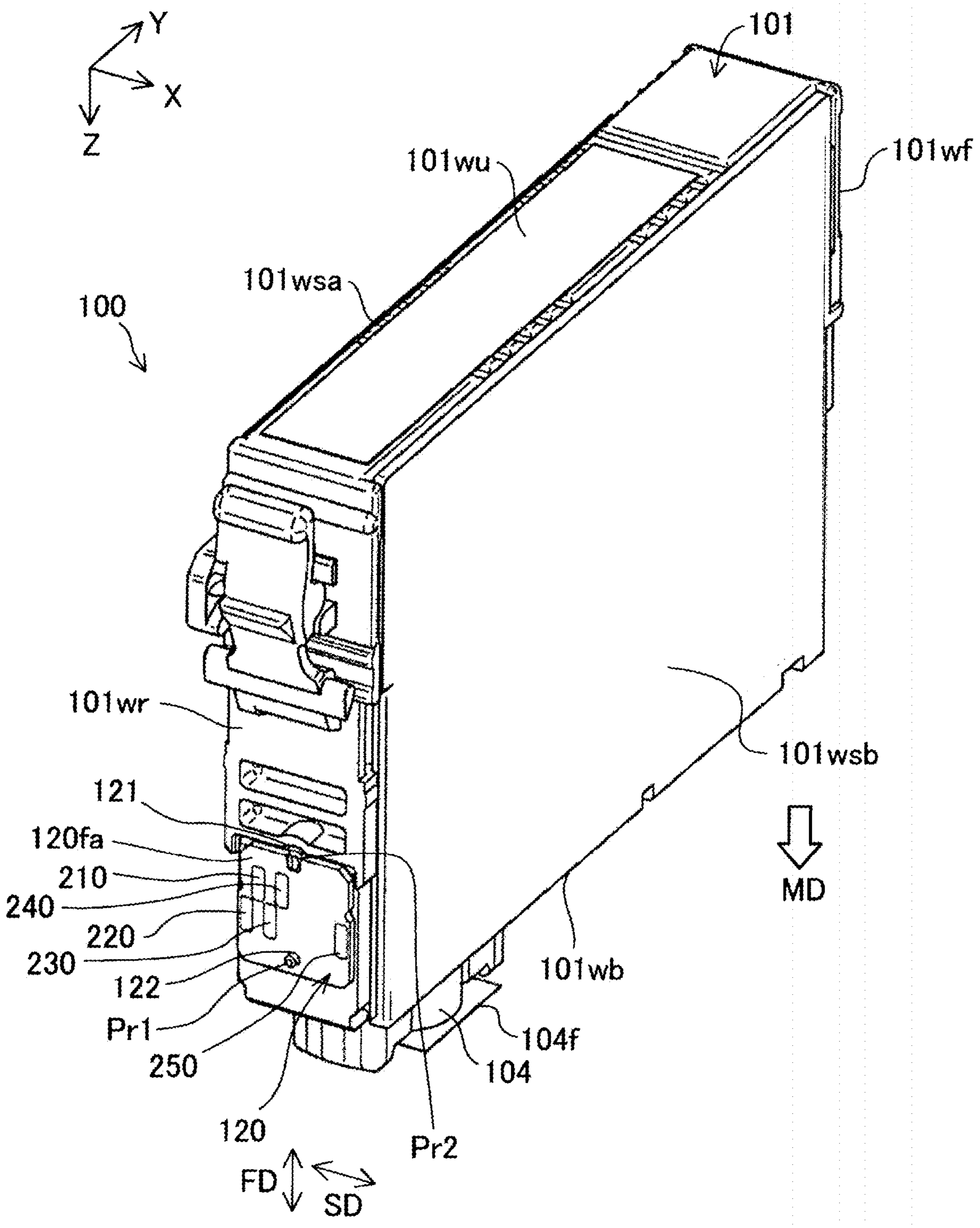
FIG. 4 is a second perspective view illustrating the configuration of the liquid accommodation container.

The configuration of the liquid accommodation container 100 will be described with reference to FIGS. 3 and 4. FIG. 3 is a first perspective view illustrating the configuration of the liquid accommodation container 100. FIG. 4 is a second perspective view illustrating the configuration of the liquid accommodation container 100. The directions of the X-axis, Y-axis, and Z-axis for the liquid accommodation container 100 are set based on a state where the printing apparatus 20 is arranged on a horizontal plane parallel to the X-direction and the Y-direction, and the liquid accommodation container 100 is mounted in the printing apparatus 20, as illustrated in FIG. 1.

As illustrated in FIGS. 3 and 4, the external shape of the liquid accommodation container 100 is a substantially rectangular parallelepiped shape. As illustrated in FIGS. 3 and 4, the liquid accommodation container 100 includes a liquid accommodation body 101 capable of accommodating an ink as a liquid, a liquid supply portion 104 having a liquid supply port 104*op*, and a board 120.

The liquid accommodation body 101 forms the outer shell of the liquid accommodation container 100. The liquid accommodation body 101 has a first wall 101*wf*, a second wall 101*wr*, a third wall 101*wb*, a fourth wall 101*wu*, a fifth wall 101*wsa*, and a sixth wall 101*wsb*. An ink chamber 150 that accommodates an ink is formed inside the liquid accommodation body 101 by the six walls 101*wf*, 101*wr*, 101*wb*, 101*wu*, 101*wsa*, and 101*wsb*. The first wall 101*wf* is a wall on the +Y direction side and forms a front wall. The front wall is directed to the front side of the printing system 1000. The second wall 101*wr* faces the first wall 101*wf*. The second wall 101*wr* is a wall on the −Y direction side and forms a rear wall. The rear wall is directed to the rear side of the printing system 1000. The third wall 101*wb* intersects with the first wall 101*wf* and the second wall 101*wr*, and is substantially perpendicular to the first wall 101*wf* and the second wall 101*wr* in the present embodiment. The third wall 101*wb* is a wall on the +Z direction side and forms a bottom wall. The fourth wall 101*wu* intersects with the first wall 101*wf* and the second wall 101*wr*, and is substantially perpendicular to the first wall 101*wf* and the second wall 101*wr* in the present embodiment. The fourth wall 101*wu* faces the third wall 101*wb*. The fourth wall 101*wu* is a wall on the −Z direction side and forms an upper wall. The fifth wall 101*wsa* intersects with the first wall 101*wf* to the fourth wall 101*wu* and is substantially perpendicular to the first wall 101*wf* to the fourth wall 101*wu* in the present embodiment. The fifth wall 101*wsa* is a wall on the −X direction side and forms a right side wall. The sixth wall 101*wsb* intersects with the first wall 101*wf* to the fourth wall 101*wu* and is substantially perpendicular to the first wall 101*wf* to the fourth wall 101*wu* in the present embodiment. The sixth wall 101*wsb* faces the fifth wall 101*wsa*. The sixth wall 101*wsb* is a wall on the +X direction side and forms a left side wall.

The liquid supply portion 104 is a tubular member that protrudes from the third wall 101*wb*. The liquid supply port 104*op* is located on the tip side of the liquid supply portion 104. The liquid supply port 104*op* is in fluid communication with the ink chamber 150 of the liquid accommodation body 101. When the liquid accommodation container 100 is mounted on the carriage 30 of the printing apparatus 20, an ink is supplied to the liquid introduction portion 6 (described later) of the carriage 30 through the liquid supply port 104*op*. The liquid supply port 104*op* is sealed by a film 104*f*. The liquid supply port 104*op* is configured to be detachable from the liquid introduction portion 6. When the liquid accommodation container 100 is mounted on the carriage 30, the film 104*f* is broken by the liquid introduction portion 6. The ink accommodated in the ink chamber 150 is supplied to the printing head 5 of the printing apparatus 20 via the liquid introduction portion 6. As the ink in the ink chamber 150 is consumed, air is introduced into the ink chamber 150 through an atmospheric air opening hole (not illustrated).

A direction in which the liquid accommodation container 100 is mounted on the carriage 30 of the printing apparatus 20 is set as a mounting direction MD. The mounting direction MD is also a direction in which the board 120 is mounted on the carriage 30 of the printing apparatus 20. In the present embodiment, the mounting direction MD is the +Z direction. Two directions perpendicular to each other are referred to as a first direction FD and a second direction SD. The first direction FD is a direction including at least a component of the mounting direction MD. In the present embodiment, the first direction FD is the Z-direction and the second direction SD is the X-direction. The first direction FD extends substantially along a front surface 120*fa* of the board 120.

The first direction FD is also defined as follows. For example, the first direction FD is perpendicular to a virtual plane including the liquid supply port 104*op*. For example, the first direction FD is a direction in which the apparatus-side terminal 490 of the printing apparatus 20 described later passes over a terminal 290 described later when the liquid accommodation container 100 or the board 120 is mounted on the carriage 30. For example, the first direction FD is a direction orthogonal to a direction in which a plurality of apparatus-side terminals 490 of the printing apparatus 20 are arranged. In other embodiments, when the front surface 120*fa* is inclined from the mounting direction MD, the first direction FD is a direction different from the mounting direction MD.

The board 120 is used for the liquid accommodation container 100. In the present embodiment, as illustrated in FIG. 4, the board 120 is provided on the second wall 101*wr* of the liquid accommodation body 101. Details of the board 120 will be described later.

Two protrusions Pr1 and Pr2 are formed on the second wall 101*wr*. The protrusions Pr1 and Pr2 protrude in the −Y direction. A hole 122 and a notch 121 for receiving the protrusions Pr1 and Pr2 are formed in the board 120, respectively. The hole 122 is formed at the center of an end portion of the board 120 on the liquid supply portion 104 side. The notch 121 is formed at the center of an end portion of the board 120 on an opposite side of the liquid supply portion 104. When the board 120 is fixed to the second wall 101*wr*, the protrusions Pr1 and Pr2 are inserted into the hole 122 and the notch 121, respectively. Then, the tips of the protrusions Pr1 and Pr2 are crushed. As a result, the board 120 is fixed to the second wall 101*wr*. The ways for fixing the board 120 to the second wall 101*wr* is not limited to the above description.

In the present embodiment, when the liquid accommodation container 100 is viewed from a direction perpendicular to the second wall 101*wr* on which the board 120 is provided, in a plan view of the board, the board 120 is arranged such that the central axis of the liquid supply port 104*op* overlaps a first virtual line C1 described later. A contact portion cp, which will be described later, is not arranged to overlap the central axis of the liquid supply port 104*op* in the plan view.

As illustrated in FIG. 3, the liquid accommodation container 100 further includes a liquid detection member 110. The liquid detection member 110 is fixed in the liquid accommodation body 101. The liquid detection member 110 is a member used when the printing apparatus 20 detects the remaining amount of ink in the liquid accommodation container 100. For example, the liquid detection member 110 may be a prism for optically detecting the remaining amount of ink, a piezoelectric element in which a piezoelectric body is sandwiched between two electrodes facing each other, or two electrodes that detect the remaining amount of ink by a difference in resistance between the electrodes. In some embodiments, the liquid detection member 110 may not be provided.

Figure 5:
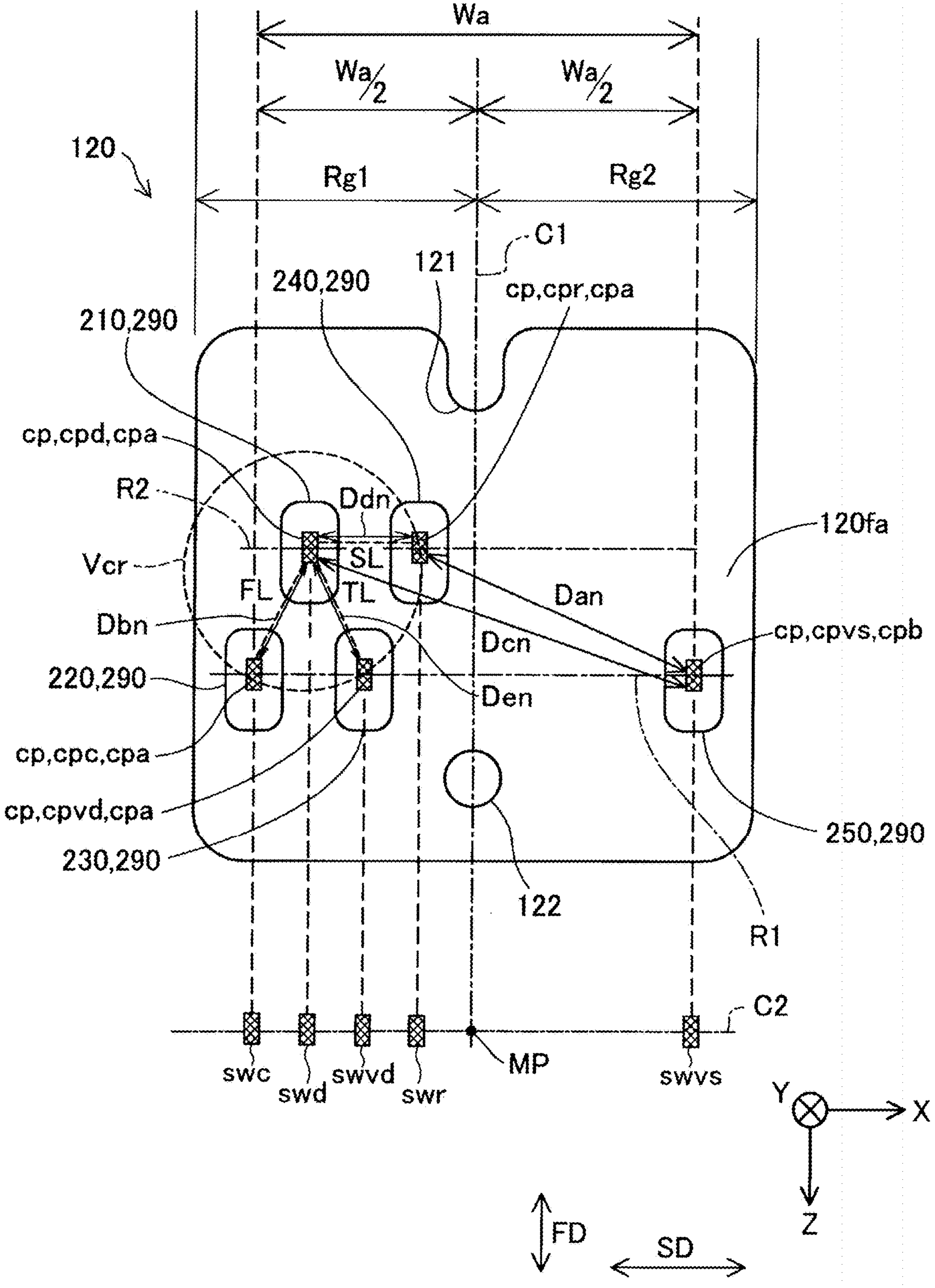
FIG. 5 is a first diagram illustrating a configuration of a board.
Figure 6:
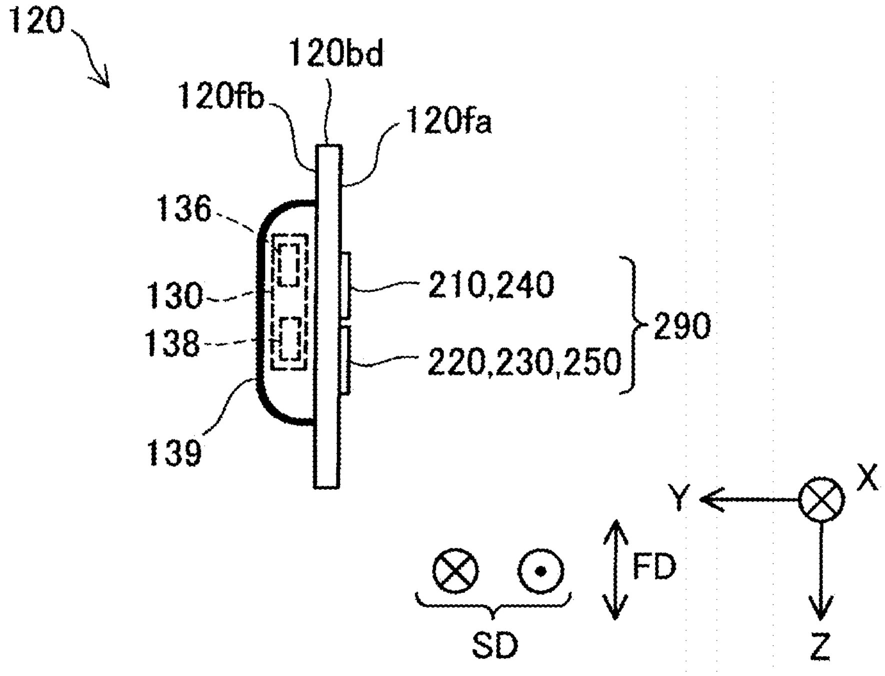
FIG. 6 is a second diagram illustrating the configuration of the board.

The details of the board 120 will be described with reference to FIGS. 5 and 6. FIG. 5 is a first diagram illustrating the configuration of the board 120. FIG. 6 is a second diagram illustrating the configuration of the board 120. As illustrated in FIG. 6, the board 120 includes a base member 120*bd*, a plurality of terminals 290, a device 130, and a wiring (not illustrated). The board 120 may include other components. The base member 120*bd* has the front surface 120*fa* and a back surface 120*fb*. In the present embodiment, the front surface 120*fa* and the back surface 120*fb* are each planar. The base member 120*bd* may be made of a material forming a rigid substrate, a flexible substrate, or the like. The terminal 290 is formed of a conductor such as a gold leaf.

In the present disclosure, in the context of the base member 120*bd*, the "surface" can refer to a surface of the base member 120*bd* that faces the apparatus-side terminal 490 (described later) when the liquid accommodation container 100 or the board 120 is mounted in the printing apparatus 20. For example, the "surface" can refer to a surface of the base member 120*bd*, on which the terminal 290 is formed, in addition to the surface facing the apparatus-side terminal 490 (described later) when the liquid accommodation container 100 or the board 120 is mounted in the printing apparatus 20. For example, the "surface" can refer to a surface of the base member 120*bd*, which includes the contact portion cp described later. In the present embodiment, the "surface" refers to the front surface 120*fa*. In other embodiments, the "surface" refers to the front surface 120*fa* unless otherwise stated.

As illustrated in FIG. 5, the plurality of terminals 290 include a data terminal 210, a clock terminal 220, a power source terminal 230, a reset terminal 240, and a ground terminal 250. Each of the terminals 210, 220, 230, 240, and 250 is coupled to the device 130. Each of the terminals 210 to 250 is electrically coupled to the device 130 via a wiring pattern layer and a through-hole (not illustrated). The wiring pattern layer is provided on the front surface 120*fa* and the back surface 120*fb* of the base member 120*bd*. The through-hole is provided in the base member 120*bd*. The data terminal 210 is used to transmit and receive a data signal SDA between the device 130 and the printing apparatus 20. Here, the "signal" refers to a change in voltage. The signals transmitted and received via the data terminal 210 include, for example, signals indicating various types of data stored in a storage unit 138, described later, signals that are controlled by a processing unit 136, described later, that are not stored in the storage unit 138, and signals that are controlled by the main control unit 40 and a sub-control unit 50 of the printing apparatus 20 and are not stored in the storage unit 138. The clock terminal 220 is used to transmit a clock signal SCK from the printing apparatus 20 to the device 130. The power source terminal 230 is used to supply a power source voltage VDD from the printing apparatus 20 to the device 130. The reset terminal 240 is used to transmit a reset signal RST from the printing apparatus 20 to the device 130. The ground terminal 250 is grounded via an apparatus-side terminal 450 (described later) of the printing apparatus 20. Voltages supplied to the data terminal 210, the clock terminal 220, the power source terminal 230, and the reset terminal 240 are voltages enabled to be received by the device 130. The ranges of the voltage supplied to the respective terminals 210 to 240 are the same. In the present embodiment, the above ranges are about 0 V to about 3.3 V. The voltage enabled to be received by the device 130 is, for example, a voltage lower than a voltage used to drive the printing head 5, a voltage as high as the power source voltage VDD, a voltage lower than the withstand voltage of the device 130, a voltage at which the device 130 is not broken, or a voltage at which the device 130 does not perform an erroneous operation. Here, a check terminal used for the shipment inspection is not included in the terminals 290 in the present disclosure. A check terminal is a terminal that does not come into contact with the apparatus-side terminal 490 of the printing apparatus 20 when the liquid accommodation container 100 is mounted in the printing apparatus 20. And a check terminal does not form any contact portion cp, described later.

The terminals 210, 220, 230, 240, and 250 include contact portions cp that are arranged to contact the corresponding apparatus-side terminals 410, 420, 430, 440, and 450 among a plurality of apparatus-side terminals 490 of the coupling mechanism 400 in the printing apparatus 20 when the liquid accommodation container 100 is mounted on the accommodation section 4. The contact portion cp of the data terminal 210 is also referred to as a data contact portion cpd. The contact portion cp of the clock terminal 220 is also referred to as a clock contact portion cpc. The contact portion cp of the power source terminal 230 is also referred to as a power-source contact portion cpvd. The contact portion cp of the reset terminal 240 is also referred to as a reset contact portion cpr. The contact portion cp of the ground terminal 250 is also referred to as a ground contact portion cpvs. The contact portions cp can be partial regions on the terminals 210, 220, 230, 240, and 250, which can contact the apparatus-side terminals 410, 420, 430, 440, and 450, respectively, when the liquid accommodation container 100 is mounted on the accommodation section 4. Although the contact portions cp are arranged to contact corresponding apparatus-side terminals of printing apparatus 20, the contact portions cp are regions of the liquid accommodation container 100, which is separate from the printing apparatus 20 and is often sold or supplied to users separately from the printing apparatus 20. The board 120 has the data contact portion cpd, the clock contact portion cpc, the power-source contact portion cpvd, the reset contact portion cpr, and the ground contact portion cpvs. The coupling between the terminal 290 and the apparatus-side terminal 490 of the printing apparatus 20 will be described later. The terminal 290 can include contact portions cp other than contact portions cp of the above terminals 210 to 250.

The data terminal 210 is used to detect whether or not the data terminal 210 has a short circuit with at least one of the clock terminal 220, the power source terminal 230, and the reset terminal 240. Specifically, the data terminal 210 is used to detect whether or not the data terminal 210 is in a short-circuited state (described later) with at least one of the clock terminal 220, the power source terminal 230, and the reset terminal 240. The data terminal 210 is also used to detect whether or not the liquid accommodation container 100 is mounted in the printing apparatus 20. Specifically, the data terminal 210 is used to detect whether the liquid accommodation container 100 is in a mounting-completed state, described later, or a non-mounting-completed state, also described later.

The board 120 illustrated in FIG. 5 is viewed in a plan view. As illustrated in FIG. 5, two orthogonal straight lines are referred to as a first virtual line C1 and a second virtual line C2. In the present embodiment, the first virtual line C1 extends along the first direction FD, and the second virtual line C2 extends along the second direction SD. In the present embodiment, these two orthogonal straight lines C1, C2 extend substantially along the surface 120*fa* of the base member 120*bd.*

The positions of all of the contact portions cp of all the terminals 290 provided on the base member 120*bd* of the board 120 can be projected onto the second virtual line C2. In the present embodiment, the positions of the data contact portion cpd, the clock contact portion cpc, the power-source contact portion cpvd, the reset contact portion cpr, and the ground contact portion cpvs can be projected onto the second virtual line C2. Regarding projection positions of the contact portions cp, the projection position of the data contact portion cpd is set as swd, the projection position of the clock contact portion cpc is set as swc, the projection position of the power-source contact portion cpvd is set as swvd, the projection position of the reset contact portion cpr is set as swr, and the projection position of the ground contact portion cpvs is set as swvs. The projection positions swd, swc, swvd, swr, and swvs indicate orthogonal projections obtained by projecting, in a direction perpendicular to the second virtual line C2, the positions of the respective contact portions cpd, cpc, cpvd, cpr, and cpvs onto the second virtual line C2. In this embodiment, the positions of all the contact portions cp are projected at different positions. The data contact portion cpd, the clock contact portion cpc, the power-source contact portion cpvd, the reset contact portion cpr, and the ground contact portion cpvs are arranged so that virtual lines extending along the same direction as the first virtual line C1, which pass through the respective contact portions cp, are parallel to each other instead of overlapping or intersecting with each other. The first virtual line C1 passes through the middle MP between the two farthest projection positions among the projection positions of all the contact portions cp. In the present embodiment, the first virtual line C1 passes through the middle MP between the projection position swvs of the ground contact portion cpvs and the projection position of the contact portion, which is arranged farthest from the projection position swvs of the ground contact portion cpvs, among the projection positions swd, swc, swvd, and swr of the data contact portion cpd, the clock contact portion cpc, the power-source contact portion cpvd, and the reset contact portion cpr. In the present embodiment, the first virtual line C1 passes through the middle between the projection position swc of the clock contact portion cpc and the projection position swvs of the ground contact portion cpvs.

The first virtual line C1 defines two regions on the base member 120*bd*. One region of the base member 120*bd* in the board 120 is first region Rg1, and the other region of the base member 120*bd* in the board 120 is second region Rg2. In the present embodiment, the first region Rg1 is a region on the −X direction side being the negative direction of the second direction SD from the first virtual line C1, and the second region Rg2 is a region on the +X direction side being the positive direction of the second direction SD from the first virtual line C1. The first region Rg1 is also one of regions of the base member 120*bd* sandwiching the first virtual line C1, and the second region Rg2 is also the other region of the base member 120*bd* sandwiching the first virtual line C1. Among all the contact portions cp, some contact portions cpa are arranged in the first region Rg1, and the remaining contact portions cpb are arranged in the second region Rg2. The some contact portions cpa arranged in the first region Rg1 include the data contact portion cpd, the clock contact portion cpc, the power-source contact portion cpv, and the reset contact portion cpr. The remaining contact portions cpb arranged in the second region Rg2 include the ground contact portion cpvs. Thus, the clock contact portion cpc, the data contact portion cpd, the reset contact portion cpr, and the power-source contact portion cpvd are arranged on one side of the first virtual line C1, and the ground contact portion cpvs is arranged on the other side. The some contact portions cpa are arranged on the board 120 in a first pattern in the first region Rg1 and the remaining contact portions cpb are arranged in a second pattern in the second region Rg2, and the first pattern is asymmetrical to the second pattern with respect to the first virtual line C1. None of the contact portions cp are positioned on the first virtual line C1.

The ground contact portion cpvs is arranged at the end of the plurality of contact portions cp in the +X direction being the positive direction of the second direction SD. Any one contact portion cp among the clock contact portion cpc, the data contact portion cpd, the power-source contact portion cpvd, and the reset contact portion cpr is arranged at the end of the plurality of contact portions cp in the −X direction being the negative direction of the second direction SD, and any one such contact portion cp is located on the one outermost side in the second direction SD among the plurality of contact portions cp. The ground contact portion cpvs is located on the other outermost side in the second direction SD among the plurality of contact portions cp. As shown in FIG. 5, Wa is a distance between the projection position swvs of the ground contact portion cpvs and a farthest projection position among the projection positions of the contact portions cp in the first region Rg1. In the present embodiment, the distance between the projection position swc of the clock contact portion cpc and the projection position swvs of the ground contact portion cpvs is Wa. In the present embodiment, a distance between the clock contact portion cp and the ground contact portion cpvs in the second direction SD is as the same as the distance Wa.

The data contact portion cpd, the clock contact portion cpc, the power-source contact portion cpvd, and the reset contact portion cpr are preferably positioned far away from the ground contact portion cpvs. For example, a distance between the projection position swvs of the ground contact portion cpvs and a nearest projection position among the projection positions of the contact portions cp in the first region Rg1 is equal to or more than Wa/2. In the present embodiment, a distance between the reset contact portion cpr and the ground contact portion cpvs in the second direction SD is equal to or more than Wa/2. In embodiments, among all of the contact portions cp coupled to the device 130 via terminal 290 that are located in the second region Rg2, the projection position swvs of the ground contact portion cpvs is closest to the first virtual line C1. In the present embodiment, there are no other contact portions cp coupled to the device 130 via the terminal 290 that are arranged between the reset contact portion cpr and the ground contact portion cpvs along the second direction SD. In the present embodiment, contact portions cpd, cpc, cpvd, cpr and the ground contact portions cpvs on the board 120 are not provided on the first virtual line C1.

At least one of the clock contact portion cpc, the power-source contact portion cpvd, and the reset contact portion cpr is arranged on the board 120 to be projected between the projection position swd of the data contact portion cpd and the projection position swvs of the ground contact portion cpvs. Preferably, any two or more contact portions cp among the clock contact portion cpc, the power-source contact portion cpvd, and the reset contact portion cpr are arranged on the board 120 to be projected between the projection position swd of the data contact portion cpd and the projection position swvs of the ground contact portion cpvs. In the present embodiment, the power-source contact portion cpvd and the reset contact portion cpr are arranged on the board 120 to be projected between the projection position swd of the data contact portion cpd and the projection position swvs of the ground contact portion cpvs.

The data contact portion cpd is arranged on the board 120 to be projected between the projection positions of any two contact portions cp among the power-source contact portion cpvd, the reset contact portion cpr, and the clock contact portion cpc. The data contact portion cpd is not the contact portion that is projected the farthest on the second virtual line C2 from the projection position swvs of the ground contact portion cpvs. In the present embodiment, the data contact portion cpd is arranged to be projected between the projection positions of the clock contact portion cpc and the power-source contact portion cpvd.

Either or both of the data contact portion cpd and the reset contact portion cpr are arranged on the board 120 to be projected between the projection position swvd of the power-source contact portion cpvd and the projection position swc of the clock contact portion cpc. The reset contact portion cpr is arranged so that the projection position swr is next to the projection position swvd of the power-source contact portion cpvd, among the projection positions swc, swd, and swvd. In the present embodiment, the data contact portion cpd is arranged on the board 120 to be projected between the projection position swvd of the power-source contact portion cpvd and the projection position swc of the clock contact portion cpc. The phrase "next to the projection position" does not necessarily mean that one contact portion and the other contact portion are closest to each other among all contact portions on the board 120. Other components may be arranged between one contact portion and the other contact portion in a range without departing from the gist of the present disclosure.

The power-source contact portion cpvd is arranged on the board 120 so that the projection position swvd is next to the projection position swd of the data contact portion cpd, among the projection positions swc, swd, and swr.

In the present embodiment, the clock contact portion cpc is arranged on the board 120 to be projected at the farthest position from the projection position swvs of the ground contact portion cpvs. Further, the data contact portion cpd, the power-source contact portion cpvd, and the reset contact portion cpr are arranged to be projected in order in a direction from the projection position swc of the clock contact portion cpc toward the projection position swvs of the ground contact portion cpvs on the second virtual line C2. The clock contact portion cpc is located at the end in the −X direction being the negative direction of the second direction SD. The contact portions cp other than the clock contact portion cpc are arranged in order of the data contact portion cpd, the power-source contact portion cpvd, and the reset contact portion cpr from the −X direction being the negative direction of the second direction SD to the +X direction being the positive direction of the second direction SD. The projection positions of the plurality of contact portions cp are arranged in order of the clock contact portion cpc, the data contact portion cpd, the power-source contact portion cpvd, the reset contact portion cpr, and the ground contact portion cpvs from the −X direction to the +X direction.

The clock contact portion cpc, the data contact portion cpd, the power-source contact portion cpvd, the reset contact portion cpr, and the ground contact portion cpvs are arranged on the board 120 to form a plurality of rows. The plurality of rows are parallel to the second virtual line C2 and perpendicular to the first virtual line C1. In the present embodiment, the plurality of contact portions cp are arranged to form two rows perpendicular to the first direction FD, and directions of the two rows are parallel to the second direction SD. A direction in which the two rows are arranged with respect to each other is the direction along the first virtual line C1, and the direction along the first direction FD in the present embodiment. The two rows are referred to as a first row R1 and a second row R2. The first row R1 is formed by the clock contact portion cpc, the power-source contact portion cpvd, and the ground contact portion cpvs. The second row R2 is formed by the data contact portion cpd and the reset contact portion cpr. The data contact portion cpd and the reset contact portion cpr forming the second row R2, and the clock contact portion cpc, the power-source contact portion cpvd, and the ground contact portion cpvs forming the first row R1 are configured to form a so-called staggered arrangement in which the data contact portion cpd and the reset contact portion cpr forming the second row R2, and the clock contact portion cpc, the power-source contact portion cpvd, and the ground contact portion cpvs forming the first row R1 are arranged in a staggered manner so the contact portions cp are not aligned with each other in the direction of the first virtual line C1. And any two of these contact portions cp that have projection positions that are next to each other on the second virtual line C2, are positioned in different rows. The data contact portion cpd and the ground contact portion cpvs are arranged in different rows. Any contact portion cp among the clock contact portion cpc, the power-source contact portion cpvd, and the reset contact portion cpr is arranged to be projected between the projection position swd of the data contact portion cpd and the projection position swvs of the ground contact portion cpvs. In the present embodiment, the reset contact portion cpr and the power-source contact portion cpvd are arranged to be projected between the projection position swd of the data contact portion cpd and the projection position swvs of the ground contact portion cpvs. In the present embodiment, the contact portions cp of the respective terminals 210 to 250 are arranged to form the first row R1 and the second row R2, but the present disclosure is not limited to this. For example, the contact portions cp of the respective terminals 210 to 250 may be arranged to form three rows or four rows. Rows may also be formed by one contact portion cp.

A distance between the ground contact portion cpvs and the reset contact portion cpr is set as a distance Dan. A distance between the data contact portion cpd and the clock contact portion cpc is set as a distance Dbn. A distance between the data contact portion cpd and the ground contact portion cpvs is set as a distance Den. A distance between the data contact portion cpd and the reset contact portion cpr is set as a distance Ddn. A distance between the data contact portion cpd and the power-source contact portion cpvd is set as a distance Den. In this case, the distance Den is longer than the distance Dbn. The distance Den is longer than the distance Den. The distance Den is longer than the distance Ddn. In the present embodiment, the distance Dbn is equal to the distance Den. A distance between the data contact portion cpd and the contact portion cp farthest to the data contact portion cpd among the plurality of contact portions cp other than the ground contact portion cpvs is either of the distance Dbn or the distance Den. In this case, the distance Dan is longer than either of the distance Dbn or the distance Den.

The clock contact portion cpc, the reset contact portion cpr, and the power-source contact portion cpvd are arranged to be adjacent to the data contact portion cpd so as to surround the data contact portion cpd between the data contact portion cpd and the ground contact portion cpvs. By disposing the data contact portion cpd inside a virtual circle Vcr passing through the clock contact portion cpc, the reset contact portion cpr, and the power-source contact portion cpvd, the clock contact portion cpc, the reset contact portion cpr, and the power-source contact portion cpvd surround the data contact portion cpd.

A virtual line segment connecting the clock contact portion cpc and the data contact portion cpd is set as a first line segment FL. A virtual line segment connecting the reset contact portion cpr and the data contact portion cpd is set as a second line segment SL. A virtual line segment connecting the power-source contact portion cpvd and the data contact portion cpd is set as a third line segment TL. On the first line segment FL, there are no contact portions cp of the terminal 290 other than the clock contact portion cpc and the data contact portion cpd. On the second line segment SL, there are no contact portions cp of the terminal 290 other than the reset contact portion cpr and the data contact portion cpd. On the third line segment TL, there are no contact portions cp of the terminal 290 other than the power-source contact portion cpvd and the data contact portion cpd.

In the present embodiment, the five terminals 210 to 250 also have the same positional relation as the above-described contact portions cpd, cpc, cpvd, cpr, and cpvs. That is, the data terminal 210, the clock terminal 220, the reset terminal 240, and the power source terminal 230 are arranged in the first region Rg1. The ground terminal 250 is arranged in the second region Rg2. There are no terminals 290 other than the clock terminal 220 and the data terminal 210 arranged on the first line segment FL. There are no terminals 290 other than the reset terminal 240 and the data terminal 210 arranged on the second line segment SL. There are no terminals 290 other than the power source terminal 230 and the data terminal 210 arranged on the third line segment TL.

As described above, the data terminal 210 is used to detect whether or not the data terminal 210 has a short circuit with the clock terminal 220, the reset terminal 240, and/or the power source terminal 250, and whether or not the liquid accommodation container 100 is mounted in the printing apparatus 20. At least a portion of the arrangement of the contact portions cp in the present disclosure is defined to enable such detections.

As illustrated in FIG. 6, the device 130 is configured to be provided on the base member 120*bd*. The device 130 includes a processing unit 136. In the present embodiment, the device 130 includes the processing unit 136 and a storage unit 138. The device 130 is molded (sealed) with resin 139. The device 130 may also be mounted at the base member 120*bd* by another method.

The processing unit 136 is configured by, for example, a circuit. The processing unit 136 is coupled to the terminals 210 to 250 and controls signals and voltages input/output to/from the terminals 210 to 250. The processing unit 136 may be a circuit having an advanced arithmetic processing function, such as a CPU. Details of the processing unit 136 will be described later.

The storage unit 138 is configured by, for example, a non-volatile memory such as a flash memory. The storage unit 138 stores information regarding the liquid accommodation container 100. The information regarding the liquid accommodation container 100 includes, for example, the ink consumption, the color of the ink, the date of manufacturing the liquid accommodation container 100, and identification information of the liquid accommodation container 100. In the present embodiment, "1" to "4" are assigned as the identification information to the liquid accommodation containers 100A to 100D, respectively.

Figure 7A:
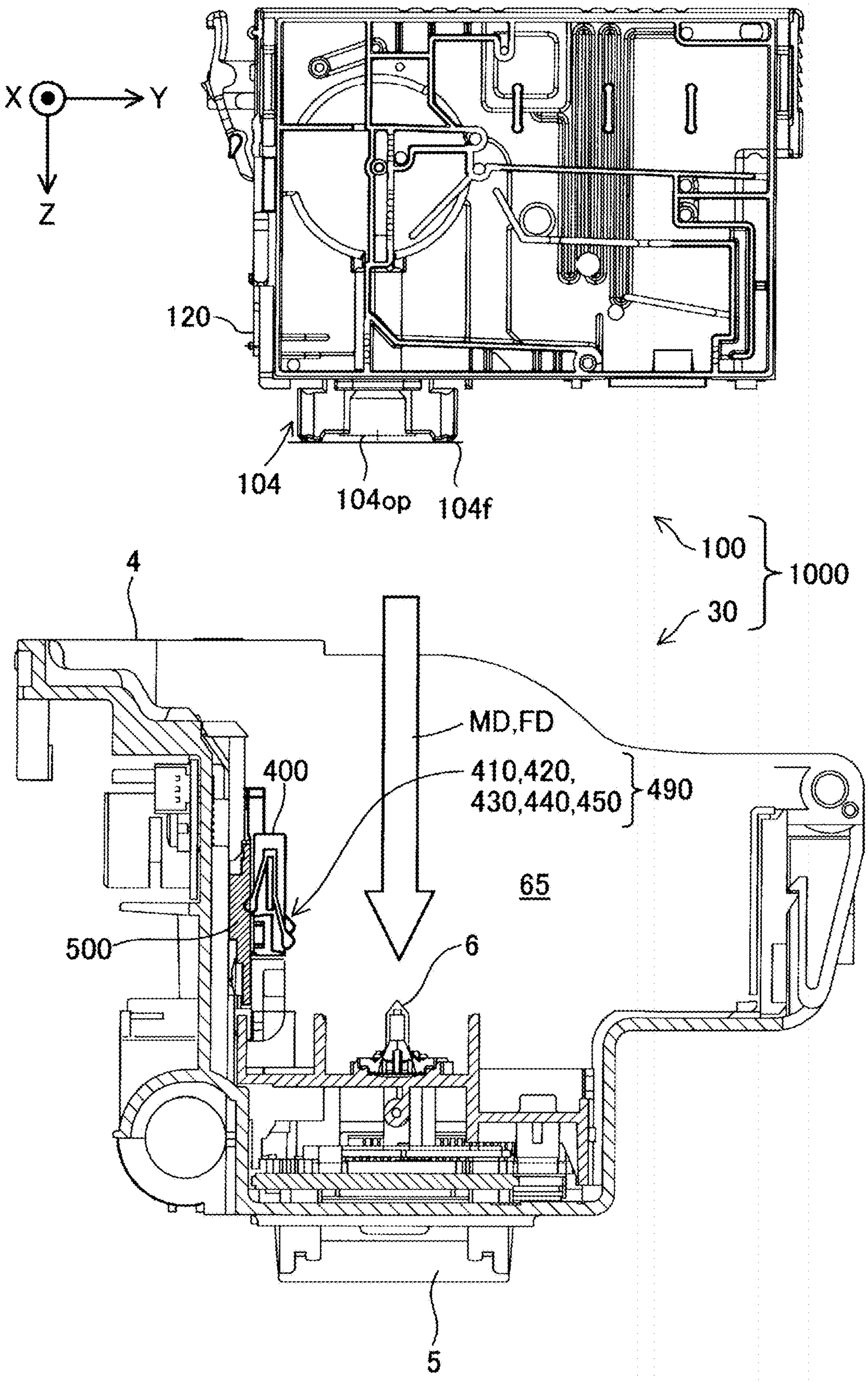
FIG. 7A is a diagram illustrating a form in which the liquid accommodation container is to be mounted on a carriage.
Figure 7B:
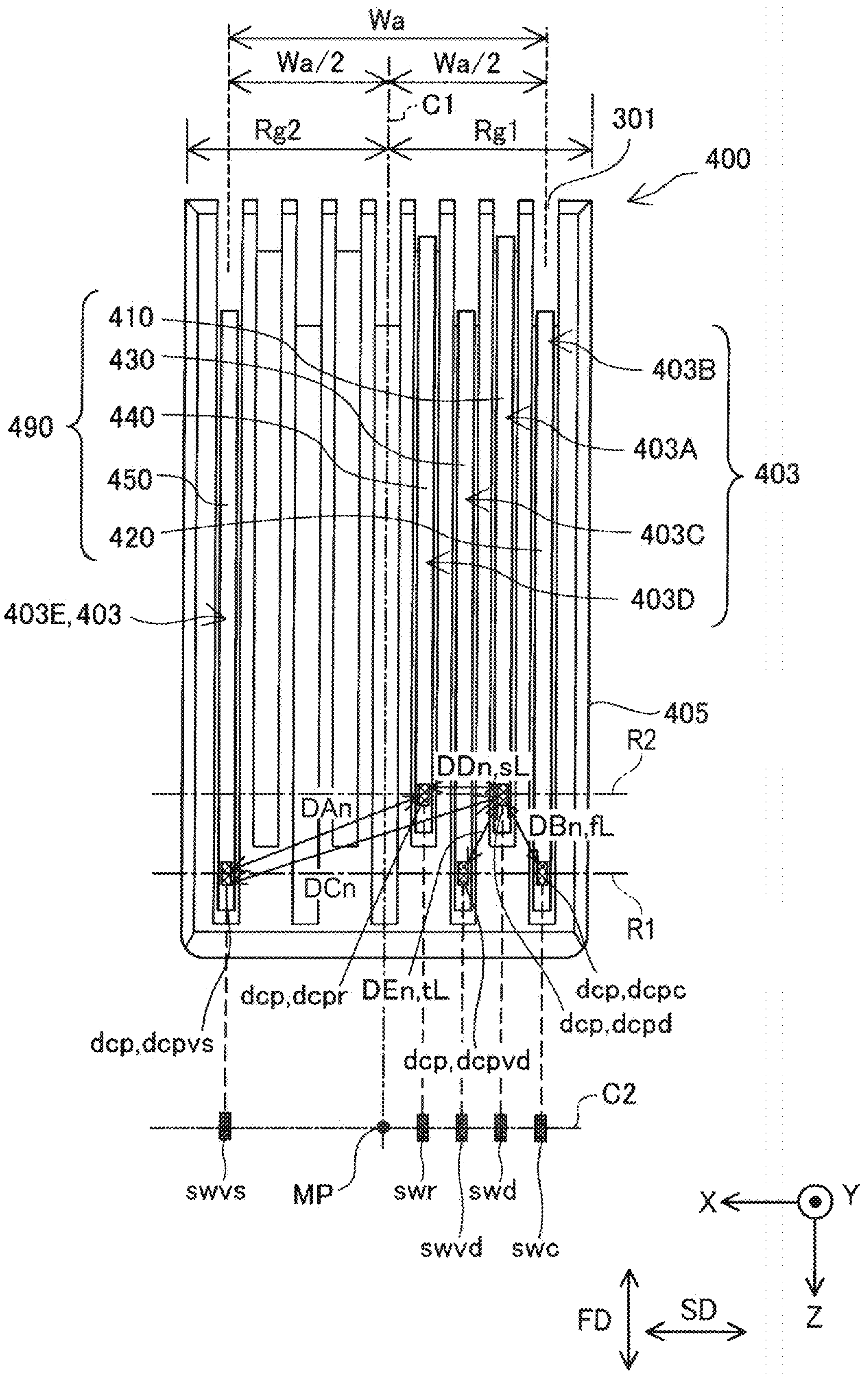
FIG. 7B is a first diagram illustrating a coupling mechanism.
Figure 7C:
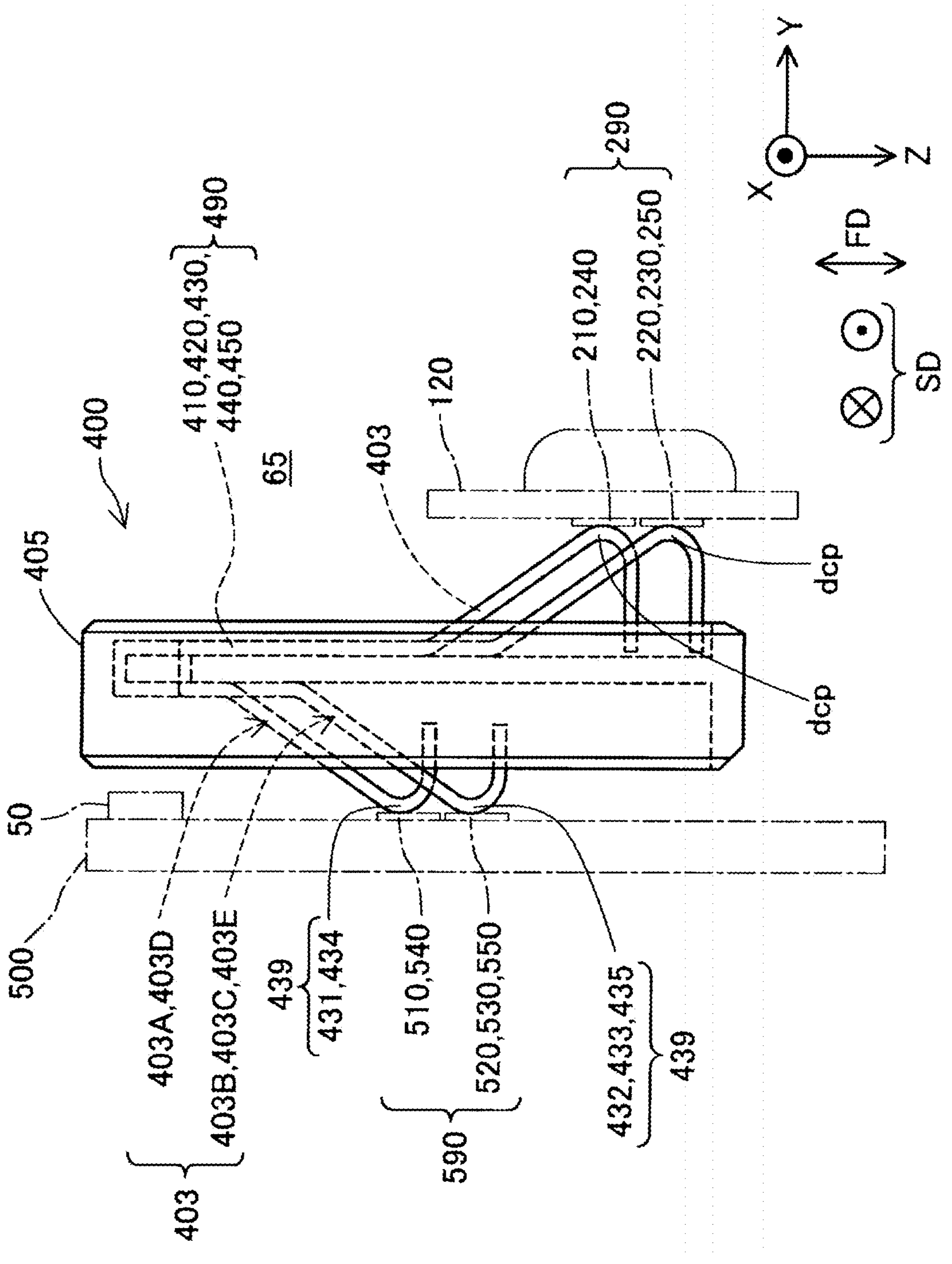
FIG. 7C is a second diagram illustrating the coupling mechanism.

The configuration of the carriage 30 and a form in which the liquid accommodation container 100 is mounted on the carriage 30 will be described with reference to FIGS. 7A to 7C. FIG. 7A is a diagram illustrating the manner in which the liquid accommodation container 100 is mounted on the carriage 30. FIG. 7B is a first diagram illustrating the coupling mechanism 400. FIG. 7C is a second diagram illustrating the coupling mechanism 400.

The carriage 30 includes the accommodation section 4 and the printing head 5. The accommodation section 4 is arranged on the printing head 5 and is configured to detachably mount a plurality of liquid accommodation containers 100. A mounting chamber 65 in which the liquid accommodation container 100 is mounted is formed in the accommodation section 4. In the present embodiment, four mounting chambers 65 are provided corresponding to the liquid accommodation containers 100A to 100D. The printing head 5 includes a plurality of nozzles and a plurality of piezoelectric elements. The printing head 5 discharges ink droplets from each nozzle in accordance with a voltage applied to each piezoelectric element to form dots on a print medium PA. The accommodation section 4 is provided with the liquid introduction portion 6, the sub-control board 500, and the coupling mechanism 400. The liquid introduction portion 6 is arranged over the printing head 5 in the normal use posture of the printing system 1000. Ink is introduced into the printing head 5 from the liquid supply port 104*op* of the liquid accommodation container 100 through the liquid introduction portion 6. In the present embodiment, four liquid introduction portions 6 are provided corresponding to the number of liquid accommodation containers 100A to 100D. A plurality of sub-control board terminals 510, 520, 530, 540, and 550 and the sub-control unit 50 are mounted on the sub-control board 500. When the plurality of sub-control board terminals 510, 520, 530, 540, and 550 are used without distinguishment, the reference sign 590 is used. The plurality of sub-control board terminals 590 are provided for each mounting chamber 65. The plurality of sub-control board terminals 590 are electrically coupled to the sub-control unit 50 via wirings of the sub-control board 500. The sub-control unit 50 is configured as, for example, a carriage circuit, and performs control related to the liquid accommodation container 100 in cooperation with the main control unit 40 illustrated in FIG. 2.

The liquid accommodation container 100 is inserted in the mounting direction MD to be mounted on the accommodation section 4 of the printing apparatus 20. The liquid accommodation container 100 is pulled out in a direction opposite to the mounting direction MD so as to be removed from the accommodation section 4. In this manner, the liquid accommodation container 100 is detachably mounted in the printing apparatus 20. When the liquid accommodation container 100 is mounted on the accommodation section 4, the device 130 is electrically coupled to the main control unit 40 via the terminals 290, the coupling mechanism 400, the sub-control board 500, and the bus 46 illustrated in FIG. 2.

As illustrated in FIGS. 7B and 7C, the coupling mechanism 400 includes a terminal holding portion 405 and a plurality of contact-portion forming members 403 held by the terminal holding portion 405. The coupling mechanism 400 is provided for each of the liquid accommodation containers 100A to 100D, that is, for each mounting chamber 65. As illustrated in FIG. 7B, the terminal holding portion 405 has a plurality of slits 301. The contact-portion forming member 403 is conductive and elastic. The contact-portion forming member 403 is fitted into the slit 301. In the present embodiment, for each coupling mechanism 400, five contact-portion forming members 403 of which the number is equal to the number of the terminals 290 are provided. As illustrated in FIG. 7B, when the five contact-portion forming members 403 are used separately, the reference signs "403A", "403B", "403C", "404D", and "404E" are used. In the present embodiment, nine slits 301 of the coupling mechanism 400 are provided and arranged at predetermined intervals. The number of the slits 301 may be set to be equal to the number of contact-portion forming members 403.

As illustrated in FIG. 7C, the contact-portion forming member 403 is a member that is electrically coupled to the terminal 290 and the sub-control board terminal 590 of the sub-control board 500. A portion of the contact-portion forming member 403, which faces the mounting chamber 65 side, forms the apparatus-side terminal 490. The apparatus-side terminal 490 includes a contact portion dcp of the apparatus-side terminal 490, which contacts the terminal 290. In the present embodiment, in the apparatus-side terminal 490, a portion of the contact-portion forming member 403, which faces the mounting chamber 65 side the closest, that is, the portion that protrudes the closest toward the mounting chamber 65, comes into contact with the terminal 290 to form the contact portion dcp of the apparatus-side terminal 490. The contact portion dcp of the apparatus-side terminal 490 is not limited to the present embodiment. For example, the terminal 290 may come into contact with a portion of the apparatus-side terminal 490 other than the portion that protrudes the closest to the mounting chamber 65. A portion of the contact-portion forming member 403, which protrudes toward the sub-control board 500, forms a relay terminal 439 that comes into contact with the sub-control board terminal 590.

When the apparatus-side terminals 490 are used separately, the reference signs "410", "420", "430", "440", and "450" are used. When the relay terminals 439 are used separately, the reference signs "431", "432", "433", "434" and "435" are used. The apparatus-side terminal 410 and the relay terminal 431 are formed on the contact-portion forming member 403A. The apparatus-side terminal 420 and the relay terminal 432 are formed on the contact-portion forming member 403B. The apparatus-side terminal 430 and the relay terminal 433 are formed on the contact-portion forming member 403C. The apparatus-side terminal 440 and the relay terminal 434 are formed on the contact-portion forming member 403D. The apparatus-side terminal 450 and the relay terminal 435 are formed on the contact-portion forming member 403E. The apparatus-side terminal 410 is also referred to as an apparatus-side data terminal. The apparatus-side terminal 420 is also referred to as an apparatus-side clock terminal. The apparatus-side terminal 430 is also referred to as an apparatus-side power source terminal. The apparatus-side terminal 440 is also referred to as an apparatus-side reset terminal. The apparatus-side terminal 450 is also referred to as an apparatus-side ground terminal.

The contact-portion forming member 403A electrically couples the data terminal 210 and the sub-control board terminal 510. The apparatus-side terminal 410 comes into contact with the data terminal 210, and the relay terminal 431 comes into contact with the sub-control board terminal 510. The contact-portion forming member 403B electrically couples the clock terminal 220 and the sub-control board terminal 520. The apparatus-side terminal 420 comes into contact with the clock terminal 220, and the relay terminal 432 comes into contact with the sub-control board terminal 520. The contact-portion forming member 403C electrically couples the power source terminal 230 and the sub-control board terminal 530. The apparatus-side terminal 430 comes into contact with the power source terminal 230, and the relay terminal 433 comes into contact with the sub-control board terminal 530. The contact-portion forming member 403D electrically couples the reset terminal 240 and the sub-control board terminal 540. The apparatus-side terminal 440 comes into contact with the reset terminal 240, and the relay terminal 434 comes into contact with the sub-control board terminal 540. The contact-portion forming member 403E electrically couples the ground terminal 250 and the sub-control board terminal 550. The apparatus-side terminal 450 comes into contact with the ground terminal 250, and the relay terminal 435 comes into contact with the sub-control board terminal 550.

When the liquid accommodation container 100 is mounted on the accommodation section 4, the terminals 210, 220, 230, 240, and 250 come into contact with the apparatus-side terminals 410, 420, 430, 440, and 450 to be electrically coupled, respectively. The apparatus-side terminals 410, 420, 430, 440, and 450 of the coupling mechanism 400 come into contact with the sub-control board terminal 590 on the sub-control board 500 to be electrically coupled. The sub-control board terminal 590 of the sub-control board 500 is electrically coupled to the sub-control unit 50 by wiring. Thus, the terminals 210, 220, 230, 240, and 250 are electrically coupled to the sub-control unit 50.

The positional relation of each contact portion cp in the liquid accommodation container 100 and the positional relation between each contact portion cp and another element, for example, the positional relation with the first virtual line C1 are similarly applied to the contact portions dcp of the apparatus-side terminals 410 to 450. The arrangement of the contact portions cp in the liquid accommodation container 100 has a mirror image relation with the arrangement of the contact portions dcp of the apparatus-side terminals 490. As illustrated in FIG. 7B, the contact portion dcp of the apparatus-side data terminal 410 is also referred to as an apparatus-side data contact portion dcpd. The contact portion dcp of the apparatus-side clock terminal 420 is also referred to as an apparatus-side clock contact portion dcpc. The contact portion dcp of the apparatus-side power source terminal 430 is also referred to as an apparatus-side power-source contact portion dcpvd. The contact portion dcp of the apparatus-side reset terminal 440 is also referred to as an apparatus-side reset contact portion dcpr. The contact portion dcp of the apparatus-side ground terminal 450 is also referred to as an apparatus-side ground contact portion dcpvs.

In FIG. 7B, the coupling mechanism 400 is viewed in a plan view. Two orthogonal straight lines are referred to as a first virtual line C1 and a second virtual line C2. In FIG. 7B, the first virtual line C1 is a direction along the first direction FD, and the second virtual line C2 is a direction along the second direction SD. In the present embodiment, these two orthogonal straight lines C1, C2 extend substantially along the surface of the terminal holding portion 405.

The positions of the contact portions dcp of all the apparatus-side terminals of the coupling mechanism 400 can be projected onto the second virtual line C2. In the present embodiment, the positions of the apparatus-side data contact portion dcpd corresponding to the data terminal 210, the apparatus-side clock contact portion dcpc corresponding to the clock terminal 220, the apparatus-side power-source contact portion dcpvd corresponding to the power source terminal 230, the apparatus-side reset contact portion dcpr corresponding to the reset terminal 240, and the apparatus-side ground contact portion dcpvs corresponding to the ground terminal 250 can be projected onto the second virtual line C2. Regarding projection positions of the contact portions dcp of the apparatus-side terminals, the projection position of the apparatus-side data contact portion dcpd is set as swd, the projection position of the apparatus-side clock contact portion dcpc is set as swc, and the projection position of the apparatus-side power-source contact portion dcpvd is set as swvd, the projection position of the apparatus-side reset contact portion dcpr is set as swr, and the projection position of the apparatus-side ground contact portion dcpvs is set as swvs. The projection positions swd, swc, swvd, swr, and swvs indicate orthogonal projections obtained by projecting, in a direction perpendicular to the second virtual line C2, the positions of the contact portions dcp of the respective apparatus-side terminals onto the second virtual line C2. In this embodiment, the positions of the contact portions dcp of all the apparatus-side terminals are projected at different positions. The positions of the apparatus-side data contact portion dcpd, the apparatus-side clock contact portion dcpc, the apparatus-side power-source contact portion dcpvd, the apparatus-side reset contact portion dcpr, and the apparatus-side ground contact portion dcpvs are projected at different positions. The apparatus-side data contact portion dcpd, the apparatus-side clock contact portion dcpc, the apparatus-side power-source contact portion dcpvd, the apparatus-side reset contact portion dcpr, and the apparatus-side ground contact portion dcpvs are arranged so that virtual lines extending along the same direction as the first virtual line C1, which pass through the contact portions dcp of the respective apparatus-side terminals, are parallel to each other instead of overlapping or intersecting with each other. The first virtual line C1 passes through the middle MP between the two farthest projection positions among the projection positions of the contact portions dcp of all the apparatus-side terminals. In the present embodiment, the first virtual line C1 passes through the middle MP between the projection position swvs of the apparatus-side ground contact portion dcpvs and the projection position of the contact portion positioned at the farthest position from the projection position swvs of the apparatus-side ground contact portion dcpvs among the projection positions swd, swc, swvd, and swr of the apparatus-side data contact portion dcpd, the apparatus-side clock contact portion dcpc, the apparatus-side power-source contact portion dcpvd, and the apparatus-side reset contact portion dcpr. In the present embodiment, the first virtual line C1 passes through the middle between the projection position swc of the apparatus-side clock contact portion dcpc and the projection position swvs of the apparatus-side ground contact portion dcpvs.

The first virtual line C1 defines two regions on the coupling mechanism 400. One region of the coupling mechanism 400 is a first region Rg1, and the other region of the coupling mechanism 400 is a second region Rg2. In this case, the apparatus-side terminals 410, 420, 430, and 440 are arranged in the first region Rg1, and the apparatus-side terminals 450 are arranged in the second region Rg2. In the present embodiment, the first region Rg1 is a region on the −X direction side being the negative direction of the second direction SD from the first virtual line C1, and the second region Rg2 is a region on the +X direction side being the positive direction of the second direction SD from the first virtual line C1. The first region Rg1 is also one of regions of the coupling mechanism 400 sandwiching the first virtual line C1, and the second region Rg2 is also the other region of the coupling mechanism 400 sandwiching the first virtual line C1. Among the contact portions dcp of all the apparatus-side terminals, some contact portions dcpa are arranged in the first region Rg1, and the remaining contact portions dcpb are arranged in the second region Rg2. The some contact portions dcpa arranged in the first region Rg1 include the apparatus-side data contact portion dcpd, the apparatus-side clock contact portion dcpc, the apparatus-side power-source contact portion dcpv, and the apparatus-side reset contact portion dcpr. The remaining contact portions dcpb arranged in the second region Rg2 include the apparatus-side ground contact portion dcpvs. The apparatus-side clock contact portion dcpc, the apparatus-side data contact portion dcpd, the apparatus-side reset contact portion dcpr, and the apparatus-side power-source contact portion dcpvd are arranged on one side of the first virtual line C1, and the apparatus-side ground contact portion dcpvs is arranged on the other side. The some contact portions dcpa are arranged in a first pattern on the coupling mechanism 400 in the first region Rg1 and the remaining contact portions dcpb are arranged in a second pattern on the coupling mechanism 400 in the second region Rg2, and the first pattern is asymmetrical to the second pattern with respect to the first virtual line C1. None of the contact portions dcp of the apparatus-side terminal are positioned on the first virtual line C1.

As illustrated in FIG. 7B, the apparatus-side ground contact portion dcpvs is arranged at the end of the contact portions dcp of the plurality of apparatus-side terminals in the +X direction being the positive direction of the second direction SD. The contact portion dcp of any one apparatus-side terminal among the apparatus-side clock contact portion dcpc, the apparatus-side data contact portion dcpd, the apparatus-side power-source contact portion dcpvd, and the apparatus-side reset contact portion dcpr is arranged at the end of the contact portions dcp of the plurality of apparatus-side terminals in the −X direction being the negative direction of the second direction SD. The contact portion dcp of such any one apparatus-side terminal is located on the one outermost side in the second direction SD among the contact portions dcp of the plurality of apparatus-side terminals. The apparatus-side ground contact portion dcpvs is located on the other outermost side in the second direction SD among the contact portions dcp of the plurality of apparatus-side terminals. As shown in FIG. 7B, Wa is a distance between the projection position swvs of the apparatus-side ground contact portion dcpvs and a farthest projection position among the projection positions of the apparatus-side contact portions dcp in the first region Rg1. In the present embodiment, the distance between the projection position swc of the apparatus-side clock contact portion dcpd and the projection position swvs of the apparatus-side ground contact portion dcpvs is Wa.

The apparatus-side data contact portion dcpd, the apparatus-side clock contact portion dcpc, the apparatus-side power-source contact portion dcpd, and the apparatus-side reset contact portion dcpr are preferably positioned far away from the apparatus-side ground terminal contact portion dcpvs. For example, a distance between the projection position swvs of the apparatus-side ground contact portion dcpvs and a nearest projection position among the projection positions of the apparatus-side contact portions dcp in the first region Rg1 is equal to or more than Wa/2. In embodiments, among all of the apparatus-side contact portions dcp located in the second region Rg2, the projection position swvs of the apparatus-side ground contact portion dcpvs is closest to the first virtual line C1. In the present embodiment, there are no other contact portions dcp of the other apparatus-side terminals that are arranged between the apparatus-side reset contact portion dcpr and the apparatus-side ground contact portion dcpvs along a direction SD. In the present embodiment, the contact portions dcp of the apparatus-side terminals 410 to 440 and the apparatus-side ground contact portion dcpvs are not positioned on the first virtual line C1.

The contact portion dcp of at least one apparatus-side terminal among the apparatus-side clock contact portion dcpc, the apparatus-side power-source contact portion dcpvd, and the apparatus-side reset contact portion dcpr is arranged to be projected between the projection position swd of the apparatus-side data contact portion dcpd and the projection position swvs of the apparatus-side ground contact portion dcpvs. Preferably, the contact portions dcp of any two or more apparatus-side terminals among the apparatus-side clock contact portion dcpc, the apparatus-side power-source contact portion dcpvd, and the apparatus-side reset contact portion dcpr are arranged to be projected between the projection position swd of the apparatus-side data contact portion dcpd and the projection position swvs of the apparatus-side ground contact portion dcpvs.

The apparatus-side data terminal dcpd is arranged to be projected between the projection positions of the contact portions dcp of any two apparatus-side terminals among the apparatus-side clock contact portion dcpc, the apparatus-side power-source contact portion dcpvd, and the apparatus-side reset contact portion dcpr. The apparatus-side data contact portion dcpd is not the contact portion that is projected the farthest on the second virtual line C2 from the projection position swvs of the apparatus-side ground contact portion dcpvs. In the present embodiment, the apparatus-side data contact portion dcpd is arranged to be projected between the projection positions of the apparatus-side clock contact portion dcpc and the apparatus-side power-source contact portion dcpvd.

Either or both of the apparatus-side data contact portion dcpd and the apparatus-side reset contact portion dcpr are arranged to be projected between the projection position swvd of the apparatus-side power-source contact portion dcpvd and the projection position swc of the apparatus-side clock contact portion dcpc. Further, the apparatus-side reset contact portion dcpr is arranged so that the projection position swr is next to the projection position swvd of the apparatus-side power-source contact portion dcpvd, among the projection positions swc, swd, and swvd. In the present embodiment, the apparatus-side data contact portion dcpd is arranged to be projected between the projection position swvd of the apparatus-side power-source contact portion dcpvd and the projection position swc of the apparatus-side clock contact portion dcpc.

The apparatus-side power-source contact portion dcpr is arranged so that the projection position swvd is next to the projection position swd of the apparatus-side data contact portion dcpd, among the projection positions swc, swd, and swr.

In the present embodiment, the apparatus-side clock contact portion dcpc is arranged to be projected at the farthest position from the projection position swvs of the apparatus-side ground contact portion dcpvs. The apparatus-side data contact portion dcpd, the apparatus-side power-source contact portion dcpvd, and the apparatus-side reset contact portion dcpr are arranged to be projected in order in a direction from the projection position swc of the apparatus-side clock contact portion dcpc toward the projection position swvs of the apparatus-side ground contact portion dcpvs on the second virtual line C2. The apparatus-side clock contact portion dcpc is located at the end in the −X direction being the negative direction of the second direction SD. The contact portions dcp of the apparatus-side terminals other than the apparatus-side clock contact portion dcpc are arranged in order of the apparatus-side data contact portion dcpd, the apparatus-side power-source contact portion dcpvd, and the apparatus-side reset contact portion dcpr from the −X direction being the negative direction of the second direction SD to the +X direction being the positive direction. The projection positions of the contact portions dcp of the plurality of apparatus-side terminals are arranged in order of the apparatus-side clock contact portion dcpc, the apparatus-side data contact portion dcpd, the apparatus-side power-source contact portion dcpvd, and the apparatus-side reset contact portion dcpr, and the apparatus-side ground contact portion dcpvs from the −X direction to the +X direction.

The apparatus-side clock contact portion dcpc, the apparatus-side data contact portion dcpd, the apparatus-side power-source contact portion dcpvd, the apparatus-side reset contact portion dcpr, and the apparatus-side ground contact portion dcpvs are arranged on the coupling mechanism 400 to form a plurality of rows. The plurality of rows are parallel to the second virtual line C2 and perpendicular to the first virtual line C1. In the present embodiment, the contact portions dcp of the plurality of apparatus-side terminals are arranged to form two rows perpendicular to the first direction FD, and directions of the two rows are parallel to the second direction SD. A direction in which the two rows are arranged with respect to each other is the direction along the first virtual line C1, and the direction along the first direction FD in the present embodiment. The two rows are referred to as a first row R1 and a second row R2. The first row R1 is formed by the apparatus-side clock contact portion dcpc, the apparatus-side power-source contact portion dcpvd, and the apparatus-side ground contact portion dcpvs. The second row R2 is formed by the apparatus-side data contact portion dcpd and the apparatus-side reset contact portion dcpr. The apparatus-side data contact portion dcpd and the apparatus-side reset contact portion dcpr forming the second row R2, the apparatus-side clock contact portion dcpc, the apparatus-side power-source contact portion dcpvd, and the apparatus-side ground contact portion dcpvs forming the first row R1 are configured to form a so-called staggered arrangement in which the apparatus-side data contact portion dcpd and the apparatus-side reset contact portion dcpr forming the second row R2, the apparatus-side clock contact portion dcpc, the apparatus-side power-source contact portion dcpvd, and the apparatus-side ground contact portion dcpvs forming the first row R1 are arranged in a staggered manner so the contact portions dcp are not aligned with each other in the direction of the first virtual line C1. Any two of these contact portions dcp that have projection positions that are next to each other on the second virtual line C2, are positioned in different rows. The apparatus-side data contact portion dcpd and the apparatus-side ground contact portion dcpvs are arranged in different rows. The contact portion dcp of any apparatus-side terminal among the apparatus-side clock contact portion dcpc, the apparatus-side power-source contact portion dcpvd, and the apparatus-side reset contact portion dcpr is arranged to be projected between the projection position swd of the apparatus-side data contact portion dcpd and the projection position swvs of the apparatus-side ground contact portion dcpvs. In the present embodiment, the apparatus-side reset contact portion dcpr and the apparatus-side power-source contact portion dcpvd are arranged to be projected between the projection position swd of the apparatus-side data contact portion dcpd and the projection position swvs of the apparatus-side ground contact portion dcpvs. In the present embodiment, the contact portions dcp of the respective apparatus-side terminals 410 to 450 are arranged to form the first row R1 and the second row R2, but the present disclosure is not limited to this. For example, the contact portions dcp of the respective apparatus-side terminals 410 to 450 may be arranged to form rows such as three rows or four rows. The row may also be formed by the contact portion dcp of one apparatus-side terminal.

A distance between the apparatus-side ground contact portion dcpvs and the apparatus-side reset contact portion dcpr is set as a distance DAn. A distance between the apparatus-side data contact portion dcpd and the apparatus-side clock contact portion dcpc is set as a distance DBn. A distance between the apparatus-side data contact portion dcpd and the apparatus-side ground contact portion dcpvs is set as a distance DCn. A distance between the apparatus-side data contact portion dcpd and the apparatus-side reset contact portion dcpr is set as a distance DDn. A distance between the apparatus-side data contact portion dcpd and the apparatus-side power-source contact portion dcpvd is set as a distance DEn. In this case, the distance DCn is longer than the distance DBn. The distance DCn is longer than the distance DEn. The distance DCn is longer than the distance DDn. In the present embodiment, the distance DBn is equal to the distance DEn. A distance between the apparatus-side data contact portion dcpd, and the contact portion dcp of the apparatus-side terminal farthest from the apparatus-side data contact portion dcpd among the contact portions dcp of the plurality of apparatus-side terminals other than the apparatus-side ground contact portion dcpvs is either of the distance DBn or the distance DEn. In this case, the distance DAn is longer than either of the distance DBn or the distance DEn.

A virtual line segment connecting the apparatus-side clock contact portion dcpc and the apparatus-side data contact portion dcpd is set as a first line segment fL. A virtual line segment connecting the apparatus-side reset contact portion dcpr and the apparatus-side data contact portion dcpd is set as a second line segment sL. A virtual line segment connecting the apparatus-side power-source contact portion dcpvd and the apparatus-side data contact portion dcpd is set as a third line segment tL. On the first line segment fL, there are no contact portions dcp of the apparatus-side terminals other than the apparatus-side clock contact portion dcpc and the apparatus-side data contact portion dcpd. On the second line segment sL, there are no contact portions dcp of the apparatus-side terminals other than the apparatus-side reset contact portion dcpr and the apparatus-side data contact portion dcpd. On the third line segment tL, there are no contact portions dcp of the apparatus-side terminals other than the apparatus-side power-source contact portion dcpvd and the apparatus-side data contact portion dcpd.

The data terminal 210 may also be referred to as a first terminal. The clock terminal 220 may also be referred to as a second terminal included in other terminals. The reset terminal 240 may also be referred to as a third terminal included in other terminals. The power source terminal 230 may also be referred to as a fourth terminal included in other terminals. The ground terminal 250 may also be referred to as a fifth terminal included in the other terminals. The data contact portion cpd may also be referred to as a first contact portion. The clock contact portion cpc may also be referred to as a second contact portion. The reset contact portion cpr may also be referred to as a third contact portion. The power-source contact portion cpvd may also be referred to as a fourth contact portion. The ground contact portion cpvs may also be referred to as a fifth contact portion. The terminals other than the first terminal may also be referred to as an other terminal group. The terminals provided on the board 120 and the liquid accommodation container 100, such as the terminals 210 to 250, may also be referred to as board-side terminals or container-side terminals.

The apparatus-side terminal 410 may also be referred to as a first apparatus-side terminal. The apparatus-side terminal 420 may also be referred to as a second apparatus-side terminal. The apparatus-side terminal 430 may also be referred to as a third apparatus-side terminal. The apparatus-side terminal 440 may also be referred to as a fourth apparatus-side terminal. The apparatus-side terminal 450 may also be referred to as a fifth apparatus-side terminal. The projection position of the first apparatus-side terminal 410 may be referred to as a first projection position. The projection position of the second apparatus-side terminal 420 may be referred to as a second projection position. The projection position of the third apparatus-side terminal 430 may be referred to as a third projection position. The projection position of the fourth apparatus-side terminal 440 may be referred to as a fourth projection position. The projection position of the fifth apparatus-side terminal 450 may be referred to as a fifth projection position.

A2. Description of Various States of Printing System

In the present disclosure, a "mounting-completed state" means a state in which the liquid accommodation container 100 is mounted in the printing apparatus 20 and no short circuit occurs between the terminals 290. As described above, in the present disclosure, the sentence that "the liquid accommodation container 100 is mounted in the printing apparatus 20" means that the liquid accommodation container 100 is physically attached to the printing apparatus 20 and the contact portion cp of the terminal 290 on the container-side is electrically coupled to the apparatus-side terminal 490. The mounting-completed state is a state in which communication is possible between the printing apparatus 20 and the device 130. A "non-mounting-completed state" means a state in which the liquid accommodation container 100 is not mounted on the accommodation section 4 of the printing apparatus 20, or a state in which the liquid accommodation container 100 is attached to the accommodation section 4 of the printing apparatus 20, but a poor contact occurs between the apparatus-side terminal 490 and the contact portion cp. A "short-circuited state" means a state in which the liquid accommodation container 100 is mounted on the accommodation section 4 of the printing apparatus 20, but a short circuit occurred between the terminals 290. For example, a case where the data terminal 210 has a short circuit with the clock terminal 220 means that "the data terminal 210 and the clock terminal 220 are in a short-circuited state".

A "coupling state" is any one of (i) the mounting-completed state, (ii) the non-mounting-completed state, and (iii) the short-circuited state. "Determination of the coupling state" means determination of which state of the above-described (i) to (iii) the liquid accommodation container 100 is in.

A3. Electrical Configuration and Software Configuration

Figure 8:
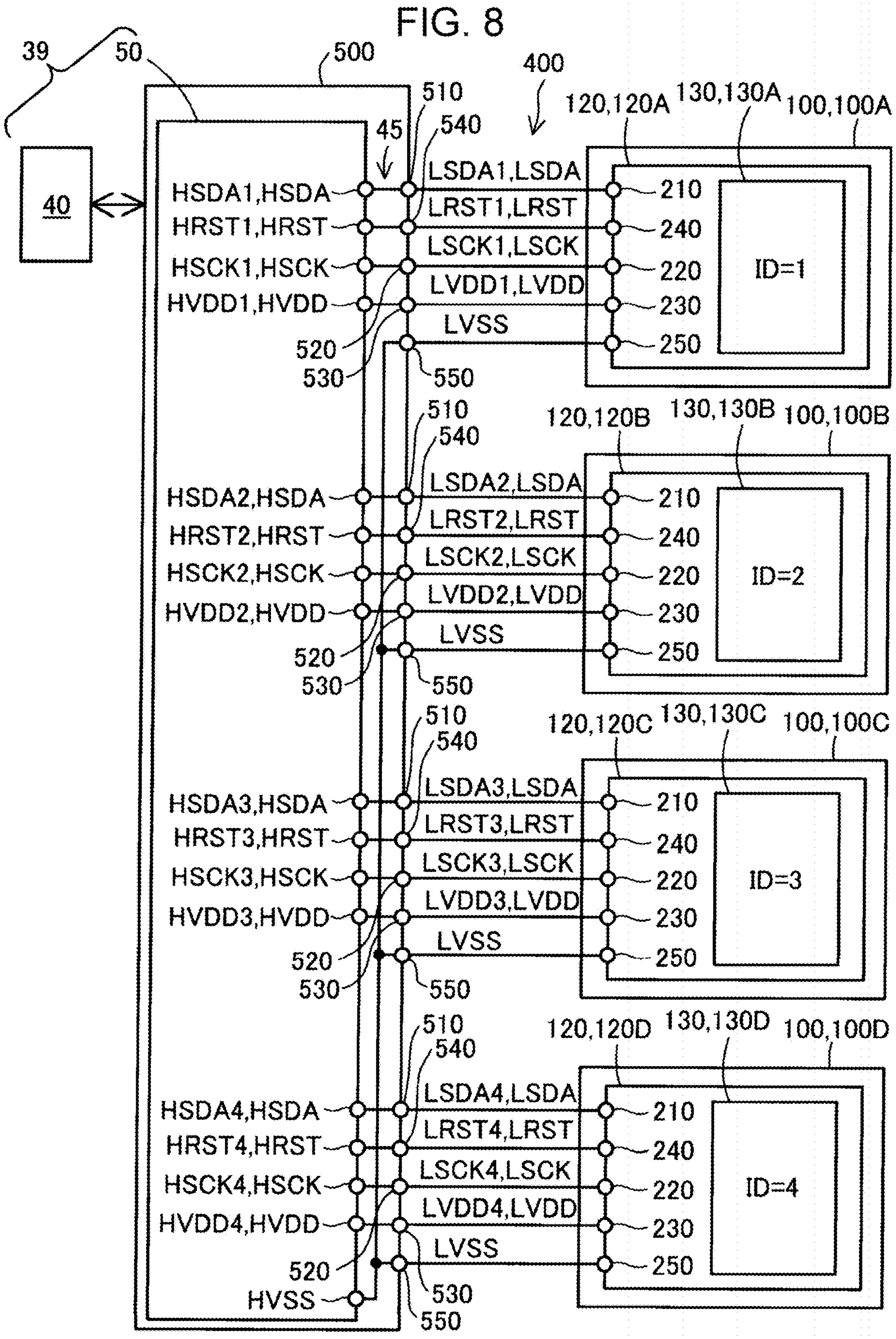
FIG. 8 is a schematic diagram illustrating an electrical configuration of the printing system.

A3-1. Electrical Configuration:

FIG. 8 is a schematic diagram illustrating the electrical configuration of the printing system 1000. In FIG. 8, when the boards 120 and the devices 130 of the four liquid accommodation containers 100A, 100B, 100C, and 100D are intended to be distinguished, "A", "B", "C", and "D" are added at the end. The devices 130A to 130D store identification information of the respective liquid accommodation containers 100A to 100D. For example, the devices 130A to 130D store information regarding liquids accommodated in the respective liquid accommodation containers 100A to 100D. The identification information is represented by ID=1 to 4 in FIG. 8. The main control unit 40 and the sub-control unit 50 form a control unit 39 that controls the operation of the printing apparatus 20.

The sub-control unit 50 is electrically coupled to the liquid accommodation containers 100A to 100D by a plurality of lines. The plurality of lines include a reset line LRST, a clock line LSCK, a power source line LVDD, a data line LSDA, and a ground line LVSS. In the present embodiment, the reset line LRST, the clock line LSCK, the power source line LVDD, and the data line LSDA are provided independently for each of the liquid accommodation containers 100A to 100D. In the present embodiment, ground line LVSS is commonly provided in the liquid accommodation containers 100A to 100D. When the lines electrically coupled to the corresponding liquid accommodation containers 100A to 100D regarding the reset line LRST, the clock line LSCK, the power source line LVDD, and the data line LSDA are intended to be distinguished, "1" to "4" are added at the end. "1" to "4" correspond to the pieces of identification information "1" to "4" of the liquid accommodation containers 100A to 100D.

In the sub-control unit 50, a terminal that outputs the reset signal RST is set as a host terminal HRST. A terminal that outputs the clock signal SCK is set as a host terminal HSCK. A terminal that outputs a power source voltage VDD is set as a host terminal HVDD. A terminal that outputs and inputs the data signal SDA is set as a host terminal HSDA. A host terminal HVSS is grounded. When the terminals coupled to the corresponding liquid accommodation containers 100A to 100D regarding the host terminals HSDA, HRST, HSCK, and HVDD are intended to be distinguished, "1" to "4" are added at the end. "1" to "4" correspond to the pieces of identification information "1" to "4" of the liquid accommodation containers 100A to 100D. The sub-control unit 50 is electrically coupled to the main control unit 40 via the bus 46. The sub-control unit 50 individually transmits various signals and voltages to the devices 130A to 130D of the liquid accommodation containers 100A to 100D via a coupling bus 45 including the lines LRST, LSCK, LVDD, LSDA, and LVSS.

The reset line LRST is a conductive line used when the control unit 39 transmits the reset signal RST to the device 130. The reset signal RST is a signal for making a state where receiving a request signal RS, which will be described later, is possible. When the reset signal RST transmitted to the device 130 by the control unit 39 changes from a high level to a low level, a portion of the processing unit 136, which receives the request signal RS, becomes an initial state. When the reset signal RST changes from the low level to the high level, a new request signal RS is enabled to be received. The clock line LSCK is a conductive line used when the control unit 39 transmits the clock signal SCK to the device 130. The clock signal SCK is a signal in which a low level and a high level are alternately repeated at a predetermined cycle. The data line LSDA is a conductive line used to transmit and receive the data signal SDA between the control unit 39 and the device 130. The data signal SDA is transmitted and received in synchronization with the clock signal SCK in order to synchronize between the control unit 39 and the device 130. For example, the data signal SDA is transmitted and received by using, as a trigger, the rising or falling edge of the clock signal SCK. The reset signal RST, the data signal SDA, and the clock signal SCK take either a high level or a low level. In the following description, the high level is also represented by the reference sign "H" or "1", and the low level is also represented by the reference sign "L" or "0". The host terminal HSDA coupled to the data line LSDA is grounded in the sub-control unit 50 via a pull-down resistor. Thus, when the data signal SDA is not transmitted/received between the sub-control unit 50 and the device 130, a drive state of the host terminal HSDA in the sub-control unit 50 is maintained at a low level.

The ground line LVSS is a conductive line for defining a ground potential VSS of the device 130. The ground potential VSS is set to, for example, 0 V. The power source line LVDD is a conductive line used when the control unit 39 supplies the power source voltage VDD as an operation voltage to the device 130. The power source voltage VDD is a voltage higher than a predetermined threshold value. In the present embodiment, as the power source voltage VDD, a potential of, for example, about 3.3 V with respect to the ground potential VSS is used. The potential used for the power source voltage VDD may have a different value depending on the type of the device 130.

Figure 9:
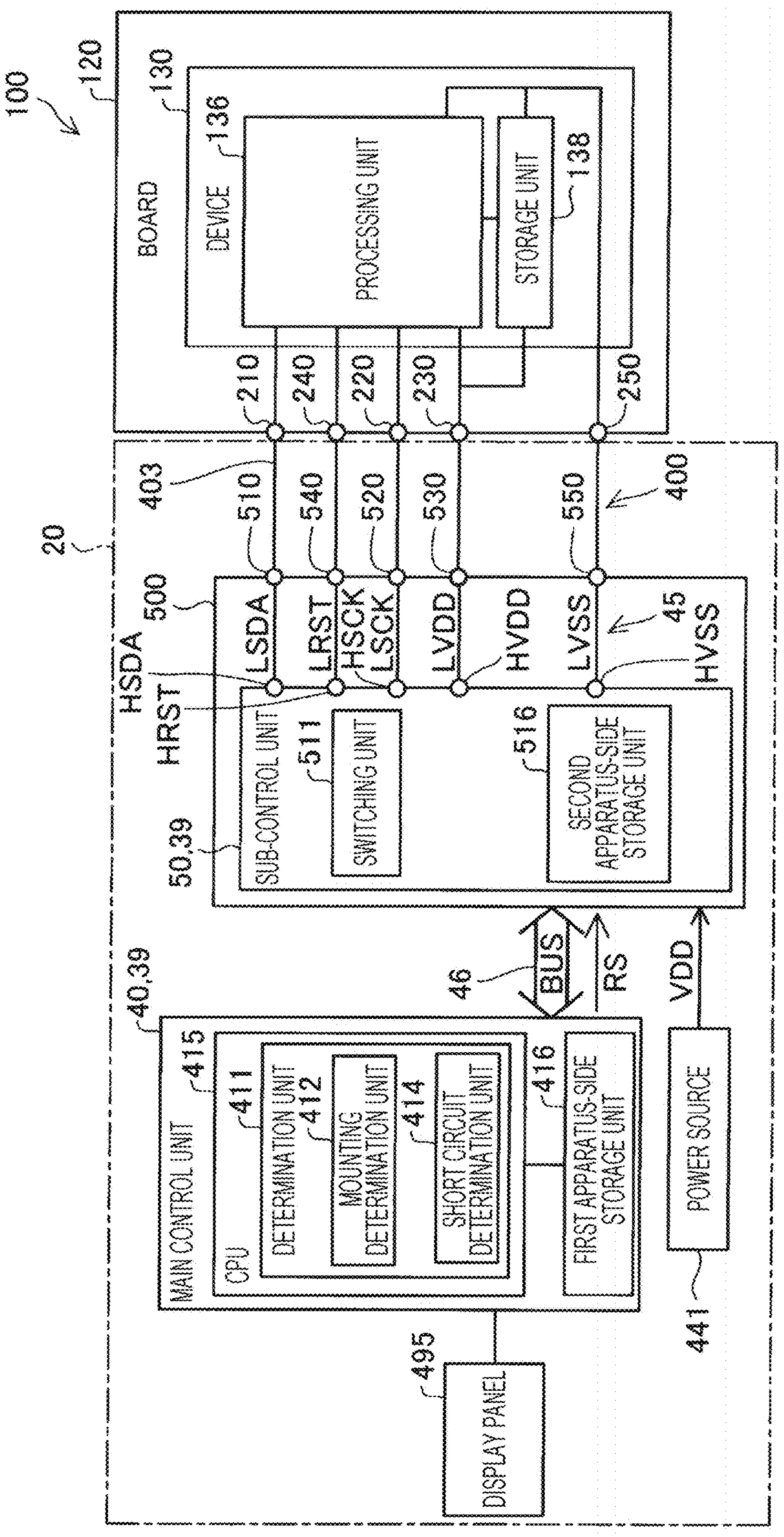
FIG. 9 is a diagram illustrating a functional configuration of a printing apparatus together with one liquid accommodation container.

FIG. 9 is a diagram illustrating the functional configuration of the printing apparatus 20 together with one liquid accommodation container 100. The printing apparatus 20 includes a display panel 495, a power source 441, the main control unit 40, and the sub-control unit 50. The display panel 495 is used to notify a user of an operation status of the printing apparatus 20, an error in the liquid accommodation containers 100A to 100D, the ink consumption stored in the device 130, the color of the ink, the manufacturing date, and the like. When the liquid accommodation container 100 is in the mounting-completed state, for example, a display informing the user that the liquid accommodation container 100 is mounted, a display indicating that the printing system 1000 is in a printable state, and a display of the remaining amount of the ink accommodated in the liquid accommodation container 100 are made on the display panel 495. The display panel 495 is provided, for example, in the operation portion 70 in FIG. 2. The power source 441 is a general power source used in a logic circuit and has a rating of 3.3 V. The voltage of the power source 441 is supplied to the sub-control unit 50, and is also supplied to other circuits as needed.

The main control unit 40 includes a CPU 415 and a first apparatus-side storage unit 416. The CPU 415 controls the operation of the printing apparatus 20 by executing various programs stored in the first apparatus-side storage unit 416. For example, the main control unit 40 controls the operation of the display panel 495 and controls the operation of the sub-control unit 50. The CPU 415 functions as a determination unit 411 by executing various programs stored in the first apparatus-side storage unit 416. The determination unit 411 includes a mounting determination unit 412 and a short circuit determination unit 414. The mounting determination unit 412 determines whether or not the liquid accommodation container 100 is mounted. The short circuit determination unit 414 determines whether or not a short circuit occurred between the terminals 290.

The sub-control unit 50 includes a switching unit 511 and a second apparatus-side storage unit 516. The switching unit 511 includes a register (not illustrated) and an analog switch (not illustrated) coupled to the register. When the CPU 415 writes "1" to the register, the analog switch becomes a conductive state. Thus, it is possible to switch the state to a state in which the CPU 415 and the board 120 are coupled to each other. When the CPU 415 writes "0" to the register, the analog switch becomes a non-conductive state. Thus, it is possible to switch the state to a state in which the CPU 415 and the board 120 are not coupled to each other.

The second apparatus-side storage unit 516 stores determination information. The determination information is information used in the coupling state determination processing described later. The determination information is information in which the voltage output from the data terminal 210 in response to the request signal RS described later is set to have a detected value. The determination unit 411 reads the determination information from the second apparatus-side storage unit 516 when performing coupling state determination processing.

The sub-control unit 50 transmits the request signal RS to the devices 130A to 130D of the liquid accommodation containers 100A to 100D via the coupling bus 45. The request signal RS is output from the host terminal HSDA of the sub-control unit 50 and input to the data terminal 210 of each of the liquid accommodation containers 100A to 100D. The request signal RS includes a command for enabling identification of the liquid accommodation containers 100A to 100D as a response target to the request signal RS, for each of the devices 130A to 130D. The determination unit 411 performs the coupling state determination processing of the liquid accommodation containers 100A to 100D by using the voltage output from the data terminal 210 of each of the liquid accommodation containers 100A to 100D in response to the request signal RS. Details of the request signal RS will be described later.

The processing unit 136 of the device 130 communicates with the printing apparatus 20 via the data line LSDA in synchronization with the clock signal SCK input from the printing apparatus 20 to the clock terminal 220. For example, a signal is transmitted/received triggered by using, as a trigger, the rising or falling edge of the clock signal SCK. The processing unit 136 controls signals and voltages input/output to/from the terminals 210 to 250. For example, response signals FS and SS are output to the data terminal 210 via the data line LSDA in response to the request signal RS. The processing unit 136 includes a three-state buffer. The three-state buffer has three drive states: a state where a low level voltage is output, a state where a high level voltage is output, and a high-impedance state. The three-state buffer is coupled to the data terminal 210. Thus, in the present disclosure, the "low level", the "high level", and the "high impedance" are used as terms indicating the drive state of the data terminal 210. The storage unit 138 includes a memory cell array in which a plurality of memory cells are arranged in a two-dimensional matrix. The processing unit 136 and the storage unit 138 are coupled by a bit line and a word line. The processing unit 136 is electrically coupled to each of the terminals 210 to 250 and the storage unit 138.

Figure 10A:
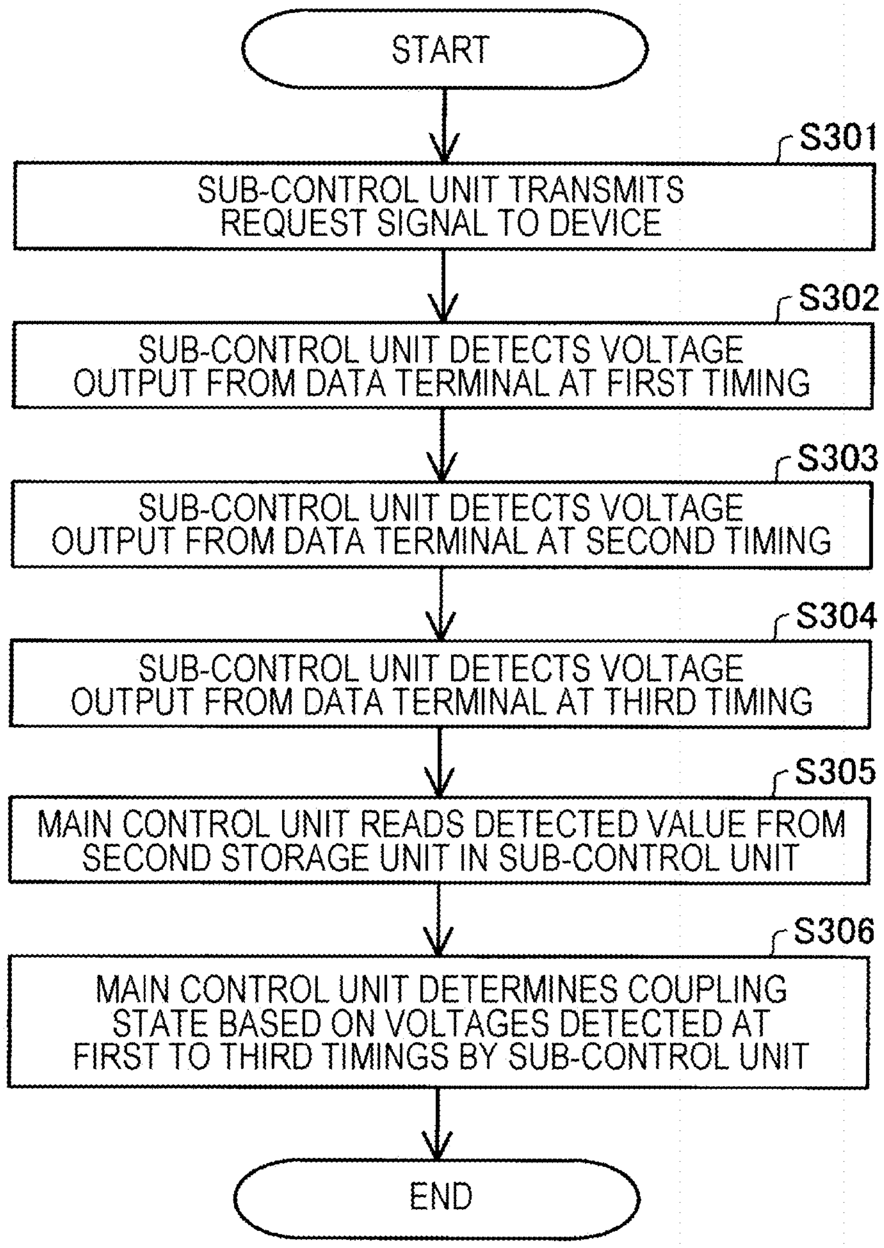
FIG. 10A is a flowchart illustrating a process executed by the printing apparatus in coupling state determination processing.
Figure 10B:
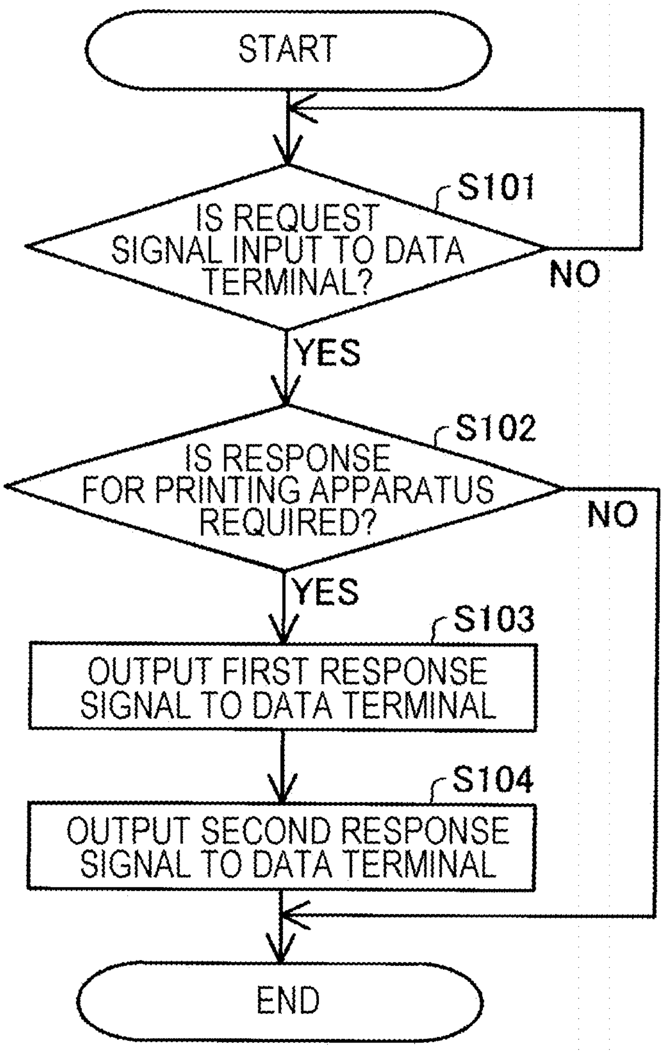
FIG. 10B is a flowchart illustrating a process executed by a device in the coupling state determination processing.

A3-2. Outline of Software Configuration (Coupling State Determination Processing):

The coupling state determination processing performed by the printing system 1000 will be described with reference to FIGS. 10A and 10B. FIG. 10A is a flowchart illustrating a process executed by the printing apparatus 20 in the coupling state determination processing. FIG. 10B is a flowchart illustrating a process executed by the device 130 in the coupling state determination processing.

As illustrated in FIG. 10A, in the coupling state determination processing, the printing apparatus 20 executes processes as follows. In Step S301, the sub-control unit 50 transmits a request signal RS to the device 130 of the liquid accommodation container 100. Then, the sub-control unit 50 detects a voltage output from the data terminal 210 of the liquid accommodation container 100. Specifically, in Step S302, the sub-control unit 50 detects the voltage output from the data terminal 210 of the liquid accommodation container 100 at a predetermined first timing t1. In Step S303, the sub-control unit 50 detects the voltage output from the data terminal 210 of the liquid accommodation container 100 at a predetermined second timing t2. In Step S304, the sub-control unit 50 detects the voltage output from the data terminal 210 of the liquid accommodation container 100 at a predetermined third timing t3. The first timing t1 to the third timing t3 are timings that are different from one another. The voltages detected by the sub-control unit 50 at the first timing t1 to the third timing t3 are stored as detected values in the second apparatus-side storage unit 516 of the sub-control unit 50. In Step S305, the determination unit 411 of the main control unit 40 reads out the detected value from the second apparatus-side storage unit 516. In Step S306, the main control unit 40 determines the coupling state based on the detected values obtained by the detection of the sub-control unit 50 at the first timing t1 to the third timing t3.

As illustrated in FIG. 10B, in the coupling state determination processing, the device 130 executes processes as follows. In Step S101, the processing unit 136 of the device 130 determines whether or not the request signal RS is input from the printing apparatus 20 to the data terminal 210. When determining that the request signal RS is input to the data terminal 210, the processing unit 136 of the device 130 determines whether or not to request the response to the printing apparatus 20 in Step S102. When determining to request the response to the printing apparatus 20, the processing unit 136 of the device 130 outputs a first response signal FS to the data terminal 210 in Step S103. After outputting the first response signal FS, the processing unit 136 of the device 130 outputs a second response signal SS to the data terminal 210 in Step S104. The first response signal FS and the second response signal SS are output from the data terminal 210 to the printing apparatus 20. When it is determined in Step S102 that the response to the printing apparatus 20 is not requested, the processing unit 136 of the device 130 ends the processes.

Figure 11A:
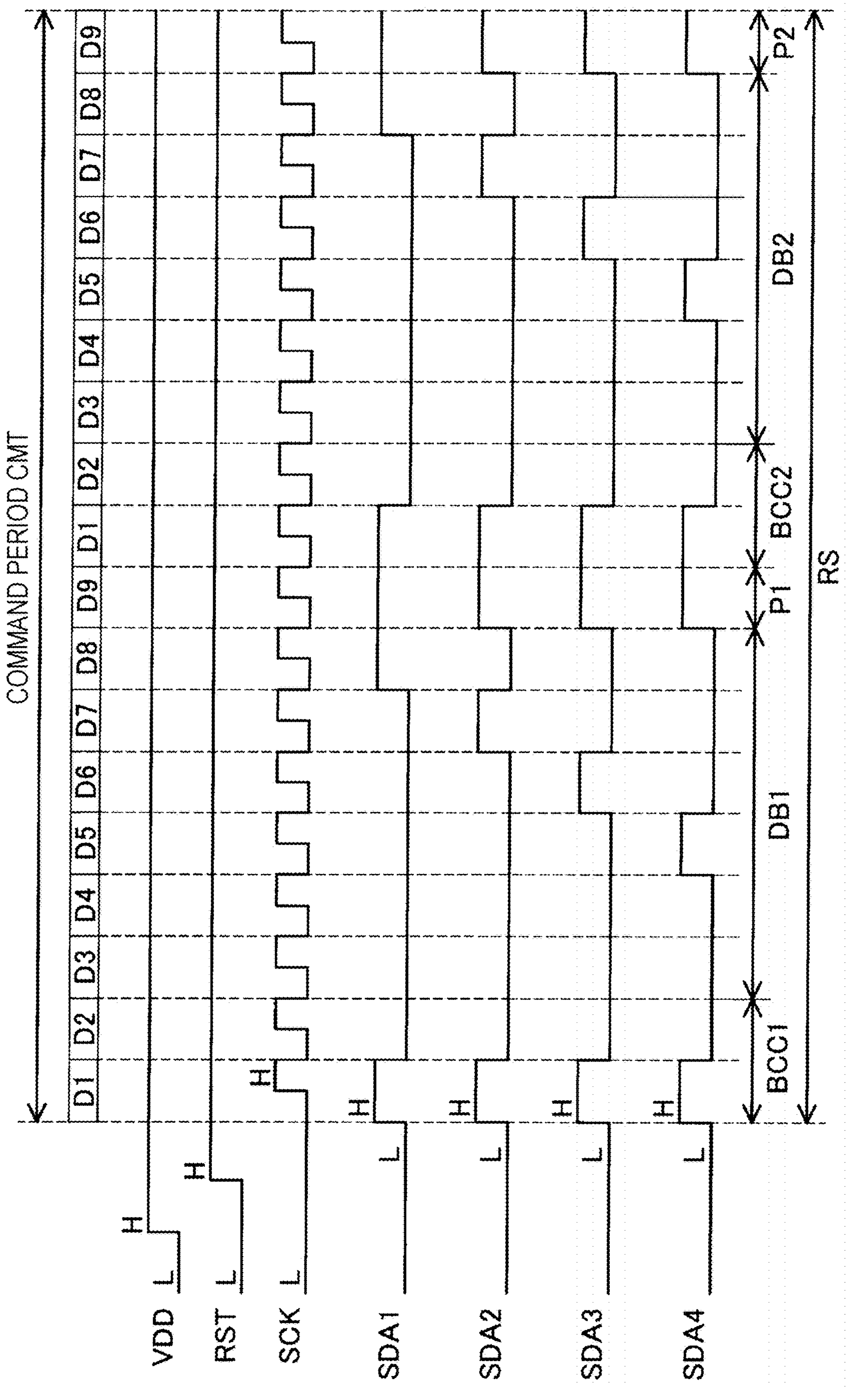
FIG. 11A is a timing chart when the printing apparatus outputs a request signal.
Figure 11B:
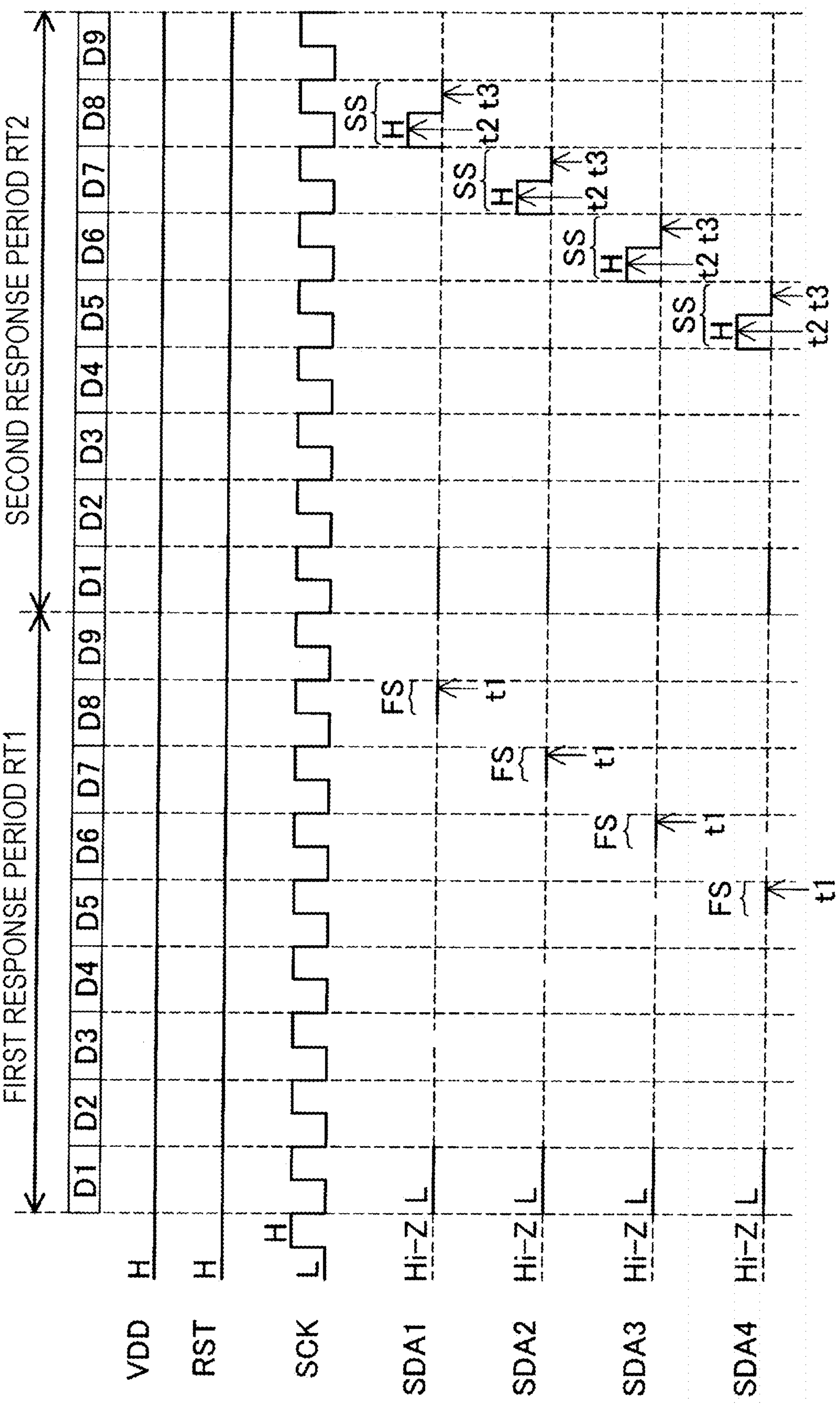
FIG. 11B is a timing chart when the device outputs a first response signal and a second response signal.
Figure 11C:
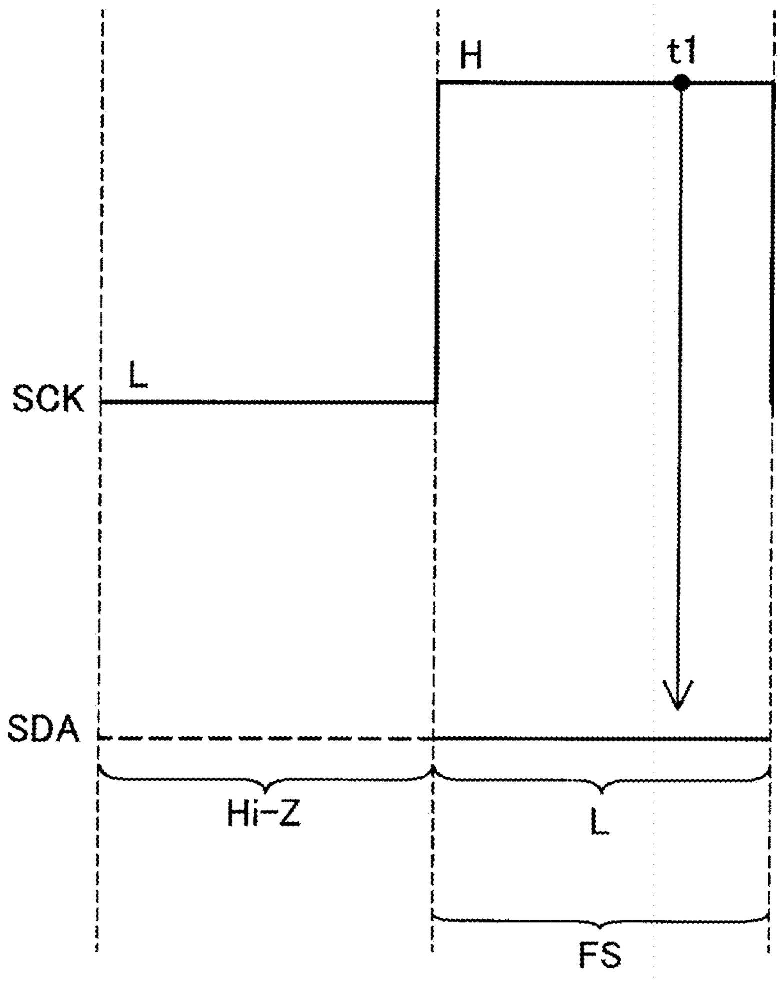
FIG. 11C is a diagram illustrating details of the first response signal.
Figure 11D:
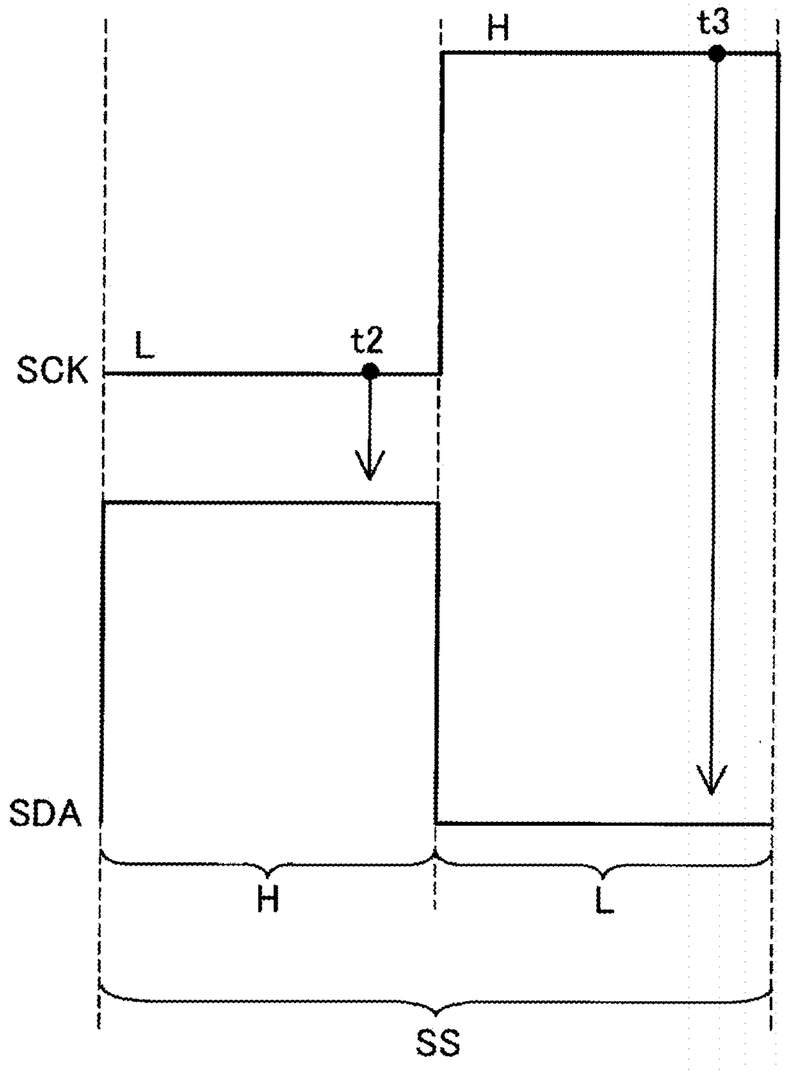
FIG. 11D is a diagram illustrating details of the second response signal.

The outline and output timings of the request signal RS, the first response signal FS, and the second response signal SS will be described with reference to FIGS. 11A to 11D. FIG. 11A is a timing chart when the printing apparatus 20 outputs the request signal RS to the data terminal 210. FIG. 11B is a timing chart when the device 130 outputs the first response signal FS and the second response signal SS to the data terminal 210. FIG. 11C is a diagram illustrating details of the first response signal FS. FIG. 11D is a diagram illustrating details of the second response signal SS. The timing chart illustrating FIG. 11B is executed following the timing chart illustrating FIG. 11A. In FIGS. 11A to 11D, "H" indicates that the signal is at a high level, and "L" indicates that the signal is at a low level. The dotted line indicates that the drive state of the terminal 290 is high impedance, and indicates that no signal is output from the terminal 290. The host terminal HSDA of the sub-control unit 50 is grounded via the pull-down resistor. Thus, it is not possible for the control unit 39 to distinguish between a case where the drive state of the terminal 290 is the high impedance and no signal is output from the terminal 290 and a case where a low level voltage is output from the terminal 290. For example, when a pull-up resistor coupling the data terminal 210 and the power source terminal 230 is used, it is recognized that the drive state of the data terminal 290 is the high impedance. VDD, RST, SCK, and SDA1 to SDA4 illustrated in FIG. 11A and the like mean signals transmitted to and received via the corresponding terminal 290 or voltages supplied, by the corresponding lines LVDD, LRST, LSCK, and LSDA1 to LSDA4. Cycles D1 to D9 in a command period CMT, a first response period RT1, and a second response period RT2 represent a unit period in which the low level and high level of the clock signal SCK are repeated in each period. The clock signal SCK in this unit period is referred to as a "cycle".

The timing charts illustrated in FIGS. 11A and 11B are executed by using a predetermined timing as a trigger. The predetermined timing is, for example, a timing at which the printing apparatus 20 is activated and the power source 441 turns ON, a timing at which the liquid accommodation container 100 is replaced, a timing at which an instruction from the user is received, and a timing at which the printing apparatus 20 does not perform printing and the carriage 30 is located at a home position. An example of performing triggering by the timing at which the power source 441 turns ON will be described below.

As illustrated in FIG. 11A, the control unit 39 first sets the power source voltage VDD to a high level. The control unit 39 changes the reset signal RST from a low level to the high level after a predetermined time elapses after the power source voltage VDD becomes the high level. The control unit 39 transmits the clock signal SCK to the device 130 after changing the reset signal RST to the high level. The control unit 39 transmits the request signal RS to the device 130 after changing the reset signal RST to the high level. The request signal RS includes a first execution command BCC1, first identification data DB1, first parity data P1, a second execution command BCC2, second identification data DB2, and second parity data P2.

The request signal RS will be described in detail. After changing the reset signal RST to the high level, the control unit 39 transmits the first execution command BCC1 to the devices 130A to 130D in the cycle D1 and the cycle D2 of the command period CMT. The first execution command BCC1 is 2-bit data, and is a command indicating that the main control unit 40 executes the coupling state determination processing. The control unit 39 generates the first execution command BCC1 by setting the voltage to the high level in the cycle D1 and the voltage to the low level in the cycle D2.

The control unit 39 transmits the first identification data DB1 to the devices 130A to 130D in the cycles D3 to D8, after the first execution command BCC1. The first identification data DB1 is 6-bit data and is used for identifying the liquid accommodation containers 100A to 100D that require a response. In the first identification data DB1, corresponding bits are assigned to each of the devices 130A to 130D. The cycle D3 which is the first bit and the cycle D4 which is the second bit may be used when six liquid accommodation containers 100 are mounted in the printing apparatus 20 in another embodiment. In the first identification data DB1, the cycle D5 which is the third bit corresponds to the liquid accommodation container 100D, the cycle D6 which is the fourth bit corresponds to the liquid accommodation container 100C, the cycle D7 which is the fifth bit corresponds to the liquid accommodation container 100B, and the cycle D8 which is the sixth bit corresponds to the liquid accommodation container 100A. The first identification data DB1 transmitted to the device 130A of the liquid accommodation container 100A is at a high level in the cycle D8 which is the sixth bit, and the remaining bits are at a low level. The first identification data DB1 transmitted to the device 130B of the liquid accommodation container 100B is at a high level in the cycle D7 which is the fifth bit, and the remaining bits are at a low level. The first identification data DB1 transmitted to the device 130C of the liquid accommodation container 100C is at a high level in the cycle D6 which is the fourth bit, and the remaining bits are at a low level. The first identification data DB1 transmitted to the device 130D of the liquid accommodation container 100D is at a high level in the cycle D5 which is the third bit, and the remaining bits are at a low level. The request signal RS has a different waveform for each of the devices 130A to 130D of the liquid accommodation containers 100A to 100D.

After the first identification data DB1, the control unit 39 transmits the first parity data P1 to the devices 130A to 130D in the cycle D9. The first parity data P1 is 1-bit data. In the present embodiment, the first parity data P1 is odd parity.

After the first parity data P1, the control unit 39 transmits the 2-bit second execution command BCC2 to the devices 130A to 130D. The second execution command BCC2 is the same data in which the first execution command BCC1 is not inverted. After the second execution command BCC2, the control unit 39 transmits the 6-bit second identification data DB2 to the devices 130A to 130D. The second identification data DB2 is the same data in which the first identification data DB1 is not inverted. After the second identification data DB2, the control unit 39 transmits the 1-bit second parity data P2 to the devices 130A to 130D.

The first execution command BCC1, the first identification data DB1, and the first parity data P1 are also collectively referred to as a first command. The second execution command BCC2, the second identification data DB2, and the second parity data P2 are also collectively referred to as a second command. A period in which the control unit 39 transmits the first command to the device 130 in the command period CMT is also referred to as a first command period. A period in which the control unit 39 transmits the second command to the device 130 in the command period CMT is also referred to as a second command period. The first command and the second command are not inverted from each other and are the same data. In other embodiments, the first and second commands may be inverted from each other.

As described above, in the device 130, firstly, the power source voltage VDD is input from the printing apparatus 20 to the power source terminal 230. A high reset voltage is input from the printing apparatus 20 to the reset terminal 240 in a manner that, in the device 130, the power source voltage VDD is input from the printing apparatus 20 to the power source terminal 230, and then the reset signal RST changes from a low reset voltage to the high reset voltage. In the device 130, after the high reset voltage is input from the printing apparatus 20 to the reset terminal 240, the clock signal SCK is input to the clock terminal 220 from the printing apparatus 20. In the device 130, after the high reset voltage is input from the printing apparatus 20 to the reset terminal 240, the request signal RS is input to the data terminal 210 from the printing apparatus 20. Here, the power source voltage VDD is a voltage as a high level higher than a threshold value. The reset signal RST is a signal containing a low reset voltage as a low level and a high reset voltage as a high level higher than the low reset voltage. The low reset voltage is a voltage lower than a reference reset voltage as the threshold value. The high reset voltage is a voltage higher than the reference reset voltage as the threshold value. The reference reset voltage is a voltage functioning as a reference for determining a high level and a low level. The clock signal SCK is a signal in which a low clock voltage as a low level and a high clock voltage as a high level higher than the low clock voltage are alternately repeated at a predetermined cycle. The low clock voltage is a voltage lower than a reference clock voltage as a threshold value. The high clock voltage is a voltage higher than the reference clock voltage as the threshold value. The reference clock voltage is a voltage functioning as a reference for determining a high level and a low level. Each threshold value is set, for example, between the potential of the power source 441 and the ground potential.

As illustrated in FIG. 11B, after the request signal RS is transmitted from the control unit 39 to the device 130, the device 130 requested to respond to the printing apparatus 20 outputs the first response signal FS and the second response signal SS to the data terminal 210. The first response signal FS and the second response signal SS are signals used by the printing apparatus 20 to determine that the data terminal 210 does not have a short circuit with the clock terminal 220, the power source terminal 230, and the reset terminal 240, and that the liquid accommodation container 100 is mounted in the printing apparatus 20. The request signal RS has a waveform for individually designating the liquid accommodation containers 100A to 100D in the first identification data DB1. When receiving the request signal RS in which the corresponding device is designated, from the printing apparatus 20, the devices 130A to 130D respectively output the first response signal FS and the second response signal SS to the data terminal 210. The first response signal FS is output in the first response period RT1. The second response signal SS is output in the second response period RT2 which is the period next to the first response period RT1.

In the first response period RT1, first, in the cycle D1 and the cycle D2, direction switching processing of a signal transmitted and received by the printing apparatus 20 via the data line LSDA is executed. After transmitting the request signal RS to the device 130, the control unit 39 discharges charges in the data line LSDA by setting the potential of the data line LSDA to 0 V in the cycle D1. Then, the control unit 39 sets the drive state of the host terminal HSDA in the sub-control unit 50 to the high impedance in the cycle D2. Thus, the printing apparatus 20 turns into a state where an input of signals is possible. After receiving the request signal RS in synchronization with the clock signal SCK, the processing unit 136 of the device 130 sets the drive state of each data terminal 210 to the high impedance in the cycle D1. This is to prevent an output of a signal from the data terminal 210 while the charges of the data line LSDA are discharged by the control unit 39 of the printing apparatus 20. Similarly, in the cycle D2, the processing unit 136 of the device 130 sets the drive state of the data terminal 210 to the high impedance. The first two bits in the first response period RT1 also function as dummy bits for making the number of bits of the request signal RS and the number of bits of the signal in the first response period RT1 be equal to each other. The number of cycles of the clock signal SCK forming the first response period RT1 is equal to the number of cycles of the clock signal SCK synchronized with the request signal RS.

Then, in the cycles D3 to D8, the processing unit 136 of each device 130 outputs the first response signal FS to the data terminal 210 at a predetermined timing. The first response signal FS is output from different processing units 136A to 136D for each cycle of the clock signal SCK. The first response signal FS includes a low level voltage. As illustrated in FIG. 11C, the first response signal FS is a signal output to the data terminal 210 during the period when the clock signal SCK is at a high level. The first response signal FS is at a low level during a period in which the clock signal SCK is at a high level. The processing unit 136 of the device 130 outputs a low level voltage to the data terminal 210 when the voltage received at the clock terminal 220 changes from a low level to a high level.

As described above, the first response signal FS includes a first low response voltage as a low level lower than the first reference response voltage as a threshold value. The first reference response voltage is a voltage functioning as a reference for determining a low level and a high level, and is set, for example, between the voltage of the power source 441 and the voltage of the ground potential.

As illustrated in FIG. 11B, the first timing t1 is set in a period in which the clock signal SCK is at a high level in each of the cycles D5 to D8 of the first response period RT1. The first timing t1 is set in a period in which the first response signal FS is at a low level. As illustrated in FIG. 11C, the device 130 begins to output a low level voltage to the data terminal 210 before the first timing t1 in a period in which the clock signal SCK is at a high level in one cycle of the clock signal SCK.

As illustrated in FIG. 11B, the cycle D9 of the first response period RT1 functions as a dummy bit for making the number of bits in the first command period and the number of bits in the first response period RT1 be equal to each other.

In the second response period RT2, as illustrated in FIG. 11B, the control unit 39 discharges charges in the data line LSDA by setting the potential of the data line LSDA to 0 V. In the cycle D1, the processing unit 136 of the device 130 sets the drive state of the data terminal 210 to the high impedance. Also in the cycle D2, the processing unit 136 of the device 130 sets the drive state of the data terminal 210 to the high impedance. The first two bits in the second response period RT2 also function as dummy bits for making the number of bits of the request signal RS and the number of bits of the signal in the second response period RT2 be equal to each other. The number of cycles of the clock signal SCK forming the second response period RT2 is equal to the number of cycles of the clock signal SCK synchronized with the request signal RS.

Then, in the cycles D5 to D8, the processing unit 136 of each device 130 outputs the second response signal SS to the data terminal 210 at a predetermined timing. The second response signal SS is output from different processing units 136A to 136D for each cycle of the clock signal SCK. The second response signal SS includes a low level voltage and a high level voltage. As illustrated in FIG. 11D, the waveform of the second response signal SS has a phase opposite to the phase of the waveform of the clock signal SCK input to the clock terminal 220. The second response signal SS includes a high level during a period in which the clock signal SCK is at a low level, and includes a low level during a period in which the clock signal SCK is at a high level.

As described above, the second response signal SS includes a second low response voltage as a low level and a second high response voltage as a high level higher than the second low response voltage. The second low response voltage is a voltage lower than a second reference response voltage as a threshold value, and the second high response voltage is a voltage higher than the second reference response voltage as the threshold value. The second reference response voltage is a voltage functioning as a reference for determining a low level and a high level, and is set, for example, between the voltage of the power source 441 and the voltage of the ground potential. The second reference response voltage may be equal to or different from the first reference response voltage. The waveform of the second response signal SS is different from the waveform of the first response signal FS.

As illustrated in FIG. 11B, the second timing t2 is set in a period in which the clock signal SCK is at a low level in each of the cycles D5 to D8 of the second response period RT2. The second timing t2 is set during a period in which the second response signal SS becomes a high level. The third timing t3 is set in a period in which the clock signal SCK is at a high level in each of the cycles D5 to D8 of the second response period RT2. The third timing t3 is set during a period in which the second response signal SS becomes a low level. As illustrated in FIG. 11D, the device 130 begins to output a high level voltage to the data terminal 210 before the second timing t2 in a period in which the clock signal SCK is at a low level in one cycle of the clock signal SCK. The device 130 begins to output a low level voltage to the data terminal 210 before the third timing t3 in a period of a high level in one cycle of the clock signal SCK.

As illustrated in FIG. 11B, the cycle D9 of the second response period RT2 functions as dummy-bit data for making the number of bits in the second command period and the number of bits in the second response period RT2 be equal to each other.

Output periods of the first response signal FS and the second response signal SS are different for each of the devices 130A to 130D of the liquid accommodation containers 100A to 100D. In the present embodiment, the device 130 outputs the first response signal FS and the second response signal SS in one cycle of the clock signal SCK corresponding to the identification information. As illustrated in FIG. 11B, the liquid accommodation container 100A outputs the first response signal FS and the second response signal SS to the data terminal 210 in each cycle D8 of the first response period RT1 and the second response period RT2. The liquid accommodation container 100B outputs the first response signal FS and the second response signal SS to the data terminal 210 in each cycle D7 of the first response period RT1 and the second response period RT2. The liquid accommodation container 100C outputs the first response signal FS and the second response signal SS to the data terminal 210 in each cycle D6 of the first response period RT1 and the second response period RT2. The liquid accommodation container 100D outputs the first response signal FS and the second response signal SS to the data terminal 210 in each cycle D5 of the first response period RT1 and the second response period RT2.

As illustrated in FIG. 11B, when the clock signal SCK having a predetermined number of cycles is input to the clock terminal 220, the device 130 switches the drive state of the data terminal 210 from the high impedance to the low level and outputs the first response signal FS. For example, as illustrated in FIG. 11B, when the clock signal SCK is input to the clock terminal 220 in the cycles D1 to D7 in the first response period RT1, the device 130A switches the drive state of the data terminal 210 from the high impedance to the low level, and outputs the first response signal FS. The device 130 switches the drive state of the data terminal 210 from the low level to the high impedance and ends the output of the first response signal FS. For example, as illustrated in FIG. 11B, the device 130A outputs the first response signal FS in the cycle D8 in the first response period RT1, and then switches the drive state of the data terminal 210 to the high impedance. Thus, the device 130A ends the output of the first response signal FS.

As illustrated in FIG. 11B, when the clock signal SCK having a predetermined number of cycles is input to the clock terminal 220, the device 130 switches the drive state of the data terminal 210 from the high impedance to the high level and outputs the second response signal SS. For example, as illustrated in FIG. 11B, when the clock signal SCK is input to the clock terminal 220 in the cycles D1 to D7 in the second response period RT2, the device 130A switches the drive state of the data terminal 210 from the high impedance to the high level, and outputs the second response signal SS. The device 130 switches the drive state of the data terminal 210 from the low level to the high impedance and ends the output of the second response signal SS. For example, as illustrated in FIG. 11B, the device 130A outputs the second response signal SS in the cycle D8 in the second response period RT2, and then switches the drive state of the data terminal 210 from the low level to the high impedance. Thus, the device 130A ends the output of the second response signal SS.

As described above, the device 130 outputs the first response signal FS to the data terminal 210 after the request signal RS is input to the data terminal 210. In addition, the device 130 outputs the first response signal FS, and then outputs the second response signal SS to the data terminal 210. The device 130 performs the following when the data terminal 210 does not have a short circuit with the clock terminal 220, the power source terminal 230, and the reset terminal 240. As illustrated in FIG. 11C, the device 130 outputs the first low response voltage as a first expected value to the data terminal 210 at a predetermined first timing t1 in a period in which the voltage received at the clock terminal 220 is a high clock voltage. As illustrated in FIG. 11D, after the device 130 outputs the first low response voltage, the device 130 outputs the second high response voltage as a second expected value to the data terminal 210 at a second timing t2 in which the voltage received at the clock terminal 220 is a low clock voltage. As illustrated in FIG. 11D, after the device 130 outputs the second high response voltage, the device 130 outputs the second low response voltage as a third expected value to the data terminal 210 at a third timing t3 in which the voltage received at the clock terminal 220 is a high clock voltage.

The first response signal FS is configured by a low level. The low level of the first response signal FS indicates that the data terminal 210 does not have a short circuit with the terminals 220, 230, 240, and 250 other than the data terminal 210. The second response signal SS is configured by a high level and a low level. The high level of the second response signal SS indicates that the liquid accommodation container 100 is mounted in the printing apparatus 20. The low level of the second response signal SS indicates that the data terminal 210 does not have a short circuit with the terminals 220, 230, 240, and 250 other than the data terminal 210.

A3-3. Details of Software Configuration (Coupling State Determination Processing):

The coupling state determination processing executed by the main control unit 40 will be described with reference to FIG. 12. FIG. 12 is a diagram illustrating an outline of the coupling state determination processing executed by the main control unit 40. As illustrated in FIG. 12, the main control unit 40 determines the coupling state by using a combination of the voltages output from the data terminal 210 of the liquid accommodation container 100 at the first timing t1 to the third timing t3. The first timing t1 to the third timing t3 are assigned to the periods of the cycles D5 to D8 in accordance with the liquid accommodation containers 100A to 100D as described above with reference to FIG. 11B. The expected value of the voltage output from the data terminal 210 of the liquid accommodation container 100 at each of the first timing t1 to the third timing t3 is the voltage output from the data terminal 210 when the liquid accommodation container 100 is in the mounting-completed state. The expected value is a low level at the first timing t1, a high level at the second timing t2, and a low level at the third timing t3. In a first case where the voltage output from the data terminal 210 of the liquid accommodation container 100 is equal to the expected value, the determination unit 411 of the main control unit 40 determines that the liquid accommodation container 100 is in the mounting-completed state, and thus determines "container provided".

In a second case where the voltage output from the data terminal 210 of the liquid accommodation container 100 has a low level at each of the first timing t1 to the third timing t3, the determination unit 411 of the main control unit 40 determines that the liquid accommodation container 100 is in the non-mounting-completed state, and thus determines "no container".

In a third case where the voltage output from the data terminal 210 of the liquid accommodation container 100 has a high level at the first timing t1, a low level at the second timing t2, and a high level at the third timing t3, the determination unit 411 of the main control unit 40 determines that the data terminal 210 and the clock terminal 220 are in the short-circuited state, and thus determines "short circuit occurring". When the data terminal 210 and the clock terminal 220 have a short circuit, the voltage of the data terminal 210 becomes substantially equal to the voltage of the clock terminal 220. Similar to the clock signal SCK in FIG. 11B, the voltage output from the data terminal 210 of the liquid accommodation container 100 has a high level at the first timing t1, a low level at the second timing t2, and a high level at the third timing t3. As described above, when the data terminal 210 and the clock terminal 220 have a short circuit among the data terminal 210, the power source terminal 230, the reset terminal 240, and the clock terminal 220, the voltage output, at the first timing t1 to the third timing t3, to the control unit 39 of the printing apparatus 20 from the data terminal 210 coupled to the device 130 is configured as follows. The voltage output from the data terminal 210 is different from the first expected value at the first timing t1, different from the second expected value at the second timing t2, and different from the third expected value at the third timing t3.

In a fourth case where the voltage output from the data terminal 210 of the liquid accommodation container 100 has a high level at each of the first timing t1 to the third timing t3, the determination unit 411 of the main control unit 40 determines at least one of that the data terminal 210 and the power source terminal 230 are in the short-circuited state and that the data terminal 210 and the reset terminal 240 are in the short-circuited state, and thus determines "short circuit occurring". When the data terminal 210 and the power source terminal 230 have a short circuit, or when the data terminal 210 and the reset terminal 240 have a short circuit, the voltage of the data terminal 210 becomes substantially equal to the voltage of the power source terminal 230 or the voltage of the reset terminal 240. As illustrated in FIG. 11B, in the first response period RT1 and the second response period RT2, the power source terminal 230 and the reset terminal 240 are at a high level. Thus, the voltage output from the data terminal 210 of the liquid accommodation container 100 has a high level at each of the first timing t1 to the third timing t3. As described above, in at least one of a case where the data terminal 210 and the power source terminal 230 have a short circuit and a case where the data terminal 210 and the reset terminal 240 have a short circuit, among the data terminal 210, the power source terminal 230, the reset terminal 240, and the clock terminal 220, the voltage output, at the first timing t1 to the third timing t3, to the control unit 39 of the printing apparatus 20 from the data terminal 210 coupled to the device 130 is configured as follows. The voltage output from the data terminal 210 is different from the first expected value at the first timing t1, equal to the second expected value at the second timing t2, and different from the third expected value at the third timing t3.

As described above, the printing apparatus 20 first detects that the data terminal 210 does not have a short circuit with the terminals 220, 230, 240, and 250 other than the data terminal 210, at the first timing t1. In this state, the printing apparatus 20 detects that the liquid accommodation container 100 is mounted in the printing apparatus 20, at the second timing t2. Further, the printing apparatus 20 checks again that the data terminal 210 does not have a short circuit with the terminals 220, 230, 240, and 250 other than the data terminal 210, at the third timing t3. By detecting the voltages output from the data terminal 210 at the first timing t1 to the third timing t3, it is checked that the liquid accommodation container 100 is in the mounting-completed state. As will be described later, a case where a short circuit between the data terminal 210 and the other terminals 220, 230, 240, and 250 occurs within the first response period RT1 and the second response period RT2 is also assumed. By detecting that the data terminal 210 does not have a short circuit with the other terminals 220, 230, 240, and 250, at the first timing t1 before the second timing t2 and at the third timing t3 after the second timing t2, it is checked with high accuracy that the liquid accommodation container 100 is in the mounting-completed state. As described above, the mounting detection mechanism and a short-circuit detection mechanism between the terminals 290, in the liquid accommodation container 100, are recognized as independent components.

When the printing apparatus 20 detects that the data terminal 210 and the clock terminal 220 do not have a short circuit, it is necessary to be able to distinguish the voltage detected by the printing apparatus 20 when the data terminal 210 and the clock terminal 220 have a short circuit, from the voltage detected by the printing apparatus 20 when the data terminal 210 and the clock terminal 220 do not have a short circuit. One cycle of the clock signal SCK has a low level period and a high level period. In a form in which, when the data terminal 210 and the clock terminal 220 do not have a short circuit, the device 130 outputs the voltage equal to the high level to the data terminal 210 in the low level period in the one cycle, the device 130 outputs the voltage equal to the high level even when the data terminal 210 and the clock terminal 220 have a short circuit. As a result, the printing apparatus 20 that detected the output from the data terminal 210 has a difficulty in determining whether or not the data terminal 210 and the clock terminal 220 have a short circuit. Since the device 130 outputs the voltage different from the voltage of the clock signal SCK to the data terminal 210 at the first timing t1 to the third timing t3, the printing apparatus 20 is able to distinguish the voltage detected by the printing apparatus when the data terminal 210 and the clock terminal 220 have a short circuit, from the voltage detected by the printing apparatus when the data terminal 210 and the clock terminal 220 do not have a short circuit. This is similarly applied to a case where the data terminal 210 and the power source terminal 230 have a short circuit and a case where the data terminal 210 and the reset terminal 240 have a short circuit.

Specific examples of the coupling state determination processing will be described with reference to FIGS. 13A to 20B. In a first specific example to a ninth specific example described below, one liquid accommodation container 100A will be described as an example. In a second specific example to the ninth specific example, waveforms illustrated in FIGS. 13A to 20B schematically illustrate an example of the voltage of the terminal 290, which was actually observed. The control unit 39 recognizes the voltage output from the data terminal 210 as either a high level or a low level, based on a predetermined threshold value.

First Specific Example

Figure 13A:
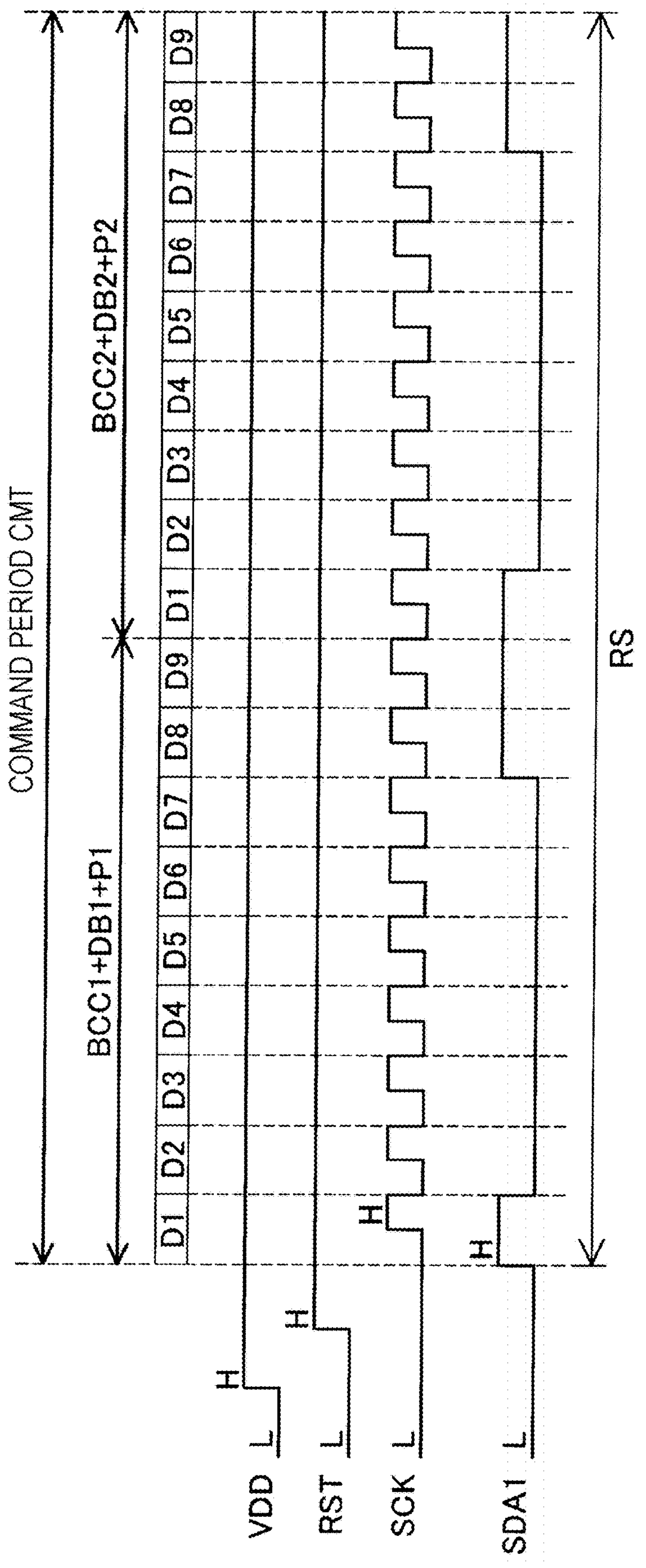
FIG. 13A is a first timing chart illustrating the coupling state determination processing.
Figure 13B:
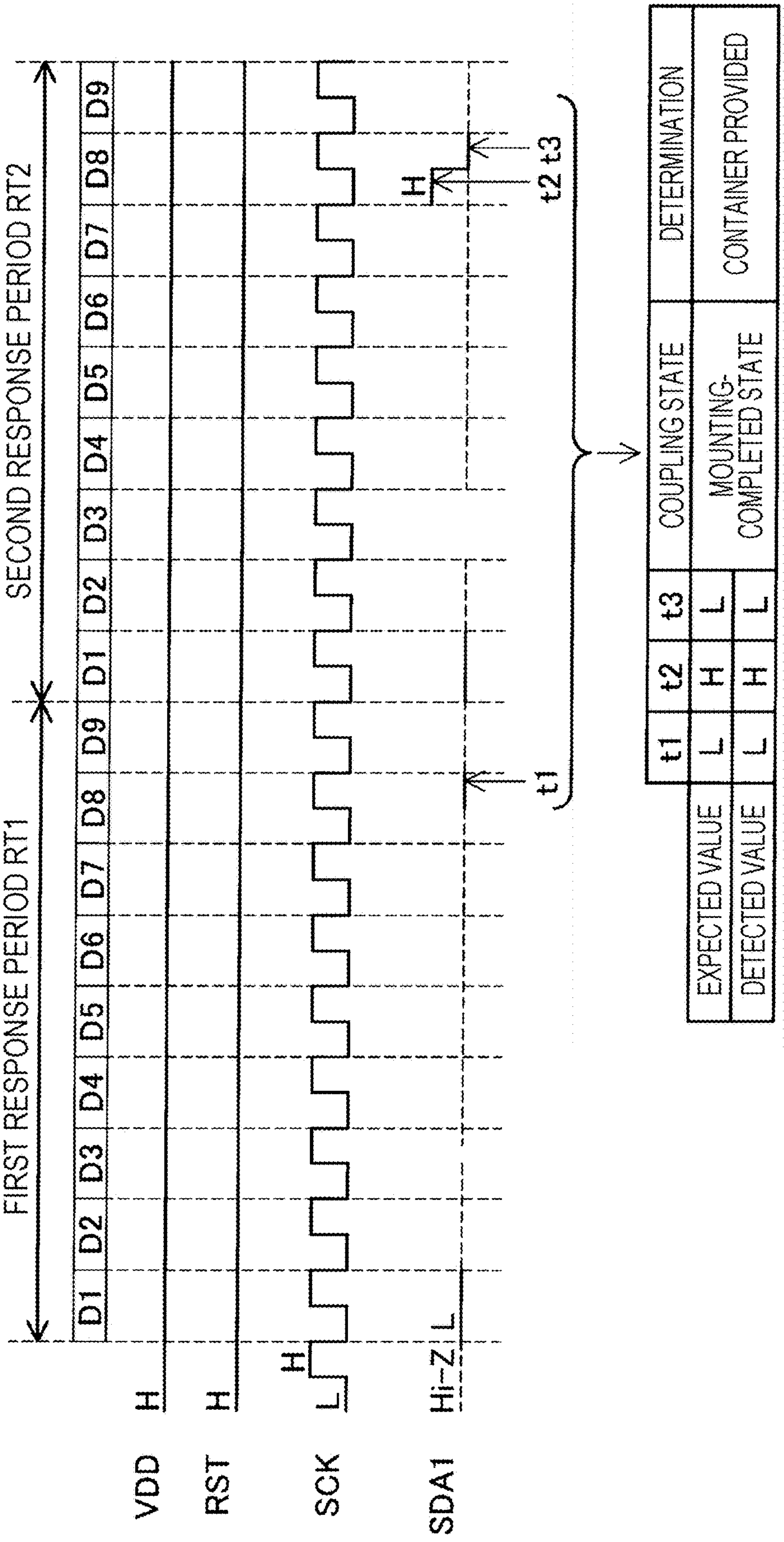
FIG. 13B is a second timing chart illustrating the coupling state determination processing.

In the first specific example, a case where the liquid accommodation container 100A is in the mounting-completed state will be described. FIG. 13A is a first timing chart illustrating the coupling state determination processing. FIG. 13B is a second timing chart illustrating the coupling state determination processing. As illustrated in FIG. 13A, the sub-control unit 50 transmits the request signal RS to the device 130A of the liquid accommodation container 100A in the command period CMT. The request signal RS transmitted to the device 130A has a high level in the bit of the cycle D8 in order to designate the liquid accommodation container 100A as a target. As illustrated in FIG. 13B, in the mounting-completed state, the sub-control unit 50 detects, from the data terminal 210, a low level at the first timing t1 in the cycle D8 in the first response period RT1, a high level at the second timing t2 in the cycle D8 in the second response period RT2, and a low level at the third timing t3 in the cycle D8 in the second response period RT2. In this case, the determination unit 421 of the main control unit 40 determines "container provided" for the liquid accommodation container 100A at the first timing t1 to the third timing t3 because the expected value is equal to the detected value.

Second Specific Example

Figure 14A:
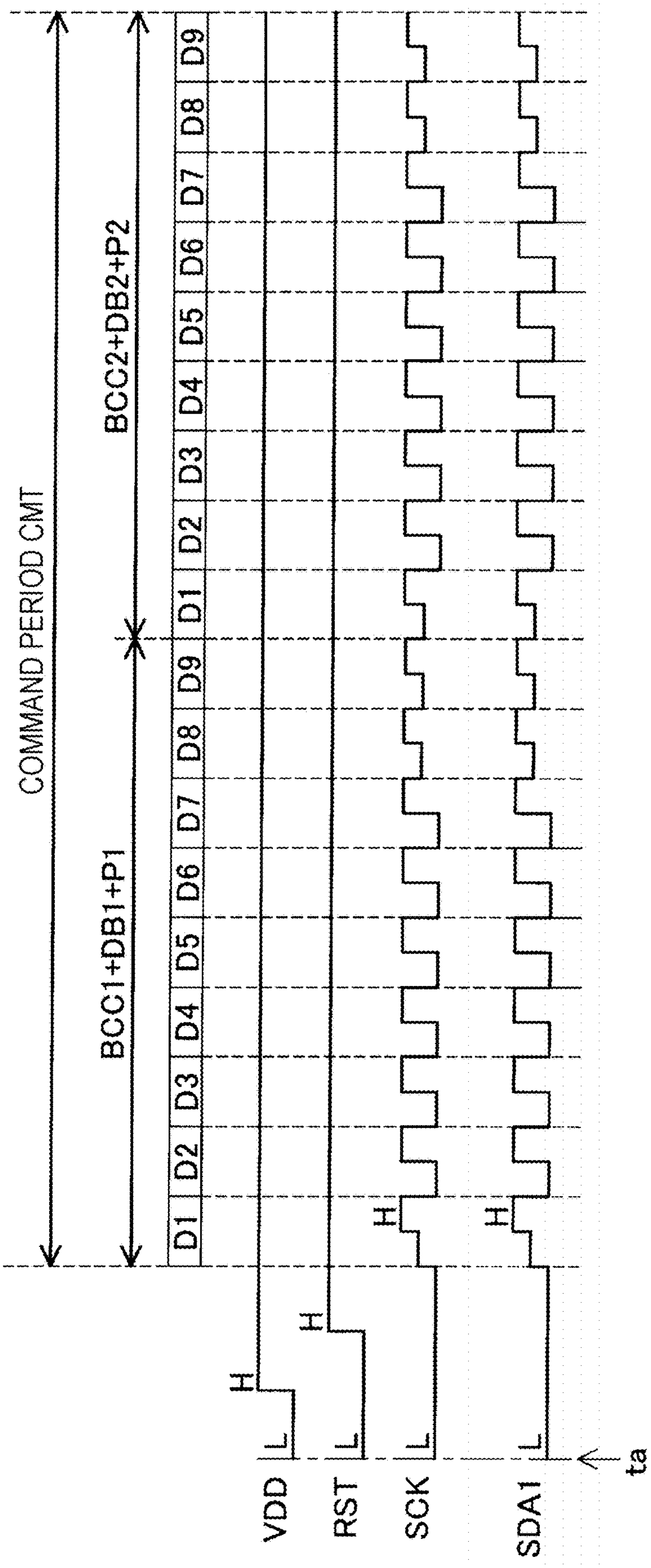
FIG. 14A is a third timing chart illustrating the coupling state determination processing.
Figure 14B:
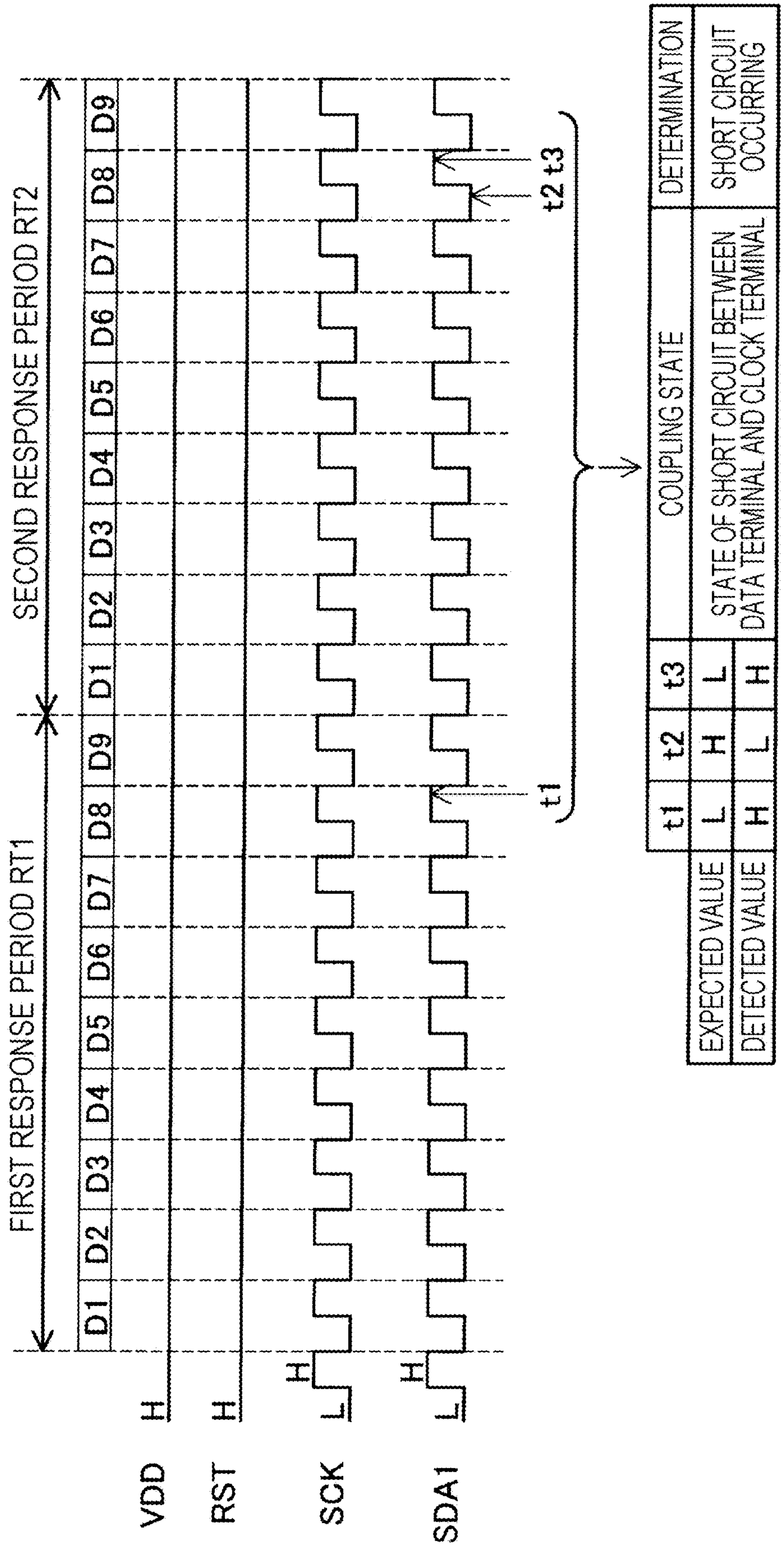
FIG. 14B is a fourth timing chart illustrating the coupling state determination processing.

In a second specific example, the coupling state determination processing when a short circuit between the data terminal 210 and the clock terminal 220 occurs will be described. FIG. 14A is a third timing chart illustrating the coupling state determination processing. FIG. 14B is a fourth timing chart illustrating the coupling state determination processing. In FIG. 14A, it is assumed that a short circuit occurs between the data terminal 210 and the clock terminal 220 of the liquid accommodation container 100A at a timing ta before the command period CMT. As illustrated in FIG. 14B, the change in the voltage output from the data terminal 210 is the same as a case of the signal of the clock terminal 220. The sub-control unit 50 detects, from the data terminal 210, a high level at the first timing t1 of the cycle D8 in the first response period RT1, a low level at the second timing t2 of the cycle D8 in the second response period RT2, and a high level at the third timing t3 of the cycle D8 in the second response period RT2. In this case, the data terminal 210 and the clock terminal 220 are in the short-circuited state, and thus the determination unit 411 of the main control unit determines "short circuit occurring".

Third Specific Example

Figure 15:
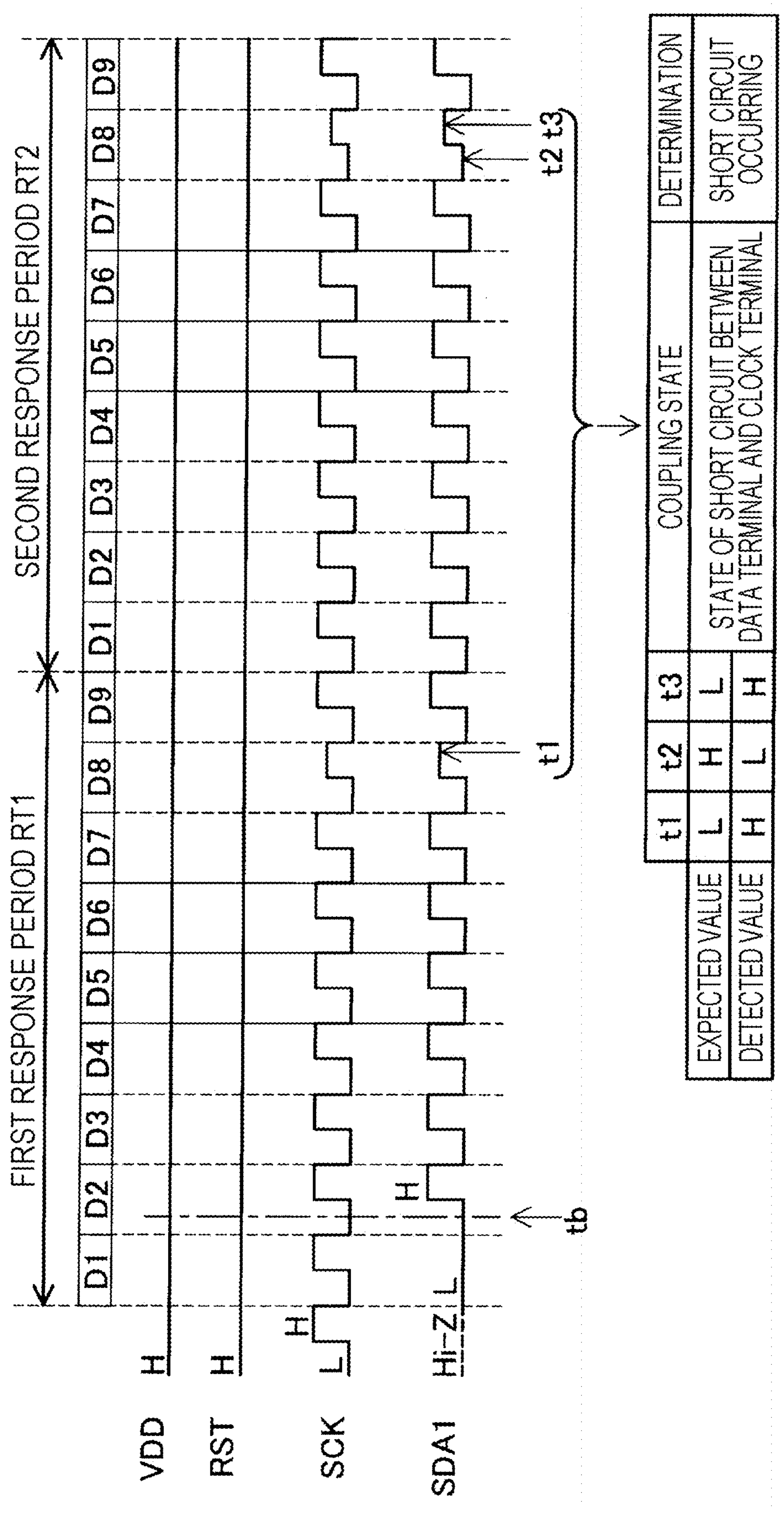
FIG. 15 is a fifth timing chart illustrating the coupling state determination processing.

In a third specific example, the coupling state determination processing when a short circuit between the data terminal 210 and the clock terminal 220 occurs will be described. The third specific example is different from the second specific example in that the device 130 receives the request signal RS, and then a short circuit occurs between the data terminal 210 and the clock terminal 220. FIG. 15 is a fifth timing chart illustrating the coupling state determination processing. It is assumed that a short circuit occurs between the data terminal 210 and the clock terminal 220 of the liquid accommodation container 100A at a timing tb of the first response period RT1. In this case, the signal output from the data terminal 210 is the same as the signal of the clock terminal 220. Thus, the sub-control unit 50 detects, from the data terminal 210, a high level at the first timing t1 of the cycle D8 in the first response period RT1, a low level at the second timing t2 of the cycle D8 in the second response period RT2, and a high level at the third timing t3 of the cycle D8 in the second response period RT2. In this case, regarding the liquid accommodation container 100A, the data terminal 210 and the clock terminal 220 are in the short-circuited state, and thus the determination unit 411 of the main control unit 40 determines "short circuit occurring".

Fourth Specific Example

Figure 16A:
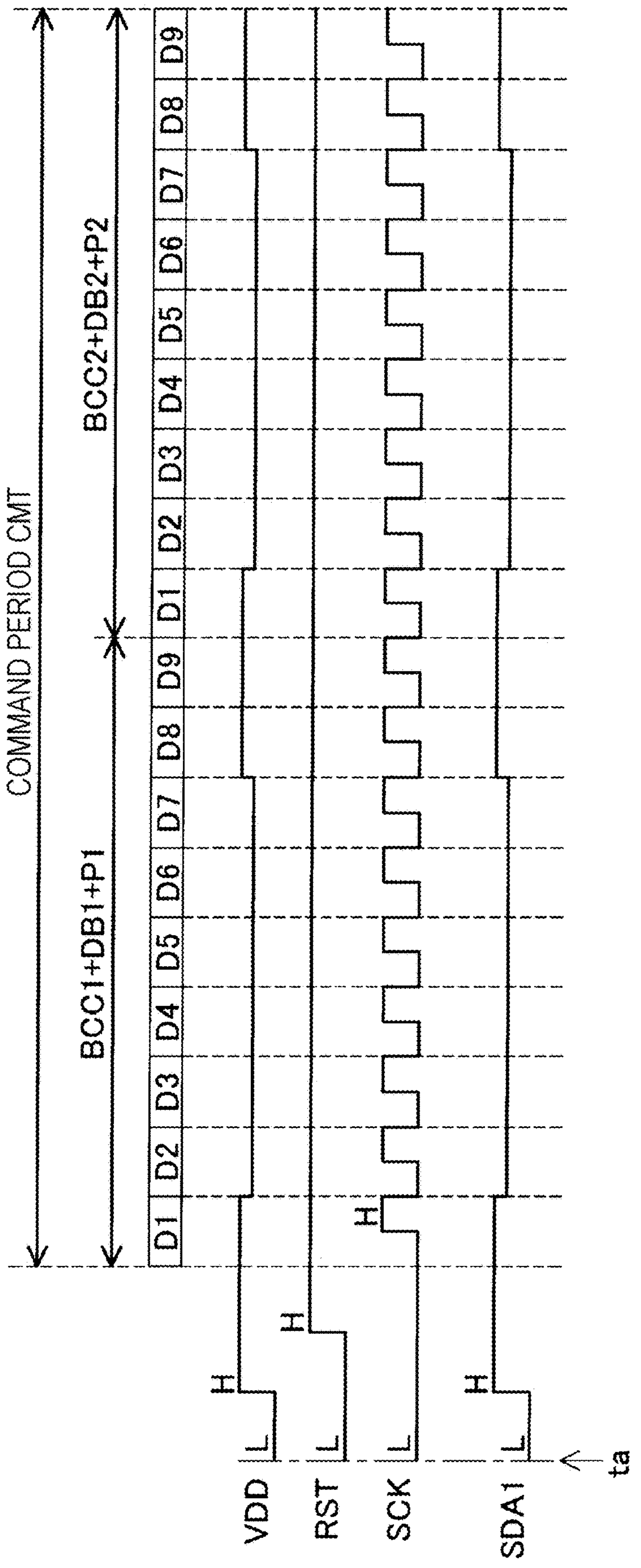
FIG. 16A is a sixth timing chart illustrating the coupling state determination processing.
Figure 16B:
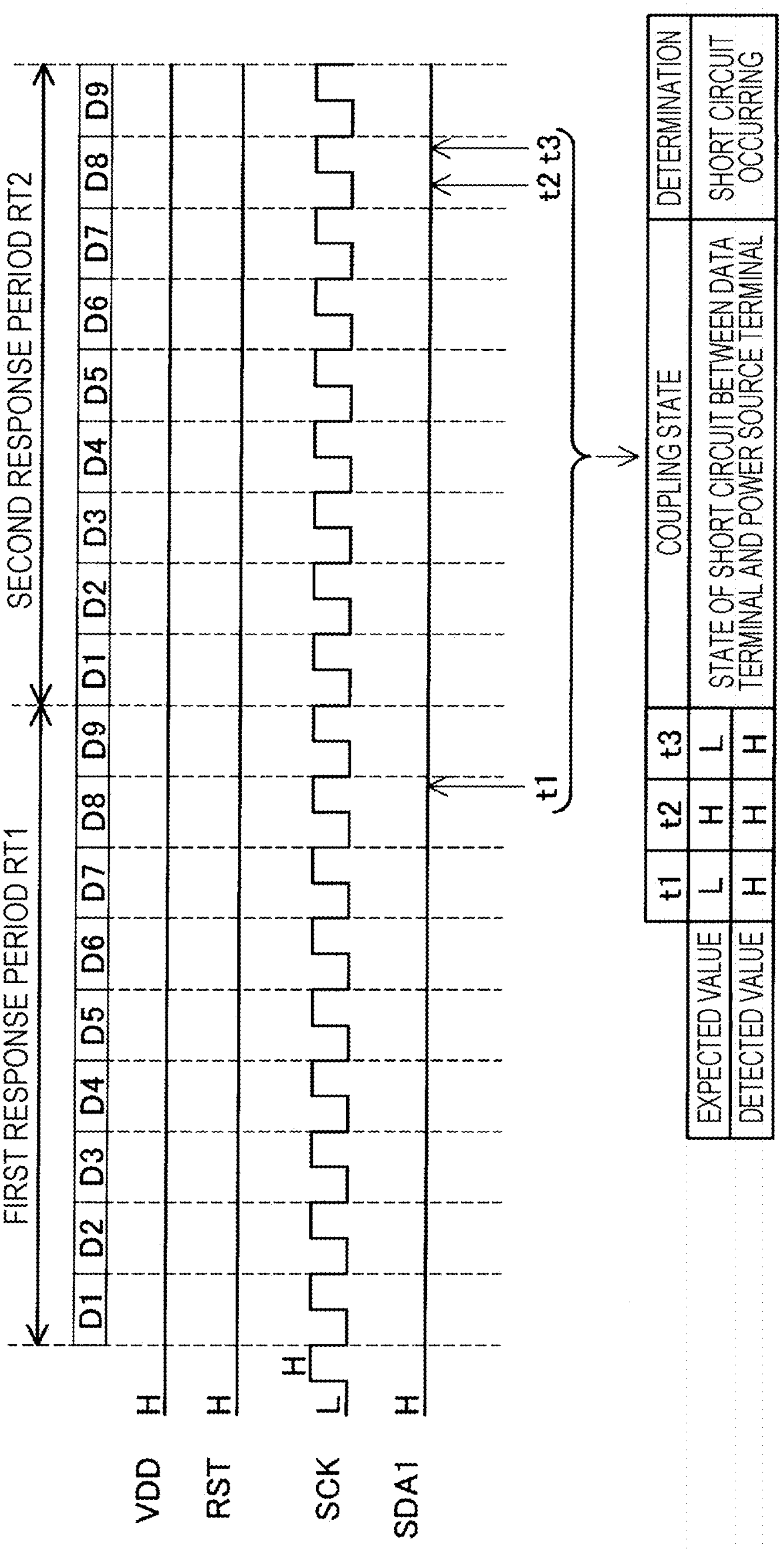
FIG. 16B is a seventh timing chart illustrating the coupling state determination processing.

In a fourth specific example, the coupling state determination processing when a short circuit between the data terminal 210 and the power source terminal 230 occurs will be described. FIG. 16A is a sixth timing chart illustrating the coupling state determination processing. FIG. 16B is a seventh timing chart illustrating the coupling state determination processing. In FIGS. 16A and 16B, it is assumed that a short circuit occurs between the data terminal 210 and the power source terminal 230 of the liquid accommodation container 100A at the timing ta before the command period CMT. As illustrated in FIG. 16B, the change in the voltage output from the data terminal 210 is the same as a case of the signal of the power source terminal 230. The sub-control unit 50 detects, from the data terminal 210, a high level at the first timing t1 of the cycle D8 in the first response period RT1, a high level at the second timing t2 of the cycle D8 in the second response period RT2, and a high level at the third timing t3 of the cycle D8 in the second response period RT2.

In this case, regarding the liquid accommodation container 100A, the data terminal 210 and the power source terminal 230 are in the short-circuited state, and thus the determination unit 411 of the main control unit 40 determines "short circuit occurring".

Fifth Specific Example

Figure 17:
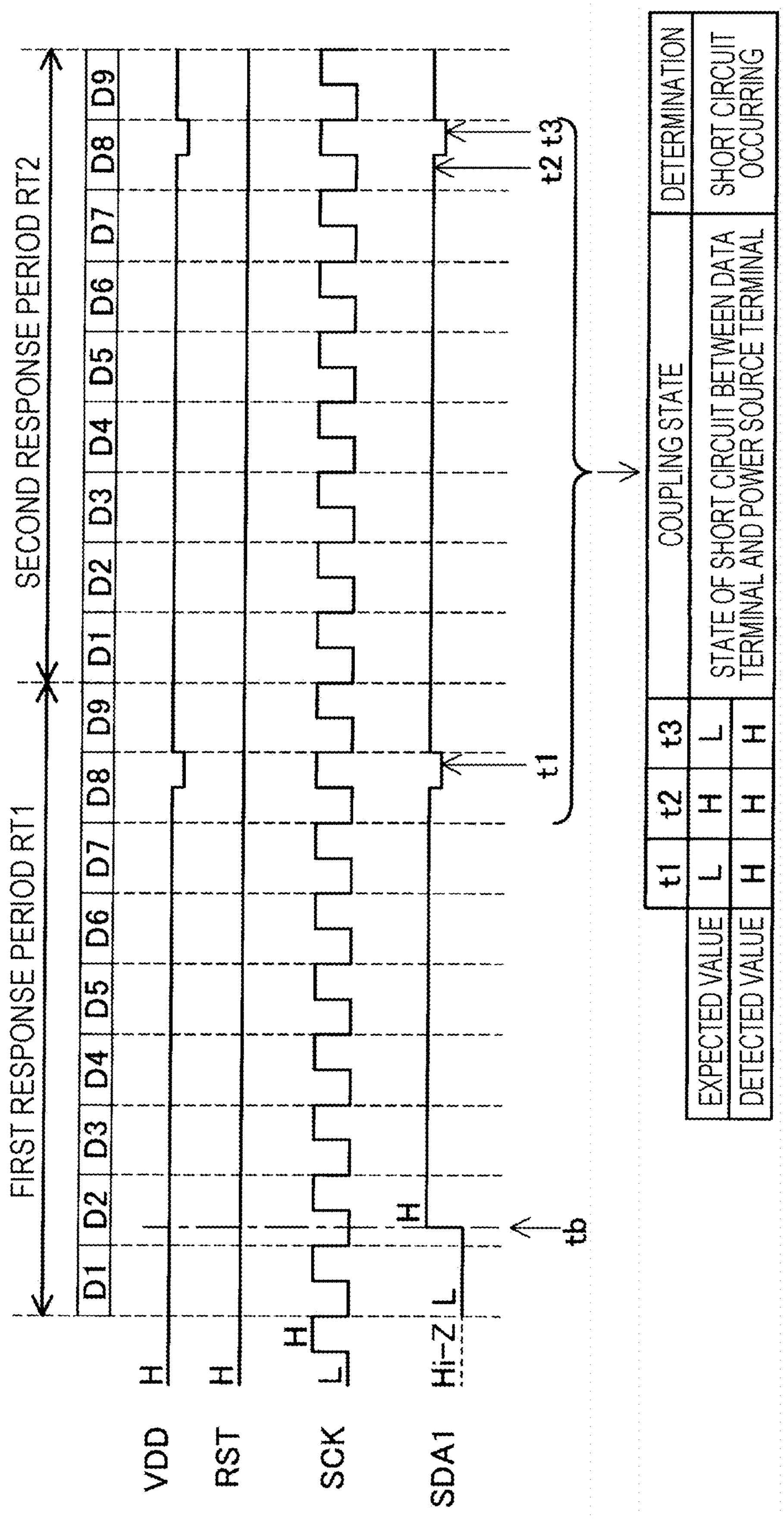
FIG. 17 is an eighth timing chart illustrating the coupling state determination processing.

In a fifth specific example, the coupling state determination processing when a short circuit between the data terminal 210 and the power source terminal 230 occurs will be described. The fifth specific example is different from the fourth specific example in that the device 130 receives the request signal RS, and then a short circuit occurs between the data terminal 210 and the power source terminal 230. FIG. 17 is an eighth timing chart illustrating the coupling state determination processing. It is assumed that a short circuit occurs between the data terminal 210 and the power source terminal 230 of the liquid accommodation container 100A at the timing tb of the first response period RT1. In this case, the signal output from the data terminal 210 is the same as the signal of the power source terminal 230. Thus, the sub-control unit 50 detects, from the data terminal 210, a high level at the first timing t1 of the cycle D8 in the first response period RT1, a high level at the second timing t2 of the cycle D8 in the second response period RT2, and a high level at the third timing t3 of the cycle D8 in the second response period RT2. In this case, regarding the liquid accommodation container 100A, the data terminal 210 and the power source terminal 230 are in the short-circuited state, and thus the determination unit 411 of the main control unit 40 determines "short circuit occurring".

Sixth Specific Example

Figure 18A:
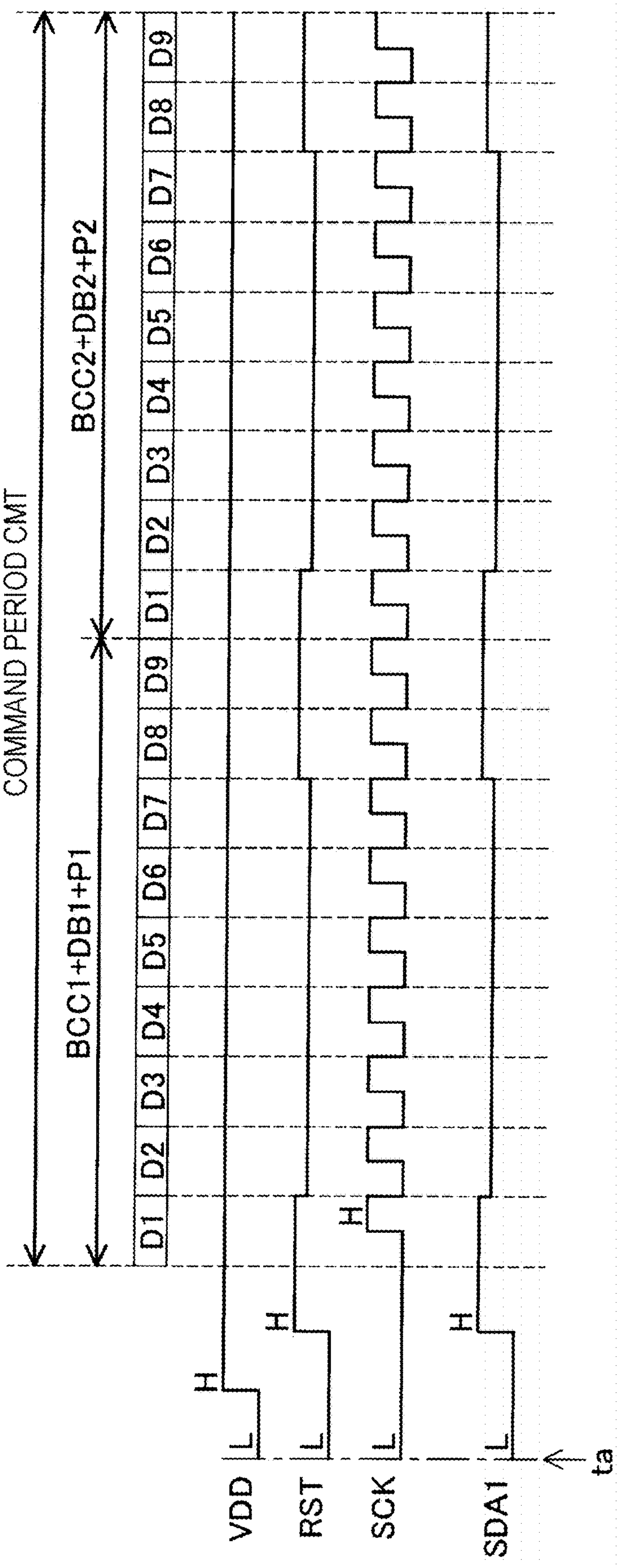
FIG. 18A is a ninth timing chart illustrating the coupling state determination processing.
Figure 18B:
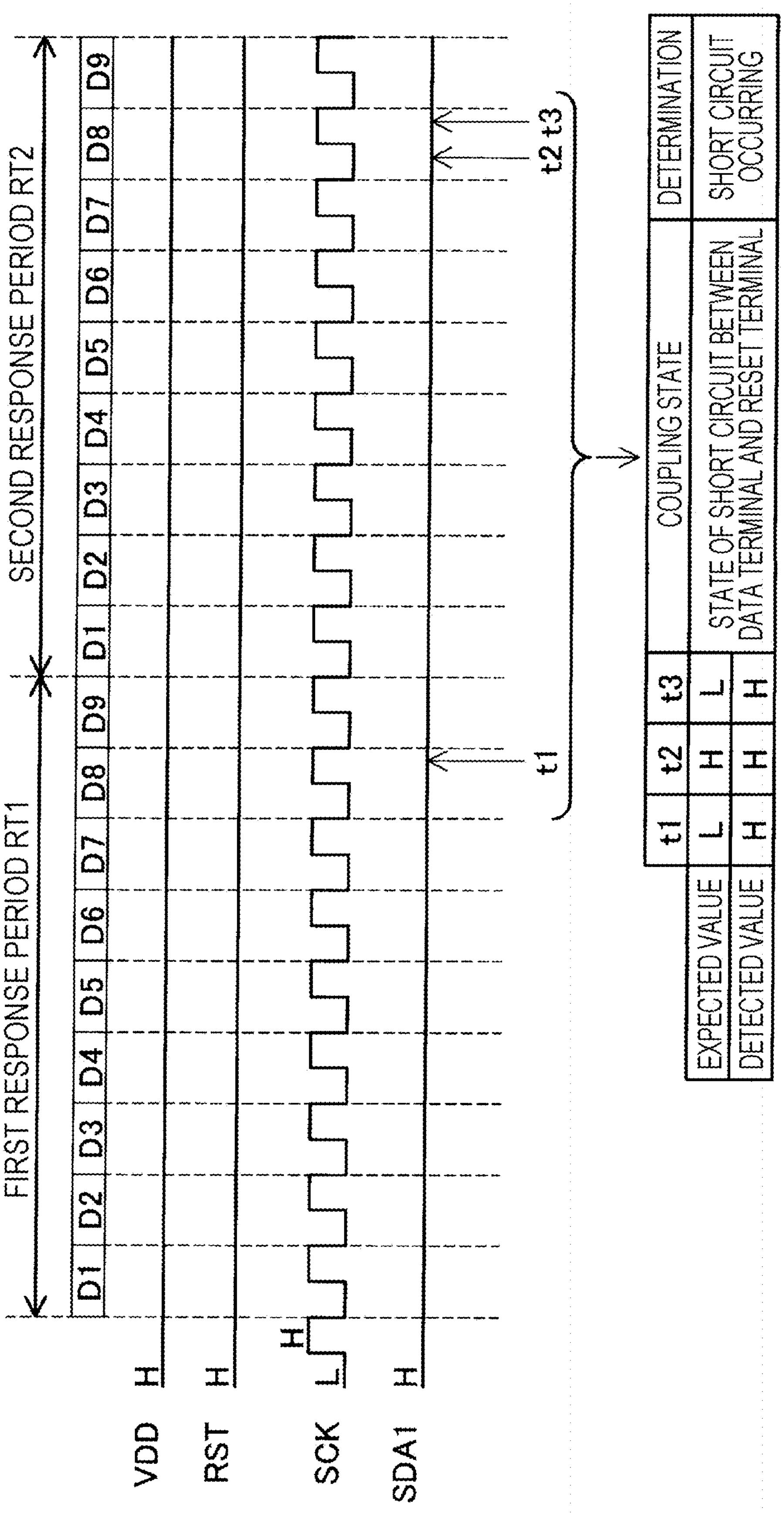
FIG. 18B is a tenth timing chart illustrating the coupling state determination processing.

In a sixth specific example, the coupling state determination processing when a short circuit between the data terminal 210 and the reset terminal 240 occurs will be described. FIG. 18A is a ninth timing chart illustrating the coupling state determination processing. FIG. 18B is a tenth timing chart illustrating the coupling state determination processing. In FIGS. 18A and 18B, it is assumed that a short circuit occurs between the data terminal 210 and the reset terminal 240 of the liquid accommodation container 100A at the timing ta before the command period CMT. As illustrated in FIG. 18B, the change in the voltage output from the data terminal 210 is the same as a case of the signal of the reset terminal 240. Thus, the sub-control unit 50 detects, from the data terminal 210, a high level at the first timing t1 of the cycle D8 in the first response period, a high level at the second timing t2 of the cycle D8 in the second response period, and a high level at the third timing t3 of the cycle D8 in the second response period. In this case, regarding the liquid accommodation container 100A, the data terminal 210 and the reset terminal 240 are in the short-circuited state, and thus the determination unit 411 of the main control unit 40 determines "short circuit occurring".

Seventh Specific Example

Figure 19:
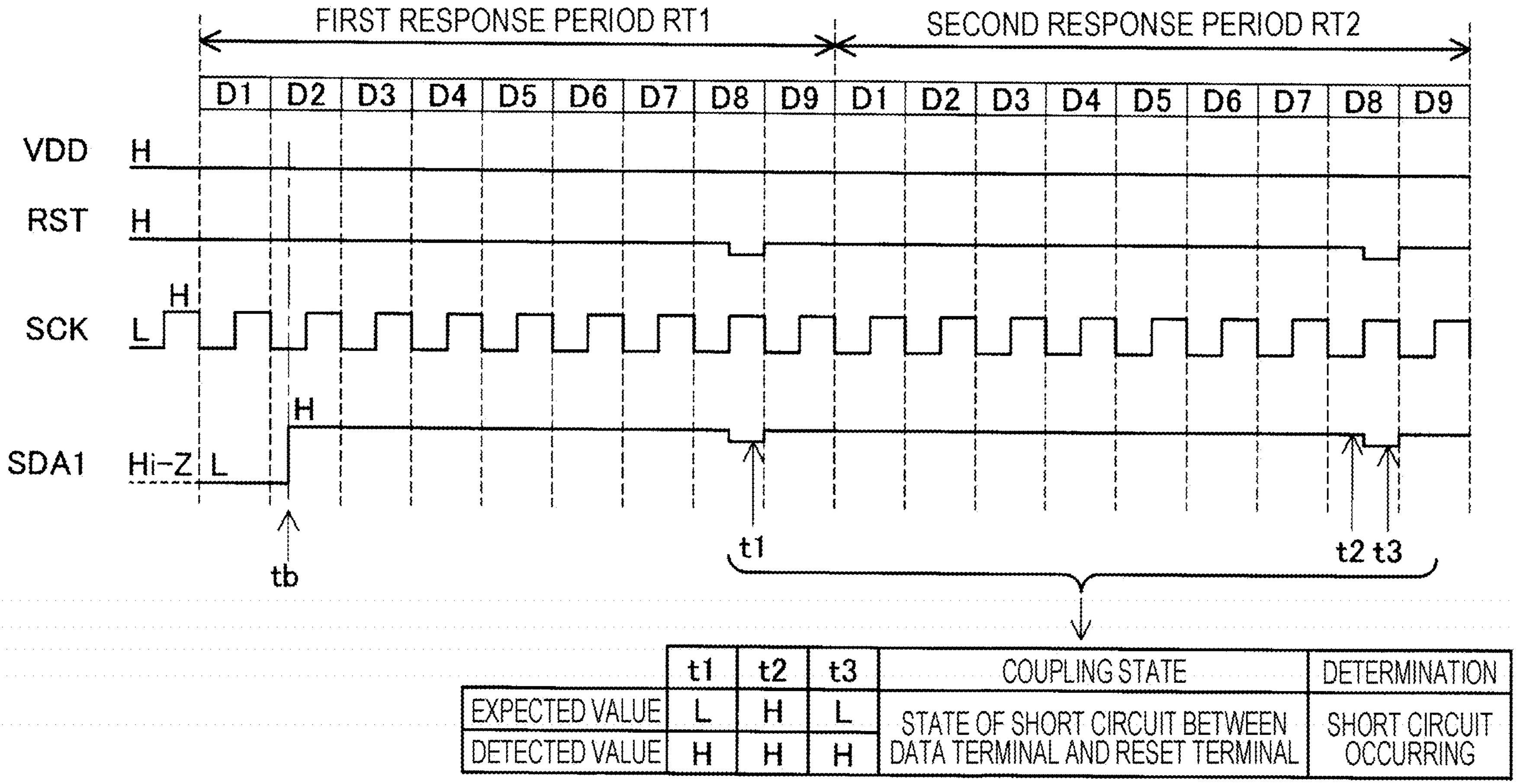
FIG. 19 is an eleventh timing chart illustrating the coupling state determination processing.

In a seventh specific example, the coupling state determination processing when a short circuit between the data terminal 210 and the reset terminal 240 occurs will be described. The seventh specific example is different from the sixth specific example in that the device 130 receives the request signal RS, and then a short circuit occurs between the data terminal 210 and the reset terminal 240. FIG. 19 is an eleventh timing chart illustrating the coupling state determination processing. It is assumed that a short circuit occurs between the data terminal 210 and the reset terminal 240 of the liquid accommodation container 100A at the timing tb of the first response period RT1. In this case, the signal output from the data terminal 210 is the same as the signal of the reset terminal 240. Thus, the sub-control unit 50 detects, from the data terminal 210, a high level at the first timing t1 of the cycle D8 in the first response period, a high level at the second timing t2 of the cycle D8 in the second response period, and a high level at the third timing t3 of the cycle D8 in the second response period. In this case, regarding the liquid accommodation container 100A, the data terminal 210 and the reset terminal 240 are in the short-circuited state, and thus the determination unit 411 of the main control unit 40 determines "short circuit occurring".

Eighth Specific Example

Figure 20A:
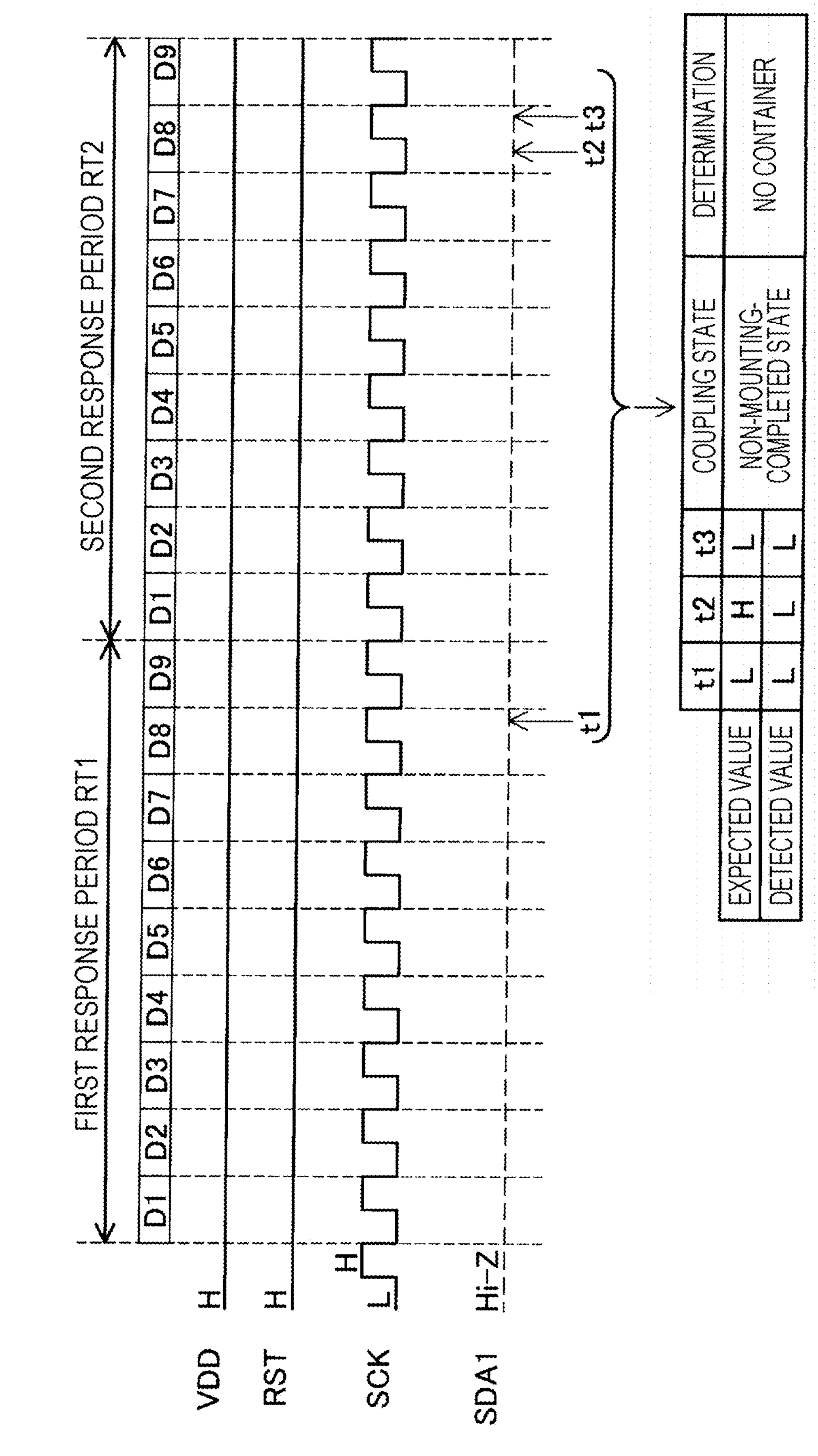
FIG. 20A is a twelfth timing chart illustrating the coupling state determination processing.

In an eighth specific example, a case where the liquid accommodation container 100A is in the non-mounting-completed state will be described. More specifically, in the eighth specific example, a case where the liquid accommodation container 100A is removed from the accommodation section 4 before the device 130A receives the request signal RS will be described. FIG. 20A is a twelfth timing chart illustrating the coupling state determination processing. When the liquid accommodation container 100A is not mounted on the accommodation section 4, the drive state of the host terminal HSDA1 of the sub-control unit 50 becomes a low level due to the coupled pull-down resistor. Thus, the sub-control unit 50 detects a low level at the first timing t1 of the cycle D8 in the first response period RT1, a low level at the second timing t2 of the cycle D8 in the second response period RT2, and a low level at the third timing t3 of the cycle D8 in the second response period RT2. In this case, the liquid accommodation container 100A is in the non-mounting-completed state, and thus the determination unit 421 of the main control unit 40 determines "no container".

Ninth Specific Example

Figure 20B:
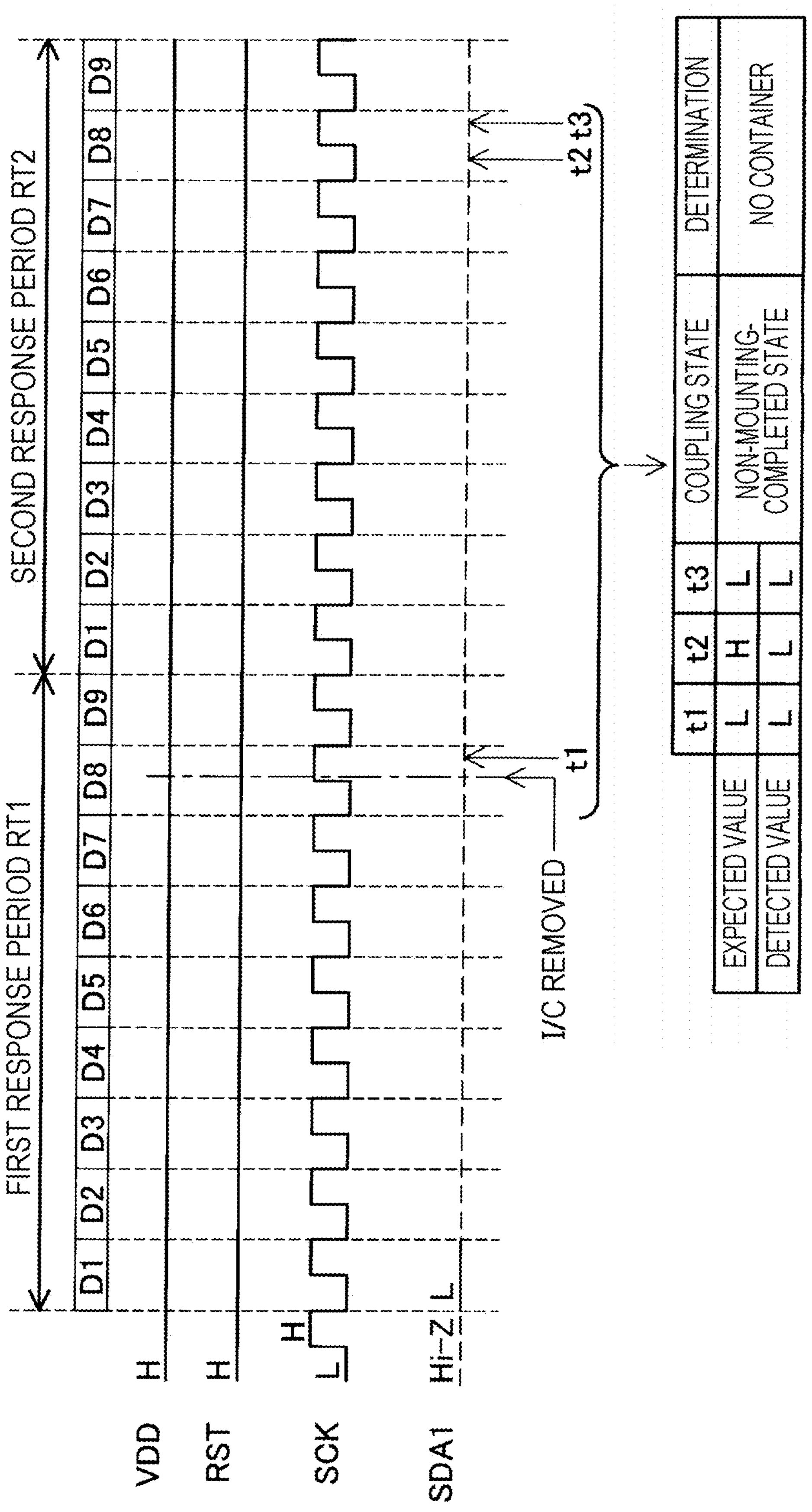
FIG. 20B is a thirteenth timing chart illustrating the coupling state determination processing.

In a ninth specific example, a case where the liquid accommodation container 100A is removed from the accommodation section 4 during the first response period RT1 will be described. FIG. 20B is a thirteenth timing chart illustrating the coupling state determination processing. The sub-control unit 50 detects a low level at the first timing t1 of the cycle D8 in the first response period RT1, a low level at the second timing t2 of the cycle D8 in the second response period RT2, and a low level at the third timing t3 of the cycle D8 in the second response period RT2. In this case, the liquid accommodation container 100A is in the non-mounting-completed state, and thus the determination unit 421 of the main control unit 40 determines "no container".

Other Specific Examples

In other specific examples, various coupling states and determination results by the determination unit 421 for the respective coupling states will be described. FIG. 20C is a diagram illustrating another specific example of the coupling state determination processing. In the coupling state determination processing, when at least one of the detected values at the first timing t1 and the third timing t3 is different from the expected value, the determination unit 411 of the main control unit 40 determines "short circuit occurring".

A case of No. 1 refers to a case where the data terminal 210 and the clock terminal 220 have a short circuit at a timing t before the first timing t1. In this case, the board 120 outputs, from the data terminal 210 to the printing apparatus 20, a high level voltage different from the first expected value at the first timing t1, a low level voltage different from the second expected value at the second timing t2, and a high level voltage different from the third expected value at the third timing t3. In this case, the determination unit 411 determines "short circuit occurring".

A case of No. 2 refers to a case where the data terminal 210 and the clock terminal 220 have a short circuit at a timing t before the second timing t2 after the first timing t1. In this case, the board 120 outputs, from the data terminal 210 to the printing apparatus 20, a low level voltage equal to the first expected value at the first timing t1, a low level voltage different from the second expected value at the second timing t2, and a high level voltage different from the third expected value at the third timing t3. In this case, the determination unit 411 determines "short circuit occurring".

A case of No. 3 refers to a case where the data terminal 210 and the clock terminal 220 have a short circuit at a timing t before the third timing t3 after the second timing t2. In this case, the board 120 outputs, from the data terminal 210 to the printing apparatus 20, a low level voltage equal to the first expected value at the first timing t1, a high level voltage equal to the second expected value at the second timing t2, and a high level voltage different from the third expected value at the third timing t3. In this case, the determination unit 411 determines "short circuit occurring".

A case of No. 4 refers to a case where a short circuit between the data terminal 210 and the clock terminal 220 is eliminated at a timing t before the second timing t2 after the first timing t1. In this case, the board 120 outputs, from the data terminal 210 to the printing apparatus 20, a high level voltage different from the first expected value at the first timing t1, a high level voltage equal to the second expected value at the second timing t2, and a low level voltage equal to the third expected value at the third timing t3. In this case, the determination unit 411 determines "short circuit occurring".

A case of No. 5 refers to a case where a short circuit between the data terminal 210 and the clock terminal 220 is eliminated at a timing t before the third timing t3 after the second timing t2. In this case, the board 120 outputs, from the data terminal 210 to the printing apparatus 20, a high level voltage different from the first expected value at the first timing t1, a low level voltage different from the second expected value at the second timing t2, and a low level voltage equal to the third expected value at the third timing t3. In this case, the determination unit 411 determines "short circuit occurring".

A case of No. 6 refers to at least one of a case where the data terminal 210 and the power source terminal 230 have a short circuit at a timing t before the first timing t1 and a case where the data terminal 210 and the reset terminal 240 have a short circuit at a timing t before the first timing t1. In this case, the board 120 outputs, from the data terminal 210 to the printing apparatus 20, a high level voltage different from the first expected value at the first timing t1, a high level voltage equal to the second expected value at the second timing t2, and a high level voltage different from the third expected value at the third timing t3. In this case, the determination unit 411 determines "short circuit occurring".

A case of No. 7 refers to at least one of a case where the data terminal 210 and the power source terminal 230 have a short circuit at a timing t before the second timing t2 after the first timing t1 and a case where the data terminal 210 and the reset terminal 240 have a short circuit at a timing t before the second timing t2 after the first timing t1. In this case, the board 120 outputs, from the data terminal 210 to the printing apparatus 20, a low level voltage equal to the first expected value at the first timing t1, a high level voltage equal to the second expected value at the second timing t2, and a high level voltage different from the third expected value at the third timing t3. In this case, the determination unit 411 determines "short circuit occurring".

A case of No. 8 refers to at least one of a case where the data terminal 210 and the power source terminal 230 have a short circuit at a timing t before the third timing t3 after the second timing t2 and a case where the data terminal 210 and the reset terminal 240 have a short circuit at a timing t before the third timing t3 after the second timing t2. In this case, the board 120 outputs, from the data terminal 210 to the printing apparatus 20, a low level voltage equal to the first expected value at the first timing t1, a high level voltage equal to the second expected value at the second timing t2, and a high level voltage different from the third expected value at the third timing t3. In this case, the determination unit 411 determines "short circuit occurring".

A case of No. 9 refers to a case where a short circuit between the data terminal 210 and the power source terminal 230 is eliminated, and a short circuit between the data terminal 210 and the reset terminal 240 is eliminated, at a timing t before the second timing t2 after the first timing t1. In this case, the board 120 outputs, from the data terminal 210 to the printing apparatus 20, a high level voltage different from the first expected value at the first timing t1, a high level voltage equal to the second expected value at the second timing t2, and a low level voltage equal to the third expected value at the third timing t3. In this case, the determination unit 411 determines "short circuit occurring".

A case of No. 10 refers to a case where a short circuit between the data terminal 210 and the power source terminal 230 is eliminated, and a short circuit between the data terminal 210 and the reset terminal 240 is eliminated, at a timing t before the third timing t3 after the second timing t2. In this case, the board 120 outputs, from the data terminal 210 to the printing apparatus 20, a high level voltage different from the first expected value at the first timing t1, a high level voltage equal to the second expected value at the second timing t2, and a low level voltage equal to the third expected value at the third timing t3. In this case, the determination unit 411 determines "short circuit occurring".

A3-4. Other Software Configuration:

In the first embodiment, when the device 130 receives the request signal RS and the printing apparatus 20 receives a second printing instruction during printing based on a first printing instruction, the device 130 may output the first response signal FS and the second response signal SS to the data terminal 210 before printing is started based on the second printing instruction after printing based on the first printing instruction is ended. When the device 130 receives the request signal RS and the printing apparatus receives a cleaning instruction of the printing head 5, the device 130 may output the first response signal FS and the second response signal SS to the data terminal 210 before the cleaning is performed. When the device 130 receives the request signal RS, and the carriage 30 is at a replacement position at which replacement of the liquid accommodation container 100 is possible, the device 130 may output the first response signal FS and the second response signal SS to the data terminal 210. Further, when the device 130 receives the request signal RS, and the carriage 30 moves from the replacement position to a standby position at which the replacement of the liquid accommodation container 100 is not possible, the device 130 may output the first response signal FS and the second response signal SS to the data terminal 210. The replacement position is, for example, the position of the carriage 30 at the home position.

The first response signal FS may also be referred to as a first signal. The second response signal SS may also be referred to as a second signal. The first low response voltage may also be referred to as a first low voltage. The first high response voltage may also be referred to as a first high voltage. The second low response voltage may also be referred to as a second low voltage. The second high response voltage may also be referred to as a second high voltage. The low clock voltage may also be referred to as a low voltage. The high clock voltage may also be referred to as a high voltage. The low reset voltage may also be referred to as a low voltage. The high reset voltage may also be referred to as a high voltage.

A4. Other Embodiments of First Embodiment

A4-1. Embodiment 1 of Board:

FIG. 21A is a diagram illustrating a board as Embodiment 1. FIG. 21A illustrates an example of a combination of arrangements of a plurality of contact portions cp. The arrangement of the data contact portion cpd, the clock contact portion cpc, the power-source contact portion cpvd, the reset contact portion cpr, and the ground contact portion cpvs is not limited to the first embodiment, and another arrangement may be used as illustrated in the combinations No. 1 to No. 24 in FIG. 21A. The combinations No. 1 to No. 24 include an arrangement in which the clock contact portion cpc, the data contact portion cpd, the power-source contact portion cpvd, and the reset contact portion cpr are arranged in the first region Rg1, and the ground contact portion cpvs is arranged in the second region Rg2. The table in FIG. 21A shows the order of the contact portions cp on the board 120 in a +X direction, i.e., corresponding to the order of the projection positions on the second virtual line C2 in the +X direction.

In the combinations No. 1 to No. 18 of the arrangements of the contact portions cp, at least one contact portion cp among the clock contact portion cpc, the power-source contact portion cpvd, and the reset contact portion cpr is arranged to be projected between the projection position swd of the data contact portion cpd and the projection position swvs of the ground contact portion cpvs. In the combinations No. 1 to No. 12 of the arrangements of the contact portions cp, any two or more contact portions cp among the clock contact portion cpc, the power-source contact portion cpvd, and the reset contact portion cpr are arranged to be projected between the projection position swd of the data contact portion cpd and the projection position swvs of the ground contact portion cpvs. In the combinations No. 1 to No. 6 and No. 13 to No. 18 of the arrangements of the contact portions cp, the data contact portion cpd is arranged to be projected between the projection positions of any two contact portions cp among the power-source contact portion cpvd, the reset contact portion cpr, and the clock contact portion cpc. In the combinations Nos. 1, 3, 8, 11, 14, 15, 20, and 23 of the arrangements of the contact portions cp, either or both of the data contact portion cpd and the reset contact portion cpr are arranged to be projected between the projection positions of the power-source contact portion cpvd and the clock contact portion cpc. And the reset contact portion cpr is arranged so that the projection position swr is next to the projection position swvd of the power-source contact portion cpvd. Here also, the phrase "next to the projection position" does not necessarily mean that one contact portion and the other contact portion are closest to each other among all contact portions on the board 120, and is instead used to refer to the closest contact portion among the other aforementioned contact portions cpc, cpd, cpvd, and/or cpr. In the combinations Nos. 1, 2, 6 to 8, 13, 14, 16, 23, and 24 of the arrangements of the contact portions cp, the power-source contact portion cpvd is arranged so that the projection position swvd is next to the projection position swd of the data contact portion cpd. In the combination No. 1 of the arrangements of the contact portions cp, the clock contact portion cpc is arranged to be projected at the farthest position from the projection position swvs of the ground contact portion cpvs. The data contact portion cpd, the power-source contact portion cpvd, and the reset contact portion cpr are arranged to be projected in order in a direction from the projection position swc of the clock contact portion cpc toward the projection position swvs of the ground contact portion cpvs on the second virtual line C2.

Figure 21B:
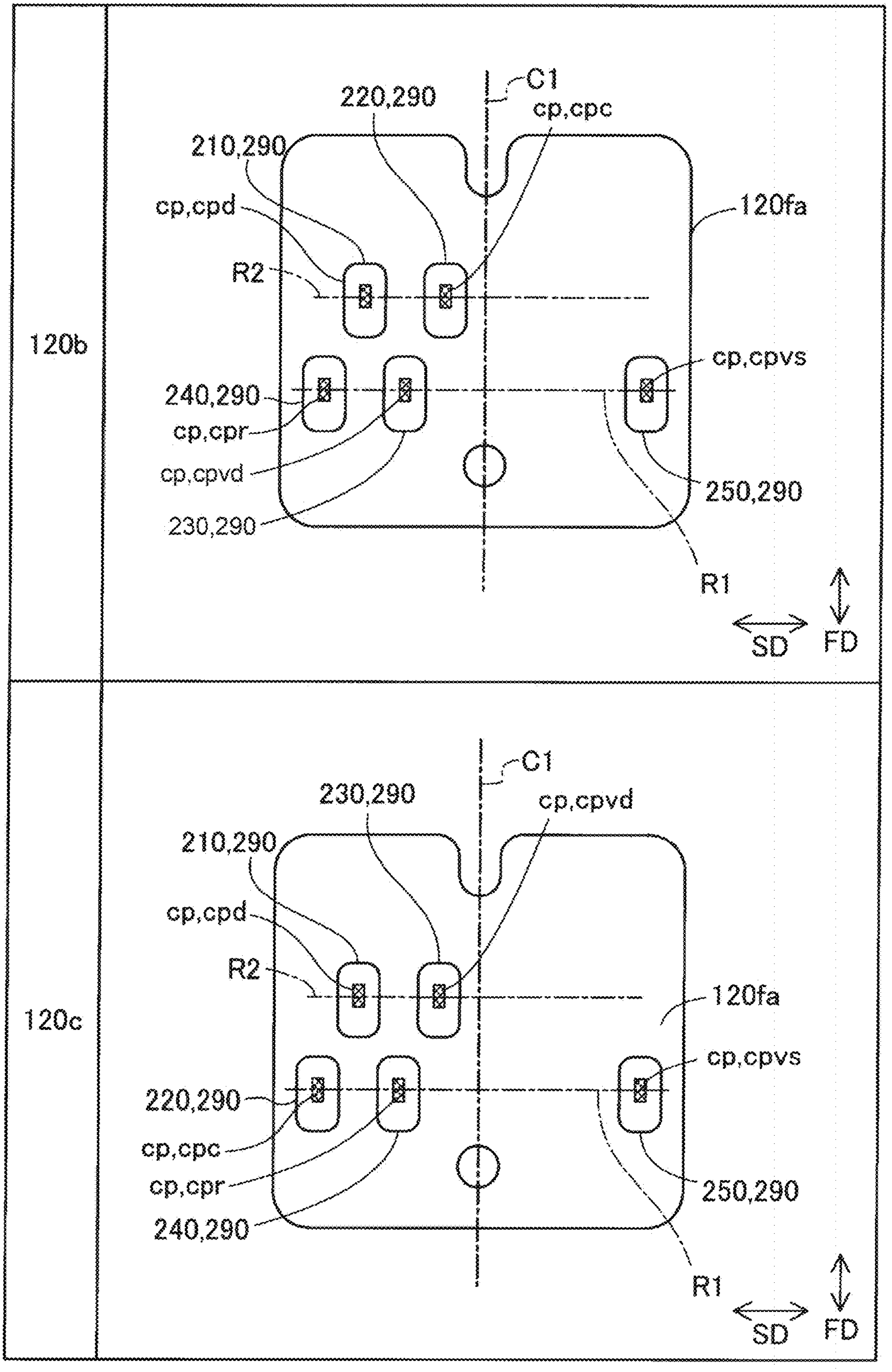
FIG. 21B is a diagram illustrating arrangement examples illustrated in No. 2 and No. 3 in FIG. 21A.

FIG. 21B illustrates arrangement examples indicated by combinations No. 2 and No. 3 in FIG. 21A. A board 120*b* corresponds to the arrangement example indicated by combination No. 2 in FIG. 21A. The board 120*b* is different from the board 120 illustrated in FIG. 5 in that the positional relation between the clock contact portion cpc and the reset contact portion cpr is changed. A board 120*c* corresponds to the arrangement example indicated by combination No. 3 in FIG. 21A. The board 120*c* is different from the board 120 illustrated in FIG. 5 in that the positional relation between the power-source contact portion cpvd and the reset contact portion cpr is changed.

The combination of arrangements of the contact portions cp illustrated in FIG. 21A may be similarly applied to the combination of arrangements of the data terminal 210, the clock terminal 220, the power source terminal 230, the reset terminal 240, and the ground terminal 250. The combination of the arrangements of the contact portions cp illustrated in FIG. 21A may also be applied to the combination of arrangements of the apparatus-side terminals 490.

In the first embodiment and FIGS. 21A and 21B, the ground contact portion cpvs is arranged in the second region Rg2, but the contact portions other than the ground contact portion cpvs may be arranged in the second region Rg2. For example, in some embodiments, the data contact portion cpd, the power-source contact portion cpvd, the reset contact portion cpr, and the ground contact portion cpvs may be arranged in the first region Rg1, and the clock contact portion cpc may be arranged in the second region Rg2. In other embodiments, the data contact portion cpd, the clock contact portion cpc, the power-source contact portion cpvd, and the ground contact portion cpvs may be arranged in the first region Rg1, and the reset contact portion cpr may be arranged in the second region Rg2. In other embodiments, the data contact portion cpd, the clock contact portion cpc, the reset contact portion cpr, and the ground contact portion cpvs may be arranged in the first region Rg1, and the power-source contact portion cpvd may be arranged in the second region Rg2. In other embodiments, the clock contact portion cpc, the power-source contact portion cpvd, the reset contact portion cpr, and the ground contact portion cpvs may be arranged in the first region Rg1, and the data contact portion cpd may be arranged in the second region Rg2. Also in the above forms, the arrangement relation between the contact portion cp arranged in the first region Rg1 and the contact portion cp arranged in the second region Rg2 is similar to the arrangement relation in the first embodiment.

Figure 22:
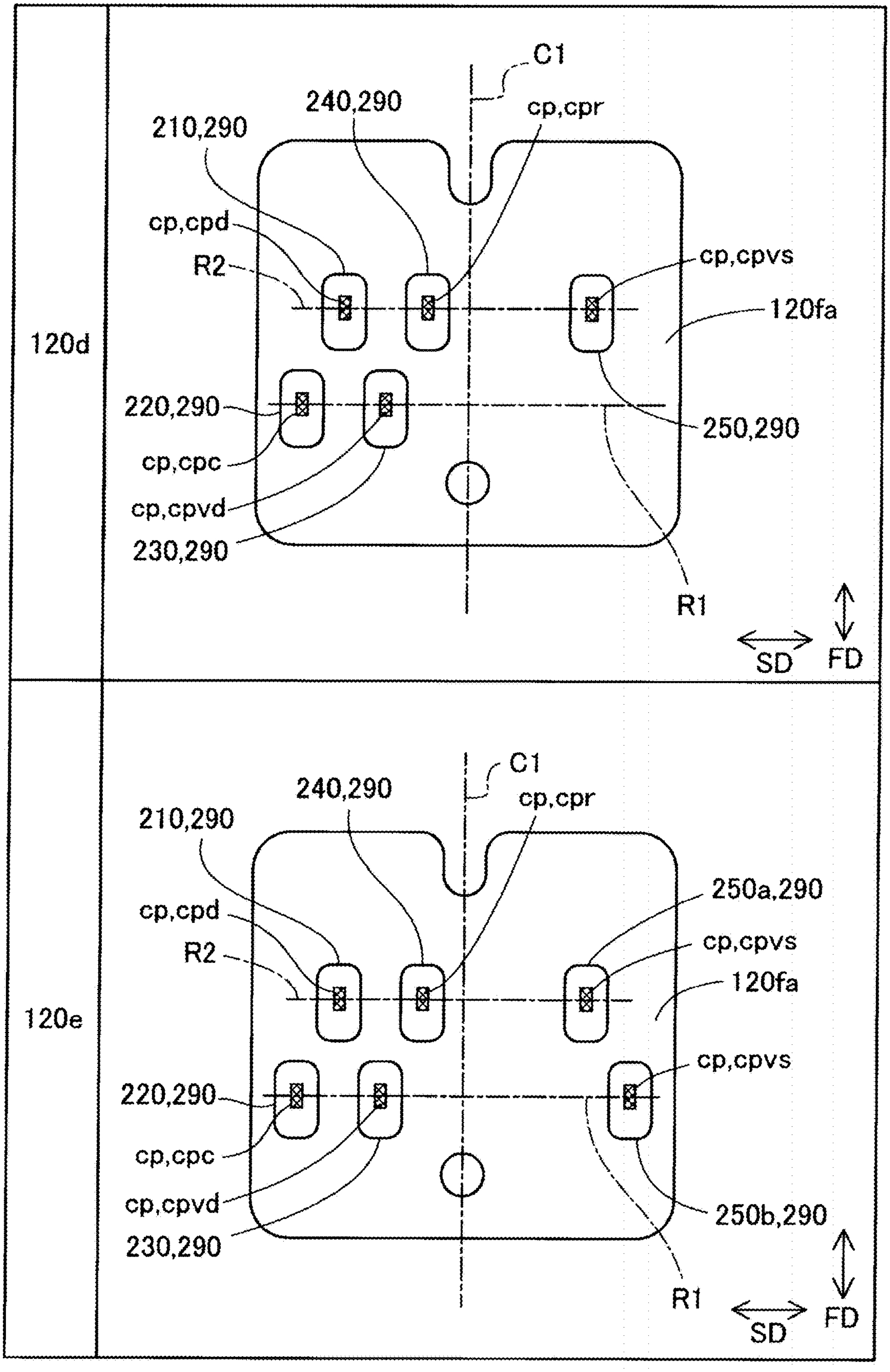
FIG. 22 is a diagram illustrating a board having two patterns as Embodiment 2.

A4-2. Embodiment 2 of Board:

FIG. 22 is a diagram illustrating boards 120*d* and 120*e* of two patterns as Embodiment 2. The disposition of the ground contact portion 250 is not limited to the above-described first embodiment, and other dispositions may be used. The arrangement of the ground contact portion cpvs in the board 120*d* is different from the arrangement in the board 120 illustrated in FIG. 5. The ground contact portion cpvs of the board 120*d* is arranged to form the second row R2. When the board 120*d* is used, the coupling mechanism 400 illustrated in FIGS. 7A and 7B includes an apparatus-side terminal corresponding to the ground contact portion cpvs of the board 120. The number of ground contact portions cpvs is not limited to the above-described first embodiment, and may be two or more. The number of ground contact portions cpvs in the board 120*e* is different from the board 120 illustrated in FIG. 5. The board 120*e* includes two ground terminals 250*a* and 250*b*, each of the ground terminals includes a ground contact portion cpvs. When the board 120*e* is used, the coupling mechanism 400 illustrated in FIGS. 7A and 7B includes two apparatus-side terminals corresponding to the two ground terminals 250*a* and 250*b*. The arrangement of the data contact portion cpd, the clock contact portion cpc, the power-source contact portion cpvd, and the reset contact portion cpr of the board 120*e* is the same as the arrangement in the board 120 illustrated in FIG. 5. The ground contact portion cpvs of the ground terminal 250*a* and the ground contact portion cpvs of the ground terminal 250*b* are arranged at different positions in the direction along the first virtual line C1. The ground contact portion cpvs of one ground terminal 250*a* is arranged to form the second row R2. The ground contact portion cpvs of the other ground terminal 250*b* is arranged to form the first row R1.

Figure 23:
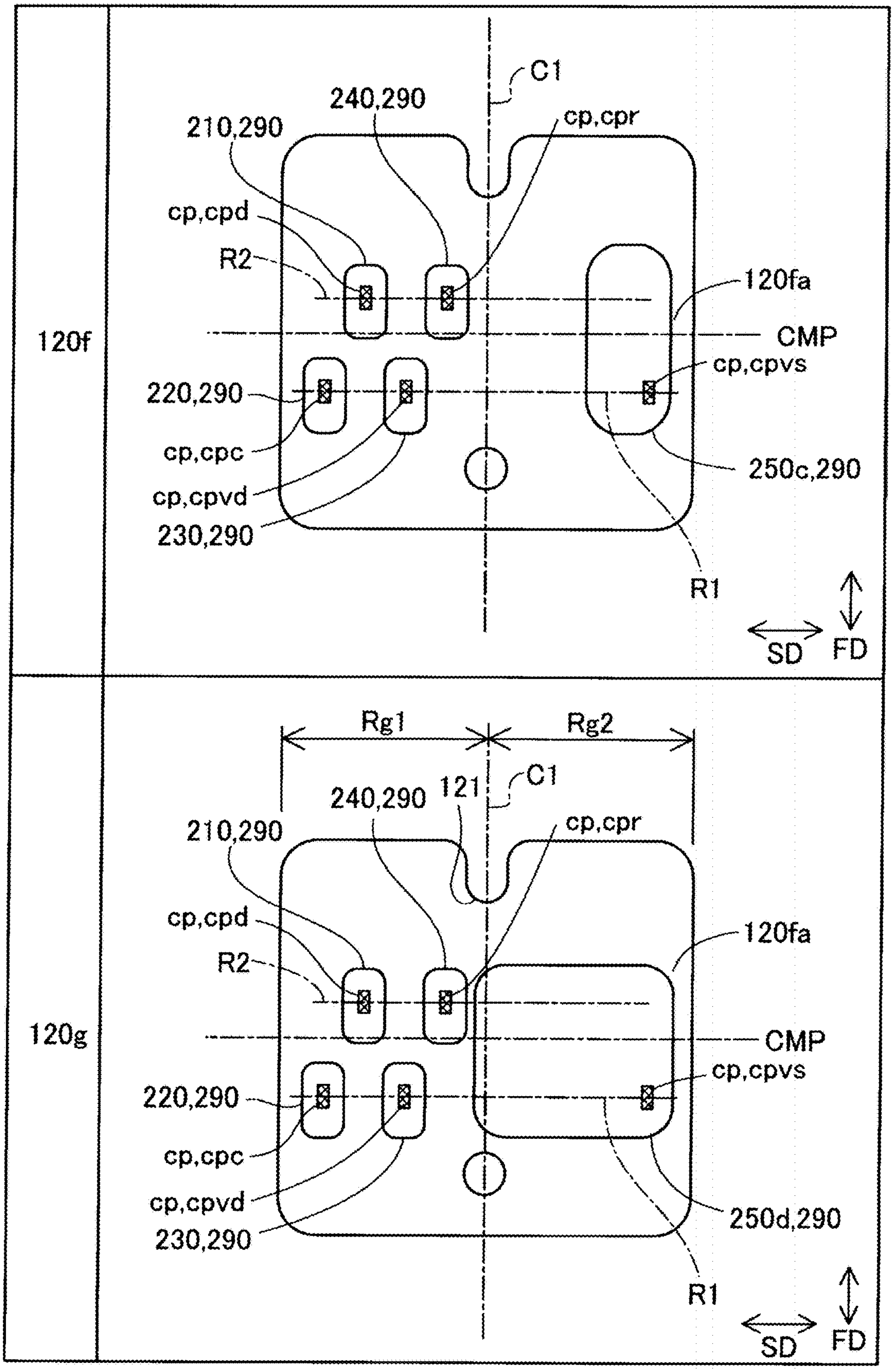
FIG. 23 is a diagram illustrating a board having two patterns as Embodiment 3.

A4-3. Embodiment 3 of Board:

FIG. 23 is a diagram illustrating boards 120*f* and 120*g* of two patterns as Embodiment 3. The size of the ground terminal 250 is not limited to the above-described first embodiment, and may have other sizes. A ground terminal 250*c* of the board 120*f* and a ground terminal 250*d* of the board 120*g* are larger than the ground terminal 250 illustrated in FIG. 5. The ground terminal 250*c* is formed over the first row R1 and the second row R2. The ground terminal 250*c* is arranged to straddle a central portion CMP of the board 120*f* in the direction along the first virtual line C1. The ground terminal 250*d* of the board 120*g* is further formed over the first region Rg1 and the second region Rg2. The ground terminal 250*d* is arranged to straddle the first virtual line C1.

Figure 24:
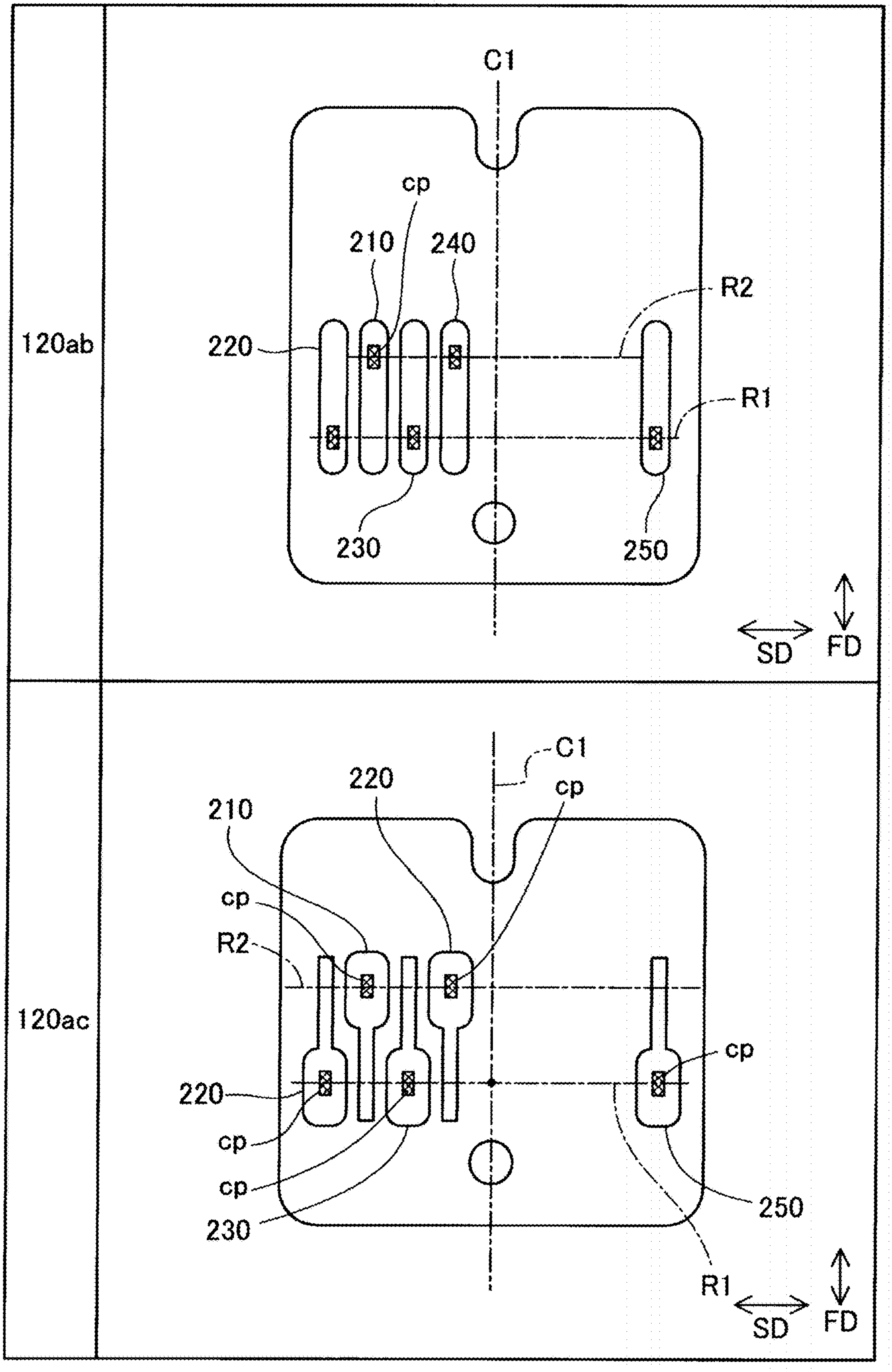
FIG. 24 is a diagram illustrating a board having two patterns as Embodiment 4.
Figure 25:
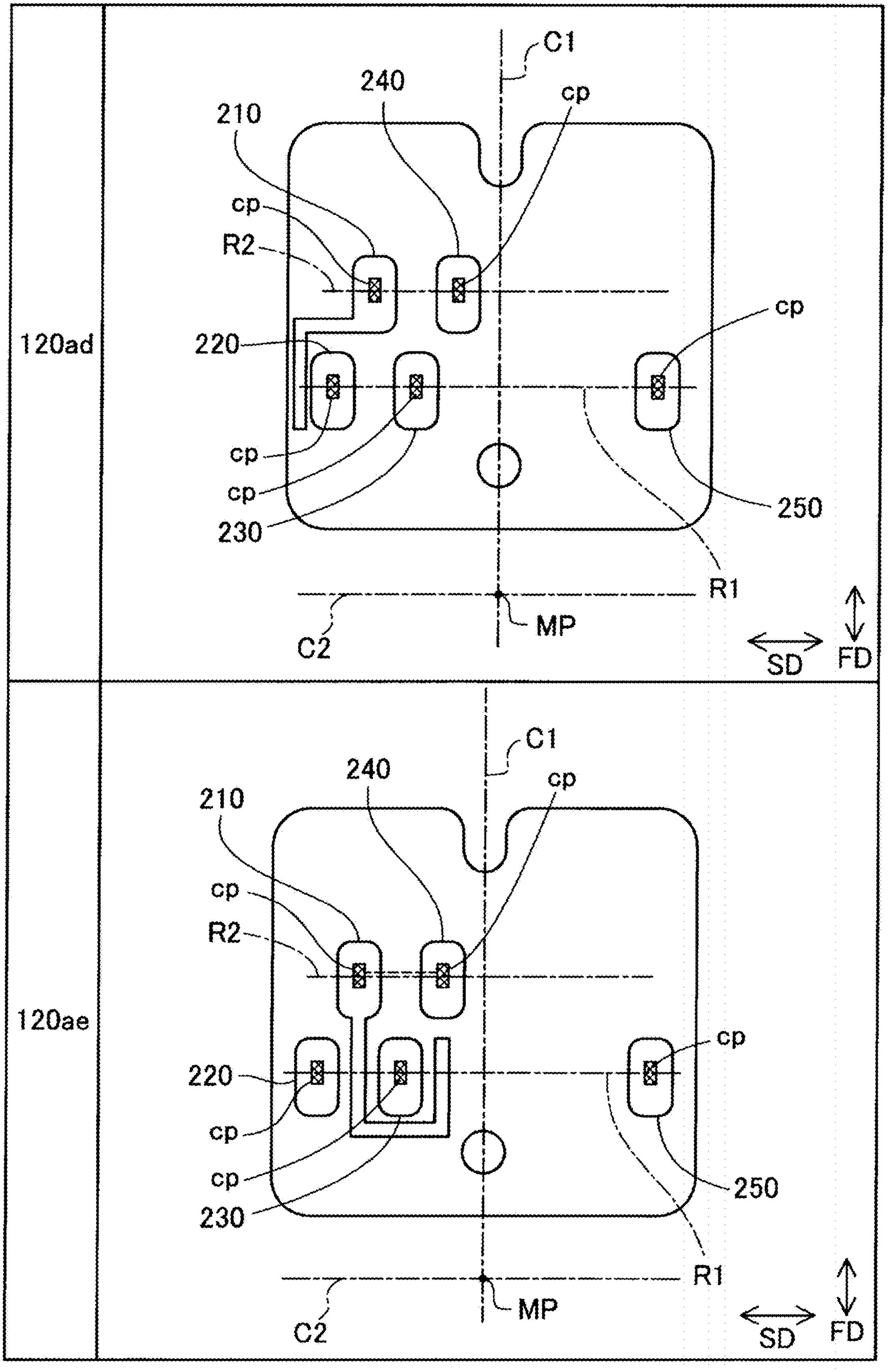
FIG. 25 is a diagram illustrating a board having two patterns as Embodiment 4.

A4-4. Embodiment 4 of Board:

FIG. 24 is a diagram illustrating boards 120*ab* and 120*ac* of two patterns as Embodiment 4. FIG. 25 is a diagram illustrating boards 120*ad* and 120*ae* of two patterns as Embodiment 4. The shapes of the terminals 210 to 250 are not limited to the above-described first embodiment, and other shapes may be used. As illustrated in FIG. 24, the terminals 210 to 250 of the board 120*ab* are formed to straddle the first row R1 and the second row R2, and have an elongated shape along the first virtual line C1. The terminals 210 to 250 of the board 120*ac* have a portion having an elongated shape along the first virtual line C1 in addition to a rectangular portion like the terminals 210 to 250 of the board 120. The data terminal 210 of the board 120*ad* has a portion bent in directions along the first virtual line C1 and the second virtual line C2. The data terminal 210 of the board 120*ae* has portions bent in a direction along the first virtual line C1 and the second virtual line C2 so as to surround a portion of the power source terminal 230. Even in this manner, the positional relation between the contact portions cp of the terminals 210 to 250 is the same as the positional relation between the contact portions cp illustrated in FIG. 5 in the first embodiment.

Figure 26:
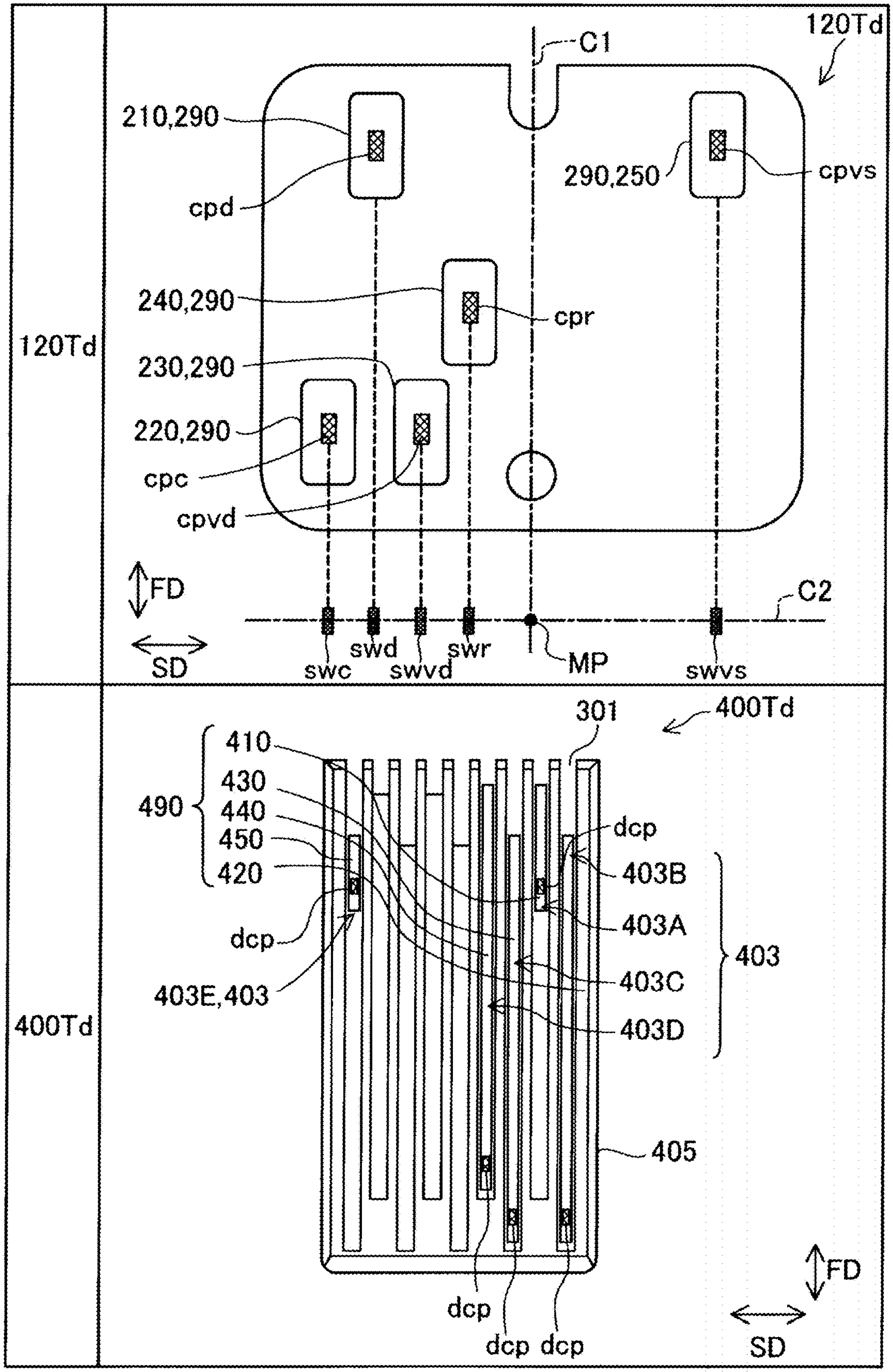
FIG. 26 is a diagram illustrating a board as Embodiment 5.

A4-5. Embodiment 5 of Board:

FIG. 26 is a diagram illustrating a board 120Td as Embodiment 5. The upper part of FIG. 26 illustrates the board 120Td. The lower part of FIG. 26 schematically illustrates a coupling mechanism 400Td corresponding to the board 120Td. In the board 120 in the first embodiment (FIG. 5), the plurality of contact portions cp are arranged to form two rows, but the present disclosure is not limited to this. In the board 120Td, the contact portions are arranged to form three rows. The data contact portion cpd and the ground contact portion cpvs form a third row. As described above, even though the contact portions cp are arranged to be different from the arrangement of the contact portions cp in the first embodiment in the direction along the first virtual line C1, the projection positions on the second virtual line C2 do not change. When the board 120Td is mounted in a direction along the gravity direction and is oriented in the corresponding mounting orientation, in the board 120Td, the clock contact portion cpc, the power-source contact portion cpvd, and the reset contact portion cpr are arranged on the +Z direction side being the gravity direction side of the data contact portion cpd (i.e., downwardly of the data contact portion cpd). At least one contact portion cpc, cpvd, or cpr among the clock contact portion cpc, the power-source contact portion cpvd, and the reset contact portion cpr is arranged to be projected between the projection position swd of the data contact portion cpd and the projection position swvs of the ground contact portion cpvs when the contact portions cp are projected onto the second virtual line C2. Similar to the data contact portion cpd and the ground contact portion cpvs in the present embodiment, the contact portions cp other than the data contact portion cpd and the ground contact portion cpvs may be arranged at positions different from the positions of the contact portions cp in the first embodiment, in the direction along the first virtual line C1. The positional relation between the contact portions cp described above is similar to the positional relation between the contact portions cp of the apparatus-side terminals 490. When the board 120Td is mounted in the direction along the gravity direction, the apparatus-side clock contact portion dcpc, the apparatus-side power-source contact portion dcpvd, and the apparatus-side reset contact portion dcpr are arranged on the +Z direction side being the gravity direction side of the apparatus-side data contact portion dcpd (i.e., downwardly of the apparatus-side data contact portion dcpd). At least one contact portion dcpc, dcpvd, or dcpr among the apparatus-side clock contact portion dcpc, the apparatus-side power-source contact portion dcpvd, and the apparatus-side reset contact portion dcpr is arranged to be projected between the projection position swd of the apparatus-side data contact portion dcpd and the projection position swvs of the apparatus-side ground contact portion dcpvs when the contact portions dcp are projected onto the second virtual line C2.

Figure 27:
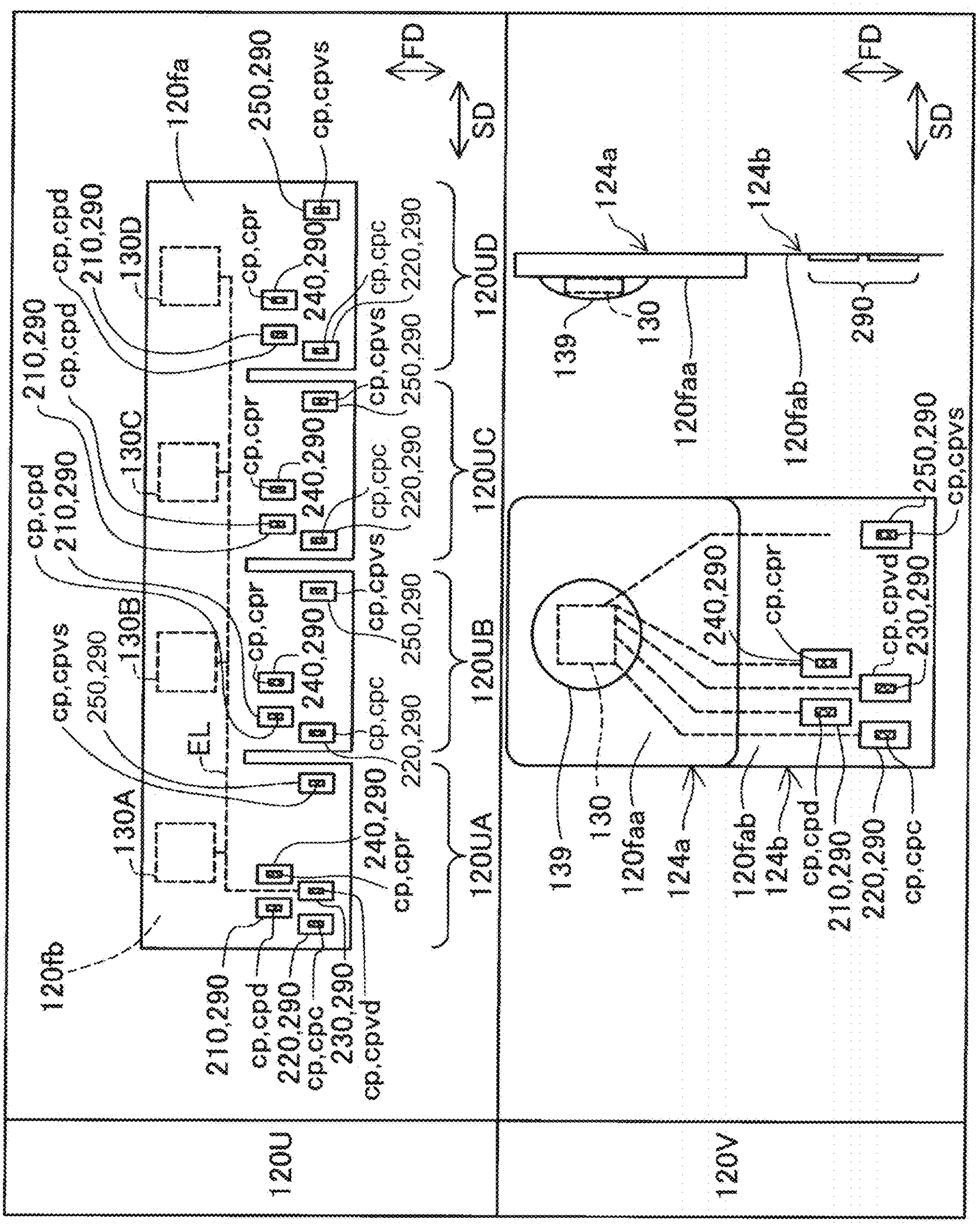
FIG. 27 is a diagram illustrating a board having two patterns as Embodiment 6.

A4-6. Embodiment 6 of Board:

FIG. 27 is a diagram illustrating boards 120U and 120V of two patterns as Embodiment 6 for the board. The form of the base member 120*bd* of the board 120 is not limited to the above-described first embodiment. The board 120U is commonly used by the four liquid accommodation containers 100A to 100D. In this case, the four liquid accommodation containers 100A to 100D may be integrally formed. The board 120U includes a first board region 120UA, a second board region 120UB, a third board region 120UC, and a fourth board region 120UD. The first board region 120UA is a region in which the terminals 290 used in the liquid accommodation container 100A are arranged. The second board region 120UB is a region in which the terminals 290 used in the liquid accommodation container 100B are arranged. The third board region 120UC is a region in which the terminals 290 used in the liquid accommodation container 100C are arranged. The fourth board region 120UD is a region in which the terminals 290 used in the liquid accommodation container 100D are arranged. For purposes of this disclosure, the first board region 120UA, second board region 120UB, third board region 120UC, and fourth board region 120UD are regarded as independent boards. Four devices 130A to 130D used in the four liquid accommodation containers 100A to 100D are provided on the back surface 120*fb* of the board 120U. The terminals 290 in each of the board regions 120UA to 120UD are coupled to the corresponding devices 130A to 130D via a wiring pattern layer (not illustrated) or a through-hole (not illustrated) in the board 120U. Here, the power source voltage VDD is supplied to each of the devices 130A to 130D via a common power source terminal 230. In the present embodiment, the common power source terminal 230 is provided in the terminals 290 of the first board region 120UA. Thus, in the board 120U, the power source terminal 230 is not provided in the terminals 290 in the second board region 120UB to the fourth board region 120UD. As described above, some of the terminals 290 may be commonly used by the plurality of devices 130A to 130D.

In the first embodiment, the base member 120*bd* of the board 120 is configured by a single member. The present disclosure is not limited to this, and the base member 120*bd* may be configured by a plurality of base members. In the board 120V, the device 130 and the terminals 290 are arranged on separate base members 124*a* and 124*b* instead of a single base member. The board 120V has a first base member 124*a* and a second base member 124*b*. The first base member 124*a* and the second base member 124*b* are electrically coupled to each other by a conductive line EL or the like. The materials of the first base member 124*a* and the second base member 124*b* can be different from each other. The first base member 124*a* is, for example, a rigid base member, and the second base member 124*b* is a sheet-like base member. The device 130 is encased by the resin 139 on the front surface 120*faa* of the first base member 124*a*. The terminals 290 are arranged on the front surface 120*fab* of the second base member 124*b*.

Figure 28:
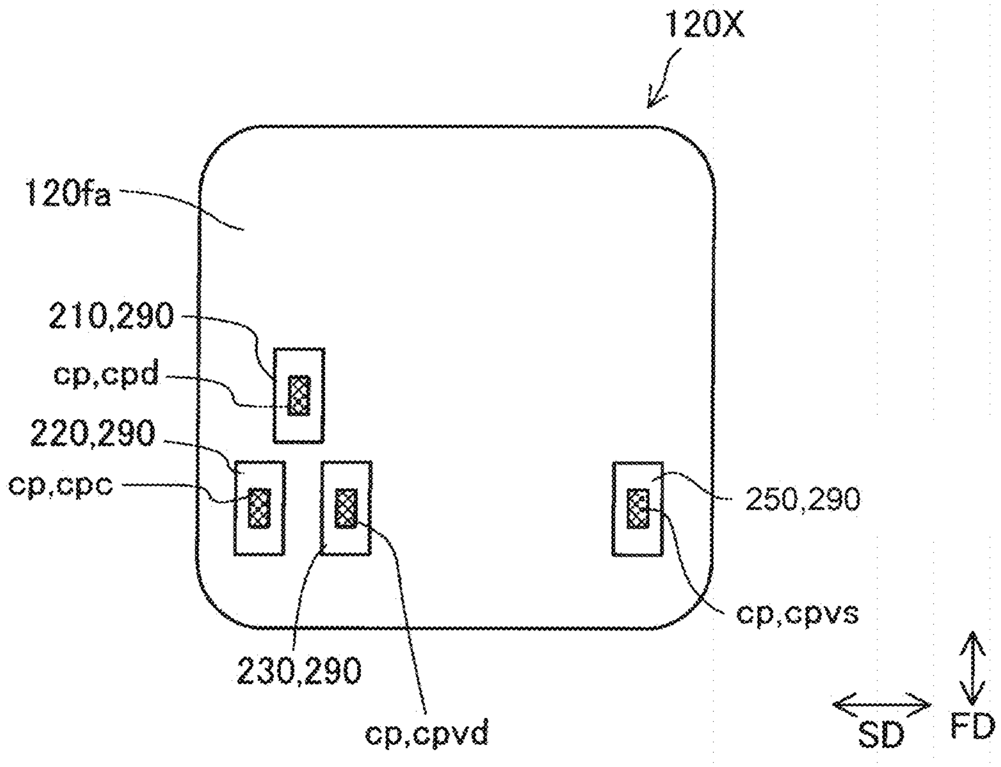
FIG. 28 is a diagram illustrating a board as Embodiment 7.

A4-7. Embodiment 7 of Board:

FIG. 28 is a diagram illustrating a board 120X in Embodiment 7 for the board. In the first embodiment, as illustrated in FIG. 5, the types of terminals 290 are five types: data terminal 210, clock terminal 220, power source terminal 230, reset terminal 240, and ground terminal 250. The present disclosure is not limited to this, and the number of types may be smaller than five. For example, the board 120X includes the data terminal 210, the clock terminal 220, the power source terminal 230, and the ground terminal 250. The board 120X does not include the reset terminal 240. In this case, the reset signal RST is generated by using the clock signal SCK, for example, in the processing unit 136 of the device 130. In other embodiments, the power source terminal 230 may not be provided at the board 120X. In this case, the power source voltage VDD is generated by using the clock signal SCK, for example, in the processing unit 136 of the device 130. In other embodiments, in the board 120X, the power source terminal 230 may be provided, and the reset terminal 240 may not be provided. As described above, the terminals 290 in the first embodiment described above may not include at least one of the reset terminal 240 and the power source terminal 230. In the case of the present embodiment, among the terminals 290 of the board 120, the terminals 290 other than the ground terminal 250 are referred to as an "other terminal group". In the present embodiment, the ground terminal 250 may also be referred to as the first terminal. The data terminal 210 may also be referred to as the second terminal. The clock terminal 220 may also be referred to as the third terminal. The ground contact portion cpvs may also be referred to as the first contact portion. The data contact portion cpd may also be referred to as the second contact portion. The clock contact portion cpc may also be referred to as the third contact portion.

A4-8. Embodiment 8 of Board:

In the embodiments of the present disclosure, the arrangement of the terminals 290 or the contact portions cp may be changed with the first virtual line C1 interposed therebetween. The terminals forming the first row and the terminals forming the second row may be changed.

A4-9. Embodiment 1 of Liquid Accommodation Container:

The liquid accommodation container in the present disclosure is not limited to the liquid accommodation container 100 illustrated in FIG. 3, and may have other configurations. Other embodiments of the liquid accommodation container 100 will be described below. The components similar to the components of the liquid accommodation container 100 in the first embodiment illustrated in FIGS. 3 and 4 and the similar components between other embodiments of the liquid accommodation container are denoted by the same reference signs, and description thereof will be omitted as appropriate. The component of the printing apparatus 20, such as the accommodation section 4 illustrated in FIG. 4, is changed in accordance with the configuration of the liquid accommodation container.

Figure 29:
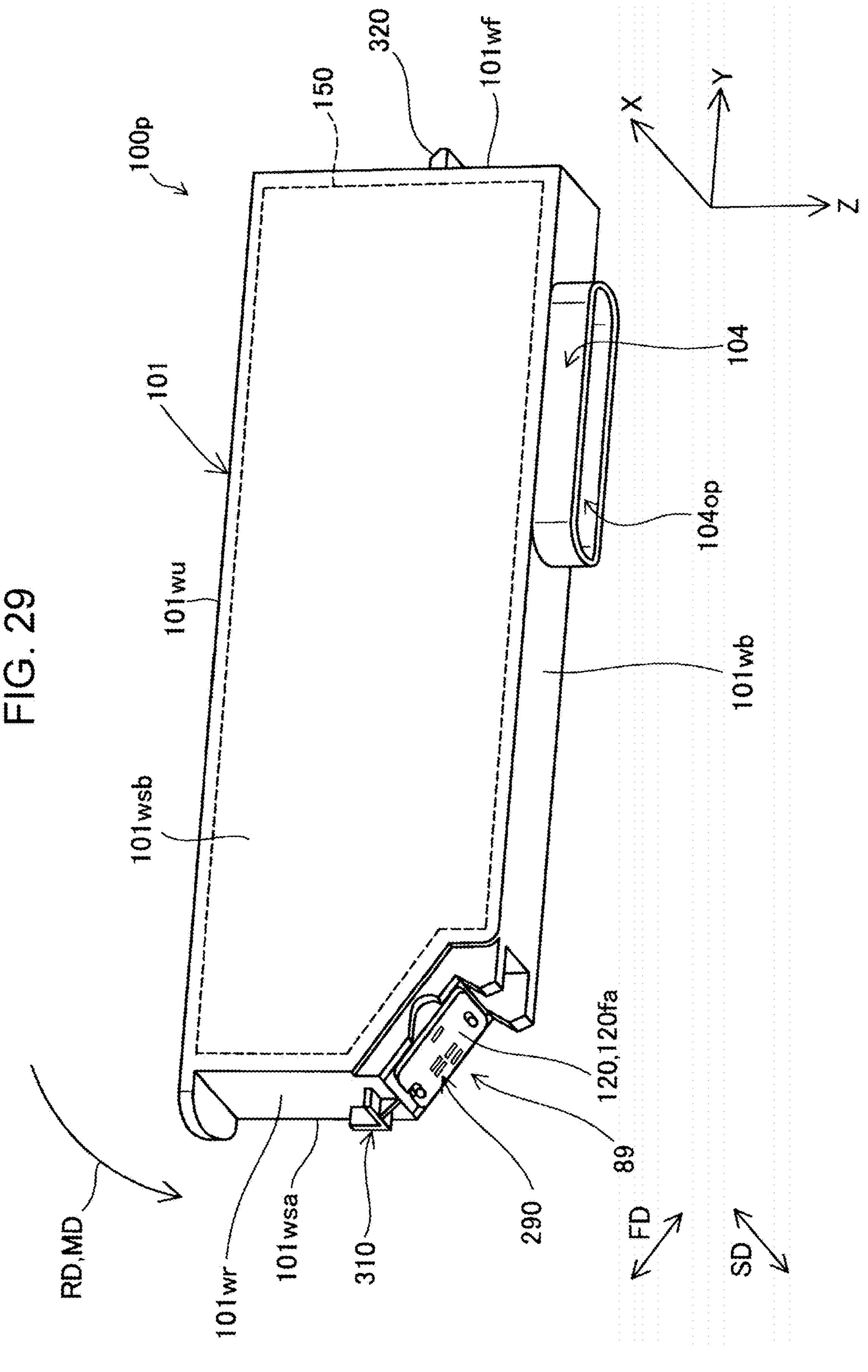
FIG. 29 is a perspective view illustrating a liquid accommodation container as Embodiment 1.

FIG. 29 is a perspective view illustrating a liquid accommodation container 100*p* as Embodiment 1 of the liquid accommodation container. The liquid accommodation container 100*p* includes the liquid accommodation body 101, the liquid supply portion 104 having the liquid supply port 104*op*, and the board 120. The liquid accommodation body 101 forms the ink chamber 150 that accommodates ink inside. The liquid supply portion 104 is formed at the bottom wall 101*wb* and communicates with the ink chamber 150. The board 120 is provided at a corner portion 89 where the third wall 101*wb* and the second wall 101*wr* of the liquid accommodation body 101 intersect with each other. The liquid accommodation container 100*p* is mounted on the accommodation section 4 in a manner that a protruding second container engagement portion 320 of the first wall 101*wf* is engaged with a recess portion of the accommodation section 4, and then the liquid accommodation container 100*p* is rotated and moved in a rotation mounting direction RD by using the second container engagement portion 320 as a fulcrum. In the mounting-completed state, a protruding first container engagement portion 310 of the second wall 101*wr* is engaged with a lever of the accommodation section 4. In the present embodiment, the mounting direction MD includes a +Z direction component and a −Y direction component, and the first direction FD includes both positive and negative Y direction components and the both positive and negative Z direction components.

Figure 30:
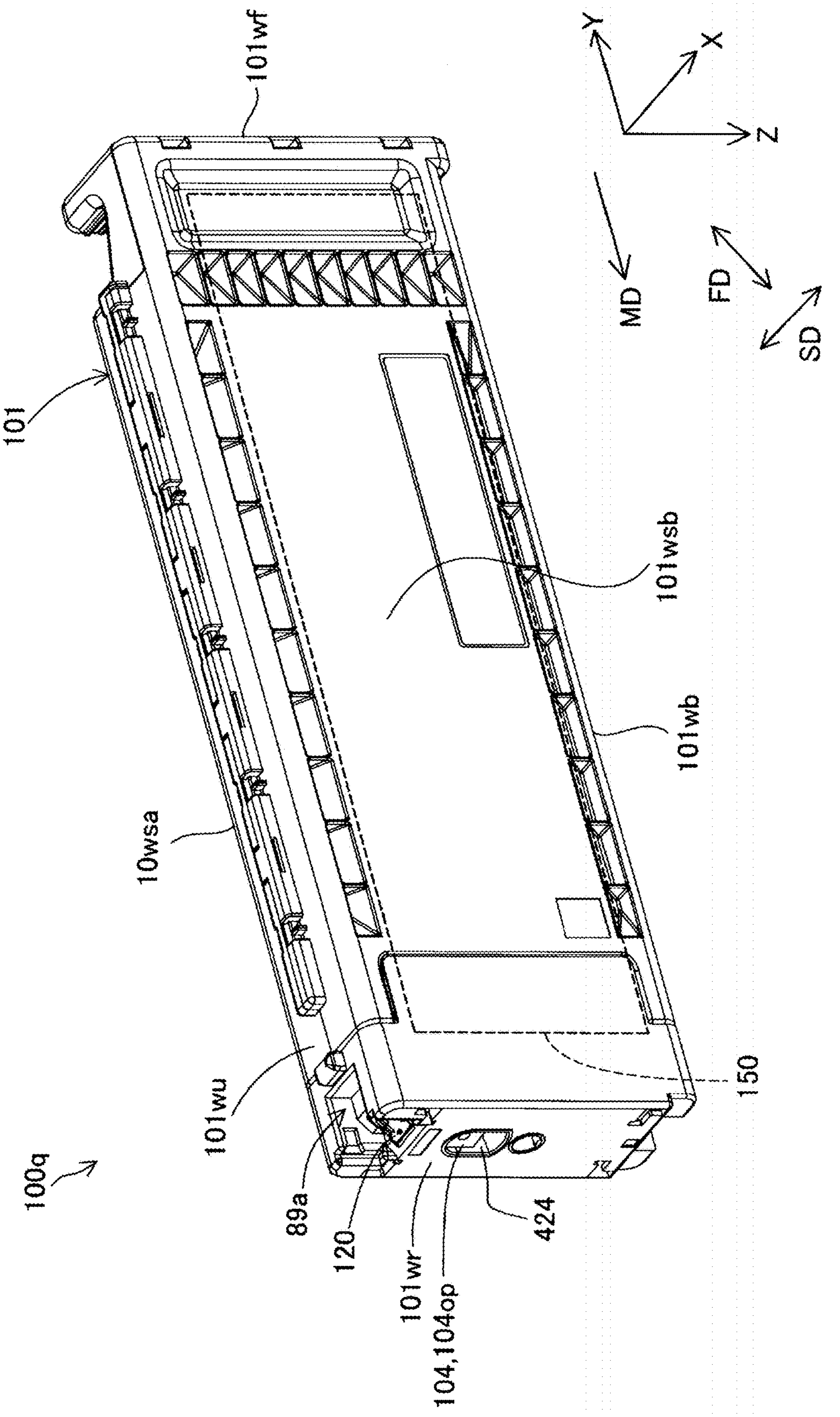
FIG. 30 is a perspective view illustrating a liquid accommodation container as Embodiment 2.
Figure 31:
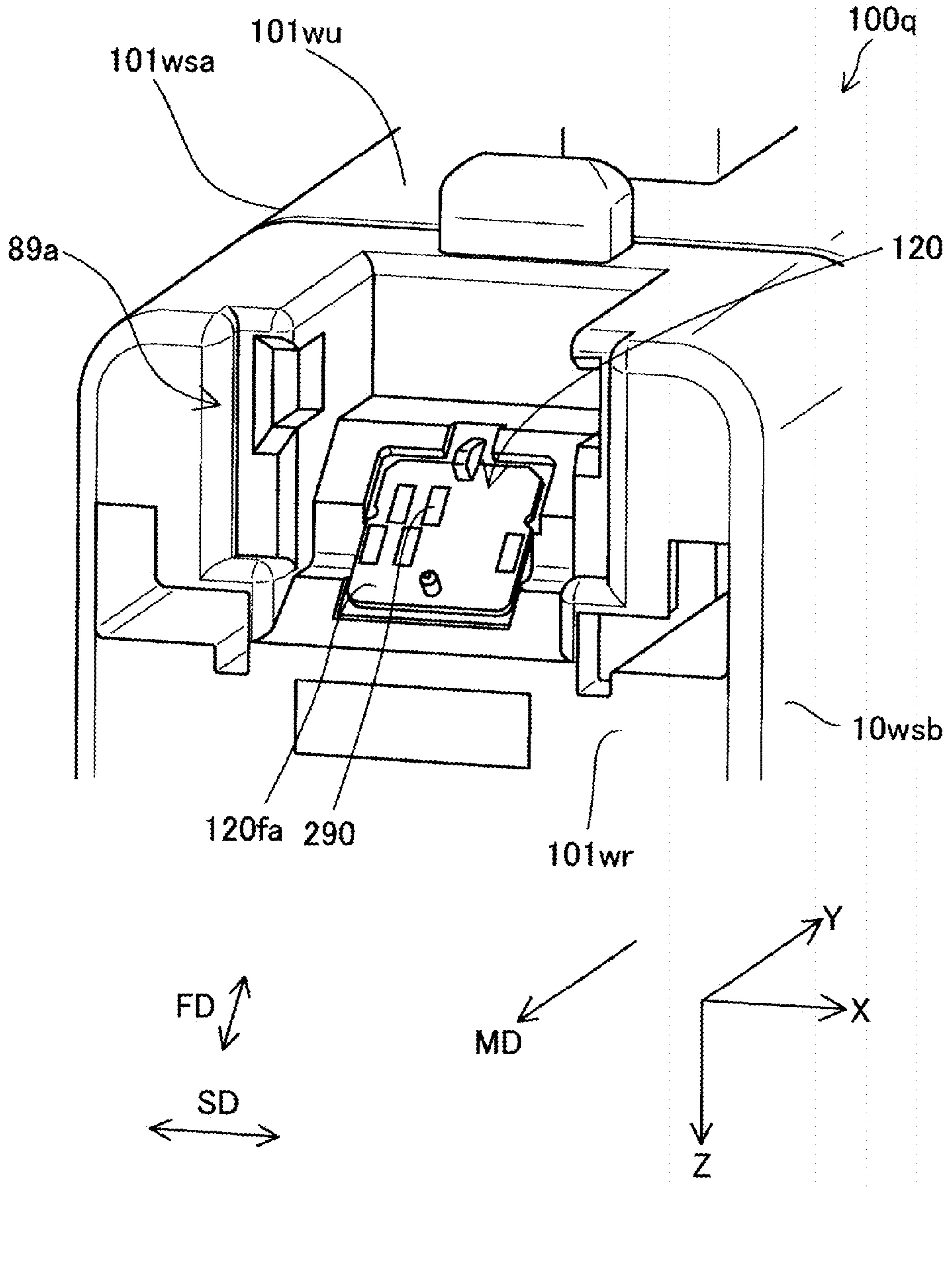
FIG. 31 is an enlarged view illustrating a periphery of the board of the liquid accommodation container.

A4-10. Embodiment 2 of Liquid Accommodation Container:

FIG. 30 is a perspective view illustrating a liquid accommodation container 100*q* as Embodiment 2 of the liquid accommodation container. FIG. 31 is an enlarged view illustrating the periphery of the board 120 of the liquid accommodation container 100*q*. As illustrated in FIG. 30, the liquid accommodation container 100*q* includes the liquid accommodation body 101, the liquid supply portion 104 having the liquid supply port 104*op*, and the board 120. A liquid accommodation bag (not illustrated) that accommodates ink is disposed in the liquid accommodation body 101. The liquid accommodation bag is flexible and functions as the ink chamber 150. The liquid supply portion 104 is provided at the liquid accommodation bag and is arranged at an opening portion 424 formed in the front wall 101*wf* of the liquid accommodation body 101. The board 120 is provided at a corner portion 89*a* where the second wall 101*wr* and the fourth wall 101*wu* of the liquid accommodation body 101 intersect with each other. The corner portion 89*a* is a recess portion of the liquid accommodation body 101, which is recessed inward. In the present embodiment, the mounting direction MD is the −Y direction, and the first direction FD includes both positive and negative Y direction components, and both positive and negative Z direction components.

Figure 32:
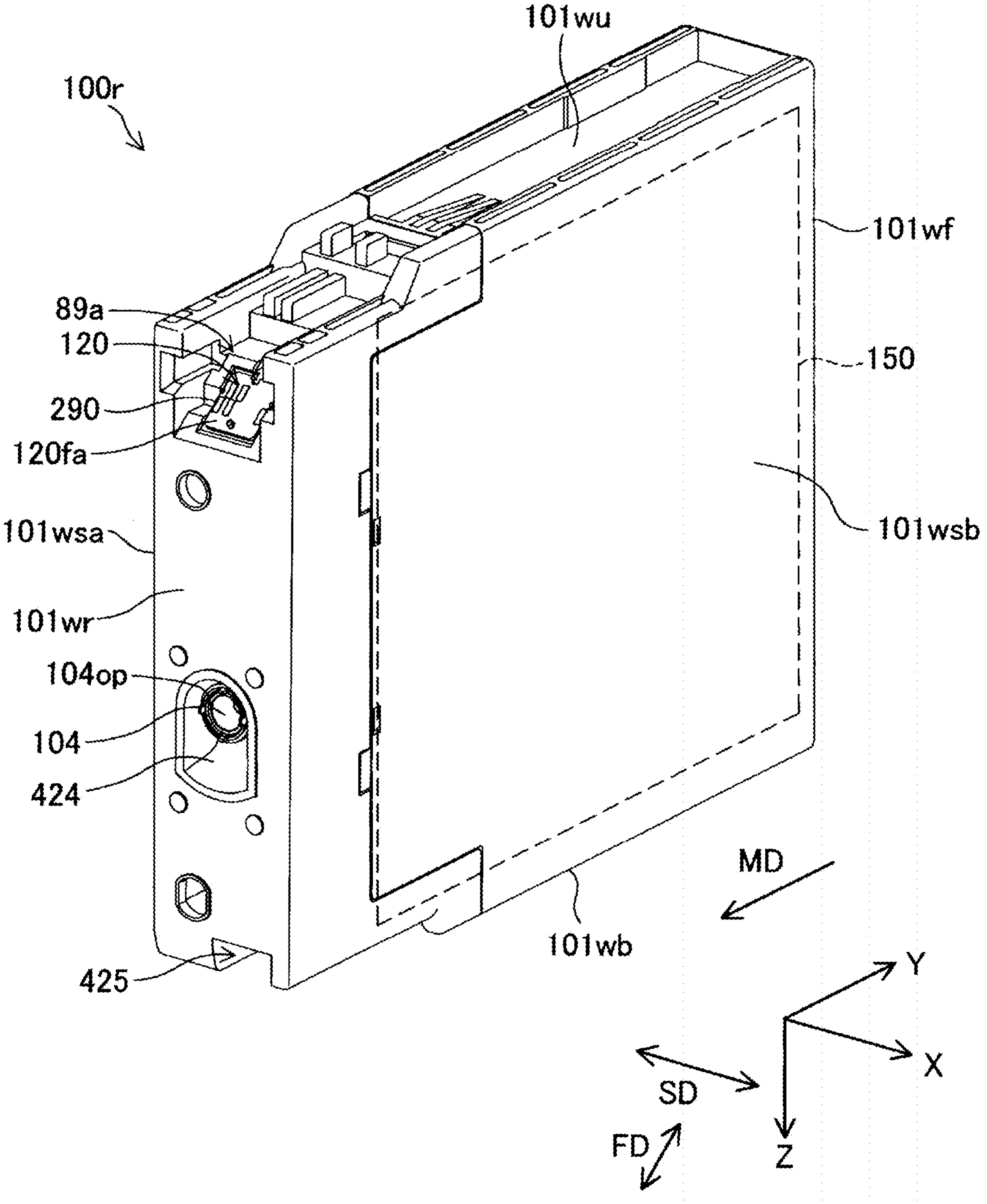
FIG. 32 is a perspective view illustrating a liquid accommodation container as Embodiment 3.

A4-11. Embodiment 3 of Liquid Accommodation Container:

FIG. 32 is a perspective view illustrating a liquid accommodation container 100*r* as Embodiment 3 of the liquid accommodation container. In the liquid accommodation container 100*r*, the −Y direction is the mounting direction MD. The liquid accommodation container 100*r* includes the liquid accommodation body 101, the liquid supply portion 104 having the liquid supply port 104*op*, and the board 120. A liquid accommodation bag (not illustrated) that accommodates ink is disposed in the liquid accommodation body 101. The liquid accommodation bag is flexible and functions as the ink chamber 150. The liquid supply portion 104 is provided at the liquid accommodation bag and is arranged at the opening portion 424 formed in the second wall 101*wr* of the liquid accommodation body 101. The board 120 is provided at the corner portion 89*a* where the second wall 101*wr* and the fourth wall 101*wu* of the liquid accommodation body 101 intersect with each other. The corner portion 89*a* is a recess portion of the liquid accommodation body 101, which is recessed inward. A groove-like container-side engaging structure 425 is formed at the third wall 101*wb* of the liquid accommodation body 101. The container-side engaging structure 425 regulates a movement on the +Y direction side being a removal direction of the liquid accommodation container 100, by engaging with a protruding apparatus-side engaging structure of the accommodation section 4 in the mounting-completed state of the liquid accommodation container 100*r*. In the present embodiment, the mounting direction MD is the −Y direction, and the first direction FD includes both positive and negative Y direction components, and both positive and negative Z direction components.

Figure 33:
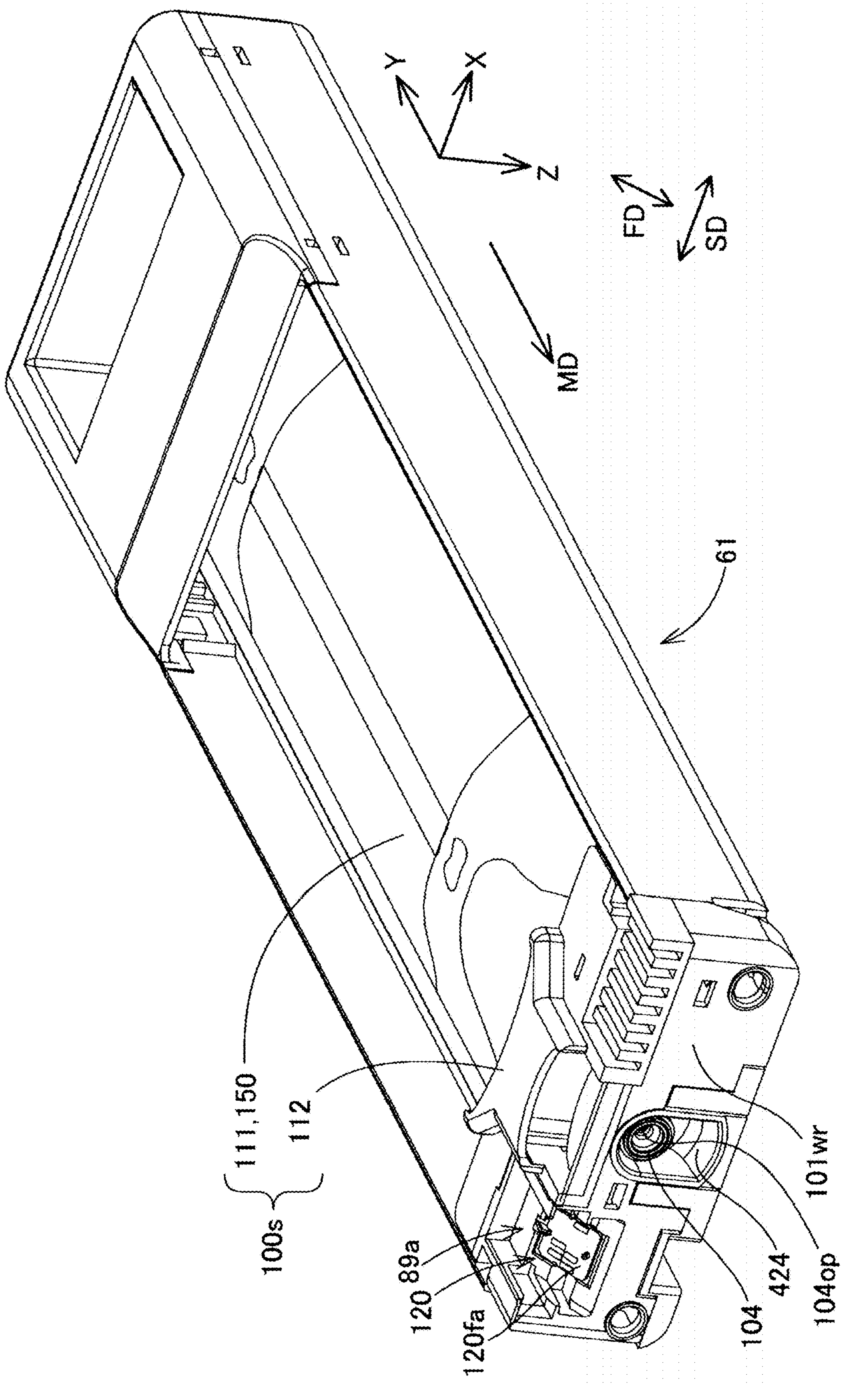
FIG. 33 is a perspective view illustrating a liquid accommodation container as Embodiment 4.

A4-12. Embodiment 4 of Liquid Accommodation Container:

FIG. 33 is a perspective view illustrating a liquid accommodation container 100*s* as Embodiment 4 of the liquid accommodation container. The liquid accommodation container 100*s* is detachably accommodated in a case 61 provided in the printing apparatus 20 to be retractable, and then is mounted in the printing apparatus 20 together with the case 61. The liquid accommodation container 100*s* includes the liquid accommodation bag 111 and a coupling member 112 attached to one end portion of the liquid accommodation bag 111 on the −Y direction side. In the present embodiment, the liquid accommodation bag 111 and the coupling member 112 function as a liquid accommodation body. The liquid accommodation bag 111 is flexible. The liquid supply portion 104 having the liquid supply port 104*op* is provided on the −Y direction side of the liquid accommodation bag 111 that functions as the ink chamber 150. The liquid supply portion 104 is arranged at the opening portion 424 formed in the second wall 101*wr* of the coupling member 112. The board 120 is arranged at the corner portion 89*a* which is a recess portion formed at the second wall 101*wr* of the coupling member 112. In the present embodiment, the mounting direction MD is the −Y direction, and the first direction FD includes both positive and negative Y direction components, and both positive and negative Z direction components.

Figure 34:
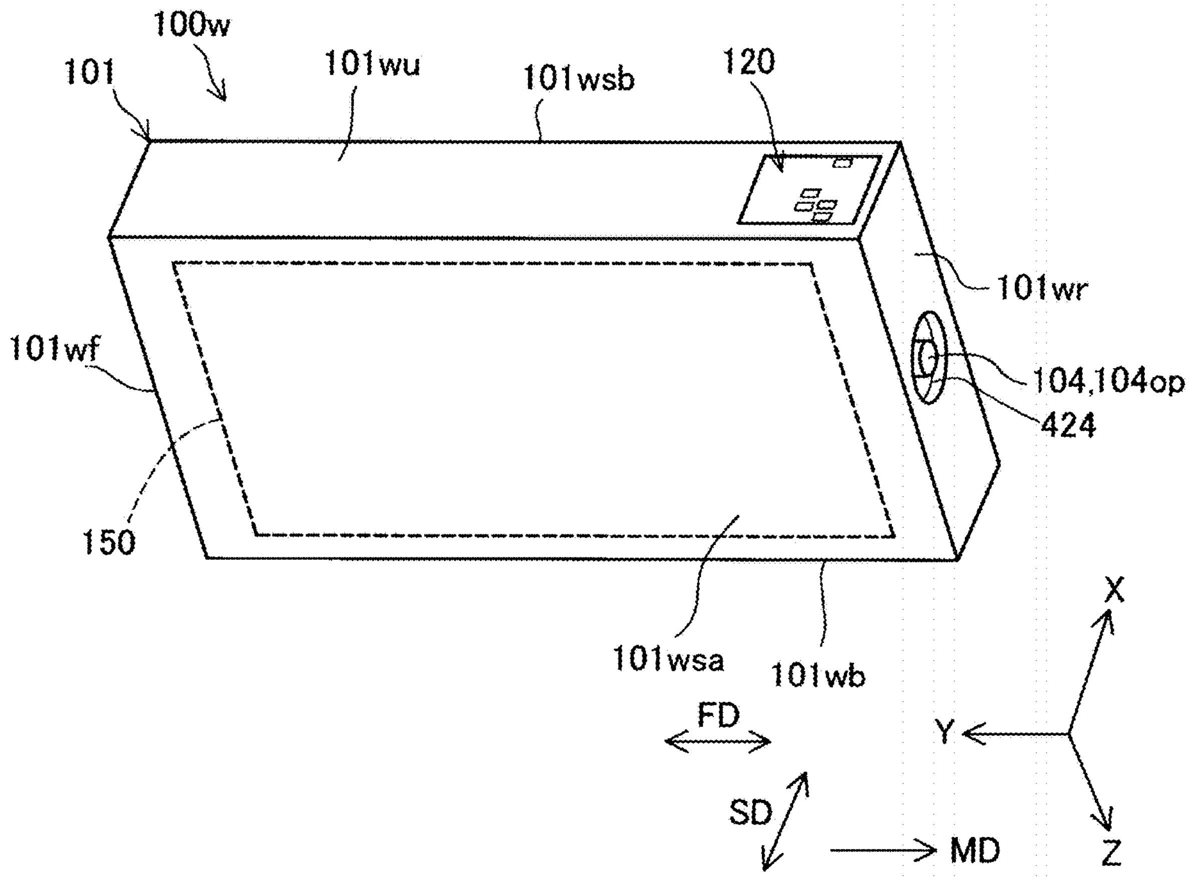
FIG. 34 is a perspective view illustrating a liquid accommodation container as Embodiment 5.

A4-13. Embodiment 5 of Liquid Accommodation Container:

FIG. 34 is a perspective view illustrating a liquid accommodation container 100*w* as Embodiment 5 of the liquid accommodation container. In the liquid accommodation container 100*w*, the board 120 is arranged at the fourth wall 101*wu* which is a horizontal surface, in the mounting-completed state. The fourth wall 101*wu* forms the upper wall in the mounting-completed state. The liquid accommodation container 100*w* includes the liquid accommodation body 101 and the liquid supply portion 104 having the liquid supply port 104*op*, similarly to the liquid accommodation container 100 illustrated in FIGS. 3 and 4. A liquid accommodation bag (not illustrated) that has flexibility and accommodates ink is disposed in the liquid accommodation body 101. The liquid accommodation bag functions as the ink chamber 150. The liquid supply portion 104 is provided at the liquid accommodation bag and is arranged at the opening portion 424 formed in the second wall 101*wr* of the liquid accommodation body 101. In the present embodiment, the mounting direction MD is the −Y direction, and the first direction FD is both the positive and negative Y direction.

Figure 35:
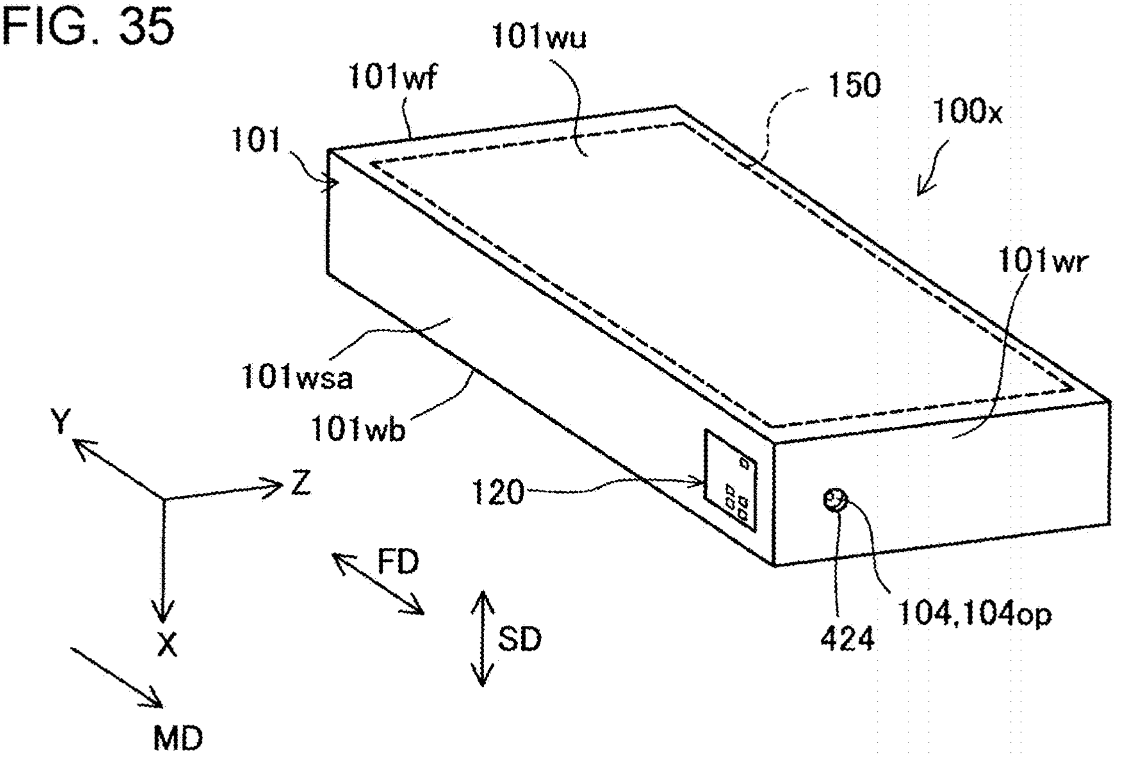
FIG. 35 is a perspective view illustrating a liquid accommodation container as Embodiment 6.

A4-14. Embodiment 6 of Liquid Accommodation Container:

FIG. 35 is a perspective view illustrating a liquid accommodation container 100*x* as Embodiment 6 of the liquid accommodation container. In the liquid accommodation container 100*x*, the board 120 is arranged at the fifth wall 101*wsa* being a vertical surface in the mounting-completed state. The fifth wall 101*wsa* forms a side wall in the mounting-completed state. The liquid accommodation container 100*x* includes the liquid accommodation body 101 and the liquid supply portion 104 having the liquid supply port 104*op*, similarly to the liquid accommodation container 100 illustrated in FIGS. 3 and 4. A liquid accommodation bag (not illustrated) that has flexibility and accommodates ink is disposed in the liquid accommodation body 101. The liquid accommodation bag functions as the ink chamber 150. The liquid supply portion 104 is provided at the liquid accommodation bag and is arranged at the opening portion 424 formed in the second wall 101*wr* of the liquid accommodation body 101. In the present embodiment, the mounting direction MD is the −Y direction, and the first direction FD is both the positive and negative Y direction.

Figure 36:
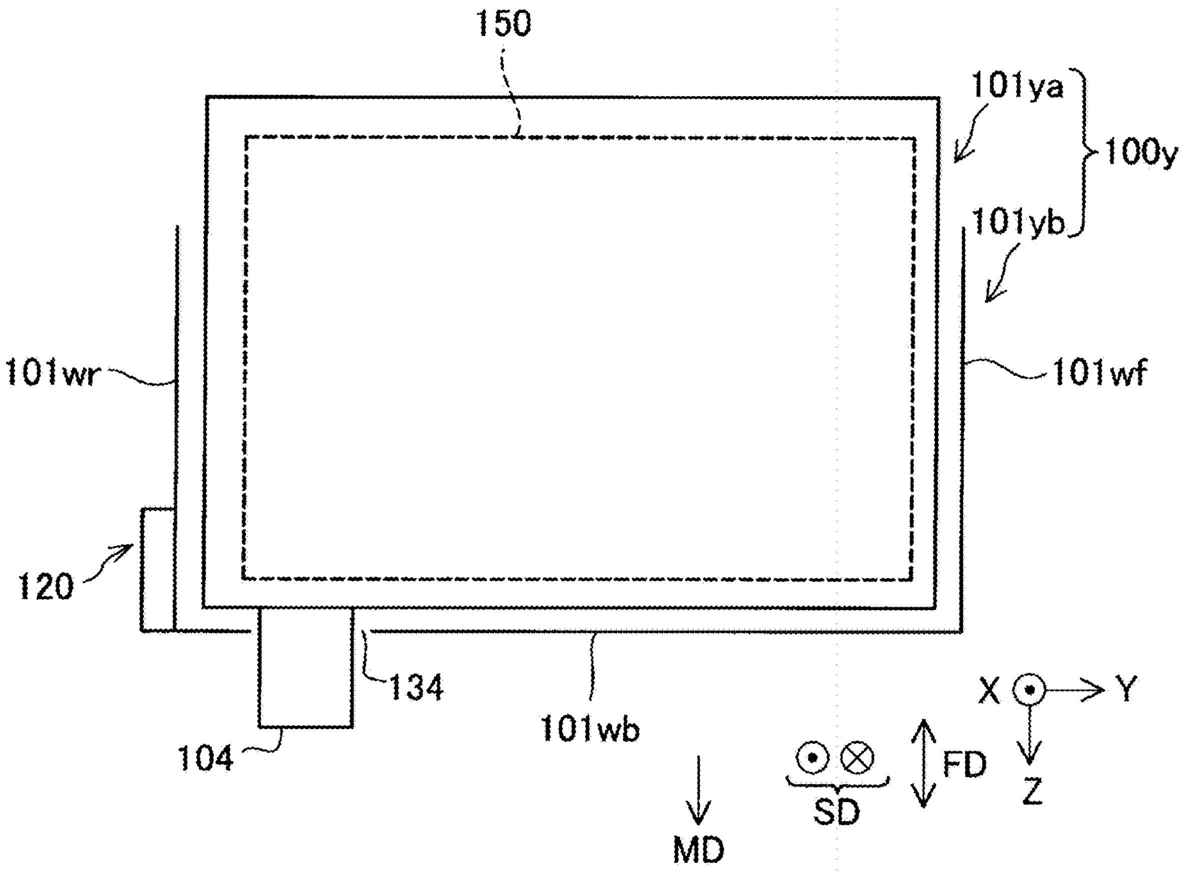
FIG. 36 is a diagram illustrating a liquid accommodation container as Embodiment 7.

A4-15. Embodiment 7 of Liquid Accommodation Container:

FIG. 36 is a diagram illustrating a liquid accommodation container 100*y* as Embodiment 7 of the liquid accommodation container. As illustrated in FIGS. 3 and 4, in the liquid accommodation container 100 in the first embodiment, the board 120 is attached directly to a surface of the liquid accommodation body 101. The present disclosure is not limited to this. For example, the liquid accommodation container 100*y* includes a liquid accommodation body 101*ya* forming the ink chamber 150 and an adapter 101*yb* to which the board 120 is attached. The liquid supply portion 104 is formed in the liquid accommodation body 101*ya*. The liquid accommodation body 101*ya* is accommodated in the recessed adapter 101*yb* to be removable. The adapter 101*yb* functions as a case for accommodating the liquid accommodation body 101*ya*. An opening portion 134 into which the liquid supply portion 104 is inserted is formed in the third wall 101*wb* of the adapter 101*yb*. The liquid accommodation body 101*ya* may be fixed to the adapter 101*yb* by using a fixing member (not illustrated). Alternatively, the liquid accommodation body 101*ya* may not be fixed to the adapter 101*yb*.

Figure 37:
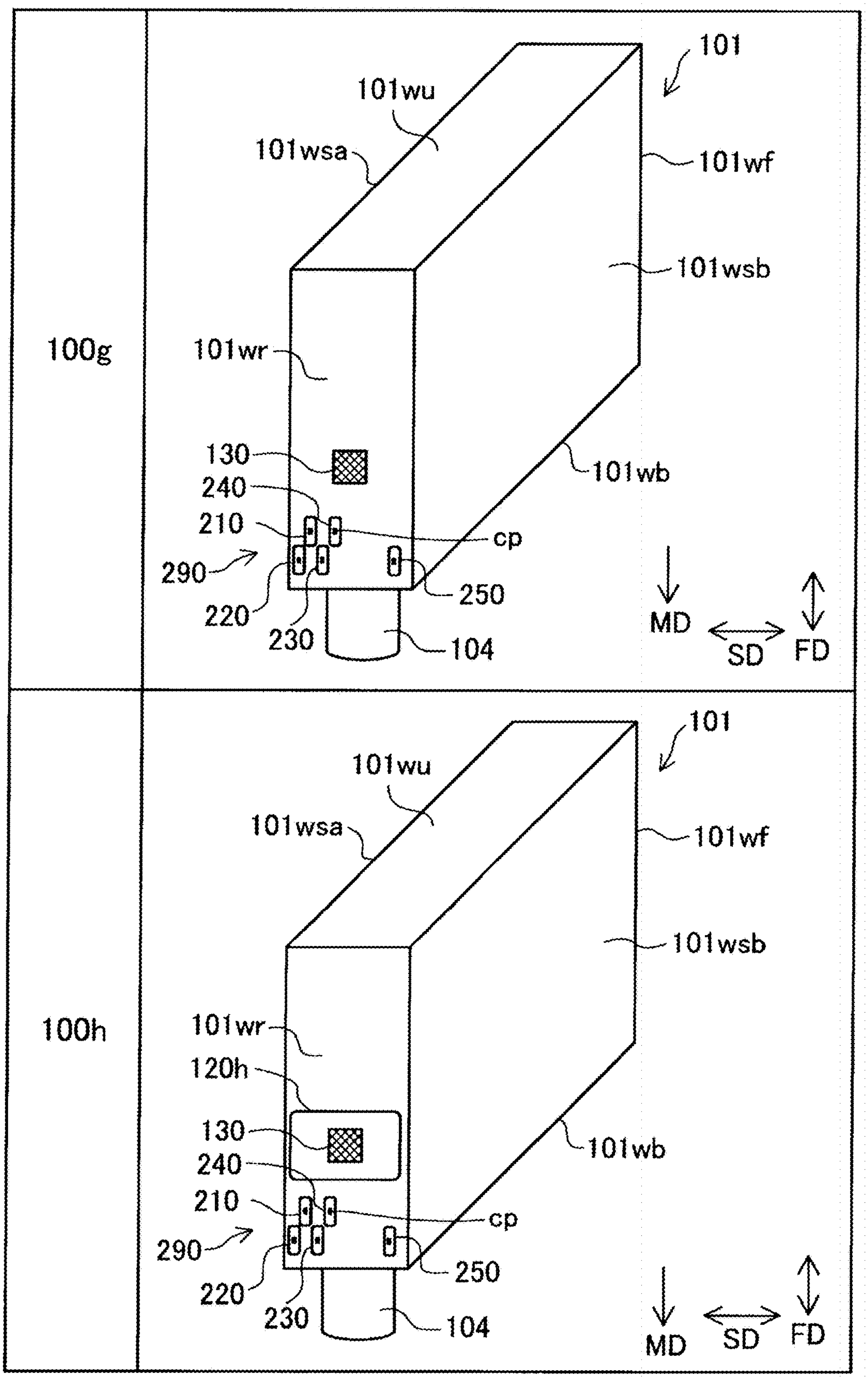
FIG. 37 is a diagram illustrating a liquid accommodation container as Embodiment 8.

A4-16. Embodiment 8 of Liquid Accommodation Container:

FIG. 37 is a diagram illustrating liquid accommodation containers 100*g* and 100*h* as Embodiment 8 of the liquid accommodation container. As illustrated in FIGS. 4 to 6, in the liquid accommodation container 100 in the first embodiment, the plurality of terminals 290 and the device 130 are arranged at the base member 120*bd*. The present disclosure is not limited to this. In the liquid accommodation container 100*g*, the plurality of terminals 290 and the device 130 are directly disposed on the second wall 101*wr* of the liquid accommodation body 101 without interposing the base member 120*bd*. The plurality of terminals 290 and the device 130 are electrically coupled to each other by a wiring pattern (not illustrated) or the like. As described above, the liquid accommodation body 101, the plurality of terminals 290, and the device 130 may be integrally configured as the liquid accommodation container 100*g*.

In the liquid accommodation container 100*h*, the plurality of terminals 290 are directly disposed on the second wall 101*wr* of the liquid accommodation body 101 without interposing the base member 120*bd*. The device 130 is arranged at a mounting base member 120*h*, and is provided at the second wall 101*wr* of the liquid accommodation body 101 via the mounting base member 120*h*. The plurality of terminals 290 and the device 130 are electrically coupled to each other by a wiring pattern (not illustrated) or the like. As described above, the liquid accommodation body 101 and the plurality of terminals 290 may be integrally configured as the liquid accommodation container 100*h*, and the device 130 may be separately configured.

Figure 38:
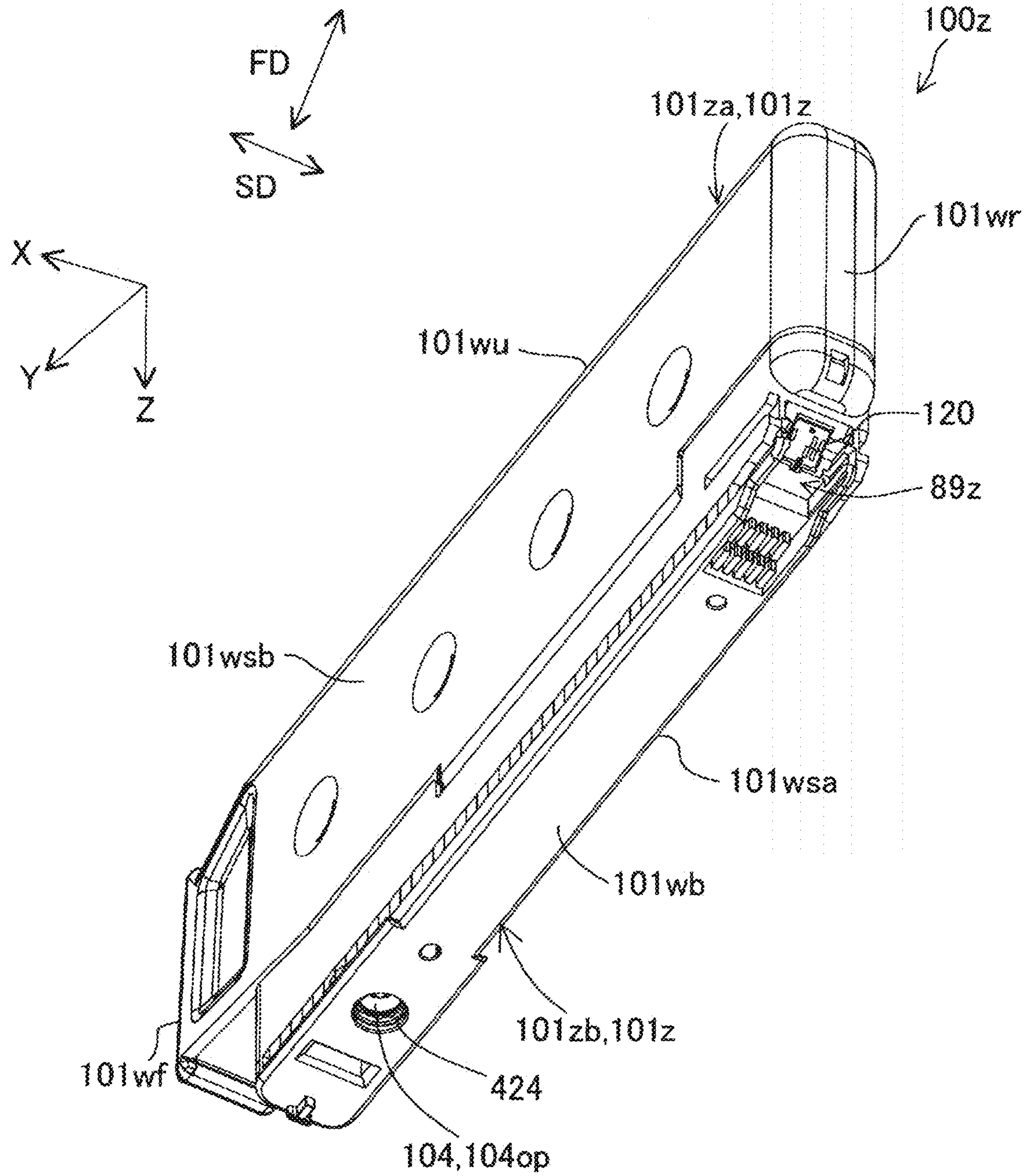
FIG. 38 is a perspective view illustrating a liquid accommodation container as Embodiment 9.
Figure 39:
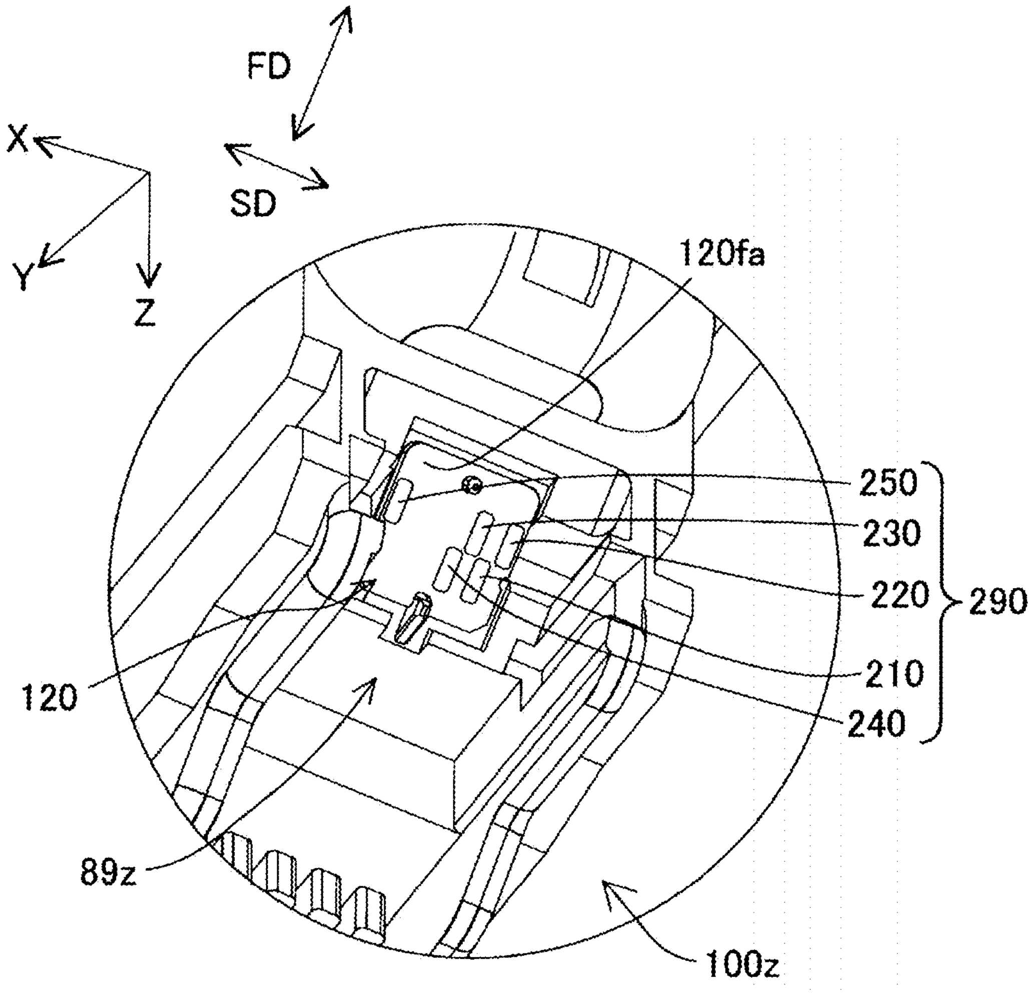
FIG. 39 is an enlarged view illustrating the periphery of the board.

A4-17. Embodiment 9 of Liquid Accommodation Container:

FIG. 38 is a perspective view illustrating a liquid accommodation container 100*z* as Embodiment 9 of the liquid accommodation container. FIG. 39 is an enlarged view illustrating the periphery of the board 120 of the liquid accommodation container 100*z*. XYZ axes illustrated in FIGS. 38 and 39 in Embodiment 9 are based on the state when the liquid accommodation container 100*z* is completely inserted into the accommodation section described later in the printing apparatus. When the liquid accommodation container 100*z* is mounted in the printing apparatus, two mounting operations are performed. In the present embodiment, the first direction FD has a Y-direction component and a Z-direction component, and the second direction SD is the X-direction. As illustrated in FIG. 38, the liquid accommodation container 100*z* includes a liquid accommodation body 101*z*, the liquid supply portion 104 having the liquid supply port 104*op*, and the board 120. The liquid accommodation body 101*z* includes an accommodation main body 101*za* capable of accommodating a liquid and a cover member 101*zb* attached to the accommodation main body 101*za*. The liquid supply portion 104 is arranged at the opening portion 424 formed in the third wall 101*wb* of the liquid accommodation body 101*z* formed by the cover member 101*zb*. The board 120 is provided at a corner portion 89*z* at which the second wall 101*wr* and the third wall 101*wb* of the liquid accommodation body 101*z* intersect with each other. The corner portion 89*z* is a recess portion of the liquid accommodation body 101*z*, which is recessed inward.

As illustrated in FIG. 39, the orientation of the board 120 is different from the orientation in FIG. 5, and the data terminal 210 and the reset terminal 240 are located on the −Z direction side of the clock terminal 220, the power source terminal 230, and the ground terminal 250.

Figure 40:
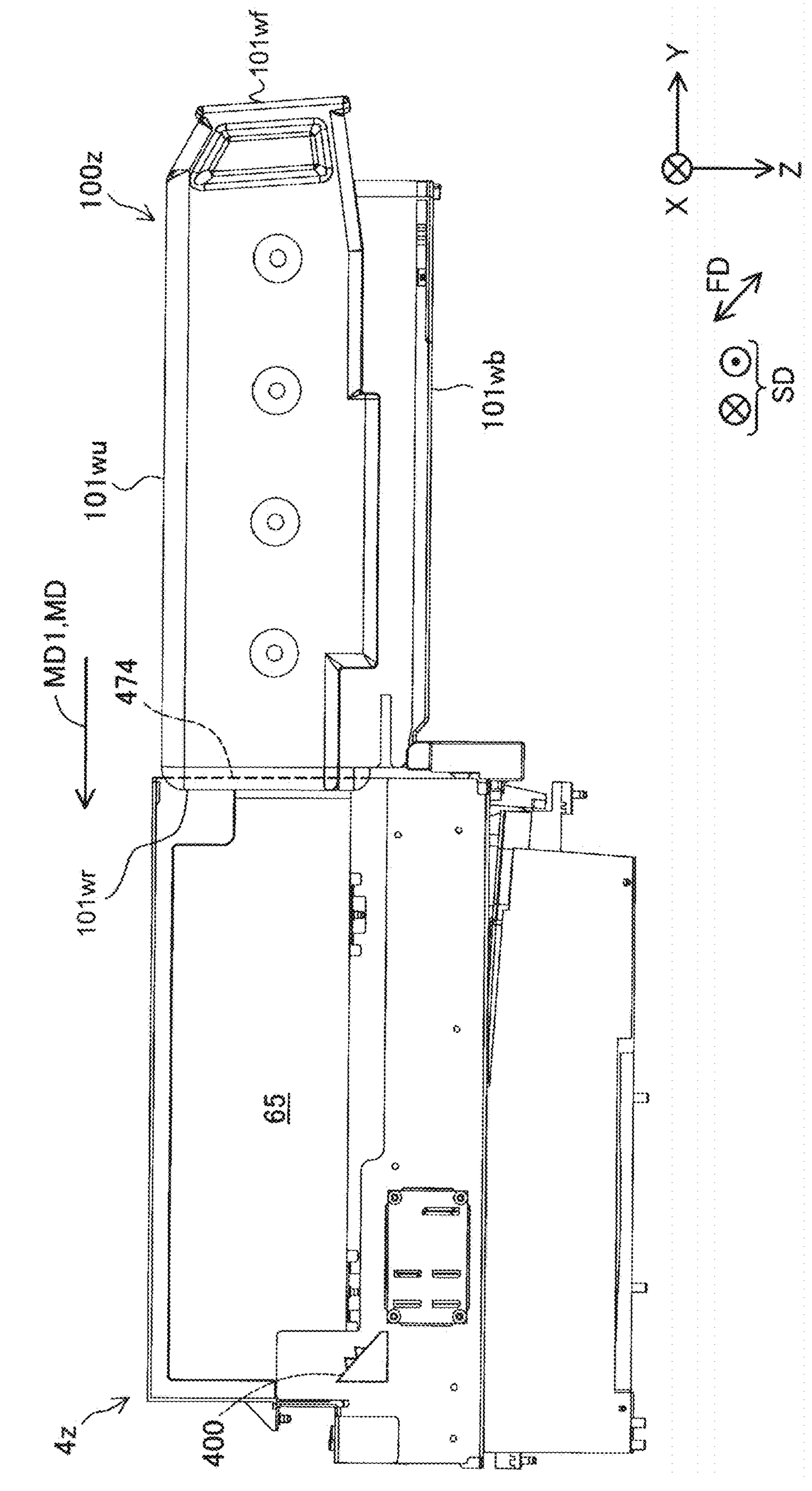
FIG. 40 is a first diagram illustrating a procedure of mounting the liquid accommodation container on an accommodation section of the printing apparatus.
Figure 41:
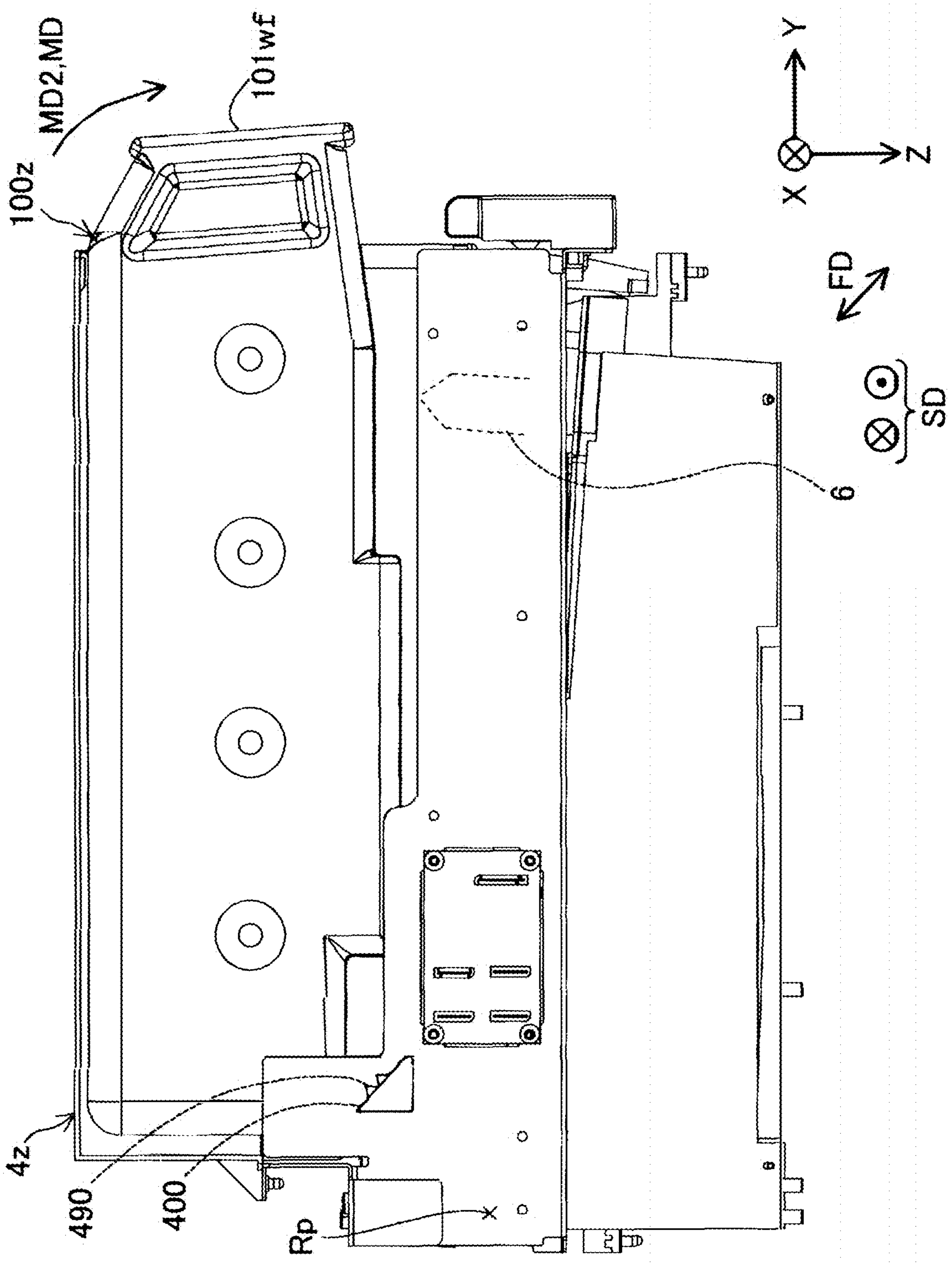
FIG. 41 is a second diagram illustrating the procedure of mounting the liquid accommodation container on the accommodation section of the printing apparatus.
Figure 42:
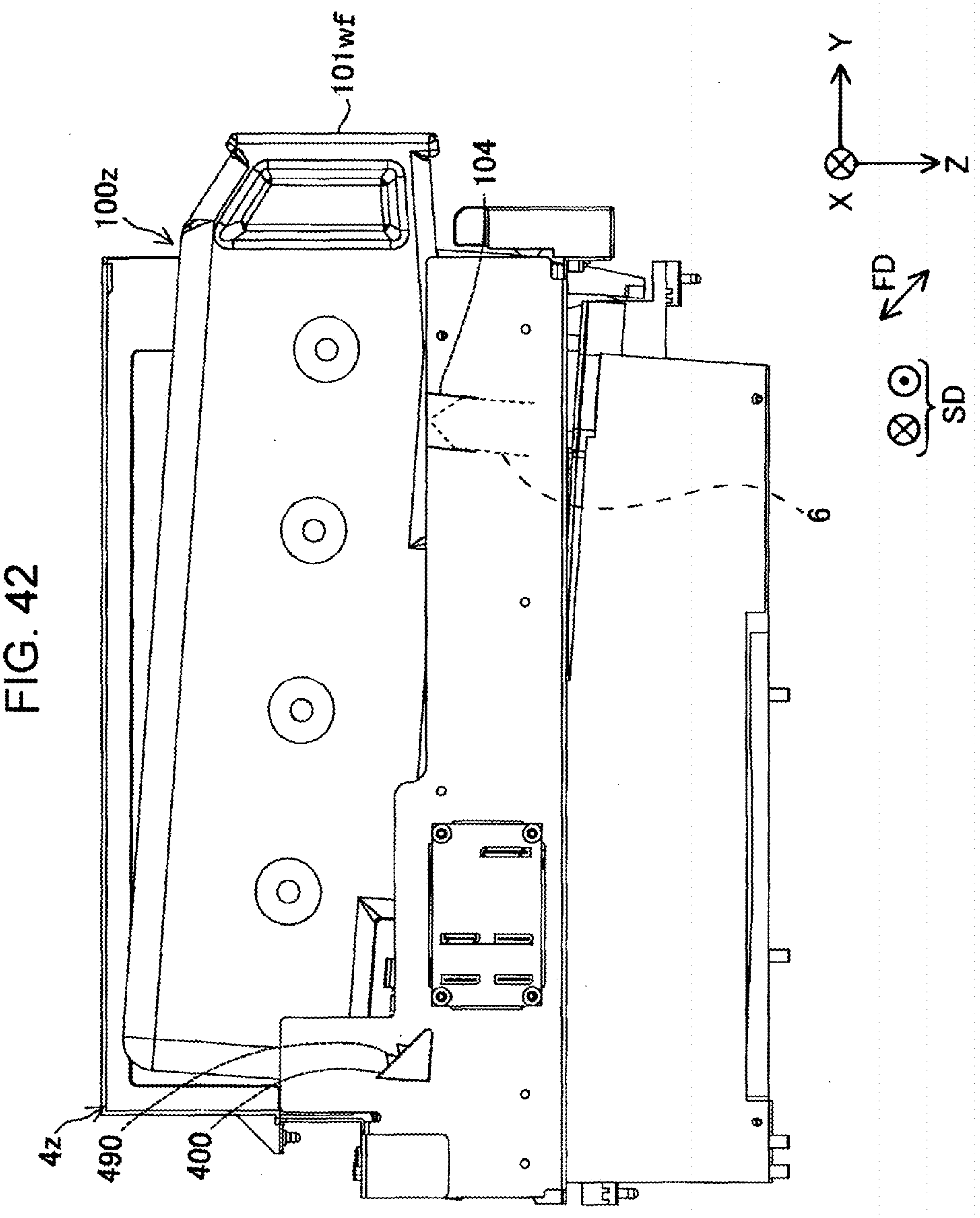
FIG. 42 is a diagram illustrating a state where mounting of the liquid accommodation container is completed.

FIG. 40 is a first diagram illustrating a procedure of mounting the liquid accommodation container 100*z* to an accommodation section 4*z* of the printing apparatus. FIG. 41 is a second diagram illustrating the procedure of mounting the liquid accommodation container 100*z* to the accommodation section 4*z* of the printing apparatus. FIG. 42 is a diagram illustrating the mounting-completed state of the liquid accommodation container 100*z*. The accommodation section 4*z* is arranged at a place different from the printing head (not illustrated). The accommodation section 4*z* and the printing head communicate with each other by a liquid flow tube (not illustrated). The liquid in the liquid accommodation container 100*z* mounted on the accommodation section 4*z* is supplied to the printing head through the liquid flow tube.

As illustrated in FIG. 40, regarding the liquid accommodation container 100*z*, by moving the liquid accommodation container 100*z* in a first mounting direction MD1 being a horizontal direction, the liquid accommodation container 100*z* is inserted into a mounting chamber 65 in the accommodation section 4*z* via an attachment/detachment opening portion 474 of the accommodation section 4*z*. The first mounting direction MD1 is the −Y direction.

As illustrated in FIG. 41, the liquid accommodation container 100*z* is pushed in the first mounting direction MD1, and the contact between the apparatus-side terminal 490 of the coupling mechanism 400 in the accommodation section 4*z* and the terminal 290 of the board 120 is completed. By pushing down the second wall 101*wr* side of the liquid accommodation container 100*z* illustrated in FIG. 41, the liquid accommodation container 100*z* rotates and moves in a second mounting direction MD2 having a gravity direction component, around a rotation fulcrum Rp provided in the accommodation section 4*z*. The second mounting direction MD2 has a +Z direction component and a +Y direction component.

As illustrated in FIG. 42, when the rotational movement of the liquid accommodation container 100*z* in the second mounting direction MD2 is completed, the liquid supply portion 104 of the liquid accommodation container 100*z* is coupled to the liquid introduction portion 6 of the accommodation section 4*z*. In the present embodiment, either of the first mounting direction MD1 and the second mounting direction MD2 is the mounting direction MD.

A4-18. Embodiment 10 of Liquid Accommodation Container:

In the first embodiment and other embodiments, the liquid accommodation container 100 is an ink cartridge, but the present disclosure is not limited to this. The liquid accommodation container 100 may be, for example, a waste liquid accommodation container. The waste liquid accommodation container is, for example, a container that accommodates a waste liquid discharged from the nozzle of the printing head 5 when the printing apparatus 20 performs cleaning of the printing head 5.

Figure 43:
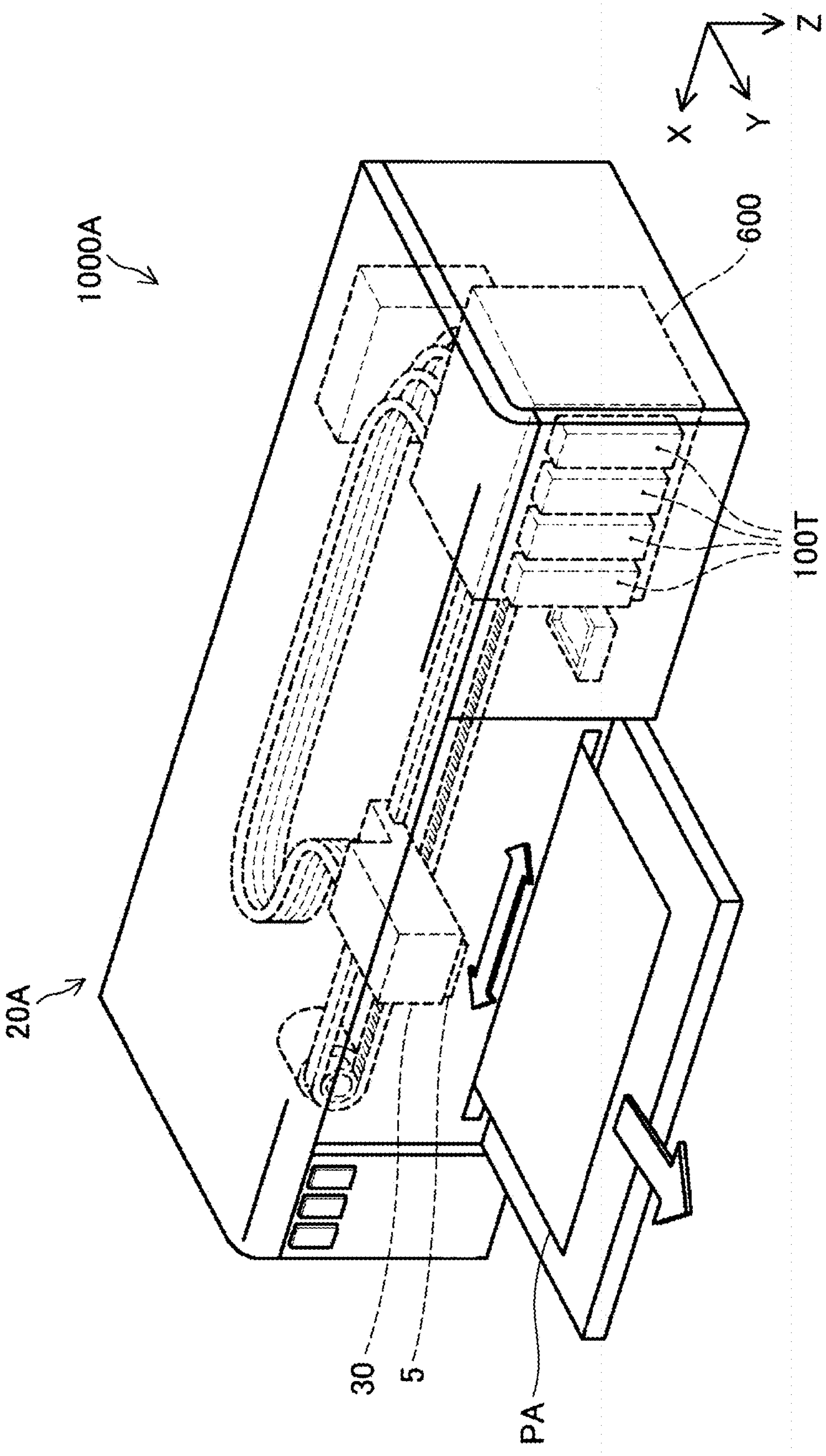
FIG. 43 is a diagram illustrating a printing system as Embodiment 1.

A4-19. Embodiment 1 of Printing System:

The printing system in the present disclosure is not limited to the printing system 1000 illustrated in FIG. 1. FIG. 43 is a diagram illustrating a printing system 1000A as Embodiment 1 of the printing system. In the first embodiment, as illustrated in FIG. 1, a configuration referred to as an on-carriage, in which the liquid accommodation container 100 is mounted on the carriage 30 is made, but the present disclosure is not limited to this. A configuration referred to as an off-carriage, in which the liquid accommodation container 100 is mounted in a place other than the carriage 30 may be made. The printing system 1000A is an off-carriage type printing system, and includes a printing apparatus 20A and a liquid accommodation container 100T. The printing apparatus 20A includes the carriage 30 including the printing head 5. The liquid accommodation container 100T is detachably mounted at a container mounting portion 600 arranged in a place different from the carriage 30. Similar to the liquid accommodation container 100 in the first embodiment, the liquid accommodation container 100T also includes a liquid accommodation body, a liquid accommodation section having an ink supply port, and a board. For example, the liquid accommodation containers 100*q* to 100*x* illustrated in FIGS. 30 to 35 are mounted in the printing apparatus 20A. The printing apparatus 20A executes the coupling state determination processing in the similar manner to the printing apparatus 20.

Figure 44:
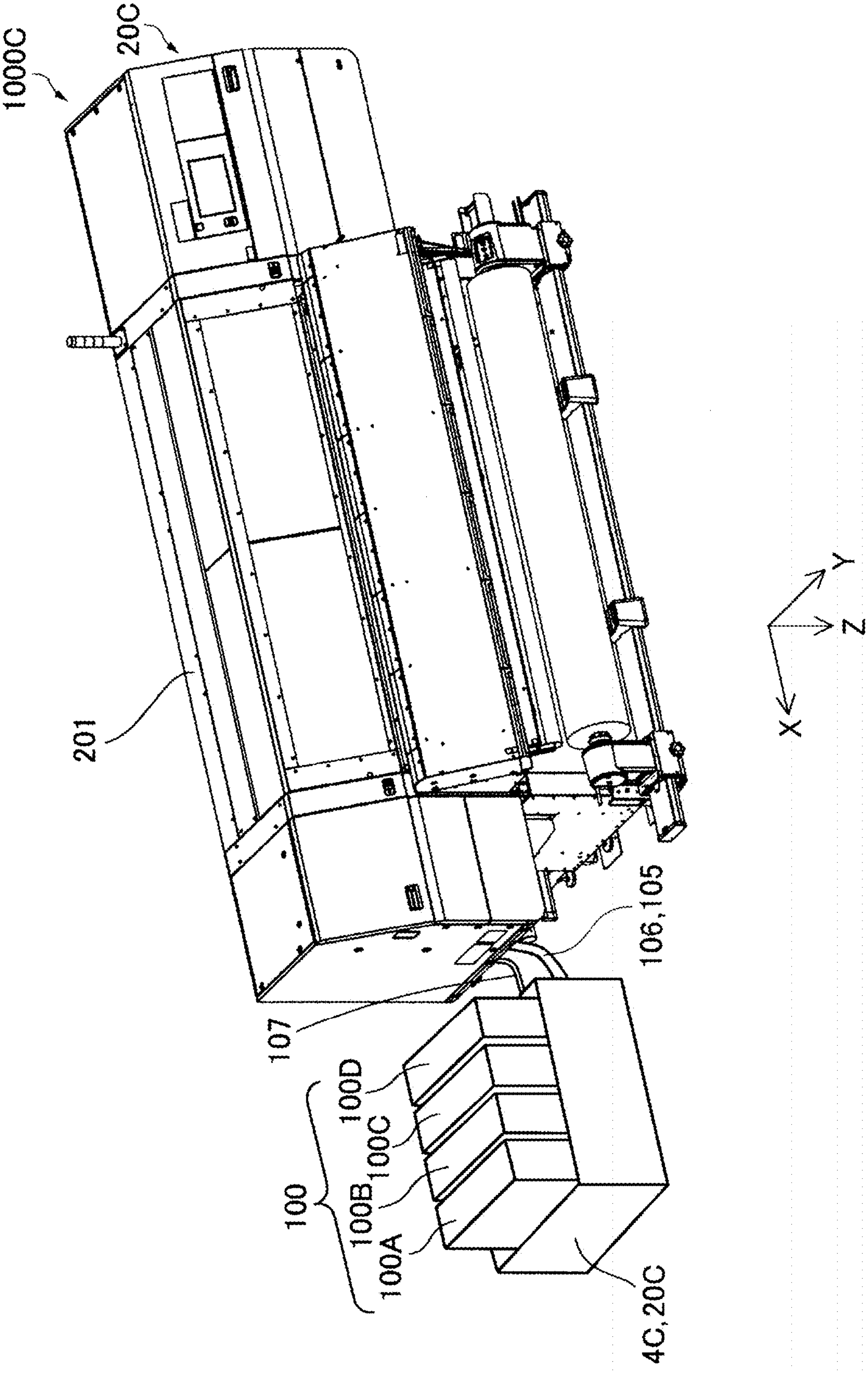
FIG. 44 is a diagram illustrating a printing system as Embodiment 2.

A4-20. Embodiment 2 of Printing System:

FIG. 44 is a diagram illustrating a printing system 1000C as Embodiment 2 of the printing system. In the first embodiment, as illustrated in FIG. 1, the accommodation section 4 on which the liquid accommodation container 100 is detachably mounted is arranged in the main body of the printing apparatus 20, but the position of the accommodation section 4 is not limited to this. In the printing system 1000C illustrated in FIG. 45, an accommodation section 4C of the printing apparatus 20C is arranged outside a main body 201 of the printing apparatus 20C. As illustrated in FIGS. 7A and 7C, the accommodation section 4C includes the liquid introduction portion 6, the coupling mechanism 400, and the sub-control board 500. The liquid introduction portion 6 and the printing head 5 arranged in the main body 201 communicate with each other by a flexible liquid flow tube 105. A plurality of liquid flow tubes 105 are provided corresponding to the number of liquid introduction portions 6. The plurality of liquid flow tubes 105 are accommodated in one protective tube 106. The printing apparatus 20C includes a bus 107 that couples the sub-control board 500 to the main control unit 40 (not illustrated) located in the main body 201 to transmit and receive various signals. Similar to the liquid accommodation container 100 in the first embodiment described above, the liquid accommodation container 100 illustrated in FIG. 44 also includes a liquid accommodation body, a liquid supply portion including a liquid supply port, and a board. The printing apparatus 20C executes the coupling state determination processing in the similar manner to the printing apparatus 20.

Figure 45:
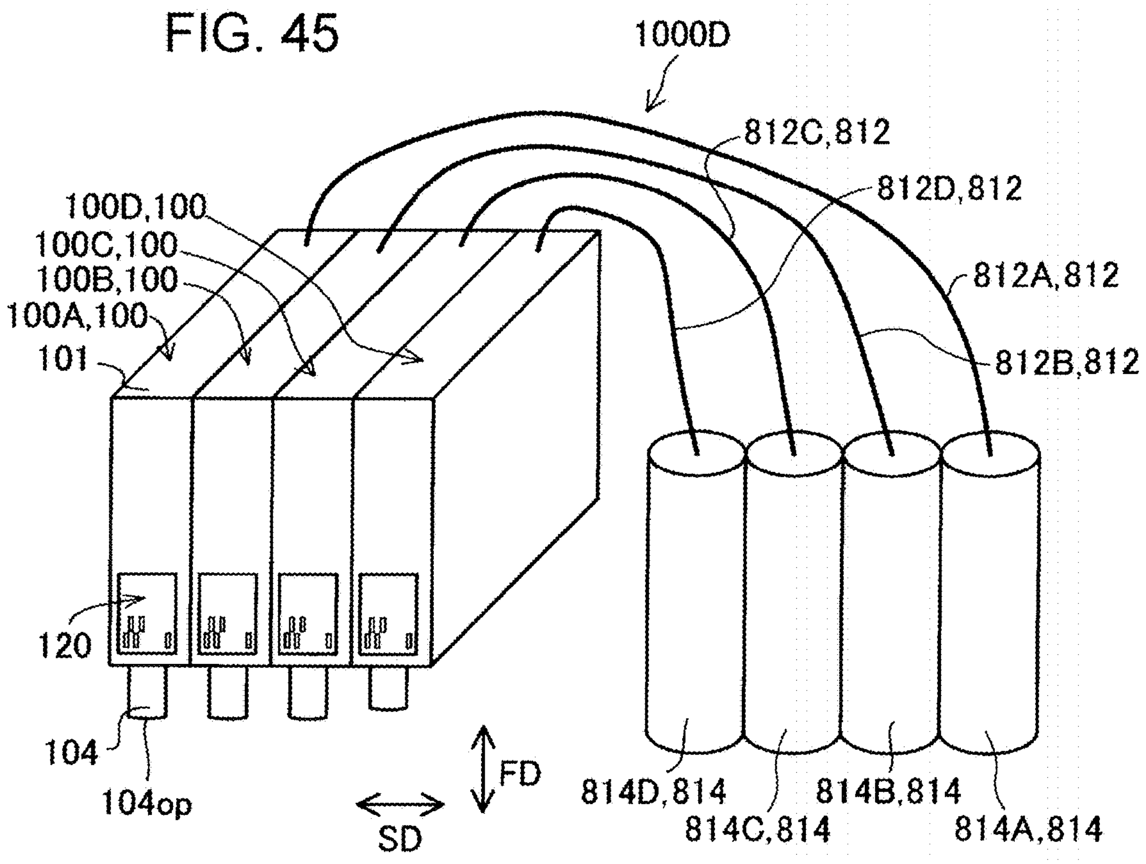
FIG. 45 is a diagram illustrating a printing system as Embodiment 3.

A4-21. Embodiment 3 of Printing System:

FIG. 45 is a diagram illustrating a printing system 1000D as Embodiment 3 of the printing system. The printing system 1000D includes the four liquid accommodation containers 100A, 100B, 100C, 100D and the printing apparatus 20 illustrated in FIG. 1, as in the first embodiment. The liquid accommodation containers 100A to 100D may be integrally formed or may be individually formed. The liquid accommodation containers 100A to 100D are replenished with liquids via an external liquid storage portion 814 and an external liquid flow tube 812, which are arranged outside the printing system 1000D. In FIG. 45, in the liquid storage portion 814 and the liquid flow tube 812, the elements corresponding to the respective liquid accommodation containers 100A to 100D are suffixed with "A" to "D".

Figure 46:
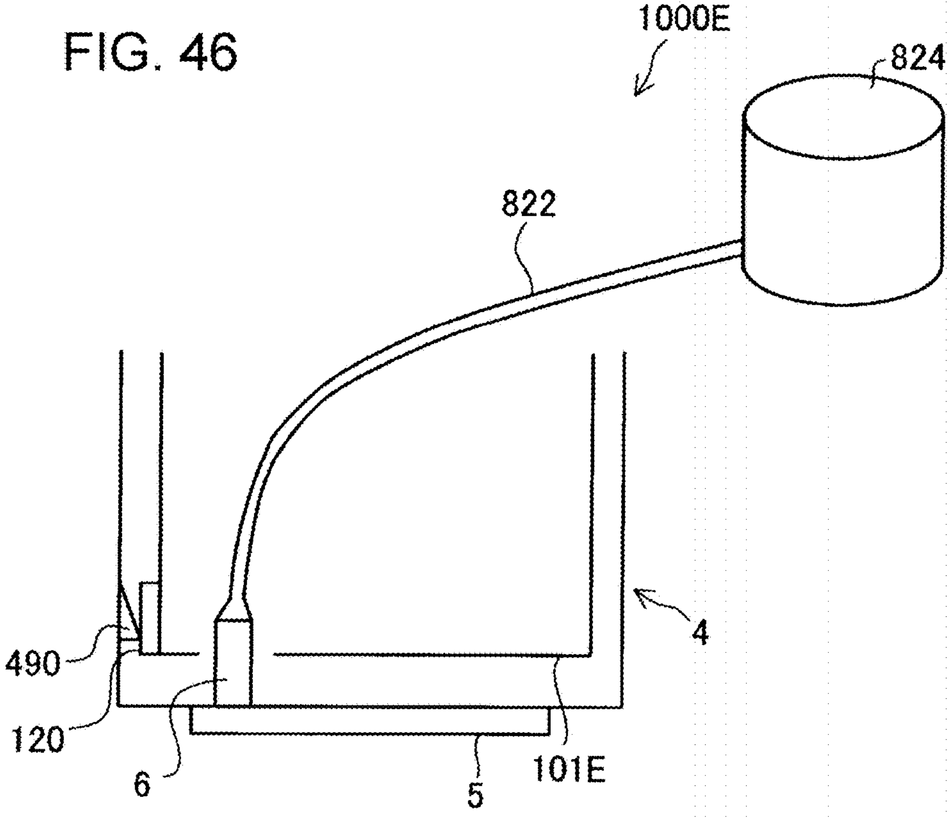
FIG. 46 is a diagram illustrating a printing system as Embodiment 4.

A4-22. Embodiment 4 of Printing System:

FIG. 46 is a diagram illustrating a printing system 1000E as Embodiment 4 of the printing system. The printing system 1000E includes an adapter 101E including the board 120, a liquid accommodation body 824 capable of accommodating a liquid, a liquid flow tube 822, and the printing apparatus 20 illustrated in FIG. 1. The adapter 101E may be detachably mounted on the accommodation section 4. The liquid flow tube 822 couples the liquid accommodation body 824 and the liquid introduction portion 6, and functions as a liquid supply portion. A portion of the liquid flow tube 822, which is coupled to the liquid introduction portion 6, functions as a liquid supply port. Four adapters 101E, four liquid flow tubes 822, and four liquid accommodation bodies 824 are provided. In the printing system 1000E, the "mounting-completed state" means a state in which the adapter 101E including the board 120 is mounted in the printing apparatus 20 and no short circuit occurs between the terminals 290. In the present embodiment, the sentence that "the board 120 is mounted in the printing apparatus 20" means that the board 120 is physically attached to the printing apparatus 20 and the contact portion cp of the terminal 290 is electrically coupled to the apparatus-side terminal 490. The data terminal 210 of the board 120 is used to detect whether or not the board 120 is mounted in the printing apparatus 20. The mounting determination unit 412 of the printing apparatus 20 determines whether or not the board 120 is mounted. The first response signal RT1 and the second response signal RT2 are signals used when the printing apparatus 20 determines that the board 120 is mounted in the printing apparatus 20.

Figure 47A:
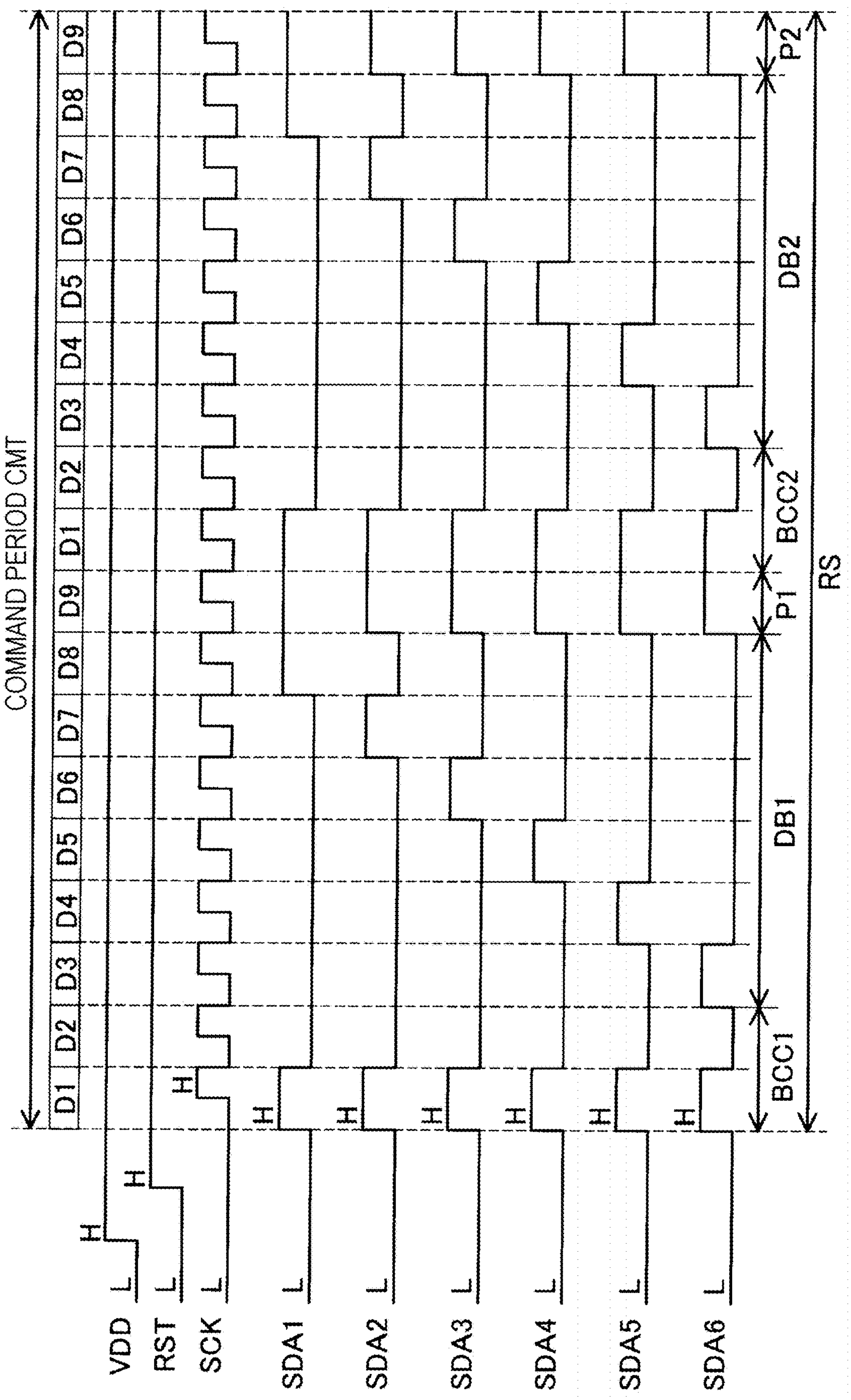
FIG. 47A is a first timing chart in a printing system including six liquid accommodation containers.
Figure 47B:
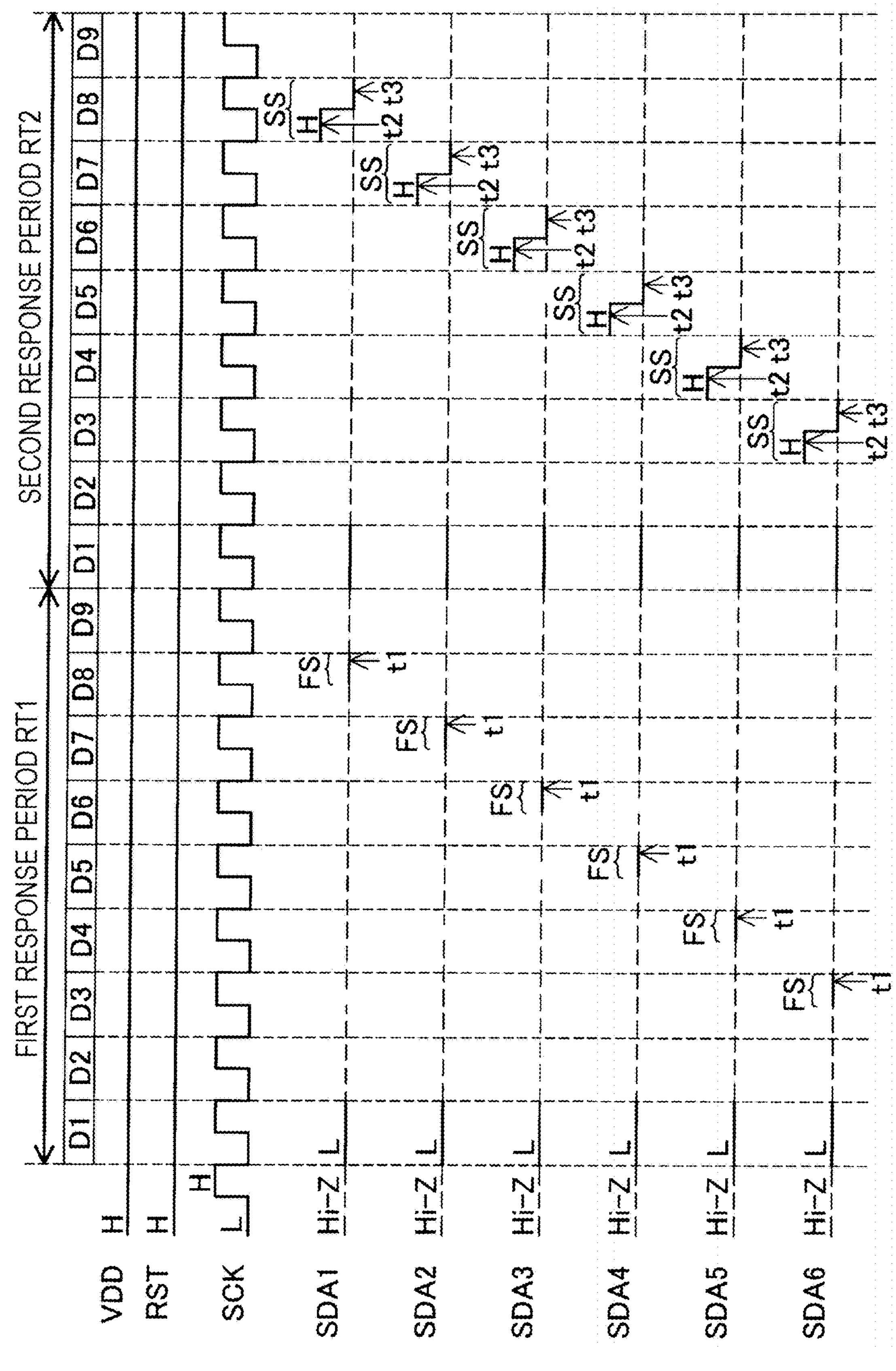
FIG. 47B is a second timing chart in the printing system including the six liquid accommodation containers.

A4-23. Other Embodiments for Electrical Configuration and Software Configuration:

In the first embodiment, as illustrated in FIG. 1, the four liquid accommodation containers 100A to 100D are detachably mounted on the accommodation section 4, but the number of liquid accommodation containers 100 detachably mounted on the accommodation section 4 is not limited to this. A timing chart of the coupling state determination processing in the printing system 1000 in which six liquid accommodation containers 100 are detachably mounted on the accommodation section 4 will be described below with reference to FIGS. 47A and 47B. The six liquid accommodation containers 100 accommodate, for example, inks of different colors. FIGS. 47A and 47B are timing charts schematically illustrating signals input/output to/from the terminals 290 of the liquid accommodation container 100 in the mounting-completed state. FIG. 47A is a first timing chart in the printing system 1000 including six liquid accommodation containers 100A to 100F. FIG. 47B is a second timing chart in the printing system 1000 including the six liquid accommodation containers 100A to 100F. FIG. 47A is a diagram corresponding to FIG. 11A, and FIG. 47B is a diagram corresponding to FIG. 11B. VDD, RST, SCK, and SDA1 to SDA6 illustrated in FIGS. 47A and 47B mean signals transmitted to and received via the corresponding terminal 290 or voltages supplied, by the corresponding lines LVDD, LRST, LSCK, and LSDA1 to LSDA6.

The request signal RS illustrated in FIG. 47A is different from the request signal RS illustrated in FIG. 11A in that bits of the cycles D4 and D3 in the command period CMT illustrated in FIG. 47A are assigned in order to designate the fifth liquid accommodation container 100E and the sixth liquid accommodation container 100F. Regarding the request signal RS transmitted via the data line LSDA5 coupled to a device 130E of the liquid accommodation container 100E, the second bit of the first identification data DB1 is at a high level, and the remaining bits are at a low level. For the request signal RS transmitted via the data line LSDA6 coupled to a device 130F of the liquid accommodation container 100F, the first bit of the first identification data DB1 is at a high level, and the remaining bits are at a low level.

The timing chart illustrated in FIG. 47B is different from the timing chart illustrated in FIG. 11B in that waveforms of the first response signal FS and the second response signal SS corresponding to the liquid accommodation containers 100E and 100F are added. The device 130E of the liquid accommodation container 100E outputs the first response signal FS to the data terminal 210 in the cycle D4 of the first response period RT1, and outputs the second response signal SS to the data terminal 210 in the cycle D4 of the second response period RT2. The device 130F of the liquid accommodation container 100F outputs the first response signal FS to the data terminal 210 in the cycle D3 of the first response period RT1, and outputs the second response signal SS to the data terminal 210 in the cycle D3 of the second response period RT2.

Figure 48:
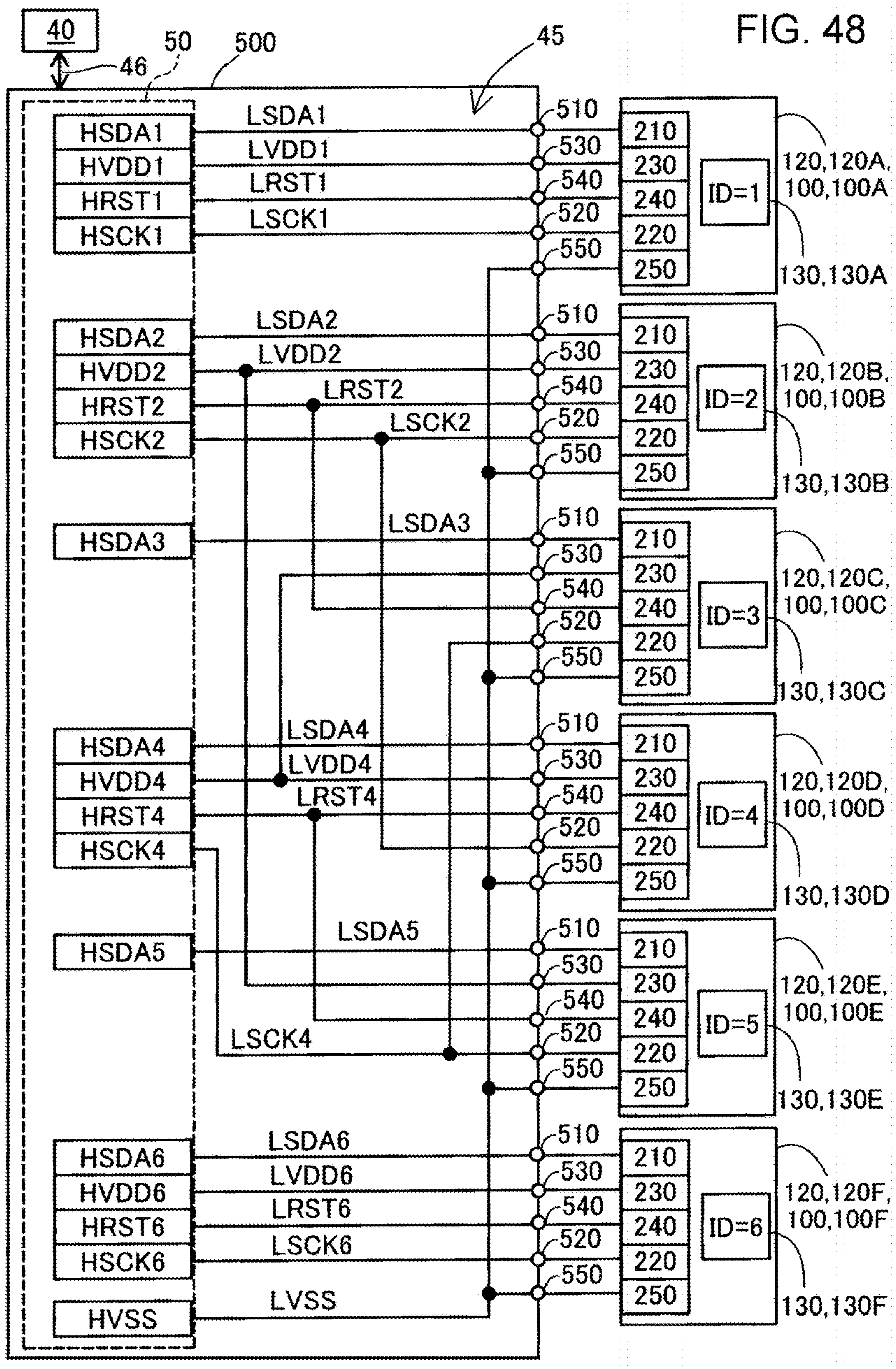
FIG. 48 is a schematic diagram illustrating an electrical configuration of the printing system including the six liquid accommodation containers.

FIG. 48 is a schematic diagram illustrating the electrical configuration of a printing system 1000 including the six liquid accommodation containers 100A to 100F. In FIG. 48, the components similar to the components in the electrical configuration illustrated in FIG. 8 are denoted by the same reference signs, and description thereof will be omitted as appropriate. The electrical configuration in FIG. 48 is different from the electrical configuration in FIG. 8 in that the lines LSDA, LRST, LSCK, and LVDD other than the ground line LVSS are independently provided corresponding to the four liquid accommodation containers 100A to 100D in FIG. 8, but the lines LRST, LSCK, and LVDD other than the data line LSDA are commonly used by a plurality of devices 130 in FIG. 48. Also in FIG. 48, the ground line LVSS is commonly used by the devices 130A to 130F of the six liquid accommodation containers 100A to 100F.

As illustrated in FIG. 48, a power source line LVDD2 electrically coupled to a host terminal HVDD2 of the sub-control unit 50 is electrically coupled to the two devices 130B and 130E in the mounting-completed state. A reset line LRST2 electrically coupled to a host terminal HRST2 of the sub-control unit 50 is electrically coupled to the two devices 130B and 130C in the mounting-completed state. A clock line LSCK2 electrically coupled to a host terminal HSCK2 of the sub-control unit 50 is electrically coupled to the two devices 130B and 130D in the mounting-completed state. A power source line LVDD4 electrically coupled to a host terminal HVDD4 of the sub-control unit 50 is electrically coupled to the two devices 130C and 130D in the mounting-completed state. A reset line LRST4 electrically coupled to a host terminal HRST4 of the sub-control unit 50 is electrically coupled to the two devices 130D and 130E in the mounting-completed state. A clock line LSCK4 electrically coupled to a host terminal HSCK4 of the sub-control unit 50 is electrically coupled to the two devices 130C and 130E in the mounting-completed state. The lines LSDA1, LVDD1, LRST1, and LSCK1 electrically coupled to the device 130A and the lines LSDA6, LVDD6, and LRST6, LSCK6 electrically coupled to the device 130F are independently used without being used in combination with other devices 130.

Regarding the electrical configuration of the printing system 1000 illustrated in FIG. 48, a partial configuration may be applied to the printing system 1000 illustrated in FIG. 1, that includes the four liquid accommodation containers 100A to 100D. For example, the liquid accommodation containers 100B to 100E illustrated in FIG. 48 may be replaced with the liquid accommodation containers 100A to 100D of the printing system 1000 illustrated in FIG. 1. For example, the liquid accommodation containers 100A, 100B, 100E, and 100F illustrated in FIG. 48 may be replaced with the liquid accommodation containers 100A to 100D of the printing system 1000 illustrated in FIG. 1.

Figure 49:
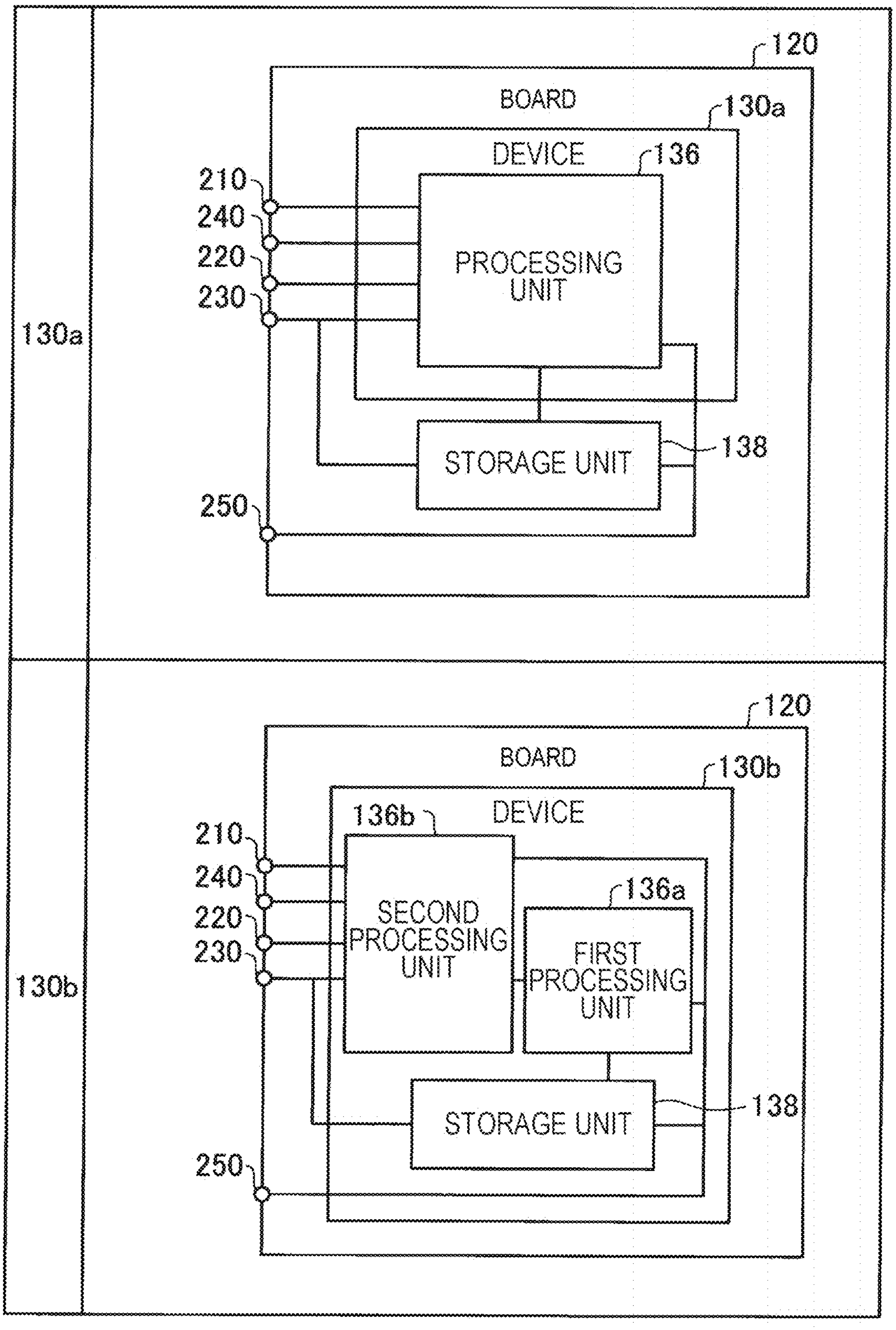
FIG. 49 is a diagram illustrating a device as Embodiment 1.

A4-24. Embodiment 1 for Device:

In the first embodiment, as illustrated in FIG. 6, the device 130 includes the processing unit 136 and the storage unit 138, but the present disclosure is not limited to this. FIG. 49 is a diagram illustrating devices 130*a* and 130*b* as Embodiment 1 for the device 130. The device 130*a* includes the processing unit 136, but does not include the storage unit 138. The storage unit 138 and the device 130 may be separately provided. In this case, the storage unit 138 is electrically coupled to the processing unit 136 of the device 130*b*. The device 130*b* includes a first processing unit 136*a*, a second processing unit 136*b*, and the storage unit 138. The first processing unit 136*a* is coupled to the storage unit 138. The second processing unit 136*b* is coupled to the first processing unit 136*a* and the terminals 210 to 250. In such a form, the first processing unit 136*a* and the second processing unit 136*b* function as the processing unit as a whole. As described above, the device 130*b* may include a plurality of processing units 136*a* and 136*b*.

A4-25. Embodiment 2 for Device:

In the first embodiment, as illustrated in FIG. 11C, the first response signal FS is output in the entire period in which the clock signal SCK is at a high level, but the present disclosure is not limited to this. For example, the device 130 may output the first response signal FS to the data terminal 210 in a portion of the period in which the clock signal SCK is at a high level. For example, the device 130 may output the first response signal FS and then set the drive state of the data terminal 210 to the high impedance, in the period in which the clock signal SCK is at a high level. For example, the device 130 may output the first response signal FS containing a low level, in the period in which the clock signal SCK is at a low level and in the period in which the clock signal SCK is at a high level in one cycle of the clock signal SCK.

A4-26. Embodiment 3 for Device:

In the first embodiment, the frequency of the clock signal SCK is constant in the coupling state determination processing, as illustrated in FIGS. 11A and 11B, but may not be constant. For example, the frequency of the clock signal SCK in the second response period RT2 may be set to be lower than the frequency of the clock signal SCK in the first response period RT1. The second response signal SS includes different voltages. In the second response period RT2, the frequency of the clock signal SCK may be set to be lower than the frequency in the first response period RT1, and the second response signal SS may be output in a period longer than a period for the first response signal FS.

A4-27. Embodiment 4 for Device:

In the first embodiment, the processing unit 136 of the device 130 may repeatedly output the first response signal FS and the second response signal SS in a manner that the first response period RT1 FS and the second response period RT2 are repeatedly provided in this order during a period in which the reset signal RST is at a high level. When the processing unit 136 outputs a low level voltage in the second response signal SS to the data terminal 210, and then the request signal RS is input again to the data terminal 210, the processing unit 136 of the device 130 may output the first response signal FS and the second response signal SS to the data terminal 210.

A4-28. Embodiment 5 for Device:

In the first embodiment, as illustrated in FIG. 11B, timings of the rising edge and the falling edge of the clock signal SCK are the same as timings of the rising edge and the falling edge of the signal such as the first response signal FS in the first response period RT1 and the signal such as the second response signal SS in the second response period RT2. The present disclosure is not limited to this. For example, the timings of the rising edge and the falling edge of the signal such as the first response signal FS in the first response period RT1 and the signal such as the second response signal SS in the second response period RT2 may be delayed from the timings of the rising edge and the falling edge of the clock signal SCK.

A4-29. Embodiment 6 for Device:

In the first embodiment, the processing units 136A to 136D of the devices 130A to 130D output the first response signal FS and the second response signal SS to the data terminal 210 at different cycles of the clock signal SCK. The present disclosure is not limited to this. For example, the processing units 136A to 136D of the devices 130A to 130D may output the first response signal FS and the second response signal SS at the same cycle of the clock signal SCK. In the coupling state determination processing, the printing apparatus 20 transmits and receives signals via the individual data lines LSDA1 to LSDA4 electrically coupled to the devices 130A to 130D, respectively. Therefore, even though the first response signal FS and the second response signal SS are output to the data terminal 210 from the devices 130A to 130D in the same cycle in the first response period RT1 and the second response period RT2, the sub-control unit 50 of the printing apparatus 20 is able to detect the voltage output from the data terminal 210 at each of the first timing t1 to the third timing t3. In this case, the request signal RS is set to a high level at the corresponding bit in the command period CMT.

For example, the processing units 136A to 136D of the devices 130A to 130D may output the first response signal FS and the second response signal SS to the data terminal 210 in all of the cycles D3 to D8 of the first response period RT1 and the second response period RT2. In this case, the first timing t1 may be provided in all of the cycles D3 to D8 of the first response period RT1. The second timing t2 and the third timing t3 may be provided in all of the cycles D3 to D8 of the second response period RT2.

A4-30. Embodiment 7 for Device:

In the first embodiment, the processing units 136A to 136D of the devices 130A to 130D output the first response signal FS and the second response signal SS to the data terminal 210 in the cycles D8 to D5 of the first response period. The present disclosure is not limited to this. For example, the processing units 136A to 136D of the devices 130A to 130D may output the first response signal FS and the second response signal SS to the data terminal 210 in the cycles D5 to D8 of the first response period. In this case, the request signal RS is set to a high level at the corresponding bit in the command period CMT.

A4-31. Embodiment 8 for Device:

In the first embodiment, the device 130 is configured such that the request signal RS is input to the data terminal 210 and the first response signal FS and the second response signal SS are output to the data terminal 210. The terminal to which the request signal RS is input may be a terminal other than the data terminal 210. Similarly, the terminal that outputs the first response signal FS and the second response signal SS may be a terminal other than the data terminal 210. In this case, the device 130 is coupled to such a terminal.

B. Other Embodiments

The present disclosure is not limited to the above embodiments, and may be realized in various configurations without departing from the spirit thereof. For example, the technical features in the embodiments corresponding to the technical features in each form described below may be appropriately replaced and combined in order to solve some or all of the above problems or to achieve some or all of the above objects. The technical features can be appropriately deleted so long as the technical features are not described as being essential in the present specification. Each form as follows does not need to have all the configurations in the present disclosure. In some aspects, each form as follows may have a minimum configuration for solving at least one of the above problems or achieving at least one of the above objects. Unless otherwise stated, the effect corresponding to one form is independent of the effect corresponding to the other form. In the combined form, the effect corresponding to the combined form is exhibited.

1. According to a first aspect of the present disclosure, there is provided a board that is mounted in a printing apparatus and is configured to come into contact with a plurality of apparatus-side terminals. The printing apparatus includes a printing head, a liquid introduction portion that introduces a liquid to the printing head, an accommodation section that accommodates a liquid accommodation container provided with the liquid introduction portion, and the plurality of apparatus-side terminals provided at the accommodation section. The board includes a base member, a device provided at the base member, and a plurality of terminals provided at the base member. The plurality of terminals include at least a first terminal, a second terminal, a third terminal, a fourth terminal, and a fifth terminal. The first terminal is coupled to the device and includes a first contact portion that is to come into contact with a corresponding first apparatus-side terminal among the plurality of apparatus-side terminals, the second terminal is coupled to the device and includes a second contact portion that is to come into contact with a corresponding second apparatus-side terminal among the plurality of apparatus-side terminals, the third terminal is coupled to the device and includes a third contact portion that is to come into contact with a corresponding third apparatus-side terminal among the plurality of apparatus-side terminals, the fourth terminal is coupled to the device and includes a fourth contact portion that is to come into contact with a corresponding fourth apparatus-side terminal among the plurality of apparatus-side terminals, and the fifth terminal is coupled to the device and includes a fifth contact portion that is to come into contact with a corresponding fifth apparatus-side terminal among the plurality of apparatus-side terminals. The first terminal is used to detect whether or not the first terminal has a short circuit with at least one of the second terminal, the third terminal, and the fourth terminal. In a plan view, when two orthogonal straight lines are set as a first virtual line and a second virtual line, and all contact portions of all the terminals provided at the base member are projected onto the second virtual line, all the contact portions are projected at different positions, and the first virtual line passes through a middle between two projection positions that are farthest from each other among projection positions of all the contact portions. When one region with respect to the first virtual line is set as a first region and the other region is set as a second region, some contact portions among all the contact portions are arranged in the first region, remaining contact portions are arranged in the second region, the some contact portions include the first contact portion, the second contact portion, the third contact portion, and the fourth contact portion, and the remaining contact portions include the fifth contact portion. The some contact portions and the remaining contact portions are asymmetrically arranged with respect to the first virtual line.

Foreign matters tend to be collected at the contact portion of the terminal. For example, foreign matters may be caught between the apparatus-side terminal and the terminal. For example, when the terminal of the board is arranged on a plane including the gravity direction component, and foreign matters enter toward the board from the upper side in the gravity direction, the foreign matters may be trapped and stay in the contact portion of the terminal. For example, when the foreign matter is a liquid, the liquid tends to be collected at the contact portion of the terminal by an influence of the capillary force. Thus, by defining the arrangement of the contact portion of the terminal instead of the arrangement of the terminal, it is possible to suppress a possibility of the occurrence of a short circuit regardless of the area, the shape, and the like of the terminal. In the present aspect, in the board, the first contact portion, the second contact portion, the third contact portion, and the fourth contact portion are arranged in the first region, and a fifth contact portion desired to suppress an occurrence of a short circuit with another contact portion is arranged in the second region. By disposing the contact portions in this manner, it is possible to suppress the possibility of the occurrence of a short circuit. The reason is that the fifth contact portion is separated from the contact portions of the other terminals and the distance from the other contact portions is secured. Thus, it is possible to suppress a possibility of the occurrence of a short circuit between the fifth contact portion and the other contact portion. Although foreign matters tend to be collected near the contact portion, the foreign matter collected at the fifth contact portion is less likely to reach the contact portions of the other terminals in comparison to a case where the fifth contact portion and the other contact portions are arranged at a short distance, because the distance between the fifth contact portion and the other contact portion is secured. Further, foreign matters collected in the first contact portion to the fourth contact portion are less likely to reach the contact portion of the fifth terminal. This is similar regardless of the area or the shape of the terminal. Examples of the foreign matters include conductive liquids such as ink and pet urine, and conductive solids such as wires, staples, and mechanical pencil leads. Regardless of the degree of a possibility that the foreign matters actually appear, there is a possibility of the occurrence of a short circuit due to foreign matters unless the possibility is zero. In the present aspect, it is possible to suppress such a possibility.

Among the plurality of terminals, there is a contact portion desired to be arranged apart from other contact portions in order to suppress the occurrence of a short circuit between the terminals. When the fifth contact portion is set as the contact portion desired to be separated, the first to fourth contact portions are arranged in the first region being one of regions with respect to the first virtual line, and the fifth contact portion is arranged in the second region being the other region. That is, the contact portion in the first region and the contact portion in the second region are arranged at the base member to be asymmetric with respect to the first virtual line.

In the present aspect, all the contact portions are arranged to be projected at different positions in the direction along the second virtual line. When the direction of the first virtual line includes the mounting direction, and foreign matters are provided, the foreign matters are dragged by the apparatus-side terminal in the procedure of mounting the liquid accommodation container in the printing apparatus, and thus there is a possibility of a short circuit occurring between the terminals. By arranging all the contact portions at the base member so that all the contact portions are projected at different positions when all the contact portions are projected onto the second virtual line, it is possible to suppress the possibility of the occurrence of a short circuit. When focusing on the first contact portion, no contact portion other than the first contact portion is located on a straight line along the first virtual line passing through the first contact portion. The contact portion other than the first contact portion is located in the direction along the second virtual line. Such a positional relation is similar to the contact portions other than the first contact portion. Therefore, the probability that a short circuit occurs in the direction including the direction along the second virtual line is higher than the probability that a short circuit occurs in the direction along the first virtual line. By defining the arrangement of the contact portions in the direction along the second virtual line, it is possible to suppress the possibility of the occurrence of a short circuit. Alternatively, by arranging all the contact portions at the base member to be projected at different positions on the second virtual line, it is possible to secure the gap between the contact portions in the direction along the second virtual line on the base member. Therefore, it is possible to suppress the possibility of the occurrence of a short circuit between the terminals.

2. In the above aspect, at least one of the second contact portion, the third contact portion, and the fourth contact portion may be arranged to be projected between a projection position of the first contact portion and a projection position of the fifth contact portion. According to this aspect, since at least one of the second contact portion, the third contact portion, and the fourth contact portion is arranged to be projected between the projection position of the first contact portion and the projection position of the fifth contact portion, a predetermined gap is generated between the first contact portion and the fifth contact portion in the direction along the second virtual line. Thus, it is possible to set the first contact portion and the fifth contact portion to be relatively separated in the direction along the second virtual line, and thus it is possible to suppress the possibility of the occurrence of a short circuit between the first terminal and the fifth terminal.

3. In the above aspect, any two or more of the second contact portion, the third contact portion, and the fourth contact portion may be arranged to be projected between a projection position of the first contact portion and a projection position of the fifth contact portion. According to this aspect, two or more of the other contact portions are arranged between the projection positions of the first contact portion and the fifth contact portion on the second virtual line, so that a predetermined gap is generated between the first contact portion and the fifth contact portion in the direction along the second virtual line. Thus, it is possible to set the first contact portion and the fifth contact portion to be relatively separated in the direction along the second virtual line, and thus it is possible to more suppress the possibility of the occurrence of a short circuit between the first terminal and the fifth terminal.

4. In the above aspect, the first contact portion may be arranged to be projected between the projection positions of any two contact portions of the second contact portion, the third contact portion, and the fourth contact portion. According to this aspect, the first contact portion is arranged to be projected between the projection positions of any two contact portions among the second contact portion, the third contact portion, and the fourth contact portion, so that a predetermined gap is generated between the contact portions arranged to sandwich the first contact portion, in the direction along the second virtual line. Thus, it is possible to set the contact portions to be relatively separated in the direction along the second virtual line, and thus it is possible to more suppress the possibility of the occurrence of a short circuit between the terminals having such contact portions.

5. In the above aspect, the first contact portion may be a data contact portion, and the first terminal may be a data terminal. The second contact portion may be a clock contact portion, and the second terminal may be a clock terminal. The third contact portion may be a reset contact portion, and the third terminal may be a reset terminal. The fourth contact portion may be a power-source contact portion, and the fourth terminal may be a power source terminal. The fifth contact portion may be a ground contact portion, and the fifth terminal may be a ground terminal. According to this aspect, it is possible to suppress a possibility of an occurrence of a short circuit of the ground terminal with the data terminal, the clock terminal, the reset terminal, and the power source terminal.

6. In the above aspect, any one or both of the data contact portion and the reset contact portion may be arranged to be projected between a projection position of the power-source contact portion and a projection position of the clock contact portion, and the reset contact portion may be arranged to have a projection position that is next to the projection position of the power-source contact portion. A period in which the clock signal is at a low level is longer than a period in which the reset signal is at a low level. That is, a load applied to the device when the power source terminal and the clock terminal have a short circuit is larger than a load applied to the board when the power source terminal and the reset terminal have a short circuit. Thus, it is preferable to suppress the occurrence of a short circuit between the power source terminal and the clock terminal rather than the occurrence of a short circuit between the power source terminal and the reset terminal. According to this aspect, a predetermined gap is generated between the power-source contact portion and the clock contact portion in the direction along the second virtual line. As a result, it is possible to set the power-source contact portion and the clock contact portion to be relatively separated in the direction along the second virtual line, and thus it is possible to more suppress the possibility of the occurrence of a short circuit between the power source terminal and the clock terminal. It is possible to relatively suppress the load applied to the board when a short circuit occurs.

7. In the above aspect, the power-source contact portion may be arranged to have the projection position that is next to the projection position of the data contact portion. According to this aspect, the drive power of the power source terminal is higher than the drive power of the data terminal. When the data terminal has a short circuit with the power source terminal, the voltage of the data terminal tends to increase. By using the contact portion next to the data contact portion as the power-source contact portion in the direction along the second virtual line, it is possible to rapidly detect the occurrence of a short circuit even when the data terminal and the power source terminal have a short circuit.

8. In the above aspect, the clock contact portion may be arranged to be projected at a position that is farthest from the projection position of the ground contact portion, and the data contact portion, the power-source contact portion, and the reset contact portion may be arranged to be projected in order in a direction from the projection position of the clock contact portion toward the projection position of the ground contact portion on the second virtual line. According to this aspect, the above-described effect is exhibited.

9. In the above aspect, a distance between the data contact portion and the ground contact portion may be longer than a distance between the data contact portion and the clock contact portion. According to this aspect, it is possible to suppress the possibility of an occurrence of a short circuit between the data terminal and the ground terminal rather than the possibility of the occurrence of a short circuit between the data terminal and the clock terminal.

10. In the above aspect, the distance between the data contact portion and the ground contact portion may be longer than the distance between the data contact portion and the reset contact portion. According to this aspect, it is possible to suppress the possibility of an occurrence of a short circuit between the data terminal and the ground terminal rather than the possibility of the occurrence of a short circuit between the data terminal and the reset terminal.

11. In the above aspect, the distance between the data contact portion and the ground contact portion may be longer than the distance between the data contact portion and the power-source contact portion. According to this aspect, it is possible to suppress the possibility of an occurrence of a short circuit between the data terminal and the ground terminal rather than the possibility of the occurrence of a short circuit between the data terminal and the power source terminal.

12. In the above aspect, when a gap of a contact portion projected at a position farthest from a projection position of the ground contact portion when projection onto the second virtual line is performed, among contact portions other than the ground contact portion in the first region, from the ground contact portion provided in the second region in a direction along the second virtual line is set as Wa, a gap of a contact portion projected at a position closest to the projection position of the ground contact portion when projection onto the second virtual line is performed, among contact portions other than the ground contact portion in the first region, from the ground contact portion provided in the second region in the direction along the second virtual line may be equal to or more than Wa/2. According to this aspect, it is possible to maintain a gap of Wa/2 or more between the contact portion located closest to the ground contact portion in the first region and the ground contact portion, in the direction along the second virtual line. Thus, it is possible to suppress a possibility of an occurrence of a short circuit between the ground terminal and the terminal other than the ground terminal.

13. In the above aspect, there may be no other contact portion between a contact portion projected at a position closest to a projection position of the ground contact portion when projection onto the second virtual line is performed, among contact portions other than the ground contact portion in the first region, and the ground contact portion provided in the second region. According to this aspect, since there is no other contact portion between the contact portion located closest to the ground contact portion in the first region and the ground contact portion, it is possible to suppress the possibility of the occurrence of a short circuit between the ground terminal and the terminal other than the ground terminal.

14. In the above aspect, there may be no other contact portion on a virtual line segment connecting the data contact portion and the clock contact portion. According to this aspect, even when the data terminal and the clock terminal have a short circuit, it is possible to detect the occurrence of a short circuit at an early stage.

15. In the above aspect, there may be no other contact portion on a virtual line segment connecting the data contact portion and the reset contact portion. According to this aspect, even when the data terminal and the reset terminal have a short circuit, it is possible to detect the occurrence of a short circuit at an early stage.

16. In the above aspect, there may be no other contact portion on a virtual line segment connecting the data contact portion and the power-source contact portion. According to this aspect, even when the data terminal and the power source terminal have a short circuit, it is possible to detect the occurrence of a short circuit at an early stage.

17. In the above aspect, when the board may be mounted in a direction along a gravity direction, the clock contact portion, the power-source contact portion, and the reset contact portion may be arranged closer in the gravity direction than the data contact portion, and at least one of the clock contact portion, the power-source contact portion, and the reset contact portion may be arranged to be projected between a projection position of the data contact portion and a projection position of the ground contact portion. According to this aspect, when a foreign matter such as a highly conductive liquid falls in the gravity direction, before the data terminal and the ground terminal have a short circuit, the data terminal has a short circuit with any of the terminals having the plurality of contact portions other than the data contact portion. Thus, it is possible to detect the occurrence of a short circuit between the data terminal and the terminal having the other contact portion and to suppress the possibility of the occurrence of a short circuit between the data terminal and the ground terminal.

18. In the above aspect, the clock contact portion, the data contact portion, the power-source contact portion, the reset contact portion, and the ground contact portion may be arranged to form a plurality of rows. According to this aspect, it is possible to arrange the contact portions in a limited region with high efficiency.

19. In the above aspect, the plurality of rows may include two rows, and two contact portions on the base member, which are projected to be next to each other when projection onto the second virtual line is performed, may form different rows. According to this aspect, it is possible to arrange the contact portions in a limited region with high efficiency.

20. In the above aspect, the data contact portion and the ground contact portion may be arranged in different rows, and any one of the clock contact portion, the power-source contact portion, and the reset contact portion may be arranged to be projected between a projection position of the data contact portion and a projection position of the ground contact portion. According to this aspect, by arranging the ground contact portion and the data contact portion in different rows and arranging another contact portion between the ground contact portion and the data contact portion, it is possible to suppress the possibility of the occurrence of a short circuit between the data terminal and the power source terminal. Even when the data terminal has a short circuit with the terminal including the other contact portion, it is possible to easily detect the occurrence of a short circuit.

21. In the above aspect, the first terminal may be further used to detect whether or not the board is mounted in the printing apparatus. According to this aspect, it is possible to detect whether or not the board is mounted in the printing apparatus by using the first terminal.

22. In the above aspect, the fifth terminal may be a ground terminal, and voltages supplied to the first terminal, the second terminal, the third terminal, and the fourth terminal may be configured to be received by the device. The voltage enabled to be received by the device refers to, for example, a voltage lower than a voltage used to drive the printing head, a voltage as high as the power source voltage, a voltage lower than the withstand voltage of the device, a voltage at which the device is not broken, or a voltage at which the device does not perform an erroneous operation. According to this aspect, by inputting the voltage enabled to be received to the device, it is possible for the printing apparatus to detect the occurrence of a short circuit even when the short circuit occurs between at least some terminals, while the suppression of a possibility of the device being broken and a possibility of an erroneous operation is realized.

23. In the above aspect, the first virtual line may be directed along a direction including a component of a mounting direction in which the board is mounted in the printing apparatus.

24. In the above aspect, a voltage supplied to the fourth terminal may be used to drive the device.

25. In the above aspect, the device may output signals indicating that the first terminal does not have a short circuit with the terminal other than the first terminal among the plurality of terminals and that the board is being mounted in the printing apparatus.

26. In the above aspect, the device may store information regarding a liquid accommodated in the liquid accommodation container.

27. According to a second aspect of the present disclosure, there is provided a board that is mounted in a printing apparatus and is configured to come into contact with a plurality of apparatus-side terminals. The printing apparatus includes a printing head, a liquid introduction portion that introduces a liquid to the printing head, an accommodation section that accommodates a liquid accommodation container provided with the liquid introduction portion, and the plurality of apparatus-side terminals provided at the accommodation section. The board includes a base member, a device provided at the base member, and a plurality of terminals provided at the base member. The plurality of terminals include a first terminal that is coupled to the device and includes a first contact portion that is to come into contact with a corresponding first apparatus-side terminal among the plurality of apparatus-side terminals, and an other terminal group. The other terminal group includes at least a second terminal that is coupled to the device and includes a second contact portion that is to come into contact with a corresponding second apparatus-side terminal among the plurality of apparatus-side terminals, and a third terminal that is coupled to the device and includes a third contact portion that is to come into contact with a corresponding third apparatus-side terminal among the plurality of apparatus-side terminals. The second terminal is used to detect whether or not the second terminal has a short circuit with at least one of terminals other than the second terminal in the other terminal group. In a plan view, when two orthogonal straight lines are set as a first virtual line and a second virtual line, and all contact portions of all the terminals provided at the base member are projected onto the second virtual line, all the contact portions are projected at different positions, and the first virtual line passes through a middle between two projection positions that are farthest from each other among projection positions of all the contact portions. When one region with respect to the first virtual line is set as a first region and the other region is set as a second region, some contact portions among all the contact portions are arranged in the first region, remaining contact portions are arranged in the second region, the some contact portions include the second contact portion and the third contact portion, and the remaining contact portions include the first contact portion. The some contact portions and the remaining contact portions are asymmetrically arranged with respect to the first virtual line.

Foreign matters tend to be collected at the contact portion of the terminal. For example, foreign matters may be caught between the apparatus-side terminal and the terminal. For example, when the terminal of the board is arranged on a plane including the gravity direction component, and foreign matters enter toward the board from the upper side in the gravity direction, the foreign matters may be trapped and stay in the contact portion of the terminal. For example, when the foreign matter is a liquid, the liquid tends to be collected at the contact portion of the terminal by an influence of the capillary force. Thus, by defining the arrangement of the contact portion of the terminal instead of the arrangement of the terminal, it is possible to suppress a possibility of the occurrence of a short circuit regardless of the area, the shape, and the like of the terminal. In the present aspect, in the board, the second contact portion and the third contact portion are provided in the first region, and the first contact portion desired to suppress an occurrence of a short circuit with some contact portions is arranged in the second region. By disposing the contact portions in this manner, it is possible to suppress the possibility of the occurrence of a short circuit. The reason is that the first contact portion is separated from the contact portions of the other terminals and the distance from the other contact portions is secured. Thus, it is possible to suppress a possibility of the occurrence of a short circuit between the first contact portion and the other contact portion. Although foreign matters tend to be collected near the contact portion, the foreign matter collected at the first contact portion is less likely to reach the other terminals in comparison to a case where the first contact portion and the other contact portions are arranged at a short distance, because the distance between the first contact portion and the other contact portion is secured. Further, foreign matters collected in the second contact portion and the third contact portion are less likely to reach the first terminal. This is similar regardless of the area or the shape of the terminal.

In the present aspect, the other terminal group may include at least the second terminal and the third terminal. For example, when the other terminal group includes only the second terminal and the third terminal, it is possible to reduce the number of contact portions at the base member. It is possible to increase the degree of freedom in the arrangement of the contact portions at the base member and to more suppress the possibility of the occurrence of a short circuit between the terminals.

Among the plurality of terminals, there is a contact portion desired to be arranged apart from other contact portions in order to suppress the occurrence of a short circuit between the terminals. When the first contact portion is set as the contact portion desired to be separated, the second contact portion and the third contact portion are arranged in the first region being one of regions with respect to the first virtual line, and the first contact portion is arranged in the second region being the other region. That is, the contact portion in the first region and the contact portion in the second region are arranged at the base member to be asymmetric with respect to the first virtual line.

In the present aspect, all the contact portions are arranged to be projected at different positions in the direction along the second virtual line. When the direction of the first virtual line includes the mounting direction, and foreign matters are provided, the foreign matters are dragged by the apparatus-side terminal in the procedure of mounting the liquid accommodation container in the printing apparatus, and thus there is a possibility of a short circuit occurring between the terminals. By arranging all the contact portions at the base member so that all the contact portions are projected at different positions when all the contact portions are projected onto the second virtual line, it is possible to suppress the possibility of the occurrence of a short circuit. When focusing on the first contact portion, no contact portion other than the first contact portion is located on a straight line along the first virtual line passing through the first contact portion. The contact portion other than the first contact portion is located in the direction along the second virtual line. Such a positional relation is similar to the contact portions other than the first contact portion. Therefore, the probability that a short circuit occurs in the direction including the direction along the second virtual line is higher than the probability that a short circuit occurs in the direction along the first virtual line. By defining the arrangement of the contact portions in the direction along the second virtual line, it is possible to suppress the possibility of the occurrence of a short circuit. Alternatively, by arranging all the contact portions at the base member to be projected at different positions on the second virtual line, it is possible to secure the gap between the contact portions in the direction along the second virtual line on the base member. Therefore, it is possible to suppress the possibility of the occurrence of a short circuit between the terminals.

28. In the above aspect, the first contact portion may be a ground contact portion, and the first terminal may be a ground terminal. The second contact portion may be a data contact portion, and the second terminal may be a data terminal. The third contact portion may be a clock contact portion, and the third terminal may be a clock terminal. According to this aspect, it is possible to suppress the possibility of the occurrence of a short circuit between the ground contact portion, and the data contact portion and the clock contact portion.

29. According to a third aspect of the present disclosure, there is provided a board that is mounted in a printing apparatus and is configured to come into contact with a plurality of apparatus-side terminals. The printing apparatus includes a printing head, a liquid introduction portion that introduces a liquid to the printing head, an accommodation section that accommodates a liquid accommodation container provided with the liquid introduction portion, and the plurality of apparatus-side terminals provided at the accommodation section. The plurality of apparatus-side terminals includes a first apparatus-side terminal, a second apparatus-side terminal, a third apparatus-side terminal, a fourth apparatus-side terminal, and a fifth apparatus-side terminal. In a plan view, when two orthogonal straight lines are set as a first virtual line and a second virtual line, and projection positions when a contact portion of the first apparatus-side terminal, a contact portion of the second apparatus-side terminal, a contact portion of the third apparatus-side terminal, a contact portion of the fourth apparatus-side terminal, and a contact portion of the fifth apparatus-side terminal are projected onto the second virtual line are set as a first projection position, a second projection position, a third projection position, a fourth projection position, and a fifth projection position, respectively, when contact portions of all apparatus-side terminals are projected onto the second virtual line, the contact portions of all apparatus-side terminals are projected at different positions, and the first virtual line passes through a middle between two projection positions farthest from each other among projection positions of the contact portions of all apparatus-side terminals. When one region with respect to the first virtual line is set as a first region and the other region is set as a second region, contact portions of some apparatus-side terminals among all the apparatus-side terminals are arranged in the first region, contact portions of remaining apparatus-side terminals are arranged in the second region, the contact portions of the some apparatus-side terminals include the contact portion of the first apparatus-side terminal, the contact portion of the second apparatus-side terminal, the contact portion of the third apparatus-side terminal, and the contact portion of the fourth apparatus-side terminal, and the contact portions of the remaining apparatus-side terminals include the contact portion of the fifth apparatus-side terminal. The contact portions of the some apparatus-side terminals and the contact portions of the remaining apparatus-side terminals are asymmetrically arranged with respect to the first virtual line. The board includes a base member, a device provided at the base member, and a plurality of terminals provided at the base member. The plurality of terminals include at least a first terminal, a second terminal, a third terminal, a fourth terminal, and a fifth terminal. The first terminal is coupled to the device and includes a first contact portion that is to come into contact with the first apparatus-side terminal corresponding among the plurality of apparatus-side terminals in the printing apparatus when the board is mounted in the printing apparatus. The second terminal is coupled to the device and includes a second contact portion that is to come into contact with the second apparatus-side terminal corresponding among the plurality of apparatus-side terminals when the board is mounted in the printing apparatus. The third terminal is coupled to the device and includes a third contact portion that is to come into contact with the third apparatus-side terminal corresponding among the plurality of apparatus-side terminals when the board is mounted in the printing apparatus. The fourth terminal is coupled to the device and includes a fourth contact portion that is to come into contact with the fourth apparatus-side terminal corresponding among the plurality of apparatus-side terminals when the board is mounted in the printing apparatus. The fifth terminal is coupled to the device and includes a fifth contact portion that is to come into contact with the fifth apparatus-side terminal corresponding among the plurality of apparatus-side terminals when the board is mounted in the printing apparatus. The first terminal is used to detect whether or not the first terminal has a short circuit with at least one of the second terminal, the third terminal, and the fourth terminal.

Foreign matters tend to be collected at the contact portion of the terminal. For example, foreign matters may be caught between the apparatus-side terminal and the terminal. For example, when the terminal of the board is arranged on a plane including the gravity direction component, and foreign matters enter toward the board from the upper side in the gravity direction, the foreign matters may be trapped and stay in the contact portion of the terminal. For example, when the foreign matter is a liquid, the liquid tends to be collected at the contact portion of the terminal by an influence of the capillary force. Thus, by defining the arrangement of the contact portion of the terminal instead of the arrangement of the terminal, it is possible to suppress a possibility of the occurrence of a short circuit regardless of the area, the shape, and the like of the terminal. In the present aspect, for the plurality of apparatus-side terminals, the contact portion of the first apparatus-side terminal, the contact portion of the second apparatus-side terminal, the contact portion of the third apparatus-side terminal, and the contact portion of the fourth apparatus-side terminal are arranged in the first region, and the contact portion of the fifth apparatus-side terminal intended to suppress the occurrence of a short circuit with other contact portions is arranged in the second region. In addition, in the board, the first contact portion to the fifth contact portion are provided at the base member to correspond to the contact portions of the apparatus-side terminals. By disposing the contact portions in this manner, it is possible to suppress the possibility of the occurrence of a short circuit. The reason is that the fifth contact portion is separated from the contact portions of the other terminals and the distance from the other contact portions is secured. Thus, it is possible to suppress a possibility of the occurrence of a short circuit between the fifth contact portion and the other contact portion. Although foreign matters tend to be collected near the contact portion, the foreign matter collected at the fifth contact portion is less likely to reach the contact portions of the other terminals in comparison to a case where the fifth contact portion and the other contact portions are arranged at a short distance, because the distance between the fifth contact portion and the other contact portion is secured. Further, foreign matters collected in the first contact portion to the fourth contact portion are less likely to reach the contact portion of the fifth terminal. This is similar regardless of the area or the shape of the terminal. Examples of the foreign matter include foreign matters similar to the foreign matters in the first aspect. Regardless of the degree of a possibility that the foreign matters actually appear, there is a possibility of the occurrence of a short circuit due to foreign matters unless the possibility is zero. In the present aspect, it is possible to suppress such a possibility.

Among the plurality of terminals, there is a contact portion desired to be arranged apart from other contact portions in order to suppress the occurrence of a short circuit between the terminals. When the contact portion desired to be separated is set as the fifth contact portion, the first to fourth contact portions corresponding to the first apparatus-side terminal to the fourth apparatus-side terminal in the first region which is one of the regions with respect to the first virtual line are arranged at the base member, and the fifth contact portion corresponding to the fifth apparatus-side terminal in the second region being the other region is arranged at the base member. That is, the contact portion in the first region and the contact portion in the second region are arranged at the base member to be asymmetric with respect to the first virtual line.

In the present aspect, the contact portions corresponding to the contact portions of all the apparatus-side terminals are arranged to be projected at different positions in the direction along the second virtual line. When the direction of the first virtual line includes the mounting direction, and foreign matters are provided, the foreign matters are dragged by the apparatus-side terminal in the procedure of mounting the liquid accommodation container in the printing apparatus, and thus there is a possibility of a short circuit occurring between the terminals. By arranging the contact portions of all the apparatus-side terminals at the board so that all the contact portions are projected at different positions when all the contact portions are projected onto the second virtual line, it is possible to suppress the possibility of the occurrence of a short circuit. When focusing on the first contact portion, no contact portion other than the first contact portion is located on a straight line along the first virtual line passing through the first contact portion. The contact portion other than the first contact portion is located in the direction along the second virtual line. Such a positional relation is similar to the contact portions other than the first contact portion. Therefore, the probability that a short circuit occurs in the direction including the direction along the second virtual line is higher than the probability that a short circuit occurs in the direction along the first virtual line. By defining the arrangement of the contact portions in the direction along the second virtual line, it is possible to suppress the possibility of the occurrence of a short circuit. Alternatively, by arranging all the contact portions at the base member to be projected at different positions on the second virtual line, it is possible to secure the gap between the contact portions in the direction along the second virtual line on the base member. Therefore, it is possible to suppress the possibility of the occurrence of a short circuit between the terminals.

In addition to the above aspects, the present disclosure can be realized in the forms such as a liquid accommodation container, a printing system, a use of a board, a use of the liquid accommodation container, and a manufacturing method of the board, the liquid accommodation container, or the like.

C. Exemplary Embodiments

Exemplary embodiments of the present disclosure are described below.

1. A board that is mounted in a printing apparatus and is configured to come into contact with a plurality of apparatus-side terminals, the printing apparatus including a printing head, a liquid introduction portion that introduces a liquid to the printing head, an accommodation section that accommodates a liquid accommodation container provided with the liquid introduction portion, and the plurality of apparatus-side terminals provided at the accommodation section, the board comprising:
   - a base member;
   - a device provided at the base member; and
   - a plurality of terminals provided at the base member, wherein
   - the plurality of terminals include at least a first terminal, a second terminal, a third terminal, a fourth terminal, and a fifth terminal,
   - the first terminal is coupled to the device and includes a first contact portion that is to come into contact with a corresponding first apparatus-side terminal among the plurality of apparatus-side terminals,
   - the second terminal is coupled to the device and includes a second contact portion that is to come into contact with a corresponding second apparatus-side terminal among the plurality of apparatus-side terminals,
   - the third terminal is coupled to the device and includes a third contact portion that is to come into contact with a corresponding third apparatus-side terminal among the plurality of apparatus-side terminals,
   - the fourth terminal is coupled to the device and includes a fourth contact portion that is to come into contact with a corresponding fourth apparatus-side terminal among the plurality of apparatus-side terminals,
   - the fifth terminal is coupled to the device and includes a fifth contact portion that is to come into contact with a corresponding fifth apparatus-side terminal among the plurality of apparatus-side terminals,
   - the first terminal is used to detect whether or not the first terminal has a short circuit with at least one of the second terminal, the third terminal, and the fourth terminal,
   - in a plan view,
     - when two orthogonal straight lines are set as a first virtual line and a second virtual line, and all contact portions of all the terminals provided at the base member are projected onto the second virtual line, all the contact portions are projected at different positions, and the first virtual line passes through a middle between two projection positions that are farthest from each other among projection positions of all the contact portions,
     - when one region with respect to the first virtual line is set as a first region and the other region is set as a second region, some contact portions among all the contact portions are arranged in the first region, remaining contact portions are arranged in the second region, the some contact portions include the first contact portion, the second contact portion, the third contact portion, and the fourth contact portion, and the remaining contact portions include the fifth contact portion, and
     - the some contact portions and the remaining contact portions are asymmetrically arranged with respect to the first virtual line.

2. The board according to Exemplary embodiment 1, wherein
   - at least one of the second contact portion, the third contact portion, and the fourth contact portion is arranged to be projected between a projection position of the first contact portion and a projection position of the fifth contact portion.

3. The board according to Exemplary embodiment 1 or Exemplary embodiment 2, wherein
   - any two or more of the second contact portion, the third contact portion, and the fourth contact portion are arranged to be projected between a projection position of the first contact portion and a projection position of the fifth contact portion.

4. The board according to any one of Exemplary embodiments 1 to 3, wherein
   - the first contact portion is arranged to be projected between projection positions of any two contact portions of the second contact portion, the third contact portion, and the fourth contact portion.

5. The board according to any one of Exemplary embodiments 1 to 4, wherein
   - the first contact portion is a data contact portion, and the first terminal is a data terminal,
   - the second contact portion is a clock contact portion, and the second terminal is a clock terminal, the third contact portion is a reset contact portion, and the third terminal is a reset terminal, the fourth contact portion is a power-source contact portion, and the fourth terminal is a power source terminal, and the fifth contact portion is a ground contact portion, and the fifth terminal is a ground terminal.

6. The board according to Exemplary embodiment 5, wherein any one or both of the data contact portion and the reset contact portion are arranged to be projected between a projection position of the power-source contact portion and a projection position of the clock contact portion, and the reset contact portion is arranged to have a projection position that is next to the projection position of the power-source contact portion.

7. The board according to Exemplary embodiment 5 or Exemplary embodiment 6, wherein the power-source contact portion is arranged to have a projection position that is next to a projection position of the data contact portion.

8. The board according to any one of Exemplary embodiments 5 to 7, wherein the clock contact portion is arranged to be projected at a position that is farthest from a projection position of the ground contact portion, and the data contact portion, the power-source contact portion, and the reset contact portion are arranged to be projected in order in a direction from a projection position of the clock contact portion toward the projection position of the ground contact portion on the second virtual line.

9. The board according to any one of Exemplary embodiments 5 to 8, wherein a distance between the data contact portion and the ground contact portion is longer than a distance between the data contact portion and the clock contact portion.

10. The board according to any one of Exemplary embodiments 5 to 9, wherein a distance between the data contact portion and the ground contact portion is longer than a distance between the data contact portion and the reset contact portion.

11. The board according to any one of Exemplary embodiments 5 to 10, wherein a distance between the data contact portion and the ground contact portion is longer than a distance between the data contact portion and the power-source contact portion.

12. The board according to any one of Exemplary embodiments 5 to 11, wherein when a gap of a contact portion projected at a position farthest from a projection position of the ground contact portion when projection onto the second virtual line is performed, among contact portions other than the ground contact portion in the first region, from the ground contact portion provided in the second region in a direction along the second virtual line is set as Wa, a gap of a contact portion projected at a position closest to the projection position of the ground contact portion when projection onto the second virtual line is performed, among contact portions other than the ground contact portion in the first region, from the ground contact portion provided in the second region in the direction along the second virtual line is equal to or more than Wa/2.

13. The board according to any one of Exemplary embodiments 5 to 12, wherein there is no other contact portion between a contact portion projected at a position closest to a projection position of the ground contact portion when projection onto the second virtual line is performed, among contact portions other than the ground contact portion in the first region, and the ground contact portion provided in the second region.

14. The board according to any one of Exemplary embodiments 5 to 13, wherein there is no other contact portion on a virtual line segment connecting the data contact portion and the clock contact portion.

15. The board according to any one of Exemplary embodiments 5 to 14, wherein there is no other contact portion on a virtual line segment connecting the data contact portion and the reset contact portion.

16. The board according to any one of Exemplary embodiments 5 to 15, wherein there is no other contact portion on a virtual line segment connecting the data contact portion and the power-source contact portion.

17. The board according to any one of Exemplary embodiments 5 to 16, wherein when the board is mounted in a direction along a gravity direction, the clock contact portion, the power-source contact portion, and the reset contact portion are arranged closer in the gravity direction than the data contact portion, and at least one of the clock contact portion, the power-source contact portion, and the reset contact portion is arranged to be projected between a projection position of the data contact portion and a projection position of the ground contact portion.

18. The board according to any one of Exemplary embodiments 5 to 17, wherein the clock contact portion, the data contact portion, the power-source contact portion, the reset contact portion, and the ground contact portion are arranged to form a plurality of rows.

19. The board according to Exemplary embodiment 18, wherein the plurality of rows includes two rows, and two contact portions on the base member, which are projected to be next to each other when projection onto the second virtual line is performed, form different rows.

20. The board according to Exemplary embodiment 19, wherein the data contact portion and the ground contact portion are arranged in different rows, and any one of the clock contact portion, the power-source contact portion, and the reset contact portion is arranged to be projected between a projection position of the data contact portion and a projection position of the ground contact portion.

21. The board according to any one of Exemplary embodiments 1 to 20, wherein the first terminal is further used to detect whether or not the board is mounted in the printing apparatus.

22. The board according to any one of Exemplary embodiments 1 to 21, wherein the fifth terminal is a ground terminal, and voltages supplied to the first terminal, the second terminal, the third terminal, and the fourth terminal are configured to be received by the device.

23. The board according to any one of Exemplary embodiments 1 to 22, wherein the first virtual line is directed along a direction including a component of a mounting direction in which the board is mounted in the printing apparatus 24. The board according to any one of Exemplary embodiments 1 to 23, wherein a voltage supplied to the fourth terminal is used to drive the device.

25. The board according to any one of Exemplary embodiments 1 to 24, wherein the device outputs signals indicating that the first terminal does not have a short circuit with the terminal other than the first terminal among the plurality of terminals and that the board is being mounted in the printing apparatus.

26. The board according to any one of Exemplary embodiments 1 to 25, wherein the device stores information regarding a liquid accommodated in the liquid accommodation container.

27. A board that is mounted in a printing apparatus and is configured to come into contact with a plurality of apparatus-side terminals, the printing apparatus including a printing head, a liquid introduction portion that introduces a liquid to the printing head, an accommodation section that accommodates a liquid accommodation container provided with the liquid introduction portion, and the plurality of apparatus-side terminals provided at the accommodation section, the board comprising:

a base member;

a device provided at the base member; and a plurality of terminals provided at the base member, wherein the plurality of terminals include a first terminal that is coupled to the device and includes a first contact portion that is to come into contact with a corresponding first apparatus-side terminal among the plurality of apparatus-side terminals, and an other terminal group, the other terminal group includes at least a second terminal that is coupled to the device and includes a second contact portion that is to come into contact with a corresponding second apparatus-side terminal among the plurality of apparatus-side terminals, and a third terminal that is coupled to the device and includes a third contact portion that is to come into contact with a corresponding third apparatus-side terminal among the plurality of apparatus-side terminals, the second terminal is used to detect whether or not the second terminal has a short circuit with at least one of terminals other than the second terminal in the other terminal group, in a plan view, when two orthogonal straight lines are set as a first virtual line and a second virtual line, and all contact portions of all the terminals provided at the base member are projected onto the second virtual line, all the contact portions are projected at different positions, and the first virtual line passes through a middle between two projection positions that are farthest from each other among projection positions of all the contact portions, when one region with respect to the first virtual line is set as a first region and the other region is set as a second region, some contact portions among all the contact portions are arranged in the first region, remaining contact portions are arranged in the second region, the some contact portions include the second contact portion and the third contact portion, and the remaining contact portions include the first contact portion, and the some contact portions and the remaining contact portions are asymmetrically arranged with respect to the first virtual line.

28. The board according to Exemplary embodiment 27, wherein the first contact portion is a ground contact portion, and the first terminal is a ground terminal, the second contact portion is a data contact portion, and the second terminal is a data terminal, and the third contact portion is a clock contact portion, and the third terminal is a clock terminal.

29. The board according to Exemplary embodiment 28, wherein a distance between the data contact portion and the ground contact portion is longer than a distance between the data contact portion and the clock contact portion.

30. The board according to Exemplary embodiment 28 or Exemplary embodiment 29, wherein there is no other contact portion on a virtual line segment connecting the data contact portion and the clock contact portion.

31. The board according to any one of Exemplary embodiments 28 to 30, wherein the other terminal group includes a reset terminal including a reset contact portion that is to come into contact with a corresponding apparatus-side terminal among the plurality of apparatus-side terminals, and the some contact portions include the reset contact portion.

32. The board according to Exemplary embodiment 31, wherein a distance between the data contact portion and the ground contact portion is longer than a distance between the data contact portion and the reset contact portion.

33. The board according to Exemplary embodiment 31 or Exemplary embodiment 32, wherein there is no other contact portion on a virtual line segment connecting the data contact portion and the reset contact portion.

34. The board according to any one of Exemplary embodiments 28 to 33, wherein the other terminal group includes a power source terminal including a power-source contact portion that is to come into contact with a corresponding apparatus-side terminal among the plurality of apparatus-side terminals, and the some contact portions include the power-source contact portion.

35. The board according to Exemplary embodiment 34, wherein a distance between the data contact portion and the ground contact portion is longer than a distance between the data contact portion and the power-source contact portion.

36. The board according to Exemplary embodiment 34 or Exemplary embodiment 35, wherein there is no other contact portion on a virtual line segment connecting the data contact portion and the power-source contact portion.

37. The board according to any one of Exemplary embodiments 34 to 36, wherein a voltage supplied to the power source terminal is used to drive the device.

38. The board according to any one of Exemplary embodiments 28 to 37, wherein at least one of a contact portion of a terminal other than the data terminal among the other terminal group is arranged to be projected between a projection position of the data contact portion and a projection position of the ground contact portion.

39. The board according to any one of Exemplary embodiments 28 to 38, wherein when a gap of a contact portion projected at a position farthest from a projection position of the ground contact portion when projection onto the second virtual line is performed, among contact portions for the other terminal group in the first region, from the ground contact portion provided in the second region in a direction along the second virtual line is set as Wa, a gap of a contact portion projected at a position closest to the projection position of the ground contact portion when projection onto the second virtual line is performed, among the contact portions for the other terminal group in the first region, from the ground contact portion provided in the second region in the direction along the second virtual line is equal to or more than Wa/2.

40. The board according to any one of Exemplary embodiments 28 to 39, wherein there is no other contact portion between a contact portion projected at a position closest to a projection position of the ground contact portion when projection onto the second virtual line is performed, among contact portions for the other terminal group in the first region, and the ground contact portion provided in the second region.

41. The board according to any one of Exemplary embodiments 28 to 40, wherein when the board is mounted in a direction along a gravity direction, contact portions for the other terminal group other than the data contact portion are arranged closer in the gravity direction than the data contact portion, and the contact portions for the other terminal group other than the data contact portion are arranged to be projected between a projection position of the data contact portion and a projection position of the ground contact portion.

42. The board according to any one of Exemplary embodiments 27 to 41, wherein the second terminal is used to detect whether or not the board is mounted in the printing apparatus.

43. The board according to any one of Exemplary embodiments 27 to 42, wherein voltages supplied to the other terminal group are configured to be received by the device.

44. The board according to any one of Exemplary embodiments 27 to 43, wherein the first virtual line is directed along a direction including a component of a mounting direction in which the board is mounted in the printing apparatus.

45. The board according to any one of Exemplary embodiments 27 to 44, wherein the device outputs signals indicating that the second terminal does not have a short circuit with the terminal other than the second terminal among the plurality of terminals and that the board is being mounted in the printing apparatus.

46. The board according to any one of Exemplary embodiments 27 to 45, wherein the device stores information regarding a liquid accommodated in the liquid accommodation container.

47. A board that is mounted in a printing apparatus and is configured to come into contact with a plurality of apparatus-side terminals, the printing apparatus including a printing head, a liquid introduction portion that introduces a liquid to the printing head, an accommodation section that accommodates a liquid accommodation container provided with the liquid introduction portion, and the plurality of apparatus-side terminals provided at the accommodation section, wherein the plurality of apparatus-side terminals includes a first apparatus-side terminal, a second apparatus-side terminal, a third apparatus-side terminal, a fourth apparatus-side terminal, and a fifth apparatus-side terminal, in a plan view, when two orthogonal straight lines are set as a first virtual line and a second virtual line, and projection positions when a contact portion of the first apparatus-side terminal, a contact portion of the second apparatus-side terminal, a contact portion of the third apparatus-side terminal, a contact portion of the fourth apparatus-side terminal, and a contact portion of the fifth apparatus-side terminal are projected onto the second virtual line are set as a first projection position, a second projection position, a third projection position, a fourth projection position, and a fifth projection position, respectively, when contact portions of all apparatus-side terminals are projected onto the second virtual line, the contact portions of all apparatus-side terminals are projected at different positions, and the first virtual line passes through a middle between two projection positions farthest from each other among projection positions of the contact portions of all apparatus-side terminals, when one region with respect to the first virtual line is set as a first region and the other region is set as a second region, contact portions of some apparatus-side terminals among all the apparatus-side terminals are arranged in the first region, contact portions of remaining apparatus-side terminals are arranged in the second region, the contact portions of the some apparatus-side terminals include the contact portion of the first apparatus-side terminal, the contact portion of the second apparatus-side terminal, the contact portion of the third apparatus-side terminal, and the contact portion of the fourth apparatus-side terminal, and the contact portions of the remaining apparatus-side terminals include the contact portion of the fifth apparatus-side terminal, the contact portions of the some apparatus-side terminals and the contact portions of the remaining apparatus-side terminals are asymmetrically arranged with respect to the first virtual line, the board includes a base member, a device provided at the base member, and a plurality of terminals provided at the base member, the plurality of terminals include at least a first terminal, a second terminal, a third terminal, a fourth terminal, and a fifth terminal, the first terminal is coupled to the device and includes a first contact portion that is to come into contact with the first apparatus-side terminal corresponding among the plurality of apparatus-side terminals in the printing apparatus when the board is mounted in the printing apparatus, the second terminal is coupled to the device and includes a second contact portion that is to come into contact with the second apparatus-side terminal corresponding among the plurality of apparatus-side terminals when the board is mounted in the printing apparatus, the third terminal is coupled to the device and includes a third contact portion that is to come into contact with the third apparatus-side terminal corresponding among the plurality of apparatus-side terminals when the board is mounted in the printing apparatus, the fourth terminal is coupled to the device and includes a fourth contact portion that is to come into contact with the fourth apparatus-side terminal corresponding among the plurality of apparatus-side terminals when the board is mounted in the printing apparatus, the fifth terminal is coupled to the device and includes a fifth contact portion that is to come into contact with the fifth apparatus-side terminal corresponding among the plurality of apparatus-side terminals when the board is mounted in the printing apparatus, and the first terminal is used to detect whether or not the first terminal has a short circuit with at least one of the second terminal, the third terminal, and the fourth terminal.

48. The board according to Exemplary embodiment 47, wherein the contact portion of at least one apparatus-side terminal among the contact portion of the second apparatus-side terminal, the contact portion of the third apparatus-side terminal, and the contact portion of the fourth apparatus-side terminal is arranged to be projected between the first projection position and the fifth projection position.

49. The board according to Exemplary embodiment 47 or Exemplary embodiment 48, wherein the contact portions of any two or more apparatus-side terminals among the contact portion of the second apparatus-side terminal, the contact portion of the third apparatus-side terminal, and the contact portion of the fourth apparatus-side terminal are arranged to be projected between the first projection position and the fifth projection position.

50. The board according to any one of Exemplary embodiments 47 to 49, wherein the contact portion of the first apparatus-side terminal is arranged to be projected between projection positions of the contact portions of any two apparatus-side terminals among the contact portion of the second apparatus-side terminal, the contact portion of the third apparatus-side terminal, and the contact portion of the fourth apparatus-side terminal.

51. The board according to any one of Exemplary embodiments 47 to 50, wherein the first contact portion is a data contact portion, the first terminal is a data terminal, and the first apparatus-side terminal is an apparatus-side data terminal, the second contact portion is a clock contact portion, the second terminal is a clock terminal, and the second apparatus-side terminal is an apparatus-side clock terminal, the third contact portion is a reset contact portion, the third terminal is a reset terminal, and the third apparatus-side terminal is an apparatus-side reset terminal, the fourth contact portion is a power-source contact portion, the fourth terminal is a power source terminal, and the fourth apparatus-side terminal is an apparatus-side power source terminal, and the fifth contact portion is a ground contact portion, the fifth terminal is a ground terminal, and the fifth apparatus-side terminal is an apparatus-side ground terminal.

52. The board according to Exemplary embodiment 51, wherein any one or both of the contact portion of the apparatus-side data terminal and the contact portion of the apparatus-side reset terminal are arranged to be projected between the fourth projection position and the second projection position, and the contact portion of the apparatus-side reset terminal is arranged to have a projection position that is next to the fourth projection position.

53. The board according to Exemplary embodiment 51 or Exemplary embodiment 52, wherein the contact portion of the apparatus-side power source terminal is arranged to have a projection position that is next to the first projection position.

54. The board according to any one of Exemplary embodiments 51 to 53, wherein the contact portion of the apparatus-side clock terminal is arranged to be projected at a position that is farthest from the fifth projection position, and the contact portion of the apparatus-side data terminal, the contact portion of the apparatus-side power source terminal, and the contact portion of the apparatus-side reset terminal are arranged to be projected in order in a direction from the second projection position toward the fifth projection position on the second virtual line.

55. The board according to any one of Exemplary embodiments 51 to 54, wherein a distance between the contact portion of the apparatus-side data terminal and the contact portion of the apparatus-side ground terminal is longer than a distance between the contact portion of the apparatus-side data terminal and the contact portion of the apparatus-side clock terminal.

56. The board according to any one of Exemplary embodiments 51 to 55, wherein a distance between the contact portion of the apparatus-side data terminal and the contact portion of the apparatus-side ground terminal is longer than a distance between the contact portion of the apparatus-side data terminal and the contact portion of the apparatus-side reset terminal.

57. The board according to any one of Exemplary embodiments 51 to 56, wherein a distance between the contact portion of the apparatus-side data terminal and the contact portion of the apparatus-side ground terminal is longer than a distance between the contact portion of the apparatus-side data terminal and the contact portion of the apparatus-side power source terminal.

58. The board according to any one of Exemplary embodiments 51 to 57, wherein when a gap of a contact portion of an apparatus-side terminal, which is projected at a position farthest from the fifth projection position when projection onto the second virtual line is performed, among the contact portions of the apparatus-side terminals other than the contact portion of the apparatus-side ground terminal in the first region, from the contact portion of the apparatus-side ground terminal provided in the second region in a direction along the second virtual line is set as Wa, a gap of a contact portion of an apparatus-side terminal, which is projected at a position closest to the fifth projection position when projection onto the second virtual line is performed, among the contact portions of the apparatus-side terminals other than the contact portion of the apparatus-side ground terminal in the first region, from the contact portion of the apparatus-side ground terminal provided in the second region in a direction along the second virtual line is equal to or more than Wa/2.

59. The board according to any one of Exemplary embodiments 51 to 58, wherein in the first region, there is no contact portion of another apparatus-side terminal between the contact portion of the apparatus-side terminal, which is projected at a position closest to the fifth projection position when projection onto the second virtual line is performed, among the contact portions of the apparatus-side terminals other than the contact portion of the apparatus-side ground terminal, and the contact portion of the apparatus-side ground terminal provided in the second region.

60. The board according to any one of Exemplary embodiments 51 to 59, wherein there is no contact portion of another apparatus-side terminal on a virtual line segment connecting the contact portion of the apparatus-side data terminal and the contact portion of the apparatus-side clock terminal.

61. The board according to any one of Exemplary embodiments 51 to 60, wherein there is no contact portion of another apparatus-side terminal on a virtual line segment connecting the contact portion of the apparatus-side data terminal and the contact portion of the apparatus-side reset terminal.

62. The board according to any one of Exemplary embodiments 51 to 61, wherein there is no contact portion of another apparatus-side terminal on a virtual line segment connecting the contact portion of the apparatus-side data terminal and the contact portion of the apparatus-side power source terminal.

63. The board according to any one of Exemplary embodiments 51 to 62, wherein when the board is mounted in a direction along a gravity direction, the contact portion of the apparatus-side clock terminal, the contact portion of the apparatus-side power source terminal, and the contact portion of the apparatus-side reset terminal are arranged closer in the gravity direction than the contact portion of the apparatus-side data terminal, and the contact portion of at least one apparatus-side terminal among the contact portion of the apparatus-side clock terminal, the contact portion of the apparatus-side power source terminal, and the contact portion of the apparatus-side reset terminal is arranged to be projected between the first projection position and the fifth projection position.

64. The board according to any one of Exemplary embodiments 51 to 63, wherein the contact portion of the apparatus-side clock terminal, the contact portion of the apparatus-side data terminal, the contact portion of the apparatus-side power source terminal, the contact portion of the apparatus-side reset terminal, and the contact portion of the apparatus-side ground terminal are arranged to form a plurality of rows.

65. The board according to Exemplary embodiment 64, wherein the plurality of rows includes two rows, and contact portions of two apparatus-side terminals, which are projected to be next to each other when projection onto the second virtual line is performed, form different rows.

66. The board according to Exemplary embodiment 65, wherein the contact portion of the apparatus-side data terminal and the contact portion of the apparatus-side ground terminal are arranged in different rows, and the contact portion of any one apparatus-side terminal among the contact portion of the apparatus-side clock terminal, the contact portion of the apparatus-side power source terminal, and the contact portion of the apparatus-side reset terminal is arranged to be projected between the first projection position and the fifth projection position.

67. The board according to any one of Exemplary embodiments 47 to 66, wherein the first terminal is further used to detect whether or not the board is mounted in the printing apparatus.

68. The board according to any one of Exemplary embodiments 47 to 67, wherein the fifth terminal is a ground terminal, and the fifth apparatus-side terminal is an apparatus-side ground terminal, and voltages supplied to the first terminal, the second terminal, the third terminal, and the fourth terminal are configured to be received by the device.

69. The board according to any one of Exemplary embodiments 47 to 68, wherein the first virtual line is directed along a direction including a component of a mounting direction in which the board is mounted in the printing apparatus.

70. The board according to any one of Exemplary embodiments 47 to 69, wherein a voltage supplied to the fourth terminal is used to drive the device.

71. The board according to any one of Exemplary embodiments 47 to 70, wherein the device outputs signals indicating that the first terminal does not have a short circuit with the terminal other than the first terminal among the plurality of terminals and that the board is being mounted in the printing apparatus.

72. The board according to any one of Exemplary embodiments 47 to 71, wherein the device stores information regarding a liquid accommodated in the liquid accommodation container.

73. A liquid accommodation container that is mounted on an accommodation section of a printing apparatus including a printing head, a liquid introduction portion that introduces a liquid to the printing head, the accommodation section provided with the liquid introduction portion, and a plurality of apparatus-side terminals provided at the accommodation section, the liquid accommodation container comprising:

a liquid accommodation body configured to accommodate a liquid;

a liquid supply portion that is mounted at the liquid introduction portion of the printing apparatus and includes a liquid supply port for supplying a liquid to the liquid introduction portion from the liquid accommodation body;

a device; and a plurality of terminals, wherein the plurality of terminals include at least a first terminal, a second terminal, a third terminal, a fourth terminal, and a fifth terminal, the first terminal is coupled to the device and includes a first contact portion that is to come into contact with a corresponding first apparatus-side terminal among the plurality of apparatus-side terminals, the second terminal is coupled to the device and includes a second contact portion that is to come into contact with a corresponding second apparatus-side terminal among the plurality of apparatus-side terminals, the third terminal is coupled to the device and includes a third contact portion that is to come into contact with a corresponding third apparatus-side terminal among the plurality of apparatus-side terminals, the fourth terminal is coupled to the device and includes a fourth contact portion that is to come into contact with a corresponding fourth apparatus-side terminal among the plurality of apparatus-side terminals, the fifth terminal is coupled to the device and includes a fifth contact portion that is to come into contact with a corresponding fifth apparatus-side terminal among the plurality of apparatus-side terminals, the first terminal is used to detect whether or not the first terminal has a short circuit with at least one of the second terminal, the third terminal, and the fourth terminal, in a plan view, when two orthogonal straight lines are set as a first virtual line and a second virtual line, and all contact portions of all the terminals provided at the liquid accommodation container are projected onto the second virtual line, all the contact portions are projected at different positions, and the first virtual line passes through a middle between two projection positions that are farthest from each other among projection positions of all the contact portions, when one region with respect to the first virtual line is set as a first region and the other region is set as a second region, some contact portions among all the contact portions are arranged in the first region, remaining contact portions are arranged in the second region, the some contact portions include the first contact portion, the second contact portion, the third contact portion, and the fourth contact portion, and the remaining contact portions include the fifth contact portion, and the some contact portions and the remaining contact portions are asymmetrically arranged with respect to the first virtual line.

74. The liquid accommodation container according to Exemplary embodiment 73, wherein at least one of the second contact portion, the third contact portion, and the fourth contact portion is arranged to be projected between a projection position of the first contact portion and a projection position of the fifth contact portion.

75. The liquid accommodation container according to Exemplary embodiment 73 or Exemplary embodiment 74, wherein any two or more of the second contact portion, the third contact portion, and the fourth contact portion are arranged to be projected between a projection position of the first contact portion and a projection position of the fifth contact portion.

76. The liquid accommodation container according to any one of Exemplary embodiments 73 to 75, wherein the first contact portion is arranged to be projected between projection positions of any two contact portions of the second contact portion, the third contact portion, and the fourth contact portion.

77. The liquid accommodation container according to any one of Exemplary embodiments 73 to 76, wherein the first contact portion is a data contact portion, and the first terminal is a data terminal, the second contact portion is a clock contact portion, and the second terminal is a clock terminal, the third contact portion is a reset contact portion, and the third terminal is a reset terminal, the fourth contact portion is a power-source contact portion, and the fourth terminal is a power source terminal, and the fifth contact portion is a ground contact portion, and the fifth terminal is a ground terminal.

78. The liquid accommodation container according to Exemplary embodiment 77, wherein any one or both of the data contact portion and the reset contact portion are arranged to be projected between a projection position of the power-source contact portion and a projection position of the clock contact portion, and the reset contact portion is arranged to have a projection position that is next to a projection position of the power-source contact portion.

79. The liquid accommodation container according to Exemplary embodiment 77 or Exemplary embodiment 78, wherein the power-source contact portion is arranged to have a projection position that is next to a projection position of the data contact portion.

80. The liquid accommodation container according to any one of Exemplary embodiments 77 to 79, wherein the clock contact portion is arranged to be projected at a position that is farthest from a projection position of the ground contact portion, and the data contact portion, the power-source contact portion, and the reset contact portion are arranged to be projected in order in a direction from a projection position of the clock contact portion toward the projection position of the ground contact portion on the second virtual line.

81. The liquid accommodation container according to any one of Exemplary embodiments 77 to 80, wherein a distance between the data contact portion and the ground contact portion is longer than a distance between the data contact portion and the clock contact portion.

82. The liquid accommodation container according to any one of Exemplary embodiments 77 to 81, wherein a distance between the data contact portion and the ground contact portion is longer than a distance between the data contact portion and the reset contact portion.

83. The liquid accommodation container according to any one of Exemplary embodiments 77 to 82, wherein a distance between the data contact portion and the ground contact portion is longer than a distance between the data contact portion and the power-source contact portion.

84. The liquid accommodation container according to any one of Exemplary embodiments 77 to 83, wherein when a gap of a contact portion projected at a position farthest from a projection position of the ground contact portion when projection onto the second virtual line is performed, among the contact portions other than the ground contact portion in the first region, from the ground contact portion provided in the second region in a direction along the second virtual line is set as Wa, a gap of a contact portion projected at a position closest to the projection position of the ground contact portion when projection onto the second virtual line is performed, among the contact portions other than the ground contact portion in the first region, from the ground contact portion provided in the second region in the direction along the second virtual line is equal to or more than Wa/2.

85. The liquid accommodation container according to any one of Exemplary embodiments 77 to 84, wherein there is no other contact portion between a contact portion projected at a position closest to a projection position of the ground contact portion when projection onto the second virtual line is performed, among the contact portions other than the ground contact portion in the first region, and the ground contact portion provided in the second region.

86. The liquid accommodation container according to any one of Exemplary embodiments 77 to 85, wherein there is no other contact portion on a virtual line segment connecting the data contact portion and the clock contact portion.

87. The liquid accommodation container according to any one of Exemplary embodiments 77 to 86, wherein there is no other contact portion on a virtual line segment connecting the data contact portion and the reset contact portion.

88. The liquid accommodation container according to any one of Exemplary embodiments 77 to 87, wherein there is no other contact portion on a virtual line segment connecting the data contact portion and the power-source contact portion.

89. The liquid accommodation container according to any one of Exemplary embodiments 77 to 88, wherein when the liquid accommodation container is mounted in a direction along a gravity direction, the clock contact portion, the power-source contact portion, and the reset contact portion are arranged closer in the gravity direction than the data contact portion, and at least one of the clock contact portion, the power-source contact portion, and the reset contact portion is arranged to be projected between a projection position of the data contact portion and a projection position of the ground contact portion.

90. The liquid accommodation container according to any one of Exemplary embodiments 77 to 89, wherein the clock contact portion, the data contact portion, the power-source contact portion, the reset contact portion, and the ground contact portion are arranged to form a plurality of rows.

91. The liquid accommodation container according to Exemplary embodiment 90, wherein the plurality of rows includes two rows, and two contact portions on the liquid accommodation container, which are projected to be next to each other when projection onto the second virtual line is performed, form different rows.

92. The liquid accommodation container according to Exemplary embodiment 91, wherein the data contact portion and the ground contact portion are arranged in different rows, and any one of the clock contact portion, the power-source contact portion, and the reset contact portion is arranged to be projected between a projection position of the data contact portion and a projection position of the ground contact portion.

93. The liquid accommodation container according to any one of Exemplary embodiments 73 to 92, wherein the first terminal is further used to detect whether or not the liquid accommodation container is mounted in the printing apparatus.

94. The liquid accommodation container according to any one of Exemplary embodiments 73 to 93, wherein the fifth terminal is a ground terminal, and voltages supplied to the first terminal, the second terminal, the third terminal, and the fourth terminal are configured to be received by the device.

95. The liquid accommodation container according to any one of Exemplary embodiments 73 to 94, wherein the first virtual line is directed along a direction including a component of a mounting direction in which the liquid accommodation container is mounted in the printing apparatus.

96. The liquid accommodation container according to any one of Exemplary embodiments 73 to 95, further comprising:

a board, wherein the board includes the plurality of terminals and the device.

97. The liquid accommodation container according to any one of Exemplary embodiments 73 to 96, wherein a voltage supplied to the fourth terminal is used to drive the device.

98. The liquid accommodation container according to any one of Exemplary embodiments 73 to 97, wherein the device outputs signals indicating that the first terminal does not have a short circuit with the terminal other than the first terminal among the plurality of terminals and that the liquid accommodation container is being mounted in the printing apparatus.

99. The liquid accommodation container according to any one of Exemplary embodiments 73 to 98, wherein the device stores information regarding a liquid accommodated in the liquid accommodation container.

100. A liquid accommodation container that is mounted on an accommodation section of a printing apparatus including a printing head, a liquid introduction portion that introduces a liquid to the printing head, the accommodation section provided with the liquid introduction portion, and a plurality of apparatus-side terminals provided at the accommodation section, the liquid accommodation container comprising:

a liquid accommodation body configured to accommodate a liquid;

a liquid supply portion that is mounted at the liquid introduction portion of the printing apparatus and includes a liquid supply port for supplying a liquid to the liquid introduction portion from the liquid accommodation body;

a device; and a plurality of terminals, wherein the plurality of terminals include a first terminal that is coupled to the device and includes a first contact portion that is to come into contact with a corresponding first apparatus-side terminal among the plurality of apparatus-side terminals in the printing apparatus, and an other terminal group, the other terminal group includes at least a second terminal that is coupled to the device and includes a second contact portion that is to come into contact with a corresponding second apparatus-side terminal among the plurality of apparatus-side terminals, and a third terminal that is coupled to the device and includes a third contact portion that is to come into contact with a corresponding third apparatus-side terminal among the plurality of apparatus-side terminals, the second terminal is used to detect whether or not the second terminal has a short circuit with at least one of terminals other than the second terminal in the other terminal group, in a plan view, when two orthogonal straight lines are set as a first virtual line and a second virtual line, and all contact portions of all the terminals provided at the liquid accommodation container are projected onto the second virtual line, all the contact portions are projected at different positions, and the first virtual line passes through a middle between two projection positions that are farthest from each other among projection positions of all the contact portions, when one region with respect to the first virtual line is set as a first region and the other region is set as a second region, some contact portions among all the contact portions are arranged in the first region, remaining contact portions are arranged in the second region, the some contact portions include the second contact portion and the third contact portion, and the remaining contact portions include the first contact portion, and the some contact portions and the remaining contact portions are asymmetrically arranged with respect to the first virtual line.

101. The liquid accommodation container according to Exemplary embodiment 100, wherein the first contact portion is a ground contact portion, and the first terminal is a ground terminal, the second contact portion is a data contact portion, and the second terminal is a data terminal, and the third contact portion is a clock contact portion, and the third terminal is a clock terminal.

102. The liquid accommodation container according to Exemplary embodiment 101, wherein a distance between the data contact portion and the ground contact portion is longer than a distance between the data contact portion and the clock contact portion.

103. The liquid accommodation container according to Exemplary embodiment 101 or Exemplary embodiment 102, wherein there is no other contact portion on a virtual line segment connecting the data contact portion and the clock contact portion.

104. The liquid accommodation container according to any one of Exemplary embodiments 101 to 103, wherein the other terminal group includes a reset terminal including a reset contact portion that is to come into contact with a corresponding apparatus-side terminal among the plurality of apparatus-side terminals, and the some contact portions include the reset contact portion.

105. The liquid accommodation container according to Exemplary embodiment 104, wherein a distance between the data contact portion and the ground contact portion is longer than a distance between the data contact portion and the reset contact portion.

106. The liquid accommodation container according to Exemplary embodiment 104 or Exemplary embodiment 105, wherein there is no other contact portion on a virtual line segment connecting the data contact portion and the reset contact portion.

107. The liquid accommodation container according to any one of Exemplary embodiments 101 to 106, wherein the other terminal group includes a power source terminal including a power-source contact portion that is to come into contact with a corresponding apparatus-side terminal among the plurality of apparatus-side terminals, and the some contact portions include the power-source contact portion.

108. The liquid accommodation container according to Exemplary embodiment 107, wherein a distance between the data contact portion and the ground contact portion is longer than a distance between the data contact portion and the power-source contact portion.

109. The liquid accommodation container according to Exemplary embodiment 107 or Exemplary embodiment 108, wherein there is no other contact portion on a virtual line segment connecting the data contact portion and the power-source contact portion.

110. The liquid accommodation container according to any one of Exemplary embodiments 107 to 109, wherein a voltage supplied to the power source terminal is used to drive the device.

111. The liquid accommodation container according to any one of Exemplary embodiments 101 to 110, wherein at least one of a contact portion of a terminal other than the data terminal among the other terminal group is arranged to be projected between a projection position of the data contact portion and a projection position of the ground contact portion.

112. The liquid accommodation container according to any one of Exemplary embodiments 101 to 111, wherein when a gap of a contact portion projected at a position farthest from a projection position of the ground contact portion when projection onto the second virtual line is performed, among contact portions for the other terminal group in the first region, from the ground contact portion provided in the second region in a direction along the second virtual line is set as Wa, a gap of a contact portion projected at a position closest to the projection position of the ground contact portion when projection onto the second virtual line is performed, among the contact portions for the other terminal group in the first region, from the ground contact portion provided in the second region in the direction along the second virtual line is equal to or more than Wa/2.

113. The liquid accommodation container according to any one of Exemplary embodiments 101 to 112, wherein there is no other contact portion between a contact portion projected at a position closest to a projection position of the ground contact portion when projection onto the second virtual line is performed, among contact portions for the other terminal group in the first region, and the ground contact portion provided in the second region.

114. The liquid accommodation container according to any one of Exemplary embodiments 101 to 113, wherein when the liquid accommodation container is mounted in a direction along a gravity direction, contact portions for the other terminal group other than the data contact portion are arranged closer in the gravity direction than the data contact portion, and the contact portions for the other terminal group other than the data contact portion are arranged to be projected between a projection position of the data contact portion and a projection position of the ground contact portion.

115. The liquid accommodation container according to any one of Exemplary embodiments 100 to 114, wherein the second terminal is used to detect whether or not the liquid accommodation container is mounted in the printing apparatus.

116. The liquid accommodation container according to any one of Exemplary embodiments 100 to 115, wherein voltages supplied to the other terminal group are configured to be received by the device.

117. The liquid accommodation container according to any one of Exemplary embodiments 100 to 116, further comprising:

a board, wherein the board includes the plurality of terminals and the device.

118. The liquid accommodation container according to any one of Exemplary embodiments 100 to 117, wherein the first virtual line is directed along a direction including a component of a mounting direction in which the liquid accommodation container is mounted in the printing apparatus.

119. The liquid accommodation container according to any one of Exemplary embodiments 100 to 118, wherein the device outputs signals indicating that the second terminal does not have a short circuit with the terminal other than the second terminal among the plurality of terminals and that the liquid accommodation container is being mounted in the printing apparatus.

120. The liquid accommodation container according to any one of Exemplary embodiments 100 to 119, wherein the device stores information regarding a liquid accommodated in the liquid accommodation container.

121. A liquid accommodation container that is mounted on an accommodation section of a printing apparatus including a printing head, a liquid introduction portion that introduces a liquid to the printing head, the accommodation section provided with the liquid introduction portion, and a plurality of apparatus-side terminals provided at the accommodation section, wherein the plurality of apparatus-side terminals includes a first apparatus-side terminal, a second apparatus-side terminal, a third apparatus-side terminal, a fourth apparatus-side terminal, and a fifth apparatus-side terminal, in a plan view, when two orthogonal straight lines are set as a first virtual line and a second virtual line, and projection positions when a contact portion of the first apparatus-side terminal, a contact portion of the second apparatus-side terminal, a contact portion of the third apparatus-side terminal, a contact portion of the fourth apparatus-side terminal, and a contact portion of the fifth apparatus-side terminal are projected onto the second virtual line are set as a first projection position, a second projection position, a third projection position, a fourth projection position, and a fifth projection position, respectively, when contact portions of all apparatus-side terminals are projected onto the second virtual line, the contact portions of all apparatus-side terminals are projected at different positions, and the first virtual line passes through a middle between two projection positions farthest from each other among projection positions of the contact portions of all apparatus-side terminals, when one region with respect to the first virtual line is set as a first region and the other region is set as a second region, contact portions of some apparatus-side terminals among all the apparatus-side terminals are arranged in the first region, contact portions of remaining apparatus-side terminals are arranged in the second region, the contact portions of the some apparatus-side terminals include the contact portion of the first apparatus-side terminal, the contact portion of the second apparatus-side terminal, the contact portion of the third apparatus-side terminal, and the contact portion of the fourth apparatus-side terminal, and the contact portions of the remaining apparatus-side terminals include the contact portion of the fifth apparatus-side terminal, the contact portions of the some apparatus-side terminals and the contact portions of the remaining apparatus-side terminals are asymmetrically arranged with respect to the first virtual line, the liquid accommodation container includes a liquid accommodation body configured to accommodate a liquid, a liquid supply portion that is mounted at the liquid introduction portion of the printing apparatus and includes a liquid supply port for supplying a liquid to the liquid introduction portion from the liquid accommodation body, a device, and a plurality of terminals, the plurality of terminals include at least a first terminal, a second terminal, a third terminal, a fourth terminal, and a fifth terminal, the first terminal is coupled to the device and includes a first contact portion that is to come into contact with the first apparatus-side terminal corresponding among the plurality of apparatus-side terminals in the printing apparatus when the board is mounted in the printing apparatus, the second terminal is coupled to the device and includes a second contact portion that is to come into contact with the second apparatus-side terminal corresponding among the plurality of apparatus-side terminals when the board is mounted in the printing apparatus, the third terminal is coupled to the device and includes a third contact portion that is to come into contact with the third apparatus-side terminal corresponding among the plurality of apparatus-side terminals when the board is mounted in the printing apparatus, the fourth terminal is coupled to the device and includes a fourth contact portion that is to come into contact with the fourth apparatus-side terminal corresponding among the plurality of apparatus-side terminals when the board is mounted in the printing apparatus, the fifth terminal is coupled to the device and includes a fifth contact portion that is to come into contact with the fifth apparatus-side terminal corresponding among the plurality of apparatus-side terminals when the board is mounted in the printing apparatus, and the first terminal is used to detect whether or not the first terminal has a short circuit with at least one of the second terminal, the third terminal, and the fourth terminal.

122. The liquid accommodation container according to Exemplary embodiment 121, wherein the contact portion of at least one apparatus-side terminal among the contact portion of the second apparatus-side terminal, the contact portion of the third apparatus-side terminal, and the contact portion of the fourth apparatus-side terminal is arranged to be projected between the first projection position and the fifth projection position.

123. The liquid accommodation container according to Exemplary embodiment 121 or Exemplary embodiment 122, wherein the contact portions of any two or more apparatus-side terminals among the contact portion of the second apparatus-side terminal, the contact portion of the third apparatus-side terminal, and the contact portion of the fourth apparatus-side terminal are arranged to be projected between the first projection position and the fifth projection position.

124. The liquid accommodation container according to any one of Exemplary embodiments 121 to 123, wherein the contact portion of the first apparatus-side terminal is arranged to be projected between projection positions of the contact portions of any two apparatus-side terminals among the contact portion of the second apparatus-side terminal, the contact portion of the third apparatus-side terminal, and the contact portion of the fourth apparatus-side terminal.

125. The liquid accommodation container according to any one of Exemplary embodiments 121 to 124, wherein the first contact portion is a data contact portion, the first terminal is a data terminal, and the first apparatus-side terminal is an apparatus-side data terminal, the second contact portion is a clock contact portion, the second terminal is a clock terminal, and the second apparatus-side terminal is an apparatus-side clock terminal, the third contact portion is a reset contact portion, the third terminal is a reset terminal, and the third apparatus-side terminal is an apparatus-side reset terminal, the fourth contact portion is a power-source contact portion, the fourth terminal is a power source terminal, and the fourth apparatus-side terminal is an apparatus-side power source terminal, and the fifth contact portion is a ground contact portion, the fifth terminal is a ground terminal, and the fifth apparatus-side terminal is an apparatus-side ground terminal.

126. The liquid accommodation container according to Exemplary embodiment 125, wherein any one or both of the contact portion of the apparatus-side data terminal and the contact portion of the apparatus-side reset terminal are arranged to be projected between the fourth projection position and the second projection position, and the contact portion of the apparatus-side reset terminal is arranged to have a projection position that is next to the fourth projection position.

127. The liquid accommodation container according to Exemplary embodiment 125 or Exemplary embodiment 126, wherein the contact portion of the apparatus-side power source terminal is arranged to have a projection position that is next to the first projection position.

128. The liquid accommodation container according to any one of Exemplary embodiments 125 to 127, wherein the contact portion of the apparatus-side clock terminal is arranged to be projected at a position that is farthest from the fifth projection position, and the contact portion of the apparatus-side data terminal, the contact portion of the apparatus-side power source terminal, and the contact portion of the apparatus-side reset terminal are arranged to be projected in order in a direction from the second projection position toward the fifth projection position on the second virtual line.

129. The liquid accommodation container according to any one of Exemplary embodiments 125 to 128, wherein a distance between the contact portion of the apparatus-side data terminal and the contact portion of the apparatus-side ground terminal is longer than a distance between the contact portion of the apparatus-side data terminal and the contact portion of the apparatus-side clock terminal.

130. The liquid accommodation container according to any one of Exemplary embodiments 125 to 129, wherein a distance between the contact portion of the apparatus-side data terminal and the contact portion of the apparatus-side ground terminal is longer than a distance between the contact portion of the apparatus-side data terminal and the contact portion of the apparatus-side reset terminal.

131. The liquid accommodation container according to any one of Exemplary embodiments 125 to 130, wherein a distance between the contact portion of the apparatus-side data terminal and the contact portion of the apparatus-side ground terminal is longer than a distance between the contact portion of the apparatus-side data terminal and the contact portion of the apparatus-side power source terminal.

132. The liquid accommodation container according to any one of Exemplary embodiments 125 to 131, wherein when a gap of a contact portion of an apparatus-side terminal, which is projected at a position farthest from the fifth projection position when projection onto the second virtual line is performed, among the contact portions of the apparatus-side terminals other than the contact portion of the apparatus-side ground terminal in the first region, from the contact portion of the apparatus-side ground terminal provided in the second region in a direction along the second virtual line is set as Wa, a gap of a contact portion of an apparatus-side terminal, which is projected at a position closest to the fifth projection position when projection onto the second virtual line is performed, among the contact portions of the apparatus-side terminals other than the contact portion of the apparatus-side ground terminal in the first region, from the contact portion of the apparatus-side ground terminal provided in the second region in a direction along the second virtual line is equal to or more than Wa/2.

133. The liquid accommodation container according to any one of Exemplary embodiments 125 to 132, wherein in the first region, there is no contact portion of another apparatus-side terminal between the contact portion of the apparatus-side terminal, which is projected at a position closest to the fifth projection position when projection onto the second virtual line is performed, among the contact portions of the apparatus-side terminals other than the contact portion of the apparatus-side ground terminal, and the contact portion of the apparatus-side ground terminal provided in the second region.

134. The liquid accommodation container according to any one of Exemplary embodiments 125 to 133, wherein there is no contact portion of another apparatus-side terminal on a virtual line segment connecting the contact portion of the apparatus-side data terminal and the contact portion of the apparatus-side clock terminal.

135. The liquid accommodation container according to any one of Exemplary embodiments 125 to 134, wherein there is no contact portion of another apparatus-side terminal on a virtual line segment connecting the contact portion of the apparatus-side data terminal and the contact portion of the apparatus-side reset terminal.

136. The liquid accommodation container according to any one of Exemplary embodiments 125 to 135, wherein there is no contact portion of another apparatus-side terminal on a virtual line segment connecting the contact portion of the apparatus-side data terminal and the contact portion of the apparatus-side power source terminal.

137. The liquid accommodation container according to any one of Exemplary embodiments 125 to 136, wherein when the board is mounted in a direction along a gravity direction, the contact portion of the apparatus-side clock terminal, the contact portion of the apparatus-side power source terminal, and the contact portion of the apparatus-side reset terminal are arranged closer in the gravity direction than the contact portion of the apparatus-side data terminal, and the contact portion of at least one apparatus-side terminal among the contact portion of the apparatus-side clock terminal, the contact portion of the apparatus-side power source terminal, and the contact portion of the apparatus-side reset terminal is arranged to be projected between the first projection position and the fifth projection position.

138. The liquid accommodation container according to any one of Exemplary embodiments 125 to 137, wherein the contact portion of the apparatus-side clock terminal, the contact portion of the apparatus-side data terminal, the contact portion of the apparatus-side power source terminal, the contact portion of the apparatus-side reset terminal, and the contact portion of the apparatus-side ground terminal are arranged to form a plurality of rows.

139. The liquid accommodation container according to Exemplary embodiment 138, wherein the plurality of rows includes two rows, and contact portions of two apparatus-side terminals, which are projected to be next to each other when projection onto the second virtual line is performed, form different rows.

140. The liquid accommodation container according to Exemplary embodiment 139, wherein the contact portion of the apparatus-side data terminal and the contact portion of the apparatus-side ground terminal are arranged in different rows, and the contact portion of any one apparatus-side terminal among the contact portion of the apparatus-side clock terminal, the contact portion of the apparatus-side power source terminal, and the contact portion of the apparatus-side reset terminal is arranged to be projected between the first projection position and the fifth projection position.

141. The liquid accommodation container according to any one of Exemplary embodiments 121 to 140, further comprising:

a board, wherein the board includes the plurality of terminals and the device.

142. The liquid accommodation container according to any one of Exemplary embodiments 121 to 141, wherein the first terminal is used to detect whether or not the liquid accommodation container is mounted in the printing apparatus.

143. The liquid accommodation container according to any one of Exemplary embodiments 121 to 142, wherein the fifth terminal is a ground terminal, and the fifth apparatus-side terminal is an apparatus-side ground terminal, and voltages supplied to the first terminal, the second terminal, the third terminal, and the fourth terminal are configured to be received by the device.

144. The liquid accommodation container according to any one of Exemplary embodiments 121 to 143, wherein the first virtual line is directed along a direction including a component of a mounting direction in which the liquid accommodation container is mounted in the printing apparatus.

145. The liquid accommodation container according to any one of Exemplary embodiments 121 to 144, wherein a voltage supplied to the fourth terminal is used to drive the device.

146. The liquid accommodation container according to any one of Exemplary embodiments 121 to 145, wherein the device outputs signals indicating that the first terminal does not have a short circuit with the terminal other than the first terminal among the plurality of terminals and that the liquid accommodation container is being mounted in the printing apparatus.

147. The liquid accommodation container according to any one of Exemplary embodiments 121 to 146, wherein the device stores information regarding a liquid accommodated in the liquid accommodation container.

148. A printing system comprising:

a printing apparatus;

a liquid accommodation body configured to accommodate a liquid;

a liquid supply portion that includes a liquid supply port;

a device;

a plurality of terminals; and a board provided with the device and the plurality of terminals, wherein the printing apparatus includes a printing head, a liquid introduction portion that introduces the liquid to the printing head, and a plurality of apparatus-side terminals, the liquid supply port supplies the liquid from the liquid accommodation body to the liquid introduction portion of the printing apparatus, the board is configured to be mounted in the printing apparatus and come into contact with the plurality of apparatus-side terminals, the plurality of terminals include at least a first terminal, a second terminal, a third terminal, a fourth terminal, and a fifth terminal, the first terminal is coupled to the device and includes a first contact portion that is to come into contact with a corresponding first apparatus-side terminal among the plurality of apparatus-side terminals, the second terminal is coupled to the device and includes a second contact portion that is to come into contact with a corresponding second apparatus-side terminal among the plurality of apparatus-side terminals, the third terminal is coupled to the device and includes a third contact portion that is to come into contact with a corresponding third apparatus-side terminal among the plurality of apparatus-side terminals, the fourth terminal is coupled to the device and includes a fourth contact portion that is to come into contact with a corresponding fourth apparatus-side terminal among the plurality of apparatus-side terminals, the fifth terminal is coupled to the device and includes a fifth contact portion that is to come into contact with a corresponding fifth apparatus-side terminal among the plurality of apparatus-side terminals, and the first terminal is used to detect whether or not the first terminal has a short circuit with at least one of the second terminal, the third terminal, and the fourth terminal, in a plan view, when two orthogonal straight lines are set as a first virtual line and a second virtual line, and all contact portions of all the terminals provided at the board are projected onto the second virtual line, all the contact portions are projected at different positions, and the first virtual line passes through a middle between two projection positions that are farthest from each other among projection positions of all the contact portions, when one region with respect to the first virtual line is set as a first region and the other region is set as a second region, some contact portions among all the contact portions are arranged in the first region, remaining contact portions are arranged in the second region, the some contact portions include the first contact portion, the second contact portion, the third contact portion, and the fourth contact portion, and the remaining contact portions include the fifth contact portion, and the some contact portions and the remaining contact portions are asymmetrically arranged with respect to the first virtual line.

149. The printing system according to Exemplary embodiment 148, wherein at least one of the second contact portion, the third contact portion, and the fourth contact portion is arranged to be projected between a projection position of the first contact portion and a projection position of the fifth contact portion.

150. The printing system according to Exemplary embodiment 148 or Exemplary embodiment 149, wherein any two or more of the second contact portion, the third contact portion, and the fourth contact portion are arranged to be projected between a projection position of the first contact portion and a projection position of the fifth contact portion.

151. The printing system according to any one of Exemplary embodiments 148 to 150, wherein the first contact portion is arranged to be projected between projection positions of any two contact portions of the second contact portion, the third contact portion, and the fourth contact portion.

152. The printing system according to any one of Exemplary embodiments 148 to 151, wherein the first contact portion is a data contact portion, and the first terminal is a data terminal, the second contact portion is a clock contact portion, and the second terminal is a clock terminal, the third contact portion is a reset contact portion, and the third terminal is a reset terminal, the fourth contact portion is a power-source contact portion, and the fourth terminal is a power source terminal, and the fifth contact portion is a ground contact portion, and the fifth terminal is a ground terminal.

153. The printing system according to Exemplary embodiment 152, wherein any one or both of the data contact portion and the reset contact portion are arranged to be projected between a projection position of the power-source contact portion and a projection position of the clock contact portion, and the reset contact portion is arranged to have a projection position that is next to a projection position of the power-source contact portion.

154. The printing system according to Exemplary embodiment 152 or Exemplary embodiment 153, wherein the power-source contact portion is arranged to have a projection position that is next to a projection position of the data contact portion.

155. The printing system according to any one of Exemplary embodiments 152 to 154, wherein the clock contact portion is arranged to be projected at a position that is farthest from a projection position of the ground contact portion, and the data contact portion, the power-source contact portion, and the reset contact portion are arranged to be projected in order in a direction from a projection position of the clock contact portion toward the projection position of the ground contact portion on the second virtual line.

156. The printing system according to any one of Exemplary embodiments 152 to 155, wherein a distance between the data contact portion and the ground contact portion is longer than a distance between the data contact portion and the clock contact portion.

157. The printing system according to any one of Exemplary embodiments 152 to 156, wherein a distance between the data contact portion and the ground contact portion is longer than a distance between the data contact portion and the reset contact portion.

158. The printing system according to any one of Exemplary embodiments 152 to 157, wherein a distance between the data contact portion and the ground contact portion is longer than a distance between the data contact portion and the power-source contact portion.

159. The printing system according to any one of Exemplary embodiments 152 to 158, wherein when a gap of a contact portion projected at a position farthest from a projection position of the ground contact portion when projection onto the second virtual line is performed, among the contact portions other than the ground contact portion in the first region, from the ground contact portion provided in the second region in a direction along the second virtual line is set as Wa, a gap of a contact portion projected at a position closest to the projection position of the ground contact portion when projection onto the second virtual line is performed, among the contact portions other than the ground contact portion in the first region, from the ground contact portion provided in the second region in the direction along the second virtual line is equal to or more than Wa/2.

160. The printing system according to any one of Exemplary embodiments 152 to 159, wherein there is no other contact portion between a contact portion projected at a position closest to a projection position of the ground contact portion when projection onto the second virtual line is performed, among the contact portions other than the ground contact portion in the first region, and the ground contact portion provided in the second region.

161. The printing system according to any one of Exemplary embodiments 152 to 160, wherein there is no other contact portion on a virtual line segment connecting the data contact portion and the clock contact portion.

162. The printing system according to any one of Exemplary embodiments 152 to 161, wherein there is no other contact portion on a virtual line segment connecting the data contact portion and the reset contact portion.

163. The printing system according to any one of Exemplary embodiments 152 to 162, wherein there is no other contact portion on a virtual line segment connecting the data contact portion and the power-source contact portion.

164. The printing system according to any one of Exemplary embodiments 152 to 163, wherein when the board is mounted in a direction along a gravity direction, the clock contact portion, the power-source contact portion, and the reset contact portion are arranged closer in the gravity direction than the data contact portion, and at least one of the clock contact portion, the power-source contact portion, and the reset contact portion is arranged to be projected between a projection position of the data contact portion and a projection position of the ground contact portion.

165. The printing system according to any one of Exemplary embodiments 152 to 164, wherein the clock contact portion, the data contact portion, the power-source contact portion, the reset contact portion, and the ground contact portion are arranged to form a plurality of rows.

166. The printing system according to Exemplary embodiment 165, wherein the plurality of rows includes two rows, and two contact portions which are next to each other on the board, which are projected to be next to each other when projection onto the second virtual line is performed, form different rows.

167. The printing system according to Exemplary embodiment 166, wherein the data contact portion and the ground contact portion are arranged in different rows, and any one of the clock contact portion, the power-source contact portion, and the reset contact portion is arranged to be projected between a projection position of the data contact portion and a projection position of the ground contact portion.

168. The printing system according to any one of Exemplary embodiments 148 to 167, wherein the first terminal is used to detect whether or not the board is mounted in the printing apparatus.

169. The printing system according to any one of Exemplary embodiments 148 to 168, wherein the fifth terminal is a ground terminal, and voltages supplied to the first terminal, the second terminal, the third terminal, and the fourth terminal are configured to be received by the device.

170. The printing system according to any one of Exemplary embodiments 148 to 169, wherein the first virtual line is directed along a direction including a component of a mounting direction in which the board is mounted in the printing apparatus.

171. The printing system according to any one of Exemplary embodiments 148 to 170, wherein a voltage supplied to the fourth terminal is used to drive the device.

172. The printing system according to any one of Exemplary embodiments 148 to 171, wherein the device outputs signals indicating that the first terminal does not have a short circuit with the terminal other than the first terminal among the plurality of terminals and that the board is being mounted in the printing apparatus.

173. The printing system according to any one of Exemplary embodiments 148 to 172, wherein the device stores information regarding the liquid.

174. A printing system comprising:

a printing apparatus; and a liquid accommodation container mounted in the printing apparatus, wherein the printing apparatus includes a printing head, a liquid introduction portion that introduces a liquid to the printing head, and a plurality of apparatus-side terminals, the liquid accommodation container includes a liquid accommodation body configured to accommodate a liquid, a liquid supply portion that includes a liquid supply port for supplying the liquid from the liquid accommodation body to the liquid introduction portion in the printing apparatus, a device, and a plurality of terminals, the plurality of terminals include at least a first terminal, a second terminal, a third terminal, a fourth terminal, and a fifth terminal, the first terminal is coupled to the device and includes a first contact portion that is to come into contact with a corresponding first apparatus-side terminal among the plurality of apparatus-side terminals, the second terminal is coupled to the device and includes a second contact portion that is to come into contact with a corresponding second apparatus-side terminal among the plurality of apparatus-side terminals, the third terminal is coupled to the device and includes a third contact portion that is to come into contact with a corresponding third apparatus-side terminal among the plurality of apparatus-side terminals, the fourth terminal is coupled to the device and includes a fourth contact portion that is to come into contact with a corresponding fourth apparatus-side terminal among the plurality of apparatus-side terminals, the fifth terminal is coupled to the device and includes a fifth contact portion that is to come into contact with a corresponding fifth apparatus-side terminal among the plurality of apparatus-side terminals, and the first terminal is used to detect whether or not the first terminal has a short circuit with at least one of the second terminal, the third terminal, and the fourth terminal, in a plan view, when two orthogonal straight lines are set as a first virtual line and a second virtual line, and all contact portions of all the terminals provided at the liquid accommodation container are projected onto the second virtual line, all the contact portions are projected at different positions, and the first virtual line passes through a middle between two projection positions that are farthest from each other among projection positions of all the contact portions, when one region with respect to the first virtual line is set as a first region and the other region is set as a second region, some contact portions among all the contact portions are arranged in the first region, remaining contact portions are arranged in the second region, the some contact portions include the first contact portion, the second contact portion, the third contact portion, and the fourth contact portion, and the remaining contact portions include the fifth contact portion, and the some contact portions and the remaining contact portions are asymmetrically arranged with respect to the first virtual line.

175. The printing system according to Exemplary embodiment 174, wherein at least one of the second contact portion, the third contact portion, and the fourth contact portion is arranged to be projected between a projection position of the first contact portion and a projection position of the fifth contact portion.

176. The printing system according to Exemplary embodiment 174 or Exemplary embodiment 175, wherein any two or more of the second contact portion, the third contact portion, and the fourth contact portion are arranged to be projected between a projection position of the first contact portion and a projection position of the fifth contact portion.

177. The printing system according to any one of Exemplary embodiments 174 to 176, wherein the first contact portion is arranged to be projected between projection positions of any two contact portions of the second contact portion, the third contact portion, and the fourth contact portion.

178. The printing system according to any one of Exemplary embodiments 174 to 177, wherein the first contact portion is a data contact portion, and the first terminal is a data terminal, the second contact portion is a clock contact portion, and the second terminal is a clock terminal, the third contact portion is a reset contact portion, and the third terminal is a reset terminal, the fourth contact portion is a power-source contact portion, and the fourth terminal is a power source terminal, and the fifth contact portion is a ground contact portion, and the fifth terminal is a ground terminal.

179. The printing system according to Exemplary embodiment 178, wherein any one or both of the data contact portion and the reset contact portion are arranged to be projected between a projection position of the power-source contact portion and a projection position of the clock contact portion, and the reset contact portion is arranged to have a projection position that is next to a projection position of the power-source contact portion.

180. The printing system according to Exemplary embodiment 178 or Exemplary embodiment 179, wherein the power-source contact portion is arranged to have a projection position that is next to a projection position of the data contact portion.

181. The printing system according to any one of Exemplary embodiments 178 to 180, wherein the clock contact portion is arranged to be projected at a position that is farthest from a projection position of the ground contact portion, and the data contact portion, the power-source contact portion, and the reset contact portion are arranged to be projected in order in a direction from a projection position of the clock contact portion toward the projection position of the ground contact portion on the second virtual line.

182. The printing system according to any one of Exemplary embodiments 178 to 181, wherein a distance between the data contact portion and the ground contact portion is longer than a distance between the data contact portion and the clock contact portion.

183. The printing system according to any one of Exemplary embodiments 178 to 182, wherein a distance between the data contact portion and the ground contact portion is longer than a distance between the data contact portion and the reset contact portion.

184. The printing system according to any one of Exemplary embodiments 178 to 183, wherein a distance between the data contact portion and the ground contact portion is longer than a distance between the data contact portion and the power-source contact portion.

185. The printing system according to any one of Exemplary embodiments 178 to 184, wherein when a gap of a contact portion projected at a position farthest from a projection position of the ground contact portion when projection onto the second virtual line is performed, among the contact portions other than the ground contact portion in the first region, from the ground contact portion provided in the second region in a direction along the second virtual line is set as Wa, a gap of a contact portion projected at a position closest to the projection position of the ground contact portion when projection onto the second virtual line is performed, among the contact portions other than the ground contact portion in the first region, from the ground contact portion provided in the second region in the direction along the second virtual line is equal to or more than Wa/2.

186. The printing system according to any one of Exemplary embodiments 178 to 185, wherein there is no other contact portion between a contact portion projected at a position closest to a projection position of the ground contact portion when projection onto the second virtual line is performed, among the contact portions other than the ground contact portion in the first region, and the ground contact portion provided in the second region.

187. The printing system according to any one of Exemplary embodiments 178 to 186, wherein there is no other contact portion on a virtual line segment connecting the data contact portion and the clock contact portion.

188. The printing system according to any one of Exemplary embodiments 178 to 187, wherein there is no other contact portion on a virtual line segment connecting the data contact portion and the reset contact portion.

189. The printing system according to any one of Exemplary embodiments 178 to 188, wherein there is no other contact portion on a virtual line segment connecting the data contact portion and the power-source contact portion.

190. The printing system according to any one of Exemplary embodiments 178 to 189, wherein when the liquid accommodation container is mounted in a direction along a gravity direction, the clock contact portion, the power-source contact portion, and the reset contact portion are arranged closer in the gravity direction than the data contact portion, and at least one of the clock contact portion, the power-source contact portion, and the reset contact portion is arranged to be projected between a projection position of the data contact portion and a projection position of the ground contact portion.

191. The printing system according to any one of Exemplary embodiments 178 to 190, wherein the clock contact portion, the data contact portion, the power-source contact portion, the reset contact portion, and the ground contact portion are arranged to form a plurality of rows.

192. The printing system according to Exemplary embodiment 191, wherein the plurality of rows includes two rows, and two contact portions on the liquid accommodation container, which are projected to be next to each other when projection onto the second virtual line is performed, form different rows.

193. The printing system according to Exemplary embodiment 192, wherein the data contact portion and the ground contact portion are arranged in different rows, and any one of the clock contact portion, the power-source contact portion, and the reset contact portion is arranged to be projected between a projection position of the data contact portion and a projection position of the ground contact portion.

194. The printing system according to any one of Exemplary embodiments 174 to 193, wherein the first terminal is used to detect whether or not the liquid accommodation container is mounted in the printing apparatus.

195. The printing system according to any one of Exemplary embodiments 174 to 194, wherein the fifth terminal is a ground terminal, and voltages supplied to the first terminal, the second terminal, the third terminal, and the fourth terminal are configured to be received by the device.

196. The printing system according to any one of Exemplary embodiments 174 to 195, wherein the first virtual line is directed along a direction including a component of a mounting direction in which the liquid accommodation container is mounted in the printing apparatus.

197. The printing system according to any one of Exemplary embodiments 174 to 196, further comprising:

a board, wherein the board includes the plurality of terminals and the device.

198. The printing system according to any one of Exemplary embodiments 174 to 197, wherein a voltage supplied to the fourth terminal is used to drive the device.

199. The printing system according to any one of Exemplary embodiments 174 to 198, wherein the device outputs signals indicating that the first terminal does not have a short circuit with the terminal other than the first terminal among the plurality of terminals and that the liquid accommodation container is being mounted in the printing apparatus.

200. The printing system according to any one of Exemplary embodiments 174 to 199, wherein the device stores information regarding a liquid accommodated in the liquid accommodation container.

What is claimed is:

1. A board that is configured to be mounted in a printing apparatus, the printing apparatus including a printing head and an accommodation section in which a liquid accommodation container can be mounted, the accommodation section including (i) a liquid introduction portion that introduces a liquid to the printing head, and (ii) a plurality of apparatus-side terminals, the board comprising:

a base member;

a device provided at the base member; and a plurality of terminals provided at the base member, wherein each of the plurality of terminals is electrically coupled to the device and includes a contact portion, and wherein the plurality of terminals includes:

a ground terminal with a ground contact portion that is arranged to contact a corresponding apparatus-side ground terminal among the plurality of apparatus-side terminals when the board is mounted in the printing apparatus, a data terminal with a data contact portion that is arranged to contact a corresponding apparatus-side data terminal among the plurality of apparatus-side terminals when the board is mounted in the printing apparatus, and a clock terminal with a clock contact portion that is arranged to contact a corresponding apparatus-side clock terminal among the plurality of apparatus-side terminals when the board is mounted in the printing apparatus, wherein the data terminal is configured such that the data terminal can be used to detect whether or not the data terminal has a short circuit with the clock terminal, and wherein the board is arranged so that, in a plan view, when (i) two orthogonal straight lines are set as a first virtual line and a second virtual line, and (ii) a position of each contact portion on the base member is projected in a direction perpendicular to the second virtual line onto the second virtual line as a projection position, including projection positions of the data contact portion, the clock contact portion, and the ground contact portion, (a) the projection position of all contact portions on the base member are different from each other, and the first virtual line passes through a middle between two projection positions that are farthest from each other among the projection positions of all of the contact portions, and (b) the first virtual line defines a first region of the base member on one side of the first virtual line and a second region of the base member on the other side of the first virtual line, and the data contact portion and the clock contact portion are arranged in the first region, and the ground contact portions is arranged in the second region.

2. The board of claim 1, wherein the contact portions are arranged on the base member such that:

among the projection positions of the data contact portion and the clock contact portion, the projection position of the clock contact portion is farthest from the projection position of the ground contact portion.

3. The board of claim 1, wherein, when the board is mounted in the direction of gravity, the clock contact portion is arranged farther in the direction of gravity than the data contact portion.

4. The board of claim 1, wherein the first virtual line is parallel to a mounting direction in which the board is mounted in the printing apparatus.

5. The board of claim 1, wherein the base member comprises a plurality of base members, and the device is arranged on a first base member among the plurality of base members, and the ground terminal is arranged on a second base member among the plurality of base members.

6. The board of claim 1, wherein the base member comprises a plurality of parts, and the device is arranged on a first part among the plurality of parts, and the ground terminal is arranged on a second part among the plurality of parts.

7. A liquid accommodation container that is configured to be mounted at an accommodation section of a printing apparatus, the printing apparatus including a printing head, the accommodation section including (i) a liquid introduction portion that introduces a liquid to the printing head, and (ii) a plurality of apparatus-side terminals, the liquid accommodation container comprising:

a liquid accommodation body configured to accommodate a liquid;

a liquid supply portion that includes a liquid supply port through which a liquid from the liquid accommodation body can be supplied to the liquid introduction port when the liquid accommodation container is mounted at the accommodation section;

a device; and a plurality of terminals, wherein each of the plurality of terminals is electrically coupled to the device and includes a contact portion, and wherein the plurality of terminals includes:

a ground terminal with a ground contact portion that is arranged to contact a corresponding apparatus-side ground terminal among the plurality of apparatus-side terminals when the liquid accommodation container is mounted at the accommodation section, a data terminal with a data contact portion that is arranged to contact a corresponding apparatus-side data terminal among the plurality of apparatus-side terminals when the liquid accommodation container is mounted at the accommodation section, and a clock terminal with a clock contact portion that is arranged to contact a corresponding apparatus-side clock terminal among the plurality of apparatus-side terminals when the liquid accommodation container is mounted at the accommodation section;

wherein the data terminal is configured such that the data terminal can be used to detect whether or not the data terminal has a short circuit with the clock terminal, and wherein in a plan view of the plurality of terminals, when (i) two orthogonal straight lines are set as a first virtual line and a second virtual line, and (ii) a position of each contact portion is projected in a direction perpendicular to the second virtual line onto the second virtual line as a projection position, including projection positions of the data contact portion, the clock contact portion and the ground contact portion, (a) the projection positions of all contact portions are different from each other, and the first virtual line passes through a middle between two projection positions that are farthest from each other among the projection positions of all of the contact portions, and (b) the first virtual line defines a first region on one side of the first virtual line and a second region on the other side of the first virtual line, and the data contact portion and the clock contact portion are arranged in the first region, and the ground contact portion is arranged in the second region.

8. The liquid accommodation container of claim 7, wherein the contact portions are arranged on a surface such that:

among the projection positions of the data contact portion and the clock contact portion, the projection position of the clock contact portion is farthest from the projection position of the ground contact portion.

9. The liquid accommodation container of claim 7, wherein when the liquid accommodation container is mounted in the direction of gravity, the clock contact portion is arranged farther in the direction of gravity than the data contact portion.

10. The liquid accommodation container of claim 7, wherein the first virtual line is parallel to a mounting direction in which the liquid accommodation container is mounted in the printing apparatus.

11. The liquid accommodation container of claim 7, wherein each of the plurality of terminals is provided at a base member provided at the liquid accommodation body and the base member comprises a plurality of base members, and the device is arranged on a first base member among the plurality of base members, and the ground terminal is arranged on a second base member among the plurality of base members.

12. The liquid accommodation container of claim 7, wherein each of the plurality of terminals is provided at a base member provided at the liquid accommodation body and the base member comprises a plurality of parts, and the device is arranged on a first part among the plurality of parts, and the ground terminal is arranged on a second part among the plurality of parts.

13. A board that is configured to be mounted in a printing apparatus, the printing apparatus including a printing head and an accommodation section in which a liquid accommodation container can be mounted, the accommodation section including (i) a liquid introduction portion that introduces a liquid to the printing head, and (ii) a plurality of apparatus-side terminals, the board comprising:

a base member;

a device provided at the base member; and a plurality of terminals provided at the base member, wherein each of the plurality of terminals is electrically coupled to the device and includes a contact portion, and wherein the plurality of terminals includes:

a ground terminal with a ground contact portion that is arranged to contact a corresponding apparatus-side ground terminal among the plurality of apparatus-side terminals when the board is mounted in the printing apparatus, a data terminal with a data contact portion that is arranged to contact a corresponding apparatus-side data terminal among the plurality of apparatus-side terminals when the board is mounted in the printing apparatus, a clock terminal with a clock contact portion that is arranged to contact a corresponding apparatus-side clock terminal among the plurality of apparatus-side terminals when the board is mounted in the printing apparatus, and another terminal with another contact portion, the another terminal being either:

a reset terminal with a reset contact portion that is arranged to contact a corresponding apparatus-side reset terminal among the plurality of apparatus-side terminals when the board is mounted in the printing apparatus, or a power-source terminal with a power-source contact portion that is arranged to contact a corresponding apparatus-side power-source terminal among the plurality of apparatus-side terminals when the board is mounted in the printing apparatus;

wherein the data terminal is configured such that the data terminal can be used to detect whether or not the data terminal has a short circuit with at least one of the clock terminal and the another terminal, and wherein the board is arranged so that, in a plan view, when (i) two orthogonal straight lines are set as a first virtual line and a second virtual line, and (ii) a position of each contact portion on the base member is projected in a direction perpendicular to the second virtual line onto the second virtual line as a projection position, including projection positions of the data contact portion, the clock contact portion, the another contact portion and the ground contact portion, (a) the projection position of all contact portions on the base member are different from each other, and the first virtual line passes through a middle between two projection positions that are farthest from each other among the projection positions of all of the contact portions, and (b) the first virtual line defines a first region of the base member on one side of the first virtual line and a second region of the base member on the other side of the first virtual line, and the data contact portion, the clock contact portion and the another contact portion are arranged in the first region, and ground contact portion is arranged in the second region.

14. The board of claim 13, wherein the contact portions are arranged on the base member such that:

among the projection positions of the data contact portion, the clock contact portion and the another contact portion, the projection position of the clock contact portion is farthest from the projection position of the ground contact portion.

15. The board of claim 14, wherein in a direction that extends on the second virtual line from the projection position of the clock contact portion to the projection position of the ground contact portion, the projection positions of the data contact portion and the another contact portion are in an order of: (a) the projection position of the data contact portion, and (b) the projection position of the another contact portion.

16. The board of claim 13, wherein when the board is mounted in the direction of gravity, the clock contact portion and the another contact portion are arranged farther in the direction of gravity than the data contact portion.

17. The board of claim 13, wherein the first virtual line is parallel to a mounting direction in which the board is mounted in the printing apparatus.

18. The board of claim 13, wherein the base member comprises a plurality of base members, and the device is arranged on a first base member among the plurality of base members, and the ground terminal is arranged on a second base member among the plurality of base members.

19. The board of claim 13, wherein the base member comprises a plurality of parts, and the device is arranged on a first part among the plurality of parts, and the ground terminal is arranged on a second part among the plurality of parts.

20. A liquid accommodation container that is configured to be mounted at an accommodation section of a printing apparatus, the printing apparatus including a printing head, the accommodation section including (i) a liquid introduction portion that introduces a liquid to the printing head, and (ii) a plurality of apparatus-side terminals, the liquid accommodation container comprising:

a liquid accommodation body configured to accommodate a liquid;

a liquid supply portion that includes a liquid supply port through which a liquid from the liquid accommodation body can be supplied to the liquid introduction port when the liquid accommodation container is mounted at the accommodation section;

a device; and a plurality of terminals, wherein each of the plurality of terminals is electrically coupled to the device and includes a contact portion, and wherein the plurality of terminals includes:

a ground terminal with a ground contact portion that is arranged to contact a corresponding apparatus-side ground terminal among the plurality of apparatus-side terminals when the liquid accommodation container is mounted at the accommodation section, a data terminal with a data contact portion that is arranged to contact a corresponding apparatus-side data terminal among the plurality of apparatus-side terminals when the liquid accommodation container is mounted at the accommodation section, a clock terminal with a clock contact portion that is arranged to contact a corresponding apparatus-side clock terminal among the plurality of apparatus-side terminals when the liquid accommodation container is mounted at the accommodation section, and another terminal with another contact portion, the another terminal being either:

a reset terminal with a reset contact portion that is arranged to contact a corresponding apparatus-side reset terminal among the plurality of apparatus-side terminals when the liquid accommodation container is mounted at the accommodation section, or a power-source terminal with a power-source contact portion that is arranged to contact a corresponding apparatus-side power-source terminal among the plurality of apparatus-side terminals when the liquid accommodation container is mounted at the accommodation section;

wherein the data terminal is configured such that the data terminal can be used to detect whether or not the data terminal has a short circuit with at least one of the clock terminal and the another terminal, and wherein in a plan view of the plurality of terminals, when (i) two orthogonal straight lines are set as a first virtual line and a second virtual line, and (ii) a position of each contact portion is projected in a direction perpendicular to the second virtual line onto the second virtual line as a projection position, including projection positions of the data contact portion, the clock contact portion and the ground contact portion, (a) the projection positions of all contact portions are different from each other, and the first virtual line passes through a middle between two projection positions that are farthest from each other among the projection positions of all of the contact portions, and (b) the first virtual line defines a first region on one side of the first virtual line and a second region on the other side of the first virtual line, and the data contact portion, clock contact portion, and the another contact portion are arranged in the first region and the ground contact portion is arranged in the second region.

21. The liquid accommodation container of claim 20, wherein the contact portions are arranged on a surface such that:

among the projection positions of the data contact portion, the clock contact portion and the another contact portion, the projection position of the clock contact portion is farthest from the projection position of the ground contact portion.

22. The liquid accommodation container of claim 20, wherein the contact portions are arranged on a surface such that:

in a direction that extends on the second virtual line from the projection position of the clock contact portion to the projection position of the ground contact portion, the projection positions of the data contact portion and the another contact portion are in an order of: (a) the projection position of the data contact portion, and (b) the projection position of the another contact portion.

23. The liquid accommodation container of claim 20, wherein when the liquid accommodation container is mounted in the direction of gravity, the clock contact portion and the another contact portion are arranged farther in the direction of gravity than the data contact portion.

24. The liquid accommodation container of claim 20, wherein the first virtual line is parallel to a mounting direction in which the liquid accommodation container is mounted in the printing apparatus.

25. The liquid accommodation container of claim 20, wherein each of the plurality of terminals is provided at a base member provided at the liquid accommodation body and the base member comprises a plurality of base members, and the device is arranged on a first base member among the plurality of base members, and the ground terminal is arranged on a second base member among the plurality of base members.

26. The liquid accommodation container of claim 20, wherein each of the plurality of terminals is provided at a base member provided at the liquid accommodation body and the base member comprises a plurality of parts, and the device is arranged on a first part among the plurality of parts, and the ground terminal is arranged on a second part among the plurality of parts.

* * * * *